US009747319B2

(12) United States Patent
Bestler et al.

(10) Patent No.: US 9,747,319 B2
(45) Date of Patent: Aug. 29, 2017

(54) READ-MODIFY-WRITE PROCESSING OF CHUNKS AT THE STORAGE SERVER LEVEL IN A DISTRIBUTED OBJECT STORAGE SYSTEM

(71) Applicant: Nexenta Systems, Inc., Santa Clara, CA (US)

(72) Inventors: Caitlin Bestler, Sunnyvale, CA (US); Robert E. Novak, Union City, CA (US); Alexander Aizman, Santa Clara, CA (US)

(73) Assignee: Nexenta Systems, Inc., Santa Clara, CA (US)

( * ) Notice: Subject to any disclaimer, the term of this patent is extended or adjusted under 35 U.S.C. 154(b) by 0 days.

(21) Appl. No.: 14/821,698

(22) Filed: Aug. 8, 2015

(65) Prior Publication Data

US 2016/0191250 A1   Jun. 30, 2016

Related U.S. Application Data

(60) Provisional application No. 62/098,727, filed on Dec. 31, 2014.

(51) Int. Cl.
*G06F 17/30* (2006.01)
*H04L 9/32* (2006.01)
(Continued)

(52) U.S. Cl.
CPC ........ *G06F 17/3033* (2013.01); *G06F 3/0619* (2013.01); *G06F 3/0665* (2013.01);
(Continued)

(58) Field of Classification Search
CPC . H04L 63/08; H04L 63/0807; H04L 63/0815; H04L 63/0846; H04L 63/0853; H04L 63/0869; H04L 63/0892; H04L 9/32; H04L 9/3202; H04L 9/3205; H04L 9/321; H04L 9/3213; H04L 9/3215; H04L 9/3218; H04L 9/3221; H04L 9/3242; H04L 9/3239; H04L 63/062; H04L 63/0876; H04L 67/1097; H04L 2209/24; G06F 17/3033;
(Continued)

(56) References Cited

U.S. PATENT DOCUMENTS 6,188,650 B1   2/2001   Hamada et al.
7,389,393 B1 *  6/2008   Karr ............... G06F 3/0613
                                          711/103
(Continued)

*Primary Examiner* — Izunna Okeke
*Assistant Examiner* — Shahriar Zarrineh
(74) *Attorney, Agent, or Firm* — Okamoto & Benedicto LLP

(57) ABSTRACT

The present disclosure provides systems and methods for sharding objects stored in a distributed storage system. Such sharding may be advantageously utilized for an object that stores a collection of key-value records and for otherwise encoded objects. The object sharding techniques disclosed herein advantageously enable a read-modify-write process at the storage server level. One embodiment disclosed herein provides a method of creating a new chunk by modifying a payload of an existing chunk at the storage server level in a distributed object storage system. The method includes validating the new chunk at the gateway server. Other embodiments, aspects and features are also disclosed.

20 Claims, 59 Drawing Sheets

(51) Int. Cl.
*G06F 3/06* (2006.01)
*H04L 29/06* (2006.01)
*G06F 12/14* (2006.01)
*H04L 29/08* (2006.01)

(52) U.S. Cl.
CPC ........ *G06F 3/0689* (2013.01); *G06F 12/1408* (2013.01); *H04L 9/3242* (2013.01); *H04L 63/062* (2013.01); *H04L 63/0807* (2013.01); *H04L 63/0853* (2013.01); *H04L 63/0876* (2013.01); *H04L 9/3239* (2013.01); *H04L 67/1097* (2013.01); *H04L 2209/24* (2013.01)

(58) Field of Classification Search
CPC .... G06F 3/0619; G06F 3/0665; G06F 3/0689; G06F 12/1408
USPC ....................................................... 713/168
See application file for complete search history.

(56) References Cited

U.S. PATENT DOCUMENTS

| | | | | |
|---|---|---|---|---|
| 8,099,550 B1* | 1/2012 | Madnani | ............... | H04L 12/185 370/312 |
| 8,290,919 B1* | 10/2012 | Kelly | ................ | G06F 17/30097 707/698 |
| 8,458,462 B1* | 6/2013 | Hanna | .................... | H04L 63/10 713/156 |
| 8,621,176 B2 | 12/2013 | Schindler | | |
| 8,856,233 B2* | 10/2014 | Lacapra | ............ | G06F 17/30206 707/622 |
| 8,924,663 B2* | 12/2014 | Szczepkowski | ...... | G06F 3/0608 711/103 |
| 9,411,862 B1* | 8/2016 | Wang | ................ | G06F 17/30557 |
| 9,519,594 B2* | 12/2016 | Flynn | .................... | G06F 1/183 |
| 2002/0078174 A1* | 6/2002 | Sim | ................... | G06F 17/30194 709/219 |
| 2004/0078419 A1* | 4/2004 | Ferrari | .................... | H04L 29/06 709/201 |
| 2004/0215709 A1* | 10/2004 | Basani | ................ | H04L 67/1095 709/201 |
| 2007/0266174 A1* | 11/2007 | Bestler | .................... | H04L 12/18 709/238 |
| 2009/0067426 A1* | 3/2009 | Ko | ....................... | H04L 12/185 370/390 |
| 2010/0070466 A1 | 3/2010 | Prahlad et al. | | |
| 2010/0070474 A1 | 3/2010 | Lad | | |
| 2010/0106779 A1* | 4/2010 | Yamauchi | ........... | H04L 12/1836 709/205 |
| 2010/0241629 A1* | 9/2010 | Tatemura | .......... | G06F 17/30557 707/741 |
| 2011/0179232 A1 | 7/2011 | Schindler | | |
| 2011/0196829 A1* | 8/2011 | Vickrey | ............ | G06F 17/30581 707/622 |
| 2011/0276789 A1* | 11/2011 | Chambers | ............. | G06F 9/3885 712/220 |
| 2012/0084383 A1* | 4/2012 | Bernbo | ............. | G06F 17/30215 709/213 |
| 2012/0233328 A1* | 9/2012 | Iyoob | .................... | G06F 9/5061 709/226 |
| 2012/0254193 A1* | 10/2012 | Chattopadhyay | . | G06F 17/30979 707/747 |
| 2013/0041872 A1* | 2/2013 | Aizman | ............ | G06F 17/30194 707/690 |
| 2013/0103729 A1* | 4/2013 | Cooney | ............. | G06F 17/30126 707/831 |
| 2013/0311612 A1* | 11/2013 | Dickinson | ............. | G06F 17/301 709/219 |
| 2014/0059217 A1* | 2/2014 | Pizurica | ................... | H04L 43/08 709/224 |
| 2014/0108421 A1* | 4/2014 | Isaacson | ............ | G06F 17/30575 707/747 |
| 2014/0108470 A1 | 4/2014 | Lad | | |
| 2014/0129618 A1* | 5/2014 | Panje | ................ | H04N 21/26258 709/203 |
| 2014/0140343 A1* | 5/2014 | Onoue | ................ | H04L 12/1881 370/390 |
| 2014/0204940 A1 | 7/2014 | Bestler et al. | | |
| 2014/0204941 A1 | 7/2014 | Bestler et al. | | |
| 2014/0207849 A1 | 7/2014 | Bestler et al. | | |
| 2014/0207850 A1 | 7/2014 | Bestler et al. | | |
| 2014/0304357 A1 | 10/2014 | Bestler et al. | | |
| 2015/0007183 A1* | 1/2015 | Luo | ....................... | G06F 9/4806 718/102 |
| 2015/0163301 A1* | 6/2015 | Narayanan | ............. | H04L 67/06 709/205 |
| 2015/0330621 A1* | 11/2015 | Min | ....................... | F21V 29/773 362/363 |
| 2016/0085839 A1* | 3/2016 | D'Halluin | ......... | G06F 17/30289 707/747 |

\* cited by examiner

Named Chunk Put Proposal Message

| Named Chunk Put Proposal Message |
|---|
| Total # of Fragments in Message |
| Target Negotiating Group |
| Content Hash ID |
| Bucket Hash ID |
| Name Hash ID |
| Unique Version Identifier |
| Name |
| Length of non-volatile content |
| Length of above included in the Put Proposal message. |
| Delivery Group |
| Maximum Delivery Rate |

Unnamed Chunk Put Proposal Message

| Unnamed Chunk Put Proposal Message |
|---|
| Total # of Fragments in Message |
| Target Negotiating Group |
| Content Hash ID |
| Length of Tracking Tokens |
| Length of non-volatile content |
| Length of content included in the Put Proposal message. |
| Delivery Group |
| Maximum Delivery Rate |

FIG. 24

Chunk Accept Message Proposed Rendezvous

| |
|---|
| Proposed Rendezvous Chunk Accept Message |
| Total # of Fragments in Message (1) |
| Target Negotiating Group |
| Copy of Put Proposal ID (Source, Sequence #, Sub-Sequence #) |
| Proposed Rendezvous (Time, Max Bandwidth) |

Chunk Accept Message Content Already Stored

| |
|---|
| Content Already Stored Chunk Accept Message |
| Total # of Fragments in Message (1) |
| Target Negotiating Group |
| Copy of Put Proposal ID (Source, Sequence #) |

Chunk Accept Message Not Now

| |
|---|
| Not Now Chunk Accept Message |
| Total # of Fragments in Message (1) |
| Target Negotiating Group |
| Copy of Put Proposal ID (Source, Sequence #, Sub-Sequence #) |
| Earliest Suggested Retry |

FIG. 25

Rendezvous Transfer Message

| Rendezvous Transfer Message Type |
| --- |
| Total # of Fragments in Message |
| Target Delivery Group |
| List of Delivery Group Members |
| Delivery Rate |
| Content Hash ID of Chunk |
| Length of Tracking Tokens |
| Length of Payload |
| Remaining Content (tracking tokens and payload) not included in original Put Proposal |

Rendezvous Transfer Message with Arbitrary Chunk ID

| Arbitrary Chunk ID Rendezvous Transfer Message Type |
| --- |
| Total # of Fragments in Message |
| Target Delivery Group |
| List of Delivery Group Members |
| Delivery Rate |
| Content Hash ID of Chunk |
| Arbitrary Chunk ID |
| Length of Tracking Tokens |
| Length of Payload |
| Remaining Content (tracking tokens and payload) not included in original Put Proposal |

FIG. 26

Named Payload Ack Message

| Named Payload Ack Message |
|---|
| Total # of Fragments in Message (1) |
| Copy of Put Proposal ID (Source, Sequence #) |
| Content Hash ID |
| Bucket ID |
| Name Hash ID |
| Unique Version Identifier |

Payload NAK Message

| Specific Payload NACK Error Code |
|---|
| Total # of Fragments in Message (1) |
| Copy of Put Proposal ID (Source, Sequence #) |
| Content Hash ID |

Unnamed Payload Ack Message

| Unnamed Payload Ack Message |
|---|
| Total # of Fragments in Message (1) |
| Copy of Put Proposal ID (Source, Sequence #) |
| Content Hash ID |

FIG. 27

Named Chunk Get Message

| Named Chunk Get Request Message |
|---|
| Total # of Fragments in Message (1) |
| Target Negotiating Group |
| Name: Bucket Hash ID / Name Hash ID / Unique Version Identifier Range |
| Delivery Group |
| Maximum Immediate Content Size per Get |
| Maximum # of Delegated Gets |
| Reception Window(s) |

Unnamed Chunk Get Message

| Unnamed Chunk Get Request Message |
|---|
| Total # of Fragments in Message (1) |
| Target Negotiating Group |
| Content Hash ID |
| Sub-sequence # |
| Delivery Group |
| Maximum Immediate Content Size per Get |
| Reception Window |

FIG. 28

Named Chunk Get Response Message

| Named Chunk Get Response Message |
| --- |
| Total # of Fragments in Message (1) |
| Target Negotiating Group |
| Copy of Get Request ID (Source, Sequence #, Sub-sequence #)) |
| Delivery Group |
| Timestamp when response would occur |
| ID of storage server |
| Content Hash ID |
| Bucket ID |
| Name Hash ID |
| Unique Version ID |
| Delivery Rate |
| Content Length |
| Immediate Content Length |
| Immediate Content |

Unnamed Chunk Get Response Message

| Unnamed Chunk Get Response Message |
| --- |
| Total # of Fragments in Message (1) |
| Target Negotiating Group |
| Copy of Get Request ID (Source, Sequence #, Sub-sequence #)) |
| Delivery Group |
| Timestamp when response would occur |
| ID of storage server |
| Content Hash ID |
| Delivery Rate |
| Content Length |
| Immediate Content Length |
| Immediate Content |

FIG. 29

Error Get Response Message

| Error Code for Chunk Get Response Message | Total # of Fragments in Message (1) | Target Negotiating Group | Copy of Get Request ID (Source, Sequence #, Sub-sequence #)) | Delivery Group |
|---|---|---|---|---|

Block-Shard Chunk Reference 4300

| Offset Range for Block (for example, Logical Offset and Logical Length) 4302 | Shard Number 4304 | Total Number of Shards for Object 4306 | Content Hash Identifying Token (CHIT) 4308 |
|---|---|---|---|

READ-MODIFY-WRITE PROCESSING OF CHUNKS AT THE STORAGE SERVER LEVEL IN A DISTRIBUTED OBJECT STORAGE SYSTEM

CROSS-REFERENCE TO RELATED APPLICATION(S)

The present application claims the benefit of U.S. Provisional Patent Application No. 62/098,727, filed Dec. 31, 2014, the disclosure of which is hereby incorporated by reference in its entirety.

BACKGROUND

Technical Field

The present disclosure relates generally to data storage systems and data communication systems.

Description of the Background Art

With the increasing amount of data is being created, there is increasing demand for data storage solutions. Storing data using a cloud storage service is a solution that is growing in popularity. A cloud storage service may be publicly-available or private to a particular enterprise or organization. Popular public cloud storage services include Amazon S3™, the Google File System, and the OpenStack Object Storage (Swift) System™.

Cloud storage systems may provide "get" and "put" access to objects, where an object includes a payload of data being stored. The payload of an object may be stored in parts referred to as "chunks". Using chunks enables the parallel transfer of the payload and allows the payload of a single large object to be spread over multiple storage servers.

SUMMARY

The present disclosure provides systems and methods for sharding objects stored in a distributed storage system. Such sharding may be advantageously utilized for an object that stores a collection of key-value records and for otherwise encoded objects. In accordance with one embodiment disclosed herein, a block sharding technique is used. In accordance with another embodiment disclosed herein, a key sharding technique is used.

The object sharding techniques advantageously enable a read-modify-write process at the storage server level. One embodiment disclosed herein provides a method of creating a new chunk by modifying a payload of an existing chunk at the storage server level in a distributed object storage system. A rendezvous transfer is sent from a gateway server to storage servers in a rendezvous group, wherein the rendezvous transfer specifies a change to the payload of the existing chunk. The payload of the existing chunk is read from a storage device by each of the storage servers in the rendezvous group. The payload of the existing chunks modified by applying the specified change to create a new payload by each of the storage servers in the rendezvous group. A cryptographic hash is applied to the new payload to generate a new content hash identifying token by each of the storage servers in the rendezvous group. The new chunk is written to the storage device by each of the storage servers in the rendezvous group, wherein the new chunk includes the new payload and the new content hash identifying token. Finally, the new chunk is validated at the gateway server.

Other embodiments, aspects, and features are also disclosed.

BRIEF DESCRIPTION OF THE DRAWINGS

FIG. 24 depicts exemplary encoding structures for chunk put proposal messages in accordance with an embodiment of the invention.

FIG. 25 depicts exemplary encoding structures for chunk accept messages in accordance with an embodiment of the invention.

FIG. 26 depicts exemplary encoding structures for rendezvous transfer messages in accordance with an embodiment of the invention.

FIG. 27 depicts exemplary encoding structures for payload acknowledgement messages in accordance with an embodiment of the invention.

FIG. 28 depicts exemplary encoding structures for get request messages in accordance with an embodiment of the invention.

FIG. 29 depicts exemplary encoding structures for get response messages in accordance with an embodiment of the invention.

FIG. 30 depicts exemplary encoding structures for an error get response message in accordance with an embodiment of the invention.

FIG. 33 depicts a sample assignment of server IDs to rows of a hash table for an object storage system in accordance with an embodiment of the invention.

FIG. 43 depicts data fields of a "block-shard" chunk reference in accordance with an embodiment of the invention.

DETAILED DESCRIPTION

I. Scalable Transport for Multicast Replication

Figure 1:
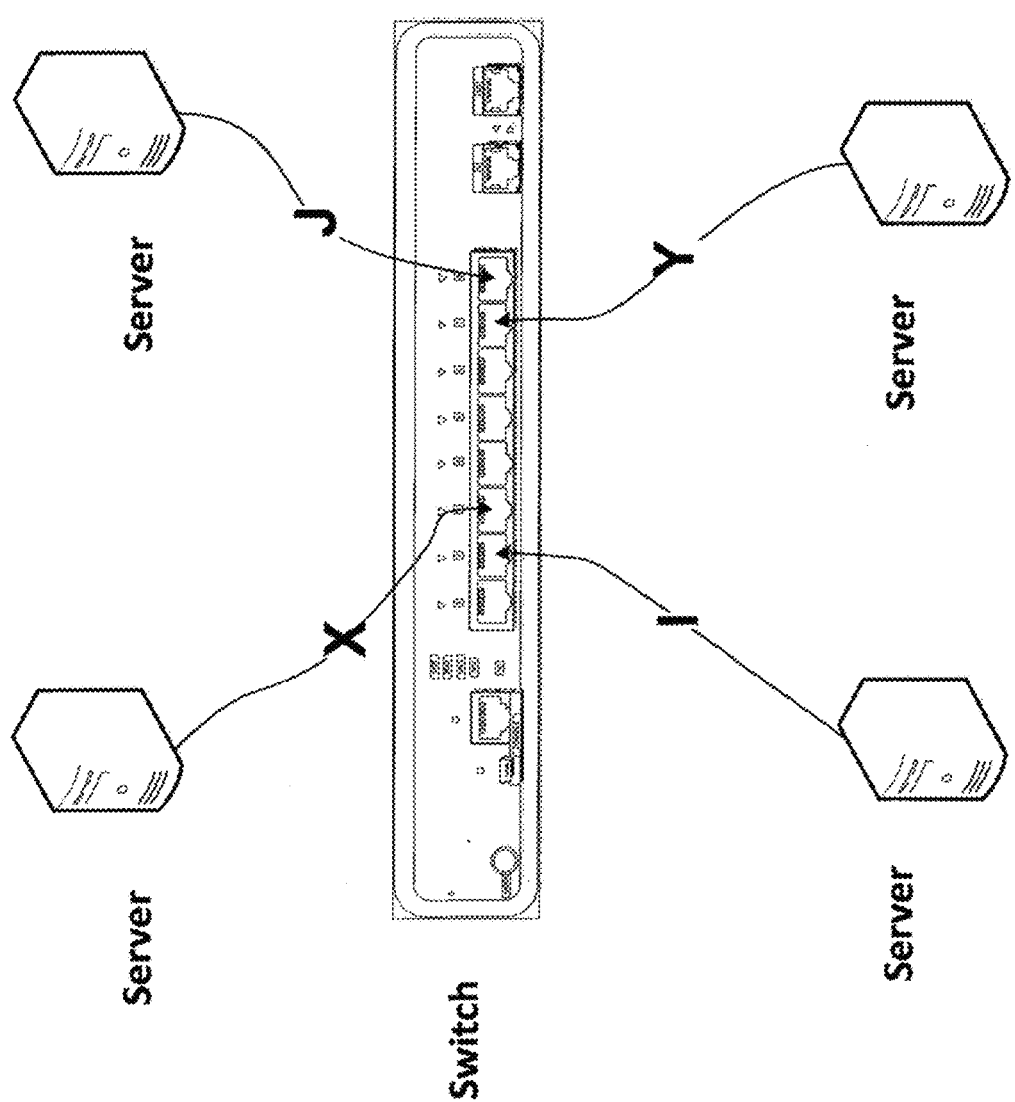
FIG. 1 depicts a non-blocking switch.

As described herein, multicast communications may provide great value in storage networking. There are several instances where the desired distribution of information is from one sender to multiple receivers. These include:

1) Replication of storage content. Creating more than one replica is generally desired to protect against the loss of individual storage servers.
2) Finding the most suitable set of storage servers to accept new content. Storage servers have dynamically varying capacities and work queue depths. Finding the servers that could store the content most quickly allows transactions to complete in the shortest possible time. If point-to-point protocols performed this survey, the polling process could easily take more time than the potential savings in time.
3) Finding the best storage server to process a specific get request has similar issues as finding the most suitable set of storage servers to accept new content.
4) Network replication to additional servers in order to create extra replicas for caching content, distributing content to archival storage and to remote networks comes with only minimal network traffic increase and no increase in server operations for reading the extra copies for these separate purposes.
5) Enabling parallel updating of distributed content (e.g. a Distributed Hash Allocation Table) on all cluster members.

While the value of these potential multicast communications is clear, the conventional wisdom has been that multicast cannot be reliable enough for storage, and therefore the overhead of point-to-point protocols must be tolerated in order to provide reliability. Use of multicast in storage clusters has been conventionally limited to the "keep-alive" protocols, which track the set of storage servers currently connected. Conventionally multicast messaging is not used for the storage content itself.

The present disclosure provides an effectively reliable transport layer for multicast communications. The methods disclosed herein are optimized for storage networking within a local area network with short and reasonably uniform round-trip times, but they may be layered on top of any transport services that provides an unreliable datagram service and multicast addressing.

Congestion Control in Point-to-Point Network Replication

Replicating storage over a shared network typically involves large transfers initiated independently by multiple sources. In such cases, some form of congestion control is required to avoid over-subscribing the buffering capacity of the storage network. Designing a core network to be non-blocking is feasible and desirable; however, it is currently implausible to design the target nodes with enough capacity to receive concurrent transfers from every source that might want to transmit. Moreover, even with a non-blocking core, some form of congestion control is required to allocate the bandwidth on the last link to the target servers.

In a simple solution, each content source replicates content to each distinct storage server using Unicast point-to-point reliable connections (most frequently TCP/IP). However, this solution can make the link from the content source a bottleneck that limits the speed of sending the new content into the network. According to this solution, if K is the desired replication count (e.g., three), then the source server sends the content K times (each time over a point-to-point connection). The OpenStack Object Service ("Swift") has this design characteristic.

Another Object Storage system, the Hadoop Distributed File System (HDFS), partially addresses this problem by serializing replication of new content. The content source puts to a first storage server, which then replicates that chunk to a second storage server, which then replicates it to a third storage server. If the server performs replication on a cut-through basis, the impact on an isolated put transaction would appear to be minimal (two times the cut-through latency, which might be as small as a single Ethernet frame for each hop).

However, such an analysis ignores the problem that the servers that are receiving chunks or objects must also retrieve and deliver content on demand. Most object storage systems operate in a write-once read-many (WORM) fashion. When a storage server takes responsibility for replicating new content the server has the limitation that the replication bandwidth is in contention with retrieval bandwidth. The only way to avoid congestion drops is to delay either the replication traffic or the retrieval traffic. The latency for puts and/or reads (gets) will suffer because of this contention.

To optimize replication of content in distributed storage systems, the presently-disclosed solution multicasts the content so as to optimize both the load on the servers and the shaping of the network traffic. While it is desirable to multicast replication traffic, doing so should not be allowed to cause network congestion and resulting dropped packets. Hence, as further disclosed herein, packet drops may be dealt with by retransmission using unicast replication on a point-to-point basis.

Reasons why Multicast was not Used in the Past

This section describes some reasons why applicants believe that multicast has not been used in the past for replication of stored content.

It would be optimum for storage networking to put the content to the network once and have that content reliably arrive at each of N destinations. One challenge to achieving this optimum result is that each chunk is typically encoded as multiple L2 (layer 2) frames. L2 networking protocols, such as Ethernet or InfiniBand™, have individual frames that are small compared to the size of the typical chunk saved in a storage system. For example in a single user Ubuntu workstation with over 584,843 files, the average file size is 240,736 bytes, (totaling ~140 GB) although the median file size is only 3,472 bytes and the largest file is 2.9 GB. Hence, a typical put (or get) will need to deliver very many L2 frames without any portion of the message being dropped.

Modern wired networks have exceedingly low error rates on raw transmission. Therefore, when a message is comprised of hundreds of L2 frames the most common cause of non-delivery of a message is congestion-induced drops. Message drops caused by a transmission error on even one of hundreds of frames are exceptionally rare.

With unicast delivery, the transport protocol acknowledges each packet within the overall message (typically only sending the acknowledgement for every other packet). However, typical point-to-point transport protocols negotiate a packet or byte sequence number during connection establishment. It is not feasible to simply multicast a TCP packet to multiple receivers and simply collect the acknowledgements from each target because each target will have selected a different random starting sequence for itself. With TCP, for example, network elements would have to modify the TCP sequence number for each target.

Generally, multicast delivery has been limited to unreliable delivery or has relied on negative acknowledgements to allow limited retransmission requests.

The challenges of using multicast distribution for reliable delivery of bulk payload has limited deployment of multicast addressing within storage clusters to control plane functions such as node discovery, health checking and negotiating which server would be assigned to store each object. However, conventional unicast protocols have been used to reliably transfer bulk payload. As desirable as sending once and receiving multiple times would be, the conventional wisdom has been that this cannot be achieved with reliable delivery.

Splitting the traffic submitted once within the network to multiple destinations is challenging with TCP-like protocols. Either the splitter must act as a full application layer gateway, complete with providing persistent storage for all payload it has acknowledged until the gateway itself has been acknowledged by each target, or it must spoof flow control responses from the splice point such that no packet is originated until there is a window for delivery to each of the targets, and it acknowledges no packet until it has been acknowledged by all targets. Such a gateway would also have to track which targets had acknowledged a given packet and only forward retransmitted packets to those targets that had not already acknowledged it. Re-transmitting an acknowledged packet will cause the destination to conclude that its acknowledgement had not been received, from which it would infer that the network must be congested.

Advantageously, the use of multicast addressing is far simpler. At the network layer, multicast protocols are unreliable. Hence, no tracking of per-packet reception is required.

Utilizing multicast addressing allows new payloads to enter the switching fabric once, and then deliver them to N destinations. The protocol may then advantageously track the delivery of the entire message rather the tracking the delivery of individual packets. When congestion control properly minimizes the risk of congestion drops, the resulting delivery becomes reliable enough that per packet acknowledgements are no longer required. Hence, in accordance with an embodiment of the present invention, reliable delivery may be achieved using a simpler and more efficient transport protocol. In addition, the utilization of the switching fabrics buffers may be radically reduced, achieving more efficient distribution and more effective utilization of the network.

Conventional point-to-point transport protocols rely on per-packet error detection. However, with modern wired networks, applicants believe that protecting data integrity for the entire message is more effective. This is because layer 2 error checking ensures that very few packets have undetected errors, and retransmission of the entire message is acceptable when it is seldom required.

As described herein, a congestion control protocol may be designed for environments where dropped packets are extremely rare by avoiding congestion on the edge links to Ethernet end stations. In particular, a congestion control protocol that prevented concurrent bulk transfers to a given egress link would make it safe to transmit the entire chunk with a single ACK/NAK. Retransmission of the entire chunk would be required after an unsuccessful delivery attempt, but this is a cost easily carried if congestion drops have been avoided and dropped frames are extremely rare. The benefits of a simplified protocol, and lesser bandwidth required for acknowledgements themselves, would compensate for the extremely rare retransmission. Combined with the benefits of multicasting, such a congestion control protocol that enables coordination of bulk data transfers in a way that avoids edge link congestion-induced packet drops should generally improve overall network utilization.

Note that the ability to avoid congestion by scheduling delivery of messages at a higher layer is dependent on networking layer 2 providing some basic traffic shaping and congestion avoidance on its own.

L2 Traffic Shaping Capabilities

The presently-disclosed solution utilizes edge-based congestion control for multicast messages. To understand how edge-based congestion control can avoid congestion-based drops of the layer 2 (L2) frames, it is useful to first review the traffic shaping capabilities of advanced Ethernet switches. In relation to such traffic shaping capabilities, the following discusses a non-blocking switch, a non-blocking core, multiple traffic classes, and protected traffic classes.

1) Non-Blocking Switch

A switch can be considered to be non-blocking if it is capable of running every one of its links at full capacity without dropping frames, as long as the traffic was distributed such that it did not exceed the capacity on any one of its links. For example, a non-blocking eight-port switch could relay traffic between four pairs of end stations at full wire speed.

More usefully, each of the eight ports could be sending 1/7th of the wire speed to each of the other ports. A non-blocking switch has sufficient internal buffering so it can queue the output frames to any one of its ports. The other ports can "share" this output without having to synchronize their transmissions. If they each have a sustained rate of 1/7th of the wire capacity then the output queue for the target port may grow temporarily, but it will not grow indefinitely. There are well-known algorithms to determine the maximum buffering capacity required.

A non-blocking switch may offer service level agreements (SLAs) to its end stations that are capable of providing a sustained level of throughput to each of its ports, as long as no egress port is over-subscribed on a sustained basis. Referring now to FIG. 1, the illustrated switch provides a non-blocking switch fabric, such that a flow from X to Y cannot be adversely impacted by any flow from I to J.

2) Non-Blocking Core

A non-blocking core is a collection of non-blocking switches that have sufficient bandwidth between the switches such that they can effectively act as though they were simply a large aggregate switch.

3) Multiple Traffic Classes

Switches typically offer multiple traffic classes. Frames are queued based upon the egress port, Ethernet class of service, and other factors such as VLAN (virtual local area network) tags.

Usually these queues do not represent buffers permanently assigned to separate queues, but rather just a method for accounting for buffer usage. When a queue is assigned N buffers it does not mean that N buffers are identified in advance. Rather it means that the number of buffers the queue is using is tracked, and if it exceeds N the excess buffers are subject to being dropped.

Advanced switches are capable of monitoring the depth of queues for multiple traffic classes and potentially taking action based on queue depth (marking excessive traffic, generating congestion notifications, or simply dropped non-compliant frames). The traffic class configuration is typically a steady configuration item for any switch. Well known algorithms allow the switch to enforce that a given traffic class will be able to sustain X Gb/sec without requiring the switch to track the state of each flow through the switch.

4) Protected Traffic Classes

A Protected Traffic Class is a traffic class that is reserved for a specific use. The network forwarding elements are configured to know which ports are members of the protected traffic class. L2 frames that are marked as part of a protected traffic class, but arrive from unauthorized ports, are simply dropped. Typically switches will also block, or at least limit, relaying frames in a protected traffic class to non-member ports.

FCoE (Fibre Channel Over Ethernet) is one example of a protocol which is dependent on a protected traffic class. The protocol is not robust if non-compliant frames can be accepted from unauthorized ports.

Replicast Transport Layer

Figure 2:
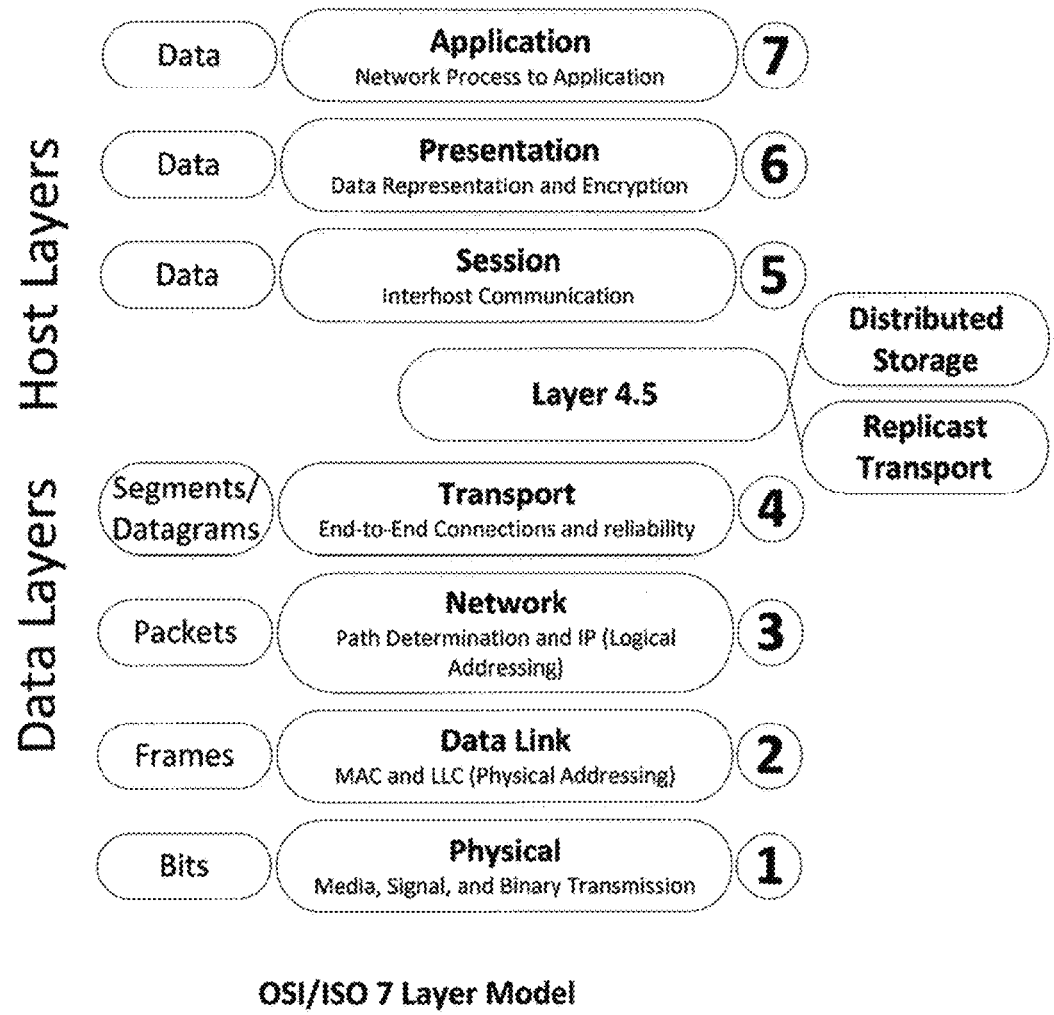
FIG. 2 depicts where the replicast transport layer may fit into the conventional OSI/ISO Seven Layer Model in accordance with an embodiment of the invention.

The present section details a "Replicast" transport layer in accordance with an embodiment of the present invention. In one implementation, the Replicast transport layer operates in conjunction with a distributed storage layer for a distributed object storage system. FIG. 2 illustrates the conventional model and where Replicast transport layer and distributed storage layers may be inserted into that model as "Layer 4.5" between the conventional transport layer 4 and the conventional session layer 5.

While the present section details a Replicast transport service that is intended for usage by a distributed object storage system, the specific multicast messaging capabilities provided are not constrained to support only distributed object storage. Other applications can benefit from the presently-disclosed Replicast transport services. For example, a method for replicating file system images between file servers could also use the Replicast transport services disclosed herein. One example of this would be ZFS file servers replicating the output of the "zfs send" utility.

The following Table 1 itemizes the assignment of responsibilities between the Replicast transport layer disclosed in the present section and an example distributed storage layer that may be supported by the Replicast transport layer:

TABLE 1

Division of responsibilities between Replicast transport and distributed storage layers

| Responsibility | Layer | Comment |
|---|---|---|
| Detection of transmission error. | Transport | A hash signature is calculated for all transferred content. |
| Detection of lost L3 packets | Transport | Messages with lost packets will fail the signature test for the complete message. Packets are sequenced within a message, allowing for checkerboard testing for reception of the complete message. |
| Detection of lost L5 messages | Storage | The transport layer will only detect messages that are partially lost, not any that are completely lost. The storage layer must detect missing messages and responses. |
| Determination of success | Storage | The transport layer can detect whether specific recipients successfully received a message without corruption, but it cannot determine whether the overall message was delivered to a sufficient set of recipients. |
| Retry of L5 message | Storage | The transport layer detects failure of individual deliveries. The storage layer must determine when and if a given message will be retried. |
| Pacing of Unsolicited Messages | Storage | The transport layer indicates how often the storage layer may transmit unsolicited messages, but it does not pace those deliveries itself. Rather it relies on the storage layer to choose which messages to submit to comply with the rate published. |
| Congestion Avoidance | Transport | The transport layer works with L2 congestion avoidance techniques (such as IEEE 802.1 DCB—Data Center Bridging) protocols to provide delivery of unreliable datagrams without dropping packets due to congestion. Note that IEEE 802.1 DCB is only one mechanism for achieving drop-resistant L2 delivery that is protected from other traffic classes. |
| Traffic Selection (i.e. Shaping Storage Traffic or Selection of content when competing for limited bandwidth) | Storage | The primary congestion avoidance technique used is to perform most bulk content transfer with reserved bandwidth. The transport layer enforces reservations, but the storage layer chooses which reservations to grant by determining when each storage server would be capable of doing a specified rendezvous transfer. The present invention does not specify what algorithm any storage server in the cluster will use when proposing rendezvous transfer times based upon its current workload. There are many well = -known algorithms for making such estimates, determination of which algorithms are most cost effective for which storage resources is left to each specific embodiment. |
| Distributed Deduplication | Storage | The storage layer determines when a proposed transfer is not needed because the content is already stored locally. The transport layer merely relays this information. |
| Management of bandwidth between Traffic Classes | Enhanced L2 (such as DCB) | The L2 layer is responsible for protecting the traffic class from other traffic. Presumably, it also protects the other traffic from the storage traffic class. |
| Management of bandwidth within the storage traffic class | Transport | The transport layer is responsible for allocating the bandwidth provided by L2 layer to specific messages and transfers. |
| Transmit at most once | Transport | Datagrams are transmitted once and are typically delivered to all members of the target multicast group. Datagrams cannot be delivered more than once because each L2 message is uniquely identified by source and sequence number. Further, each datagram is identified as a specific fragment of an L5 message. Packets that are duplicate receptions are discarded. |
| Datagram sequencing Multicast addressing | Transport unreliable datagram service | Unreliable datagrams are labeled as to their sequencing within an L5 message. Such as UDP/IP/Ethernet or UD/InfiniBand. |

Edge Managed Flow Control

The present disclosure combines the lack of central bottlenecks with the ability to factor dynamic storage-server specific metrics, such as available storage capacity, work queue depth and network congestion on the storage server's ingress ports.

An overly simplified analysis would seek to have every storage server evaluate its own suitability for storing a specific chunk, and then having the source select the number (n) of storage servers with the highest score. However, this would not scale as the total number (N) of storage servers in a cluster increased. As disclosed herein, a scalable methodology, instead, controls the total number of requests made to each storage server. Ideally, as the cluster workload grows, the number of requests per server can be held nearly constant by adding servers and network bandwidth. This will allow the entire cluster to scale in a nearly linear fashion.

The present disclosure accomplishes holding nearly constant the number of requests per server by selecting a subset of the storage servers to process requests related to any specific chunk. The present disclosure refers to this subset as the "Negotiating Group". The Negotiating Group will select specific storage servers from the group to store the specific chunk. Generally, the number of members in a Negotiating Group should be kept stable even as the number of storage servers grows. The complexity of the negotiation process is determined by the number of storage servers in the Negotiating Group, not by the size of the entire cluster.

Referring now to Table 2, an exemplary size (n) of the Negotiating Group is that it should scale to on the order of K multiplied by $Log_{10}(N)$ [i.e. should scale to $O(K*Log_{10}(N))$], where K is a function of the storage replication count, and where N is the total number of cluster members. K may typically vary from one to five. Hence, as shown in Table 2, depending on the value of K, for 100 servers in the cluster, there should be two to ten members of the Negotiating Group, and for 10,000 servers in the cluster, there should be four to twenty members of the Negotiating Group.

TABLE 2

Number of Designated Servers in a Negotiating Group for a Cluster

| Replication Cluster Members | K = 1 | K = 2 | K = 3 | K = 4 | K = 5 |
|---|---|---|---|---|---|
| 100 | 2 | 4 | 6 | 8 | 10 |
| 1,000 | 3 | 6 | 9 | 12 | 15 |
| 10,000 | 4 | 8 | 12 | 16 | 20 |

In an exemplary implementation, the server performing the "put" operation for a chunk will select a set of servers from the Negotiating Group. The selection method is not dependent on a central process or bottleneck and is capable of adapting to storage server backlogs and capacity.

In an exemplary selection method, all members of the Negotiating group receive a proposal to store the new chunk (i.e. a Put Proposal) via multicast-addressed UDP datagrams, without adding extra transmission burden on the source server. The source chooses the Negotiating Group by mapping the appropriate Chunk Hash ID to a Distributed Hash Allocation Table so as to specify the membership of the Negotiating Group and identify its members. A Chunk Hash ID may be a cryptographic hash of either a chunk's payload (for chunks that hold only payload) or of the identity of the object (for chunks holding metadata). In an exemplary embodiment, this mapping is accomplished by indexing one row from a shared Distributed Hash Allocation Table. In an exemplary implementation, each chunk may have a unique identifier that effectively incorporates distributed deduplication into the distribution algorithm, making the implementation highly tailored for document storage applications. There are existing techniques that allow distributed deduplication to co-exist with the provision of cryptographic protection for document content.

It should be understood that the "Distributed Hash Allocation Table" need not be an actual table fully implemented on every node of the network. It is sufficient that each row of the table maps to a multicast address, and that the network's multicast forwarding be configured so that a multicast message will be delivered to the members of the row. Existing protocols for controlling multicast forwarding can therefore be used to implement the "Distributed Hash Allocation Table" even if they do not consider the tables they manipulate to be anything more than multicast forwarding tables.

Referring back to the exemplary selection method, each recipient of the Put Proposal calculates when and if it could accept the chunk, or whether it already has the indicated chunk. The recipient returns a Put Accept message with the appropriate indication to not only the source, but to all other members of the Negotiation Group. Limitations on the recipient's available storage that make this specific storage server less desirable as a target are reflected by making this storage server less prompt in acknowledging the proposal or in scheduling the receipt of the chunk. Additional considerations are possible to indicate that perhaps the recipient has a heavy workload and, if there are other recipients with less workload, that their responses may also be more prompt.

While the present disclosure is not necessarily limited to storage servers, in most embodiments, the storage servers will utilize the entire bandwidth available to a single reservation at a time. In accordance with the present disclosure, there is no benefit to delivering part of a chunk. Therefore, it will generally be desirable to finish each request as early as possible, even if it means delaying the start of the transfer of a later request. It is the aggregate completion times for the transfers that matters. By contrast, conventional file systems will generally seek to make forward progress for all transfers in parallel.

Upon the collection of the responses from the Negotiating Group within the timeout window, the Chunk Source decides whether to deliver the Chunk payload in order to increase the number of replicas. If so, it creates the Rendezvous Group, which is a subset of the Negotiating Group. In the exemplary implementation, other members of the negotiating group may also see this response and update their list of designated servers that hold a copy of the Chunk.

The present disclosure also provides for efficient replication of content to the Rendezvous Group by relying on the rendezvous negotiation to eliminate the need for sustained congestion control for a multicast Chunk Put or conventional point-to-point reliable transport protocols.

Exemplary Storage Cluster

Figure 3:
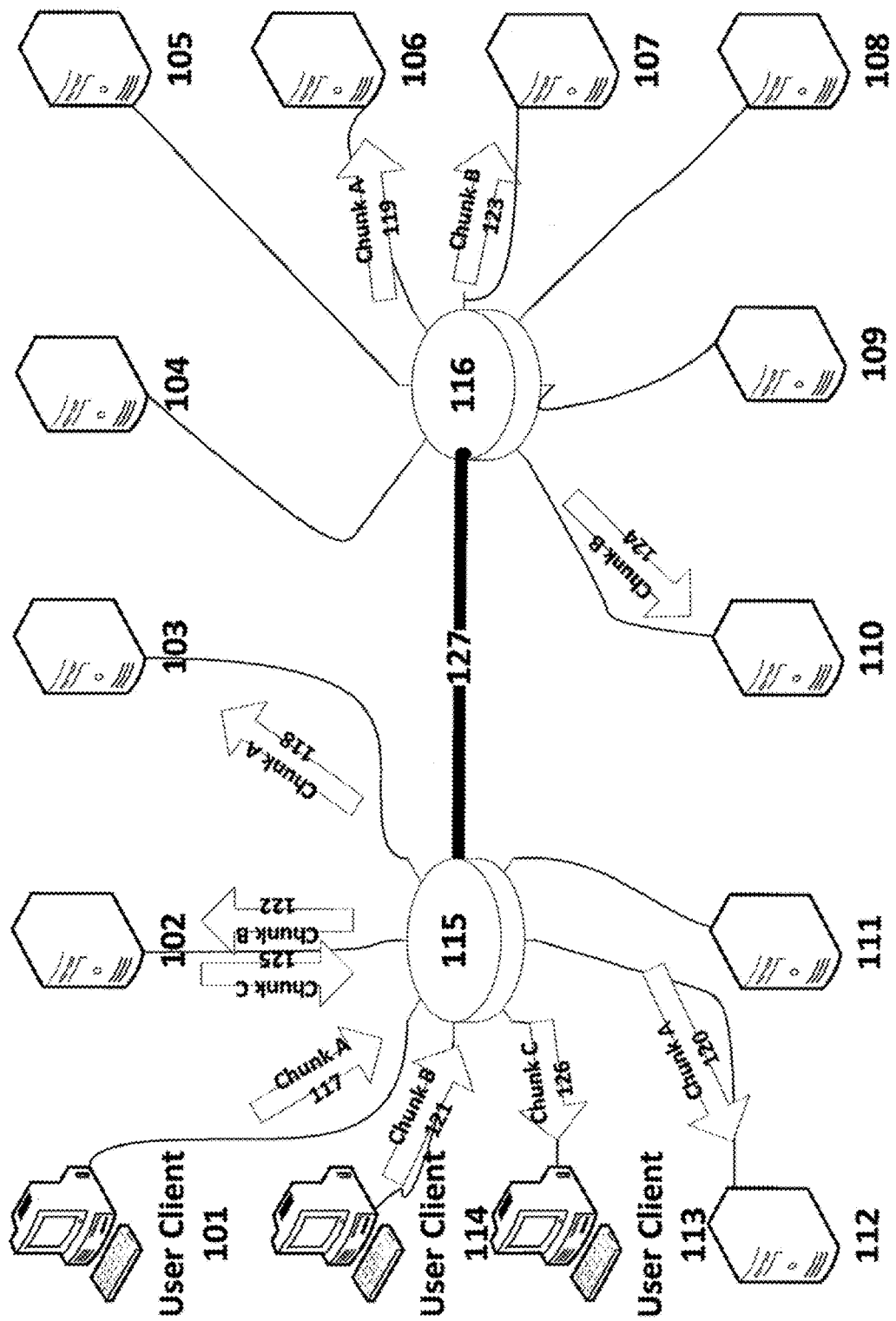
FIG. 3 is a simplified depiction of chunk transmission in an exemplary distributed storage system in accordance with an embodiment of the invention.

FIG. 3 is a simplified depiction of chunk transmission in an exemplary storage cluster in accordance with an embodiment of the invention. As shown in FIG. 3, there is a cluster 100 of servers and clients. The servers 102 through 112 are connected to Ethernet switches 115 and 116. While several servers and two switches are depicted, an implemented storage cluster may have a multitude of servers and a larger number of switches. The switches, in turn, may be connected to each other by one or more Ethernet trunk 127. In an exemplary implementation, the switches may be non-blocking switches, and the switches together with the interconnecting trunks may form a non-blocking core.

In this depiction, Chunk A 117 is sent from user client 101 to network switch 115 and is multicast replicated to Server 103 as Chunk A 118, Server 106 as Chunk A 119, Server 112 as Chunk A 120. Chunk B 121 is sent from user client 114 to switch 115 and is replicated to Server 102 as Chunk B 122, through trunk 127 to switch 116 and then to Server 107 as Chunk B 123 and to Server 110 as Chunk B 124. At the same time Server 102 is returning Chunk C 125 via Switch 115 to client user 113 as Chunk C 126.

Serial Transmission of Chunk Copies

Figure 4:
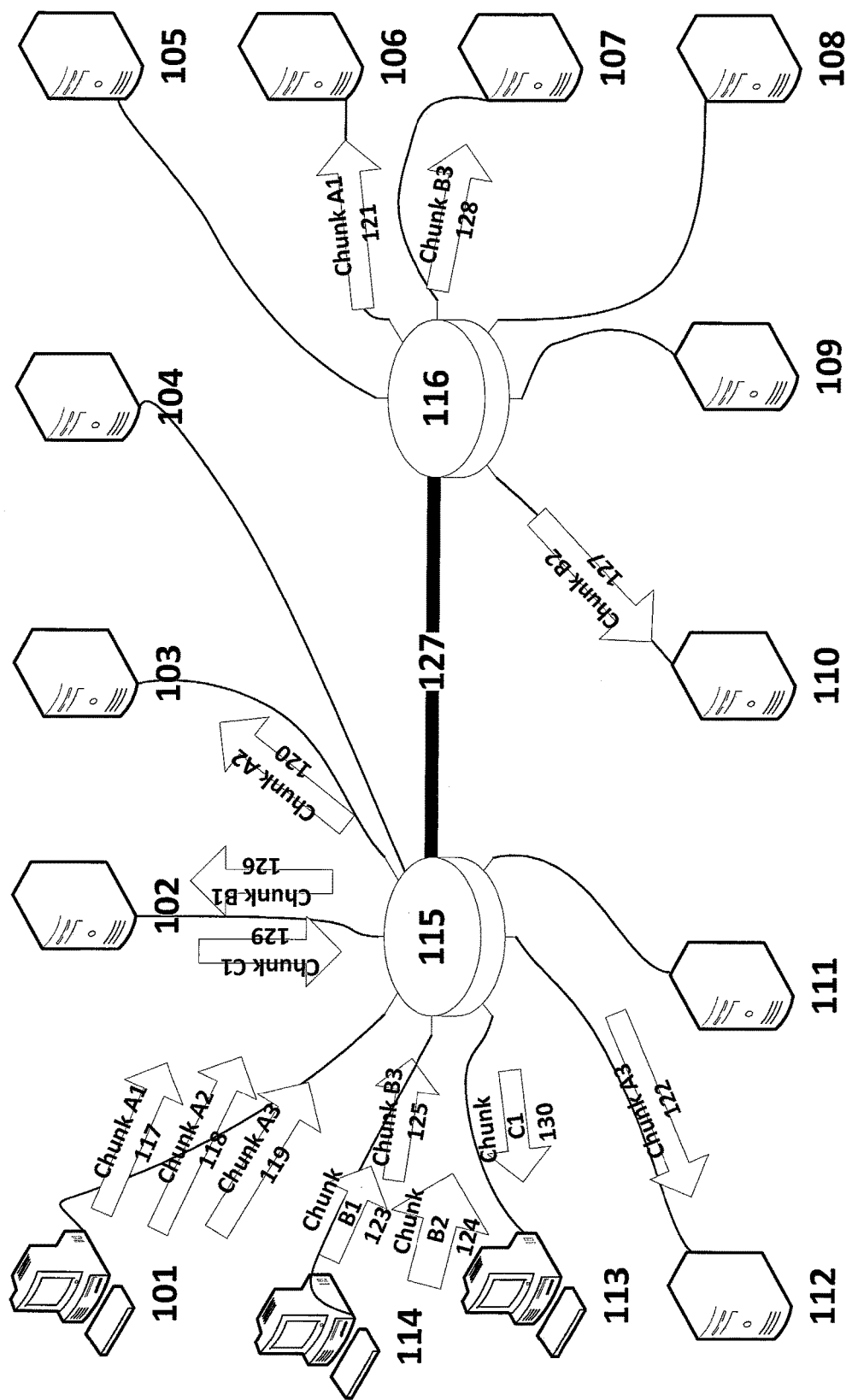
FIG. 4 depicts congestion on inbound links of a distributed storage system with serial transmission of chunk copies.

FIG. 4 depicts congestion on inbound links of a distributed storage system with serial transmission of chunk copies. Such serial transmission of chunk copies is utilized, for example, in the OpenStack Object Service. The servers, clients, switches and trunks of FIG. 4 may be arranged as described above in relation to FIG. 3.

As depicted in FIG. 4, we see that Chunks A1 117, A2 118 and A3 119 (all copies of Chunk A) are transmitted sequentially through the connection between the user client machine 101 and the Ethernet switch 115. From that point, Chunk A1 121 is sent to the target server 106, Chunk A2 120 is sent to a different server 103 and Chunk A3 122 to a third server 112. Similarly the chunks B1 123, B2 124 and B3 125 (all copies of Chunk B) are transmitted from user client 114 to Ethernet switch 115 in sequential fashion, even though they are all copies of the same chunk B. From that point, the B1 Chunk 126, B2 Chunk 127 and B3 Chunk 128 are sent to separate servers. In addition, the C1 Chunk illustrates that, in addition to the PUT activities for Chunks A and B, users are also performing GETs of data. In particular, the C1 Chunk 129 is sent from the server 102 to the switch 115, and then the C1 Chunk 130 is sent to the user client 113.

Relayed Unicast Transmission

Figure 5:
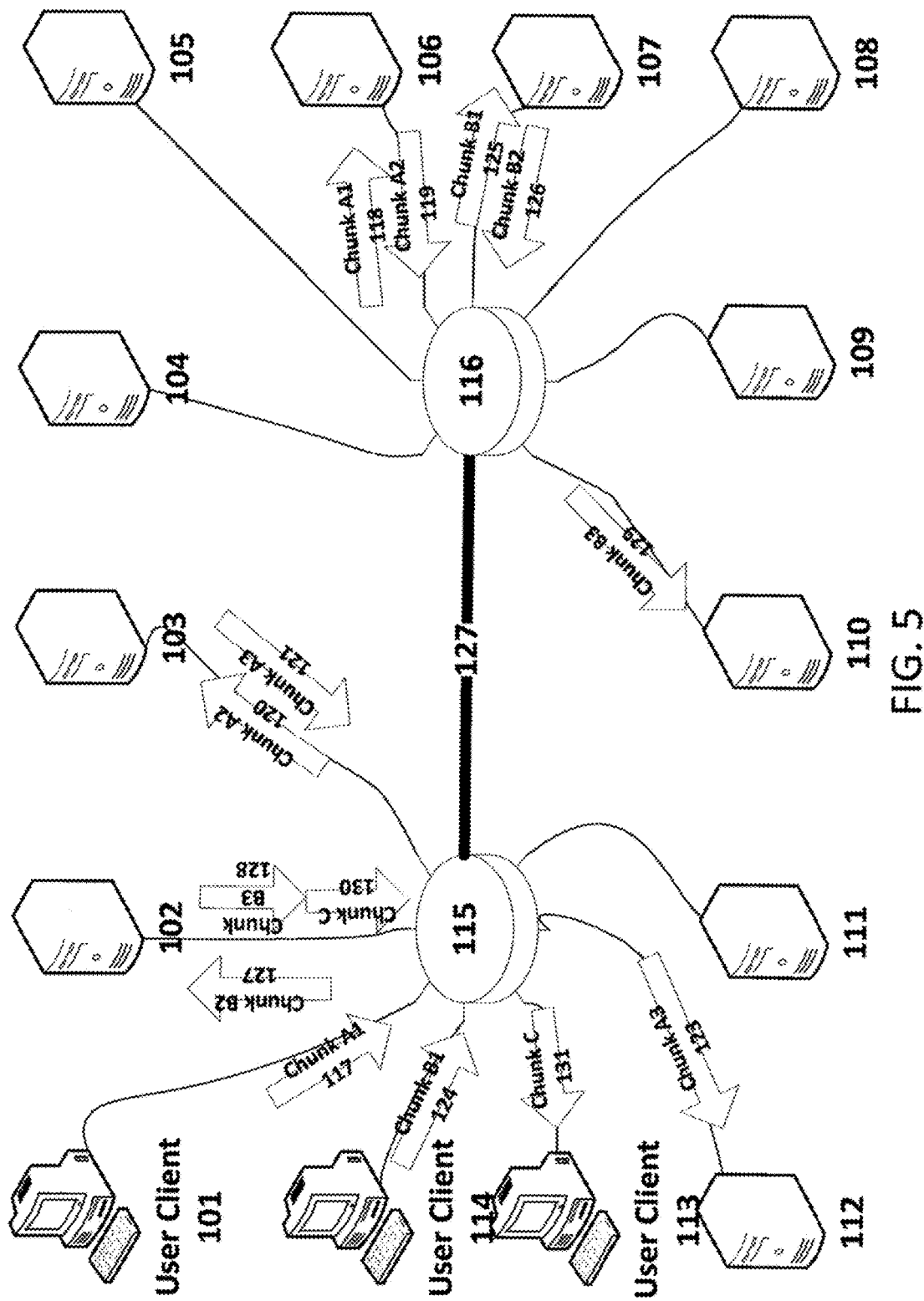
FIG. 5 depicts a distributed chunk put operation using relayed unicast transmission in a distributed storage system.

FIG. 5 depicts a distributed chunk put operation using relayed unicast transmission in a distributed storage system. Such a relayed unicast put is utilized, for example, in the HDFS. The servers, clients, switches and trunks of FIG. 5 may be arranged as described above in relation to FIG. 3.

In the illustration of FIG. 5, we walk through a sequence of events. The first event is that the user Client 101 transmits the first copy of Chunk A, namely Chunk A1 117, which is received by Server 106 as Chunk A1 118. In preferred implementations, while the Chunk A1 118 is being received, the Server 106 begins a "Cut-through" transmission (illustrated here by the ingress and egress of 118 and 119 overlapping each other) to start transmitting Chunk A2 119 which is a copy of Chunk A1. Other implementations are possible, including waiting until Chunk A1 118 is completely received prior to transmitting Chunk A2 119, but are less optimal. Chunk A2 120 is received by Server 103, copied and retransmitted as Chunk A3 121 (here again illustrated by the ingress and egress of 120 and 121) and finally received by Server 112 as Chunk A3 123.

Similarly, the user Client 114 transmits the first copy of Chunk B, namely Chunk B1 124, which is received by Server 107 as Chunk B1 125. In preferred implementations, while the Chunk B1 125 is being received, the Server 107 begins a "Cut-through" transmission (illustrated here by the ingress and egress of 125 and 126 overlapping each other) to start transmitting Chunk B2 126 which is a copy of Chunk B1. Chunk B2 127 is received by Server 102, copied and retransmitted as Chunk B3 128 (here again illustrated by the ingress and egress of 127 and 128) and finally received by Server 110 as Chunk B3 129. In this case, the retransmission of Chunk B3 128 may be delayed by the transmission of an asynchronous "get" operation which requested Chunk C 130. In this way, other operations on the Servers performing "get" operations (to retrieve data upon request) may slow down the replication of packets by the Servers.

The C Chunk illustrates that, in addition to the PUT activities for Chunks A and B, users are also performing GETs of data. In particular, the C Chunk 130 is sent from the server 102 to the switch 115, and then the C Chunk 131 is sent to the user client 113.

Overview of Replicast Transport Protocol

The present disclosure provides a method of supporting effectively reliable message exchange and rendezvous payload transfers within a multicast group or subsets of the multicast group (possibly combined with an external client). An exemplary implementation of the disclosed method may be referred to herein as the "Replicast" transport protocol.

The Replicast transport protocol sends unreliable datagrams over a protected traffic class. Protected traffic classes are a known networking mechanism used in many different IEEE 802.1 protocols. One example particularly relevant for storage networking is FCoE (Fibre Channel over Ethernet). The requirements for a protected traffic class may be summarized as follows.

L2 frames are admitted to this traffic class only from explicitly authorized end stations.

L2 frames are only delivered to members of the group.

As long as this traffic class is in compliance with a bandwidth budget provisioned for it, its frames will not be dropped due to congestion caused by L2 frames from other traffic classes.

Effective Reliability

A goal of the Replicast transport layer (when it is used by a distributed storage application) is to enable effectively reliable transfer of chunks and associated tracking data within a storage cluster and to/from its clients. Distributed storage applications frequently need to make multiple replicas of storage chunks. Enabling an effectively reliable multicast replication may radically improve the efficiency of network utilization and the efficiency of server resources in a cluster.

The Replicast transport layer disclosed herein is optimized for networks where actual transmission errors are rare. In such networks, packets are typically dropped due oversubscription of either forwarding or receiving buffers.

Distributed storage applications supported by the Replicast transport protocol preferably may be expected to require more thorough validation of successful transfer of data than is supported by conventional point-to-point transport protocols (such as InfiniBand Reliable Connection, TCP/IP or SCTP/IP). To support more thorough validation of successful transfers, the Replicast transport protocol disclosed herein provides hash signatures for the entire chunk and self-validating tracking data which may be used to validate successful transfers. These measures allow incomplete or corrupted transfers to be detected by and reported to the upper layers. For example, a multicast transmission of a chunk may be successfully received by 5 out 7 target nodes. The question of whether that is a "successful" delivery may be properly answered at an upper layer; it is not something the transport layer can or should determine.

Congestion Avoidance

The present disclosure utilizes an assumption that the lower-layer transports (below the Replicast transport layer) provide at least minimal congestion avoidance features that can deal with short-lived congestion without dropping frames. The IEEE 802.1 Data Center Bridging (DCB) protocols are an example implementation of a suitable lower layer transport. Another goal of the Replicast transport layer disclosed herein is to further avoid congestion, particularly congestion over a sustained duration. The Replicast Transport layer strives to complement the existing lower layer solutions (such as DCB) to short-term congestion with solutions that avoid sustained over-commits of bandwidth.

Unsolicited Vs. Solicited Bandwidth

The present disclosure seeks to effectively eliminate the risk of a congestion drop by tracking its own usage of unsolicited bandwidth, issuing its own reservations for solicited bandwidth, and relying on the lower transport layers to resolve very short span over-subscriptions and protect the traffic class from traffic from other classes.

Network administration will specify four bandwidth allocations for each participant in the protected traffic class:

Unsolicited inbound rate: Using known techniques, this translates to a required amount of buffering to receive unsolicited packets.

Unsolicited outbound rate: A base rate for transmission of unreliable datagrams that have no reservation. This rate may be adjusted dynamically by other sources of information. One source that must be used is the number of failed deliveries on prior attempts to transmit this datagram. This technique is known as the Aloha back-off algorithm.

Reserved outbound rate: This may limit the aggregate bandwidth of all rendezvous transmissions from this storage node. This limit would seldom be reached, so some embodiments may omit this from their implementation. One deployment where it would be useful is when the same node was also originating traffic from a different traffic class.

Reserved inbound rate: This node must limit the reservations it grants so that this rate is never exceeded.

The disclosed congestion avoidance method may be, therefore:

1) Provision buffering for reception and in-network forward elements adequate for both the Unsolicited and Solicited traffic. Unsolicited traffic is subject to peaks because there is no advance permission granted before a request is transmitted. Therefore, more buffering is needed to support a specific bandwidth when using Unsolicited messaging than would be required for reserved bandwidth.
2) Limiting transmission rates of unsolicited messages so that the probability of packet drop is low.
3) Utilizing Aloha-style random back-offs of retransmissions of Unsolicited messages used for requests.

Distributing and Retrieving Chunks

The presently-disclosed Replicast transport layer relies on the layer above it, a distributed storage system in one embodiment, to specify the following:

1) A Negotiating Group, which is a multicast group that will conduct the negotiation to determine the Rendezvous Group, and may determine the source for a data transfer in a get transaction.
2) A Rendezvous Group, which is a multicast group that will receive a data transfer. For a put transaction this group will be a subset of the Negotiating Group. For a get transaction this group will include the client or proxy that initiated the get transaction and may include other members of the Negotiating Group that wish to receive opportunistic copies of the chunk that has been requested.
3) A base bandwidth quota for unsolicited traffic that this node may generate to a specified traffic class. This quota is across support for all requests. This quota may be dynamically adjusted by many sources of information as to the congestion state of the network. At the minimum this set must include the number of recent messages sent by this node for which there was no timely response. It may include other sources of network status that are correlated with the congestion state of the network, including:
    a) Measured queue depths on forwarding elements for queues that support this traffic class.
    b) Receipt of packets for this traffic class which were explicitly marked to indicate congestion.
    c) An increase in the one-way delay of packets for this traffic class through the network.
    d) Reports of congestion from other nodes participating in this traffic class.
4) A bandwidth for this node to receive solicited transfers. The node will not grant reservations that exceed this quota.

Messages may be addressed to either Negotiating Groups and/or to Rendezvous Groups.

A negotiation is conducted within the Negotiation Group using unreliable datagrams sent with multicast addressing, as described in further detail below, to select a subset of those servers to which the bulk message must be delivered (or replicated at).

The purpose of the presently-disclosed transport is to deliver "chunks", which are large collection of bytes used by the upper layer, to the Rendezvous Group negotiated in the transaction. Additionally, a set of opaque "transaction tokens" may be associated with each chunk and updated in each transfer.

Typical uses of "chunks" by a distributed storage layer would include:

5) Large slices of object payload, typically after compression.
6) Metadata for versions of named objects, which will reference the payload chunks to allow the full object to be retrieved.

The presently-disclosed transport requires each chunk to have the following naming attributes:

A Chunk ID which uniquely identifies the chunk and which will never reference a different payload. In an exemplary implementation, the Chunk ID must be effectively globally unique for at least twice the lifetime that the chunk will be retained or referenced.

A Content Hash ID: If the selected hash algorithm is a cryptographic hash with strong immunity from pre-image attacks, such as SHA-2 or SHA-3, then the Content Hash ID may also serve as the Chunk ID. When only used to validate content the hash algorithm merely has to be resistant to coincidental collisions. Whether or not the Content Hash ID is used to identify the chunk, the Content Hash ID is used to validate the content of transmitted chunks or chunks retrieved from persistent storage.

In an exemplary implementation, the Chunk ID must have a uniform distribution so that it can efficiently index locally retained chunks on storage servers. In the preferred embodiment, the Chunk ID is always the Content Hash ID. Cryptographic hash algorithms always provide a uniform distribution.

A chunk may also have a Name Hash ID. The upper layer (for example, a distributed storage layer) may name some chunks that are used to store the root of metadata for a version of an object within the storage system and may also have a name that can be used to retrieve the chunk object. The Name Hash ID may be an additional partial identifier for such chunks (where the addition of a version identifier is required to form a complete additional identifier).

Distributed Gets and Puts

The common goal for the distributed get and put procedures is to use multicast datagrams sent using unsolicited bandwidth to negotiate a multicast rendezvous transfer using solicited bandwidth.

The first step is for the Client (User Client) to initiate the transaction by multicasting a request to the Negotiating Group. To put a chunk, the request that is multicast is a Multicast Put Proposal. To get a chunk, the request that is multicast is a Multicast Get Request.

Each of the recipients of this multicast request then responds to the Client (Chunk Sink for a get, or Chunk Source for a put). When getting a chunk, the response is a Get Response. When putting a chunk, the response is a Chunk Put Accept. Note that, for Multicast Get Requests, the Chunk Sink must accept each transfer from a specific source.

Once the rendezvous is negotiated, a multicast payload delivery can be initiated at the negotiated time. In either case (get or put), the rendezvous is to a multicast group, referred to herein as the Rendezvous Group. In an exemplary implementation, the Rendezvous Group is specified by the Client (Chunk Sink or Chunk Source). When getting a chunk, the Rendezvous Group will typically contain only the Chunk Sink, but may include other storage servers seeking to create additional replicas by piggy-backing on the delivery to the Chunk Sink. When putting a chunk, the Rendezvous Group is a subset of the Negotiating Group.

Lastly, when putting a chunk, a transaction closing acknowledgement is required. Note that the upper layer (for example, the distributed storage layer) which uses the disclosed Replicast transport layer is responsible for determining whether sufficient replicas have been created for a put transaction to complete, or whether the put transaction should be retried.

Also note that, when getting a chunk, the chunk may also be replicated to a volunteer storage server to provide additional replicas. The present disclosure allows for opportunistic replication of the chunks most frequently retrieved, thereby optimizing later retrieval of those same chunks.

Chunk Put Proposal—Client Consensus

Figure 6:
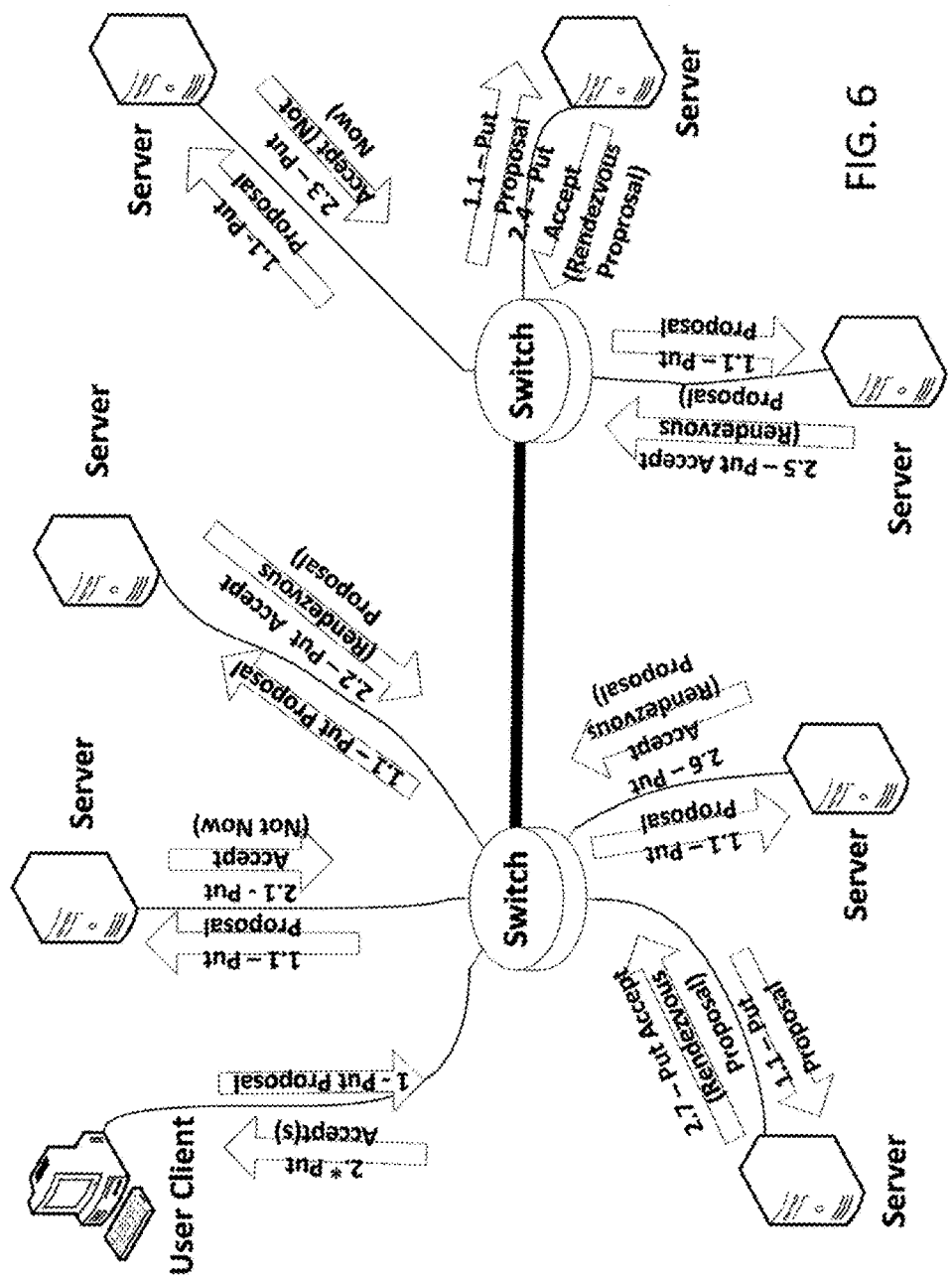
FIGS. 6-8 depict steps of a client-consensus-based procedure for proposing a chunk put to a distributed storage system in accordance with an embodiment of the invention.
Figure 7:
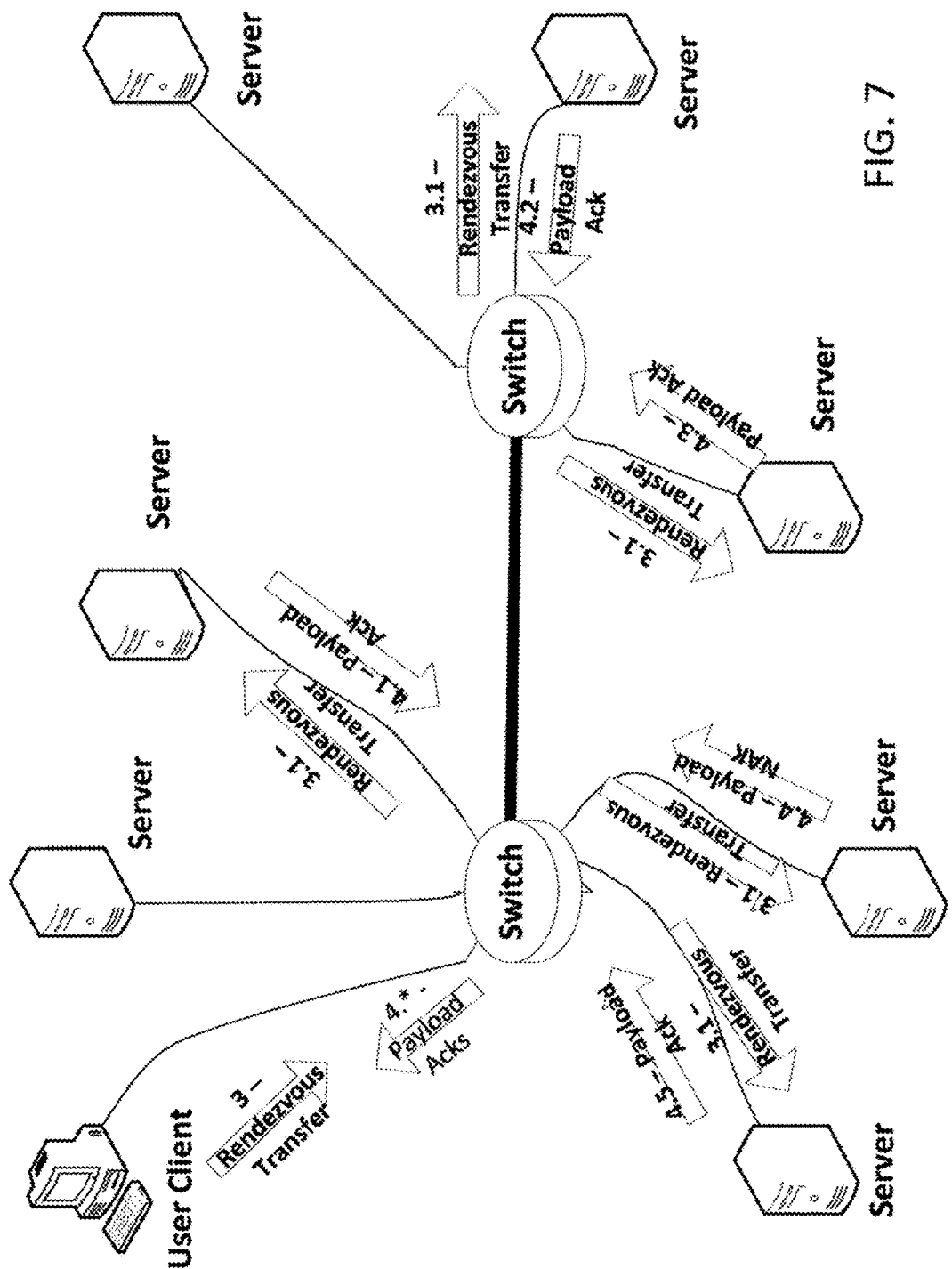
Figure 8:
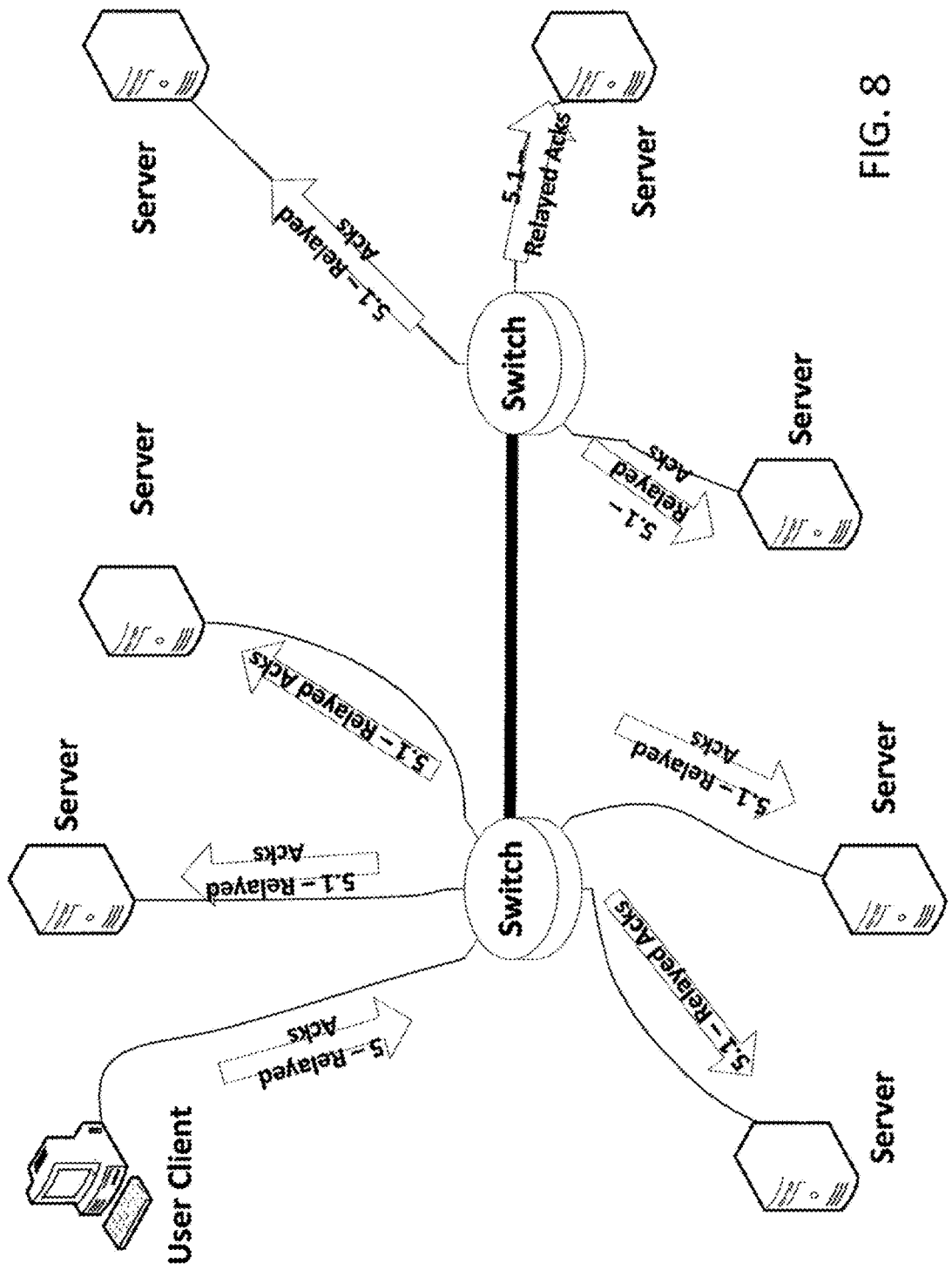

FIGS. 6-8 depict steps of a client-consensus-based procedure for proposing a chunk put to a distributed storage system in accordance with an embodiment of the invention. In this client-consensus variation of the distributed put algorithm, each of the Put Accept messages is unicast to the Client (i.e. to the Chunk Source). This client-consensus-based procedure has advantages over the serial transmission procedure of FIG. 4 and the relayed unicast transmission procedure of FIG. 5. In comparison to the serial transmission procedure, congestion on inbound links is avoided. In comparison to the relayed unicast transmission procedure, contention between the relay (put) traffic and get traffic is avoided.

In the illustrations of FIGS. 6-8, we will walk through a sequence of events for a put transaction with the client-consensus procedure. Before this sequence of events, an upper layer (i.e. a layer above the Replicast transport layer) has already specified a previously-provisioned multicast Negotiating Group and a previously-provisioned multicast Rendezvous Group.

In a first step 1 shown, the Client multicasts a "Put Proposal" 1 to the Negotiating Group of Servers. Data fields in exemplary implementations of a Put Proposal message are described below in relation to FIG. 24. The Switches may make a best effort attempt to deliver a copy 1.1 of the Put Proposal 1 to every member of the Negotiating Group. Note that, as disclosed in this application, the nodes in aggregate are highly unlikely to transmit more unsolicited datagrams than the switch and receiver buffering can accommodate. Therefore, in almost all cases the Put Proposal will be delivered to the entire Negotiating Group.

Each recipient of the Put Proposal generates and sends a response in the form of a "Put Accept" message. In an exemplary implementation, the Put Accept message may be a "Not Now" message or a "Rendezvous Proposal" message. Data fields in exemplary implementations of a Put Accept message are described below in relation to FIG. 25. When generating a Rendezvous Proposal response, each server is free to consider its pending work requests, device performance history, and the desirability of accepting new content using a wide variety of algorithms. There is no need for these algorithms to be uniform amongst the servers. In other words, multiple different algorithms may be used by the servers. In the illustrated example: the Put Accept 2.1 message sent by a first Server in the Negotiating Group is a Not Now message; the Put Accept 2.2 message sent by a second Server in the Negotiating Group is a Rendezvous Proposal message; the Put Accept 2.3 message sent by a third Server in the Negotiating Group is a Not Now message; and the Put Accept 2.4, 2.5, 2.6 and 2.7 messages sent, respectively, by a fourth, fifth, sixth, and seventh Servers in the Negotiating Group are Rendezvous Proposal messages. The Put Accept 2.*(*=1, 2, . . . , 7) messages are received by the sending Client (Chunk Source).

FIG. 7 illustrates the next steps in the put process. The Client (Chunk Source) evaluates all of the "Put Accept" responses and determines whether a "Rendezvous Transfer" is required. For example, if there were already sufficient replicas of the chunk to be put, then no Rendezvous Transfer would be required.

The criteria for "sufficient replicas" can vary with the usage of the present invention. For example some users may establish a policy that their content should have at least four replicas in at least two different failure domains, while others may simply require three replicas in three different failure domains. In a preferred embodiment, this flexibility to accommodate differing policies is enabled by making these determinations in a callback function to the upper layer.

In the example illustrated, the Rendezvous Transfer 3 (including the chunk payload) is multicast from the Client to the Rendezvous Group, which is a subset of the Negotiating Group. Hence, copies 3.1 of the Rendezvous Transfer 3 are shown as being received by each Server in the Rendezvous Group. Data fields in exemplary implementations of a Rendezvous Transfer message are described below in relation to FIG. 26. In the illustrated example, the first and third storage servers in the Negotiating Group indicated in their Put Accept response that they could not accept delivery now (i.e. returned Not Now messages), and therefore did not join the Rendezvous Group. The remaining storage servers in the Negotiating Group indicated in their Put Accept responses that they could accept delivery and so became members of the Rendezvous Group.

The recipients of the Rendezvous Transfers 3.1 respond by unicasting a Payload Acknowledgement ("Payload ACK") message to the Chunk Source. Data fields in exemplary implementations of a Payload ACK message are described below in relation to FIG. 27. In the illustrated example, the Payload ACK 4.1, 4.2, 4.3, 4.4, and 4.5 messages are sent, respectively, by the first, second, third, fourth, and fifth Servers in the Rendezvous Group. The Payload ACK 4.*(*=1, 2, . . . , 5) messages are received by the sending Client (Chunk Source).

FIG. 8 illustrates the final step in the put process. The client collects the received Payload ACKs and forwards them to the Negotiating Group in one or more Relayed ACK message. As depicted, a Relayed ACK 5 message may be multicast from the Client such that a copy 5.1 of the Relayed ACK message is received by each Server in the Negotiating Group. The Relayed ACK message informs each Server in the Negotiating Group as to which Servers of the Rendezvous Group are to receive the chunk to be put.

Chunk Put Proposal—Cluster Consensus

Figure 9:
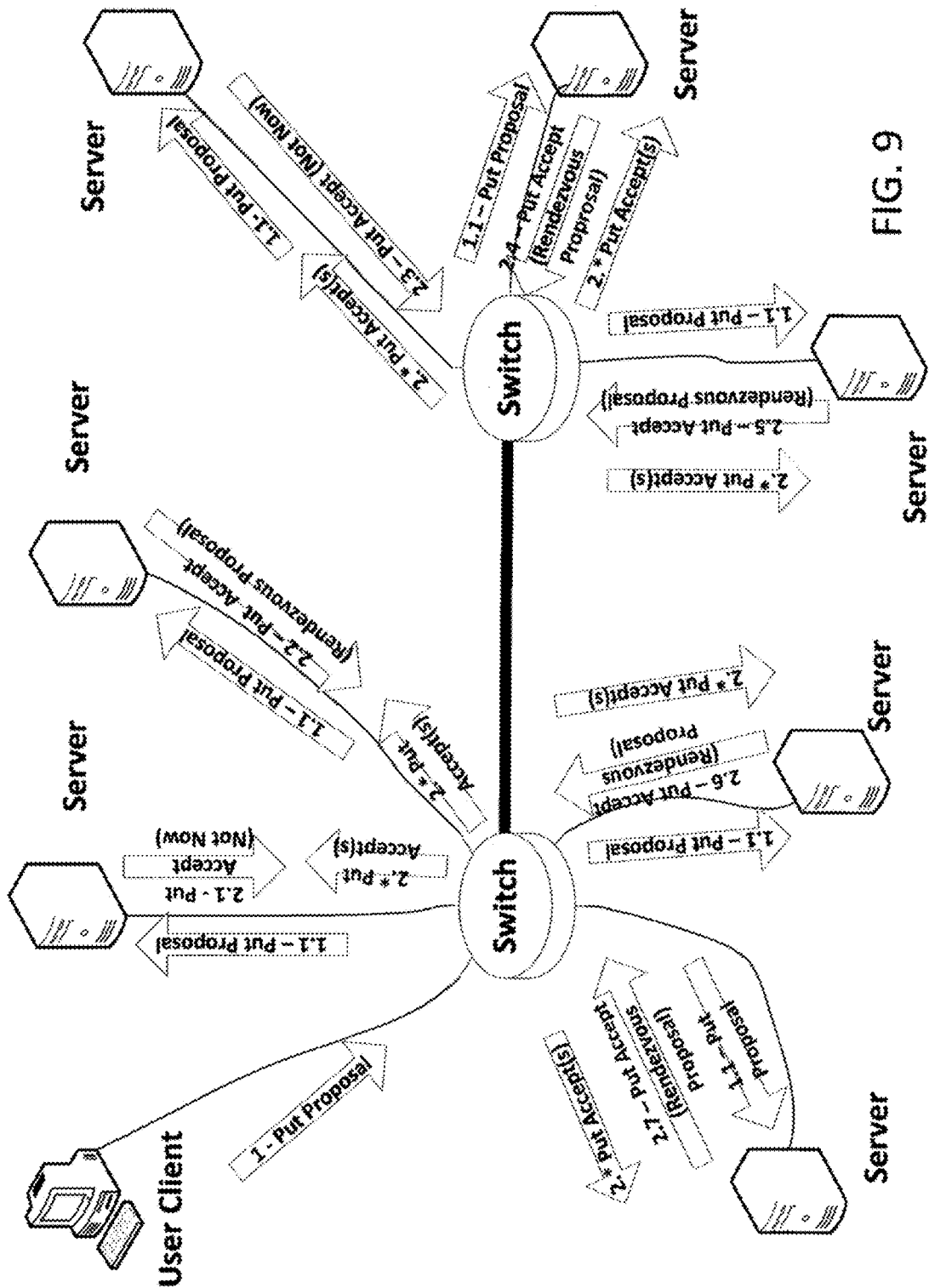
FIGS. 9-11 depict steps of a cluster-consensus-based procedure for proposing a chunk put to a distributed storage system in accordance with an embodiment of the invention.
Figure 10:
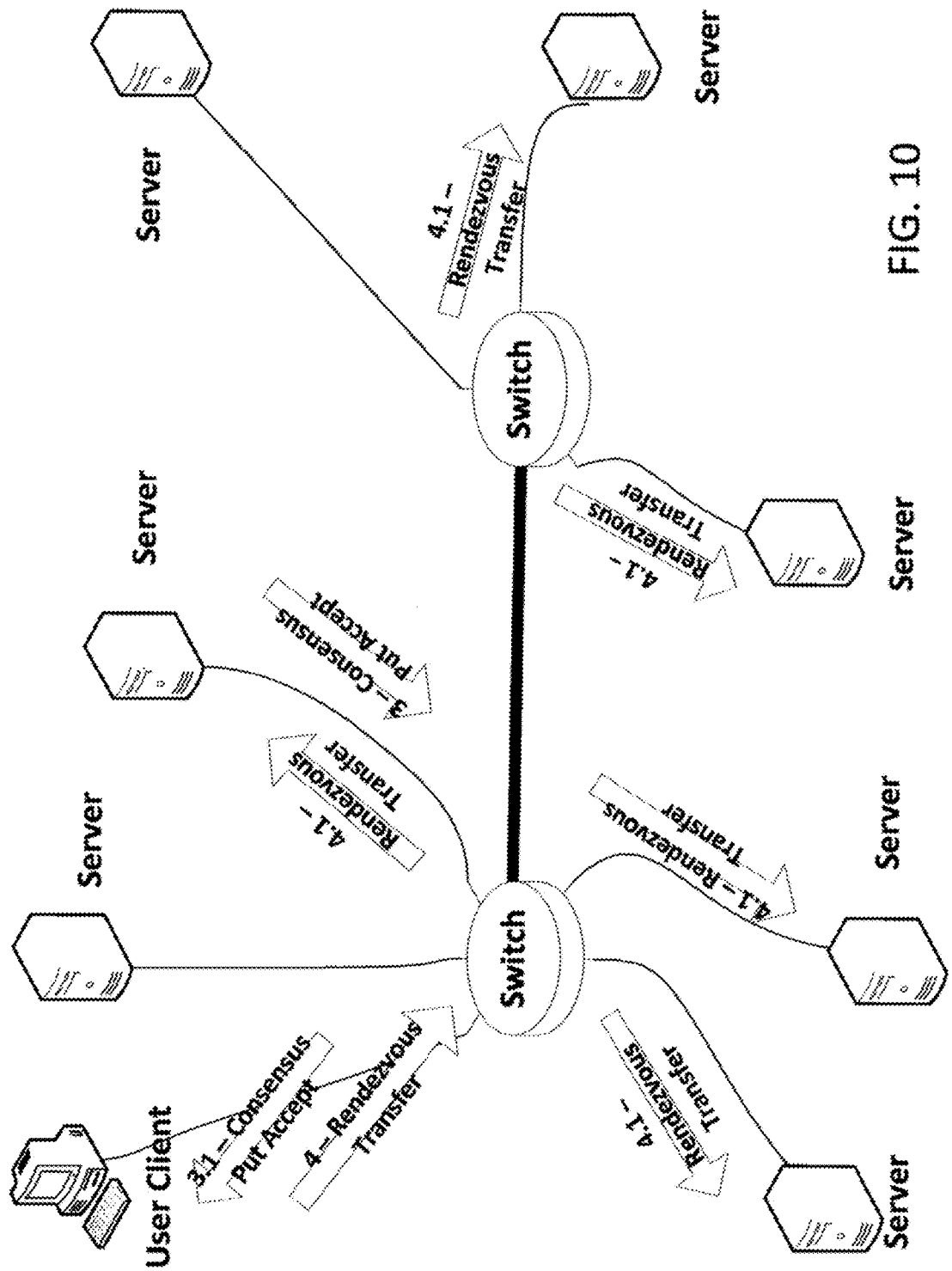
Figure 11:
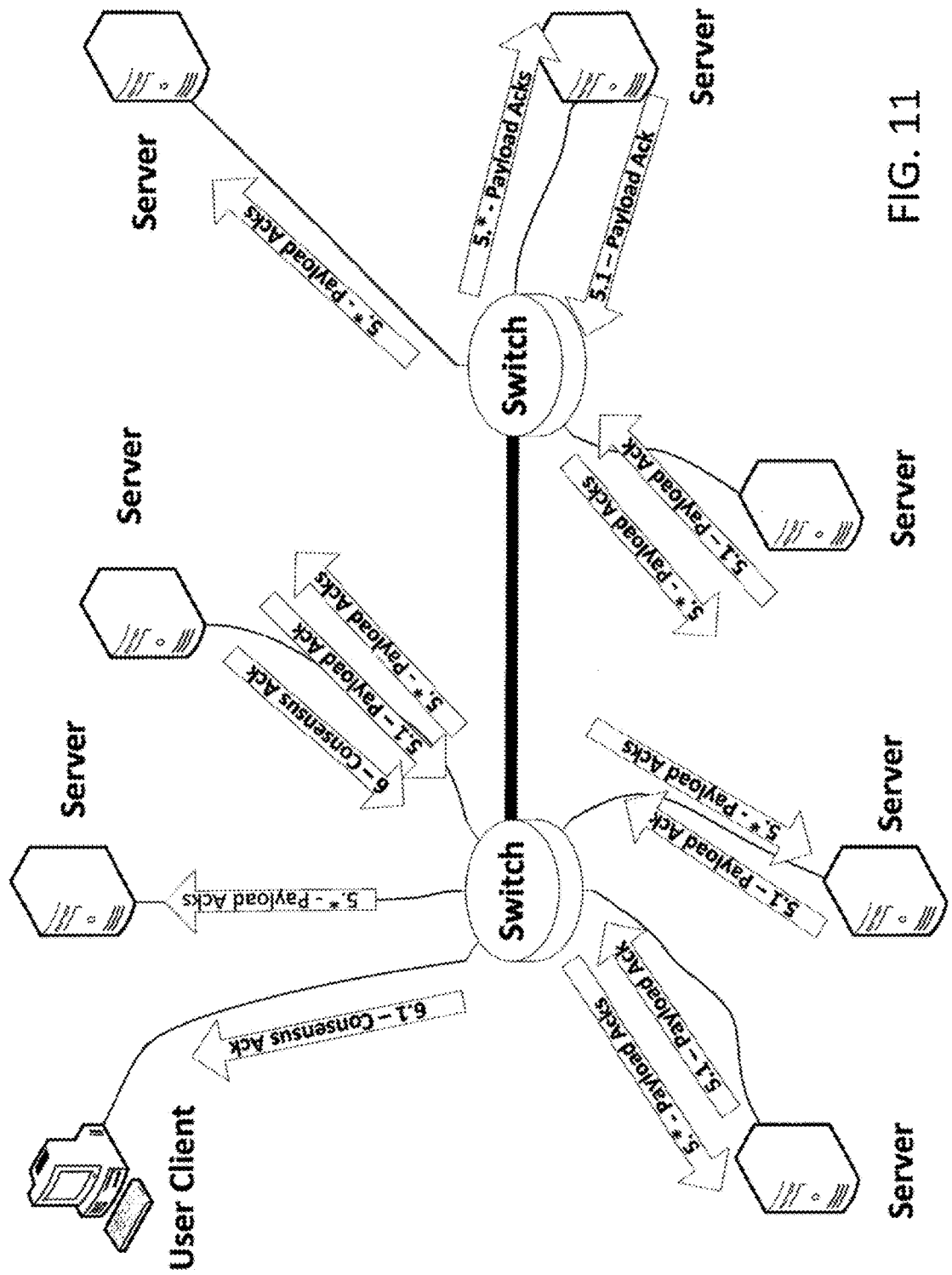

FIGS. 9-11 depict steps of a cluster-consensus-based procedure for proposing a chunk put to a distributed storage system in accordance with an embodiment of the invention. This cluster-consensus-based procedure has advantages over the serial transmission procedure of FIG. 4 and the relayed unicast transmission procedure of FIG. 5. In comparison to the serial transmission procedure, congestion on inbound links is avoided. In comparison to the relayed unicast transmission procedure, contention between the relay (put) traffic and get traffic is avoided.

In the illustrations of FIGS. 9-11, we will walk through a sequence of events for a put transaction with the cluster-consensus procedure. Before this sequence of events, the upper layers (above the replicast transport layer) have already specified a previously-provisioned multicast Negotiating Group and a previously-provisioned multicast Rendezvous Group.

In a first step shown, the Client multicasts a "Put Proposal" 1 to the Negotiating Group of Servers. The Switches may make a best effort attempt to deliver a copy 1.1 of the Put Proposal 1 to every member of the Negotiating Group. As with the client-consensus example, the Put Proposal will typically be delivered to each member of the Negotiating Group.

Each recipient of the Put Proposal responds by generating and sending a "Put Accept" message. As shown in FIG. 9, in this cluster-consensus variation of the distributed put protocol, each of the Put Accept messages is multicast to the other members of the Negotiating Group. As with the client-consensus variation previously described, each storage server is free to employ its own algorithm to generate its Put Proposal based, for example, upon its performance history, work queue depth, and the desirability of accepting more storage. In the illustrated example: the Put Accept 2.1 message sent by a first Server in the Negotiating Group is a Not Now message; the Put Accept 2.2 message sent by a second Server in the Negotiating Group is a Rendezvous Proposal message; the Put Accept 2.3 message sent by a third Server in the Negotiating Group is a Not Now message; and the Put Accept 2.4, 2.5, 2.6 and 2.7 messages sent, respectively, by a fourth, fifth, sixth, and seventh Servers in the Negotiating Group are Rendezvous Proposal messages. Each Server in the Negotiating Group receives the Put Accept 2.*(*=1, 2, . . . , 7) messages from the other members of the Negotiating Group.

The next steps in the put process are depicted in FIG. 10. Each member of the Negotiating Group evaluates the Put Accepts 2.* for the transaction. A consistent procedure may be applied during the evaluation by each member so as to concurrently determine which of them should take a specific action. One of various conventional procedures may be used for this purpose. For example, one compatible procedure involves electing a lead member (the leader) to be the first-listed designated member of the Negotiating Group that intends to accept the transfer. When no member intends to accept the transfer, it may be the first-listed designated member of the Negotiating Group, even though that member does not intend to accept. However selected, the selected Server in the Negotiating Group may multicast the Consensus Put Accept 3 to the Client. Hence, a copy 3.1 of the Consensus Put Accept 3 is shown as being received by the Client.

As with the Client-Consensus procedure, the selection process may accommodate a variety of user policies. The only requirement is that the evaluation procedures on the various members of the Negotiating Group do not derive solutions that conflict with each other. In a preferred embodiment, a callback to the upper layer is used to enable this policy flexibility.

At a specified time, or within a specified window of time, the Client performs the Rendezvous Transfer 4 (including sending the chunk payload) to the Rendezvous Group. Hence, a copy 4.1 of the Rendezvous Transfer 4 is shown as being received by each Server that is a member of the Rendezvous Group.

The final steps of the put process are depicted in FIG. 11. Each recipient of the Rendezvous Transfer 4.1 multicasts a Payload ACK 5.1 message to the Rendezvous Group. In addition, the previously-selected leader of the Rendezvous Group unicasts a Consensus ACK 6 message to the Client.

Chunk Put Proposal with Deduplication—Client Consensus

Figure 12:
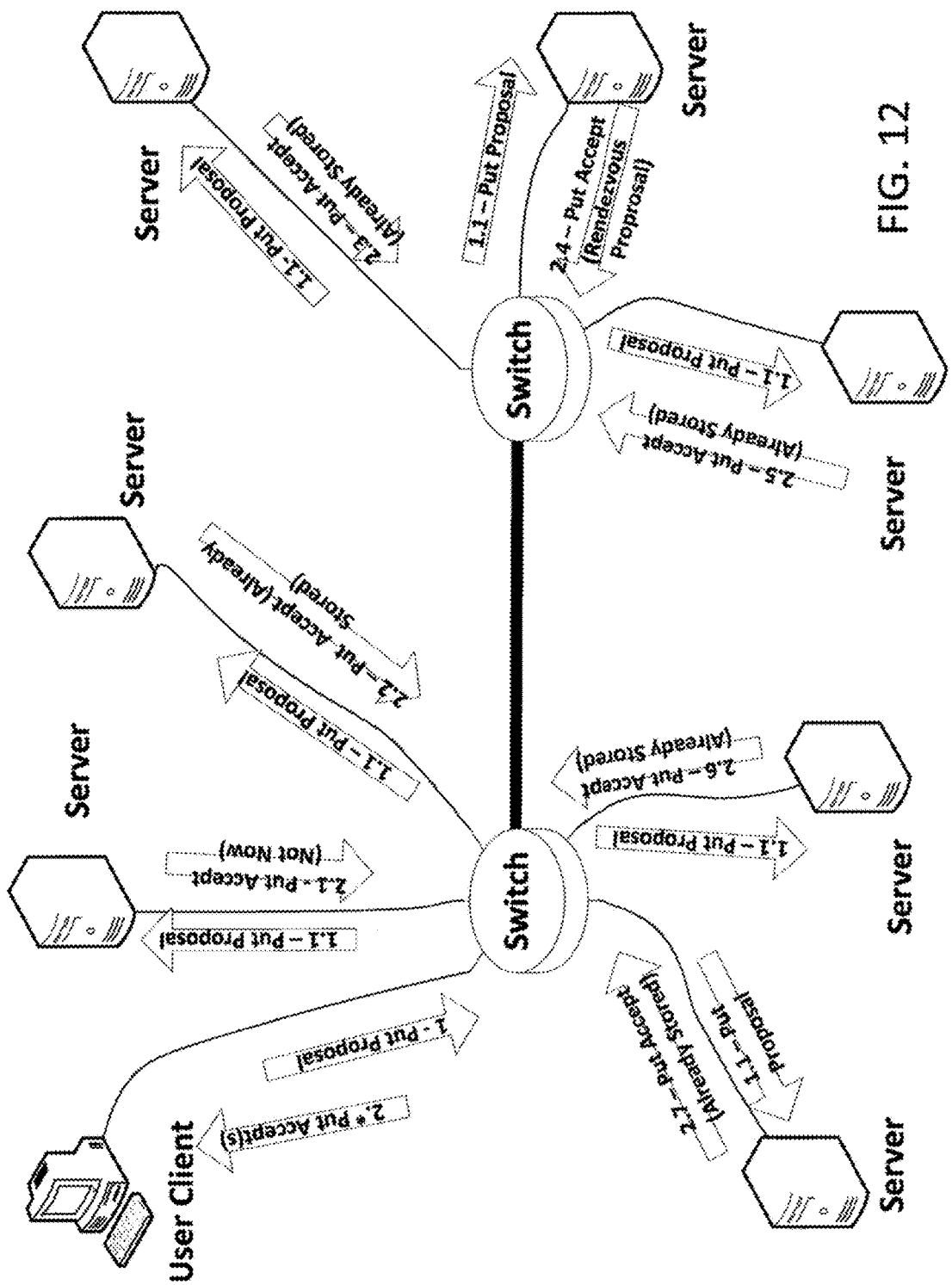
FIGS. 12 and 13 depict steps of a client-consensus-based procedure for proposing a chunk put to a distributed storage system with de-duplication in accordance with an embodiment of the invention.
Figure 13:
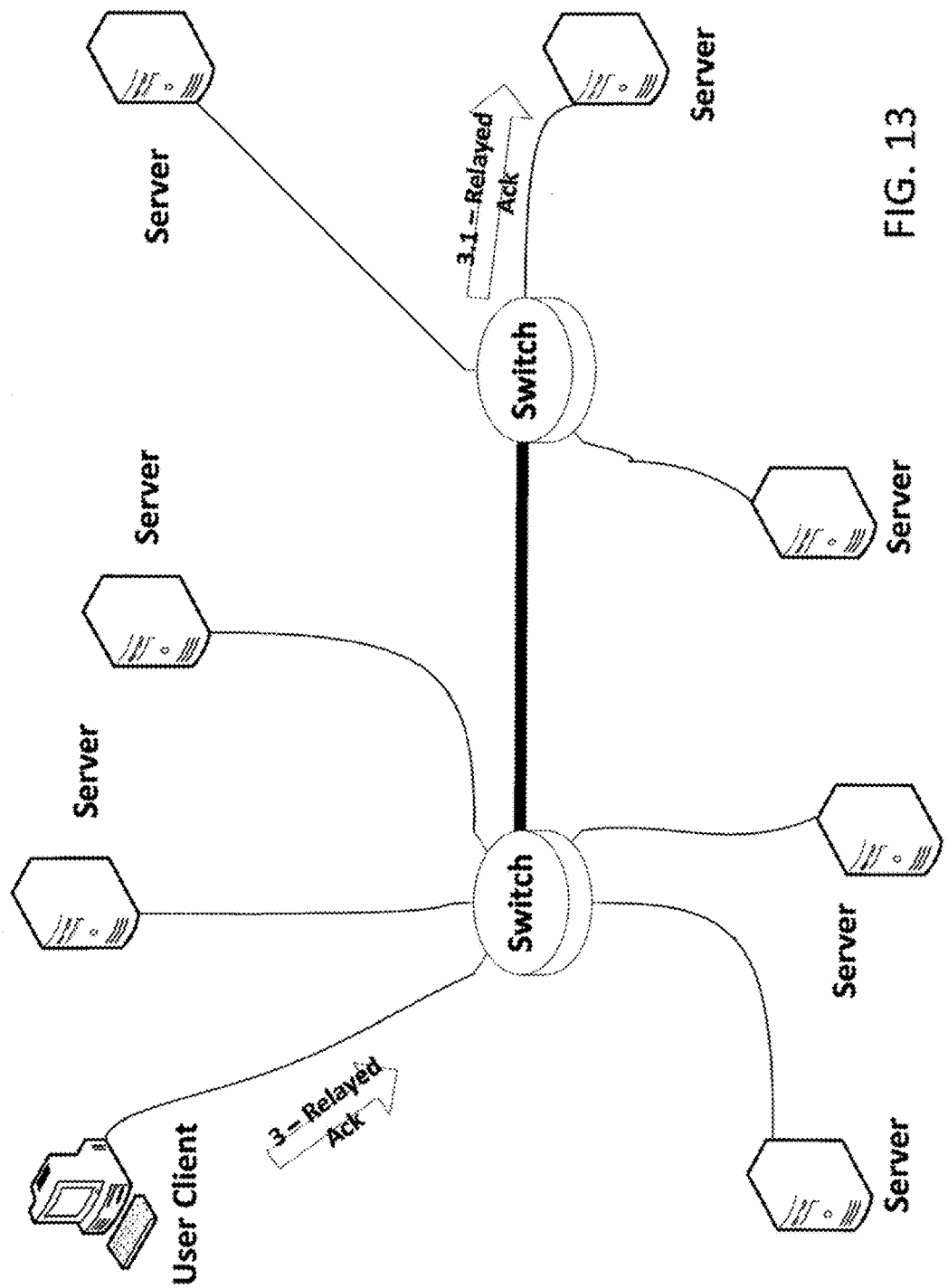

FIGS. 12 and 13 depict steps of a client-consensus-based procedure for proposing a chunk put to a distributed storage system with de-duplication in accordance with an embodiment of the invention.

The steps shown in FIG. 12 are similar to the steps discussed above in relation to FIG. 6. However, the system of FIG. 12 has de-duplication, and the chunk to be put is already stored on a number of storage servers in the illustrated example. In particular, the chunk to be put is already stored on the second, third, fifth, sixth and seventh Servers. Hence, the second, third, fifth, sixth and seventh Servers respond to the Put Proposal 1.1 with Put Accept messages (2.2, 2.3, 2.5, 2.6 and 2.7, respectively) that indicate that the chunk to be put is "Already Stored" at that server.

The Client (Chunk Source) receives the Put Accept 2.* (where *=1, 2, 3, . . . , 7) messages. From the number of "Already Stored" responses among the Put Accept messages, the Client is able to determine, in this example, that the chunk to be put is already stored on a sufficient number of storage servers. Hence, in this case, no rendezvous transfer is required. Since no rendezvous transfer is required, the Client may send a Relayed ACK 3 message to the members of the Rendezvous Group, as depicted in FIG. 13. The Relayed ACK message indicates to the members of the Rendezvous Group that there were sufficient replicas already stored, so no new replicas need to be created.

Chunk Put Proposal with Deduplication—Cluster Consensus

Figure 14:
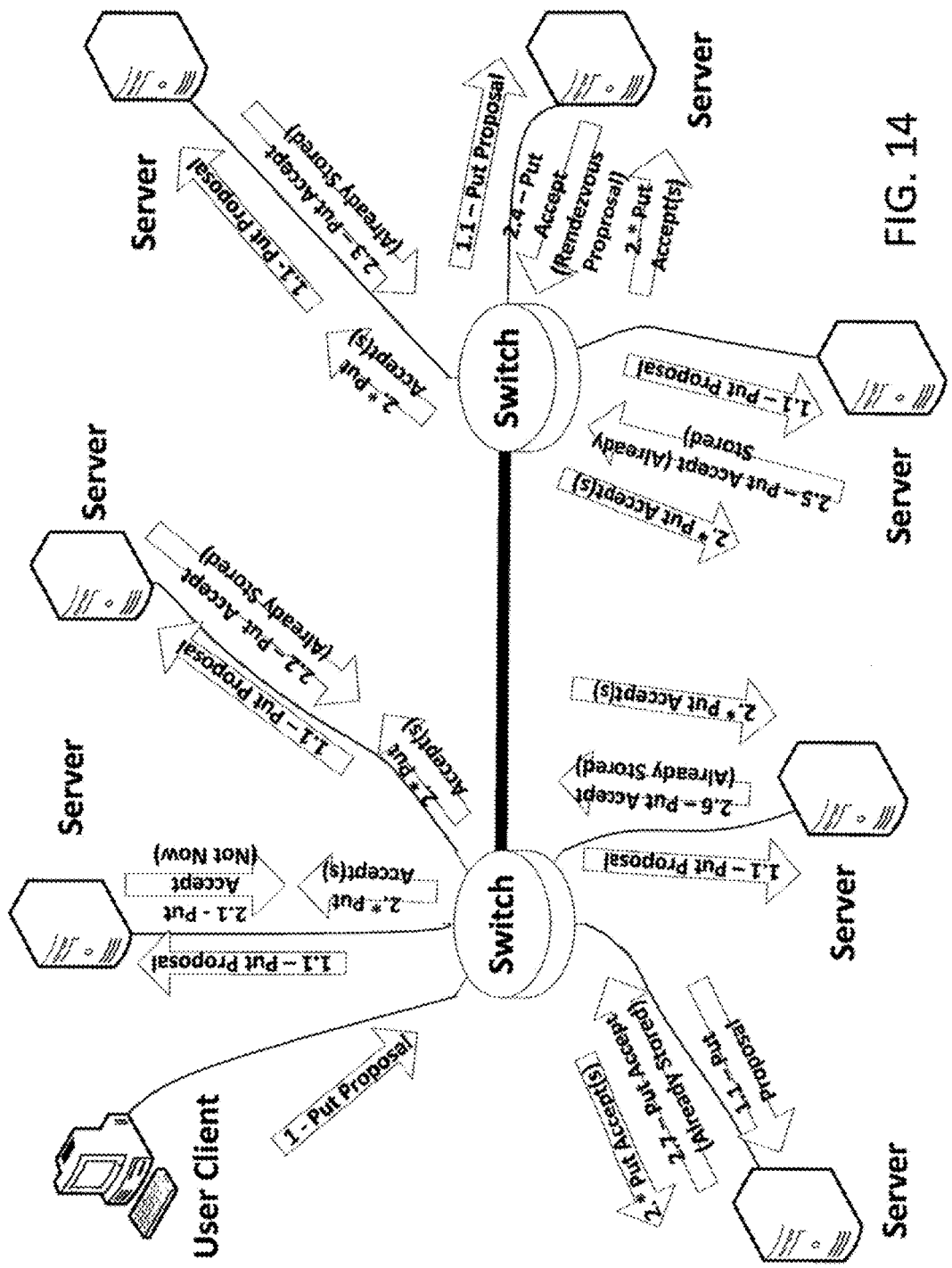
FIGS. 14 and 15 depict steps of a cluster-consensus-based procedure for proposing a chunk put to a distributed storage system with de-duplication in accordance with an embodiment of the invention.
Figure 15:
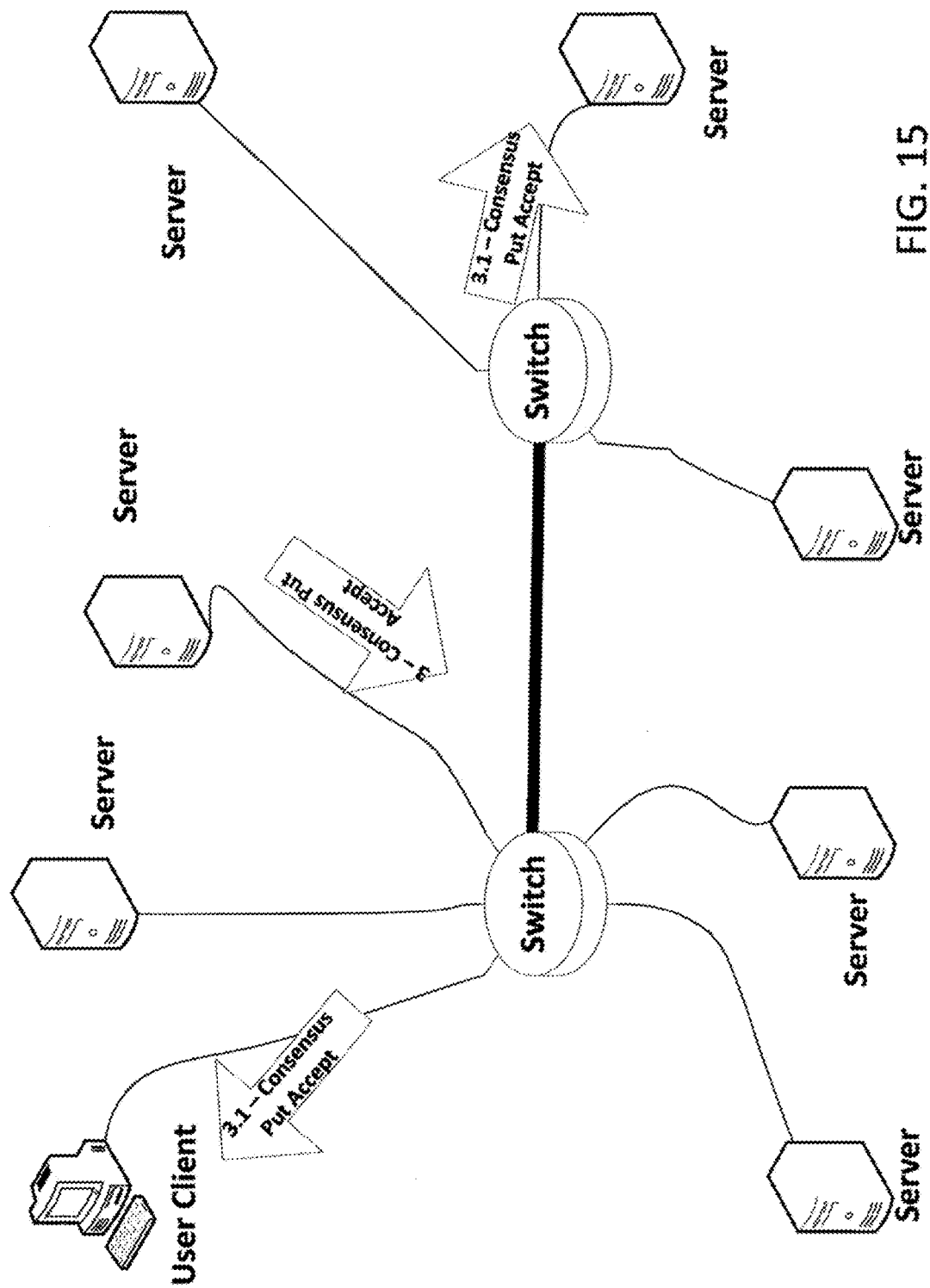

FIGS. 14 and 15 depict steps of a cluster-consensus-based procedure for proposing a chunk put to a distributed storage system with de-duplication in accordance with an embodiment of the invention.

The steps shown in FIG. 14 are similar to the steps discussed above in relation to FIG. 9. However, the system of FIG. 14 has de-duplication, and the chunk to be put is already stored on a number of storage servers in the illustrated example. In particular, the chunk to be put is already stored on the second, third, fifth, sixth and seventh Servers. Hence, the second, third, fifth, sixth and seventh Servers respond to the Put Proposal 1.1 with Put Accept messages (2.2, 2.3, 2.5, 2.6 and 2.7, respectively) that indicate that the chunk to be put is "Already Stored" at that server.

Each Server of the Negotiating Group receives the Put Accept 2.* (where *=1, 2, 3, . . . , 7) messages. In this example, from the number of "Already Stored" responses among the Put Accept messages, each Server is able to determine independently that the chunk to be put is already stored on a sufficient number of storage servers such that no rendezvous transfer is required. In this case, the leader may transmit a Consensus Put Accept 3 which is received (as Consensus Put Accept 3.1) by the Client (Chunk Source), as depicted in FIG. 15. The Consensus Put Accept 3.1 indicates to the Client that there were sufficient replicas already stored, so no new replicas need to be created.

Chunk Get—Client Consensus

Figure 16:
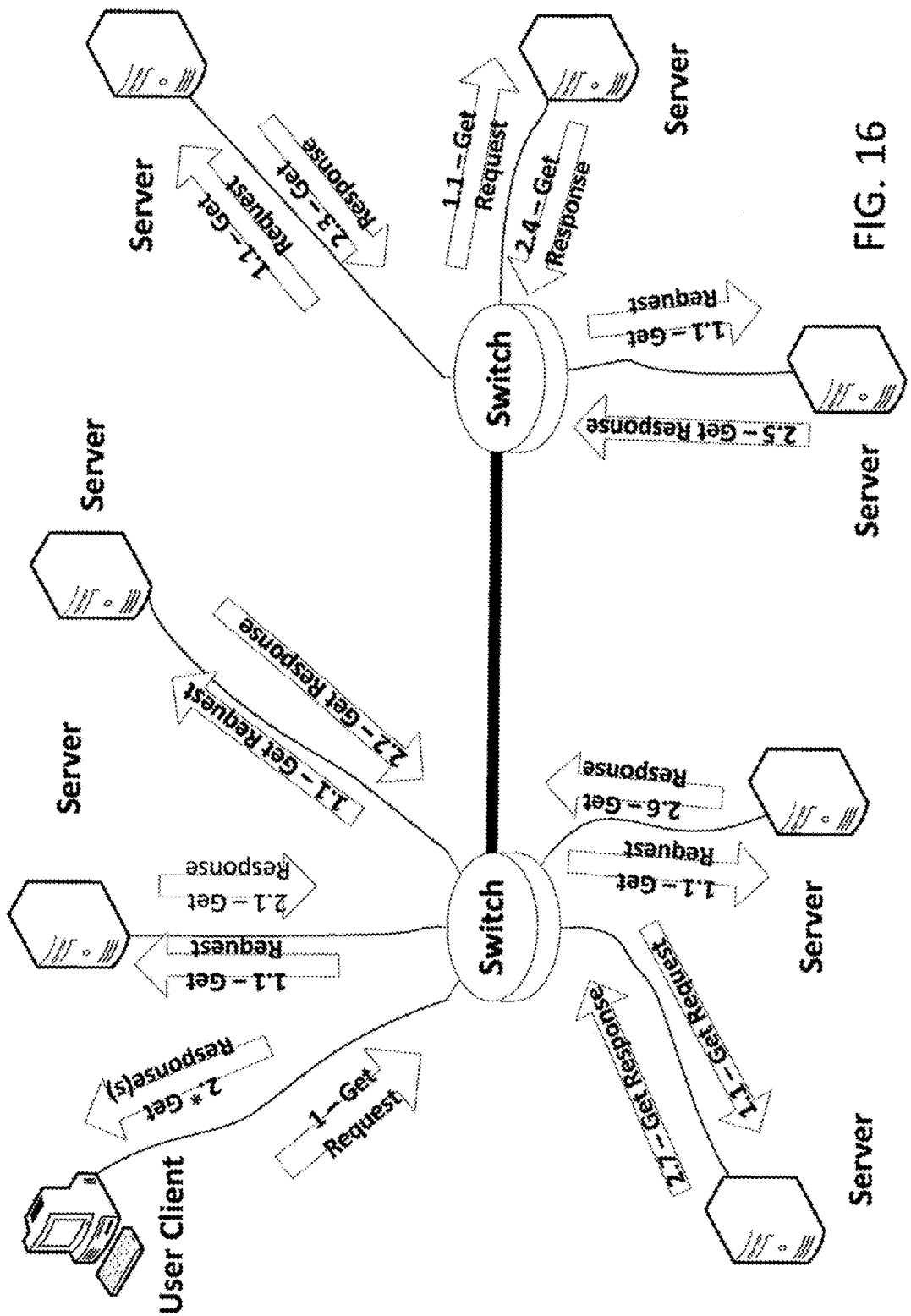
FIGS. 16 and 17 depict steps of a client-consensus-based procedure for requesting a chunk get from a distributed storage system in accordance with an embodiment of the invention.
Figure 17:
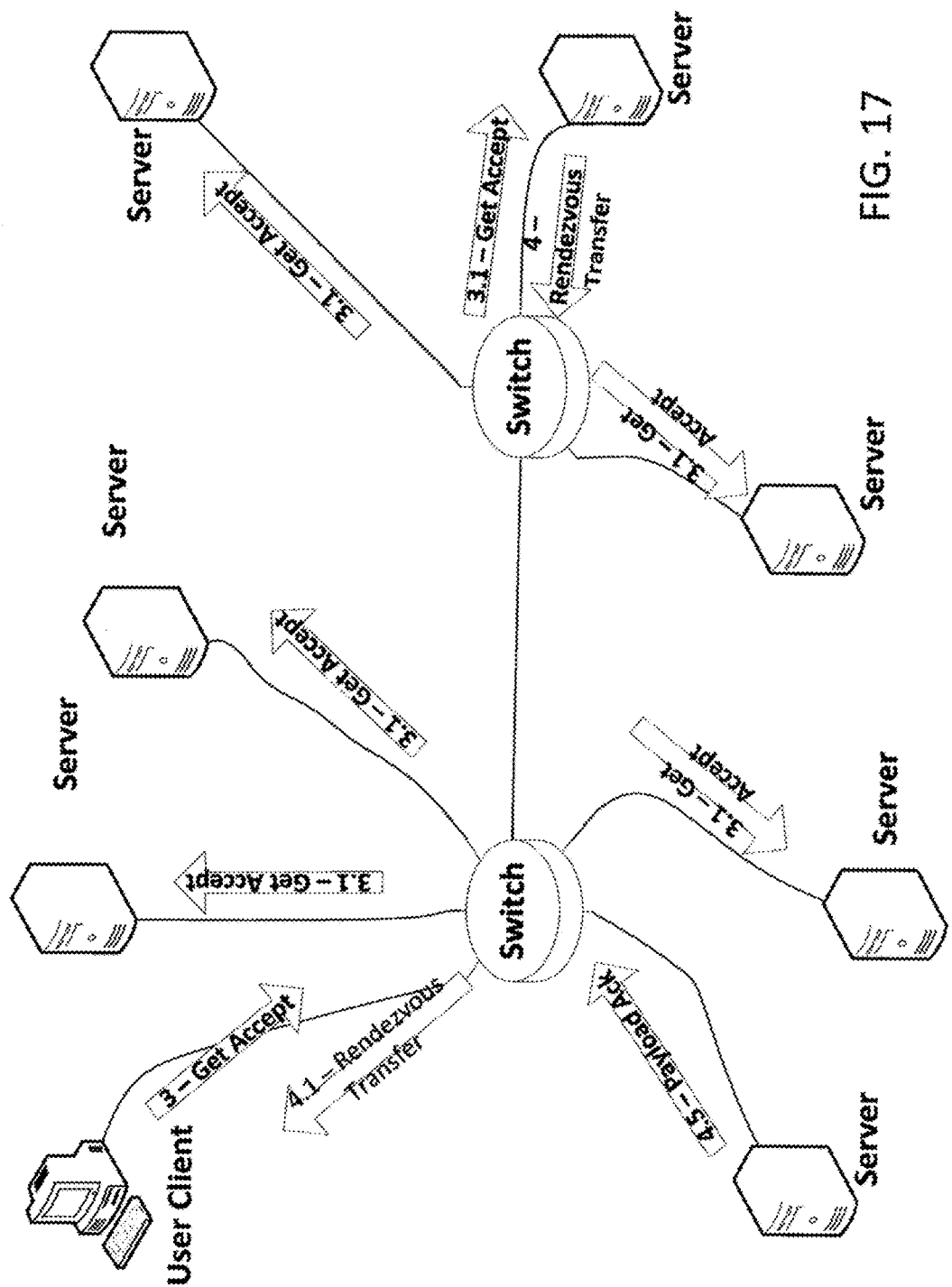

FIGS. 16 and 17 depict steps of a client-consensus-based procedure for requesting a chunk get from a distributed storage system in accordance with an embodiment of the invention. Before this sequence of events, an upper layer (i.e. a layer above the Replicast transport layer) has already specified a previously-provisioned multicast Negotiating Group and a previously-provisioned multicast Rendezvous Group.

Note that, for a chunk get transaction, the specified Rendezvous Group is one that has been joined by the Client, or an agent acting on behalf of the Client. Typically, the Client (or its agent) will have previously joined several provisioned Rendezvous Groups for previous transactions and so one of these previously-joined Rendezvous Groups may be specified.

As depicted in FIG. 16, the Client may multicast, in step 1, a Get Request 1 to the Negotiating Group. The Switches of the system then forward the Get Request 1.1 to Servers that are members of the Negotiating Group.

Each Server in the Negotiating Group then generates and unicasts a Get Response to the Client in response to the Get Request 1.1. This response may be generated using an algorithm that factors in the current work queue depths, the performance history of the devices to be used, and other factors to derive its best estimate of earliest delivery time. However, there is no requirement that this algorithm be uniform across all storage servers. In other words, multiple different algorithms may be used by the storage servers. In the illustrated example: Get Response 2.1 is unicast by the first Server; Get Response 2.2 is unicast by the second Server; Get Response 2.3 is unicast by the third Server; . . . ; and Get Response 2.7 is unicast by the seventh Server. The Get Responses 2.* (where *=1, 2, 3, . . . , 7) are received by the Client.

The Client analyzes the Get Responses 2.* to determine which Server corresponds to the best response. As shown in FIG. 17, the Client then multicasts a Get Accept 3 to the Negotiating Group. The Get Accept 3 specifies which Get Response will be accepted (i.e. which Server is selected to provide the chunk). Each Server in the Negotiating Group receives a copy 3.1 of the Get Accept 3. Upon receiving the Get Accept, the selected Server may initiate a multicast Rendezvous Transfer 4 to the Rendezvous Group, which in this case consists solely of the Client. The Client thus receives a copy 4.1 of the Rendezvous Transfer 3 and so obtains the desired chunk.

Chunk Get—Cluster Consensus

Figure 18:
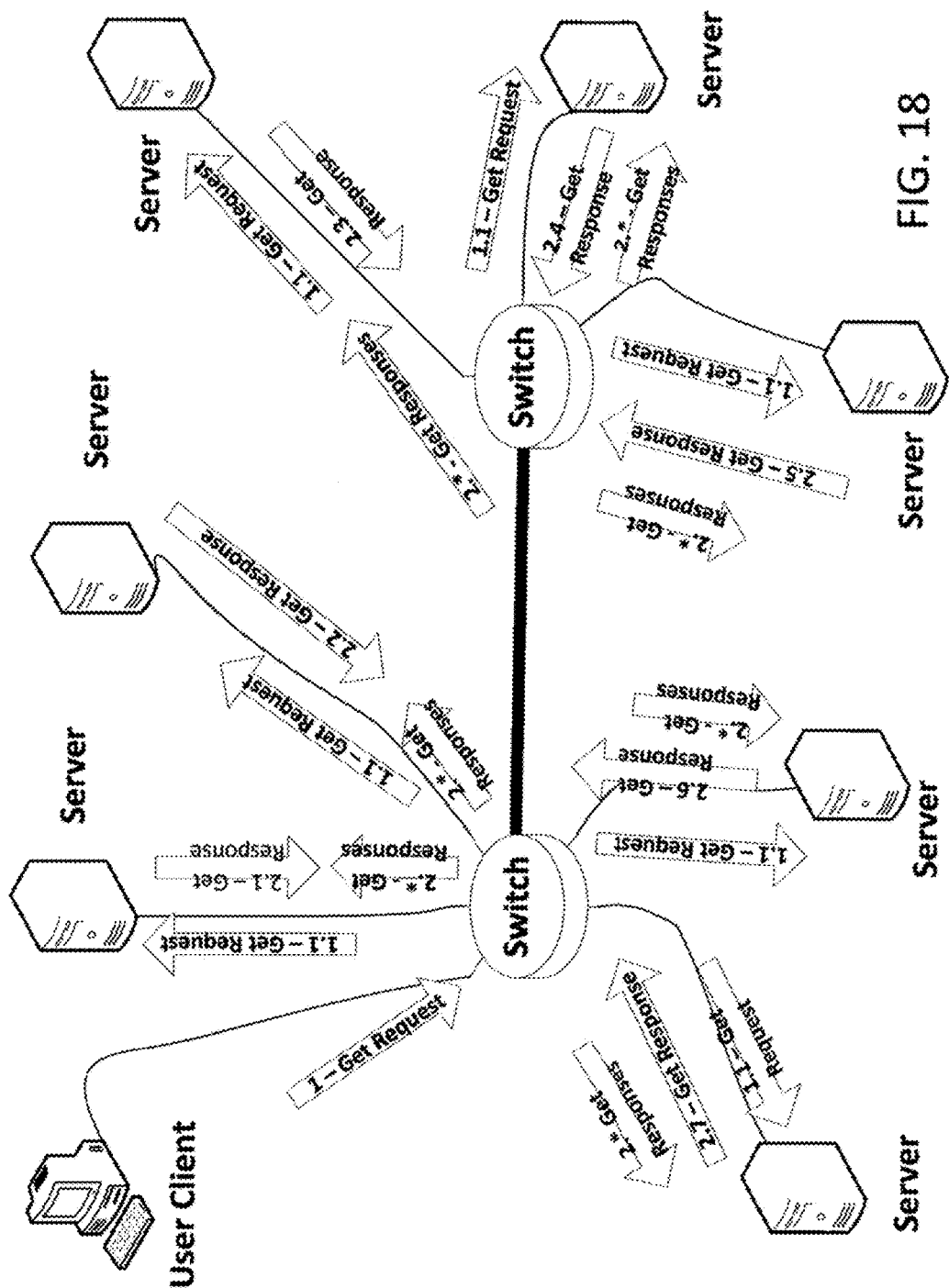
FIGS. 18 and 19 depict steps of a cluster-consensus-based procedure for requesting a chunk get from a distributed storage system in accordance with an embodiment of the invention.
Figure 19:
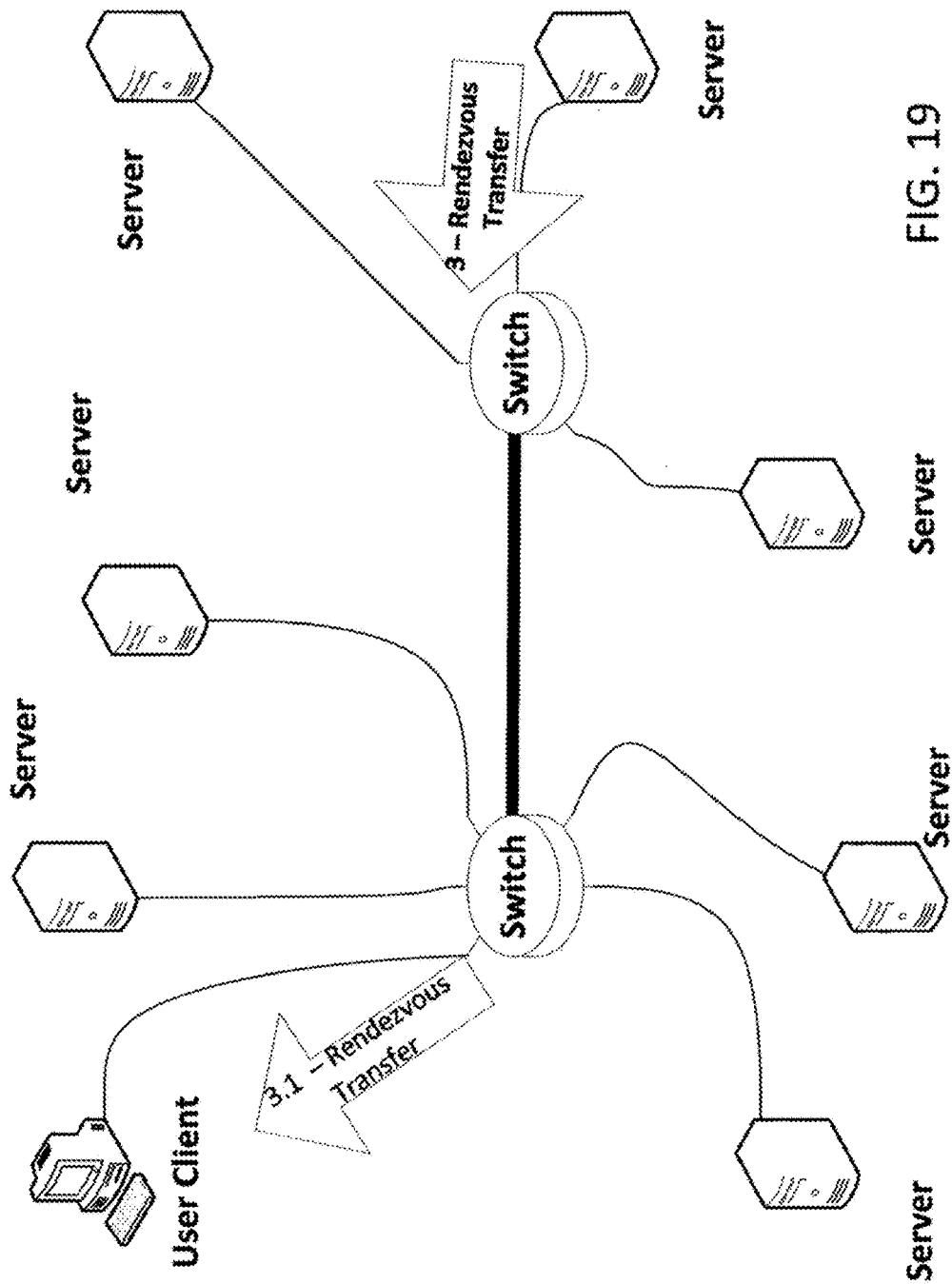

FIGS. 18 and 19 depict steps of a cluster-consensus-based procedure for requesting a chunk get from a distributed storage system in accordance with an embodiment of the invention. Before this sequence of events, an upper layer (i.e. a layer above the Replicast transport layer) has already specified a previously-provisioned multicast Negotiating Group and a previously-provisioned multicast Rendezvous Group.

Note that, for a chunk get transaction, the specified Rendezvous Group is one that has been joined by the Client, or an agent acting on behalf of the Client. Typically, the Client (or its agent) will have previously joined several provisioned Rendezvous Groups for previous transactions and so one of these previously-joined Rendezvous Groups may be specified.

As depicted in FIG. 18, the Client may multicast, in step 1, a Get Request 1 to the Negotiating Group. The Switches of the system then forward the Get Request 1.1 to Servers that are members of the Negotiating Group.

In response to the Get Request 1.1, each Server generates and multicasts a Get Response to the other Servers in the Negotiating Group. This response may be generated using an algorithm that factors in the current work queue depths, the performance history of the devices to be used, and other factors to derive its best estimate of earliest delivery time. However, there is no requirement that this algorithm be uniform across all storage servers. In other words, multiple different algorithms may be used by the storage servers. In the illustrated example: Get Response 2.1 is multicast by the first Server; Get Response 2.2 is multicast by the second Server; Get Response 2.3 is multicast by the third Server; . . . ; and Get Response 2.7 is multicast by the seventh Server. Each Server in the Negotiating Group receives the Get Responses 2.* (where *=1, 2, 3, . . . , 7) from the other Servers in the Negotiating Group.

Each Server in the Negotiating Group analyzes the Get Responses 2.* to determine which Server corresponds to the best response. As shown in FIG. 19, the one Server that corresponds to the best response initiates a multicast Rendezvous Transfer 3 to the Rendezvous Group, which in this case consists solely of the Client. The Client thus receives a copy 3.1 of the Rendezvous Transfer 3 and so obtains the desired chunk.

Chunk Get—Cluster Consensus with Additional Target

Figure 20:
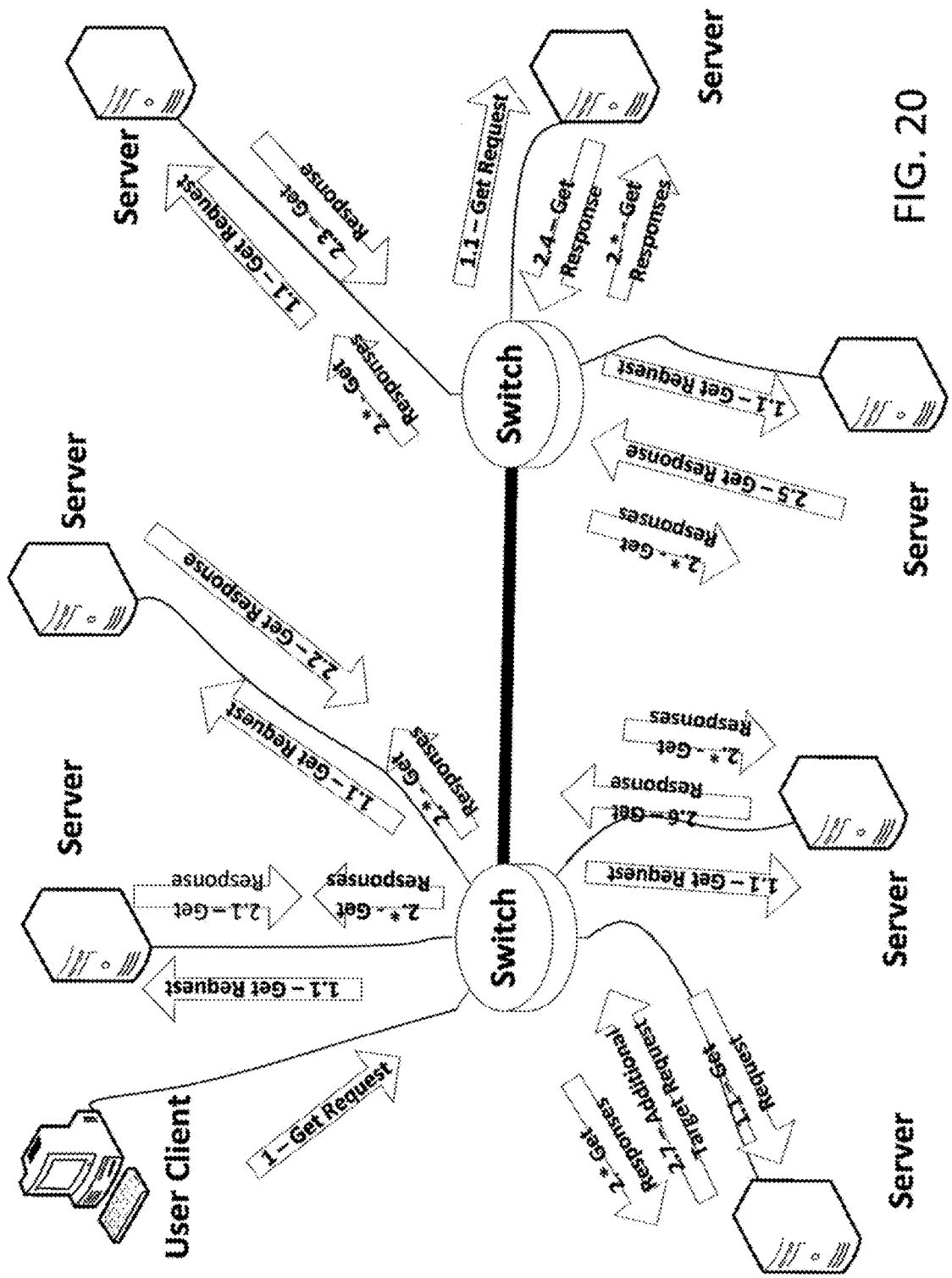
FIGS. 20 and 21 depict steps of a cluster-consensus-based procedure for requesting a chunk get from a distributed storage system where an additional target is requested in accordance with an embodiment of the invention.
Figure 21:
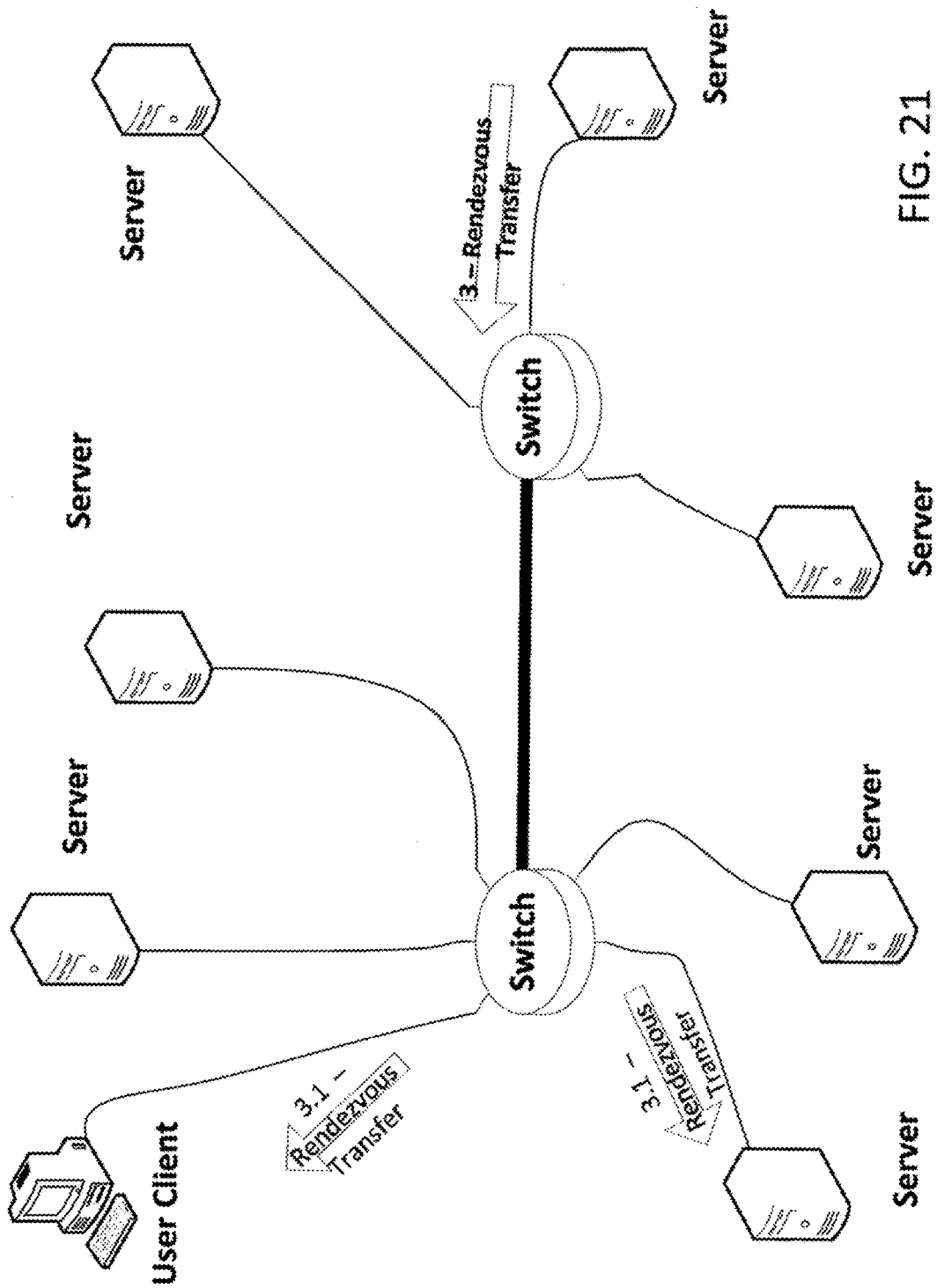

FIGS. 20 and 21 depict steps of a cluster-consensus-based procedure for requesting a chunk get from a distributed storage system where an additional target is requested in accordance with an embodiment of the invention.

As depicted in FIG. 20, the Client may multicast, in step 1, a Get Request 1 to the distributed storage system. The Switches of the system then forward the Get Request 1.1 to Servers that are members of the Negotiating Group.

In response to the Get Request 1.1, each of the Servers generates and multicasts either a Get Response to the other Servers in the Negotiating Group. In the illustrated example: Get Response 2.1 is multicast by the first Server; Get Response 2.2 is multicast by the second Server; Get Response 2.3 is multicast by the third Server; . . . ; Get Response 2.6 is multicast by the sixth Server; and Get Response 2.7 is multicast by the seventh Server. In this case, the Get Response 2.7 from the seventh Server is an Additional Target Request 2.7.

The Additional Target Request 2.7 is a request for the seventh Server be added to the Rendezvous Group. Hence, the Additional Target Request creates an additional replica by "piggy-backing" on a get transaction using the client-consensus procedure. The Additional Target Request 2.7 may be generated by the seventh Server because it does not currently have a copy of the requested chunk. In other words, the Additional Target Request is effectively a Get Response that tells the other members of the Negotiating Group that this storage server cannot respond to this get request, but would like to do so in the future, so it will be subscribing to the Rendezvous Group to get a replica of the chunk.

Each Server in the Negotiating Group receives the Get Responses (including Additional Target Requests) 2.* (where *=1, 2, 3, . . . , 7) from the other Servers in the Negotiating Group. Each Server in the Negotiating Group analyzes the Get Responses (including Additional Target Requests) 2.* to determine which Server corresponds to the best response. As shown in FIG. 21, the one Server that corresponds to the best response initiates a multicast Rendezvous Transfer 3 to the Rendezvous Group, which in this case consists of the Client plus the seventh Server. The Client and the seventh Server thus each receives a copy 3.1 of the Rendezvous Transfer 3 and so obtains the desired chunk.

Exemplary Encoding Structures

This section will describe an exemplary set of packets that are one possible encoding of the operations described herein. The examples shown assume use of actual L3 multicast addresses.

Figure 22:
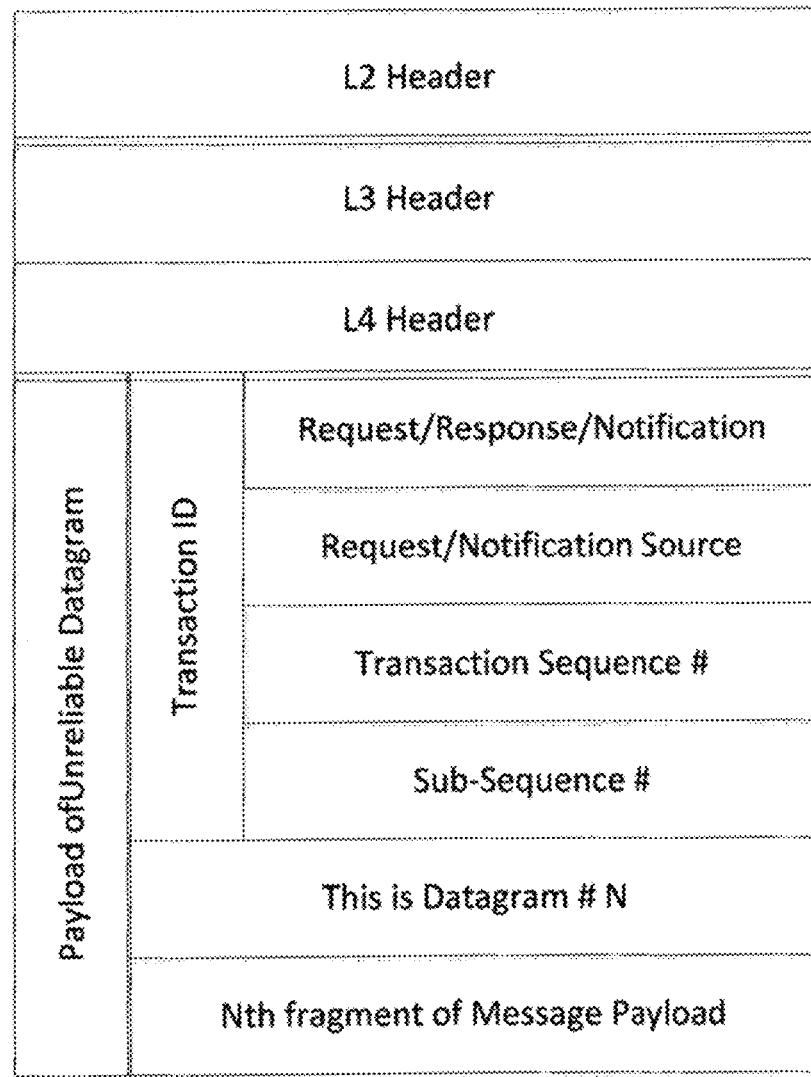
FIGS. 22 and 23 depict a possible encoding of a generic "Replicast" message over L2 frames.
Figure 23:
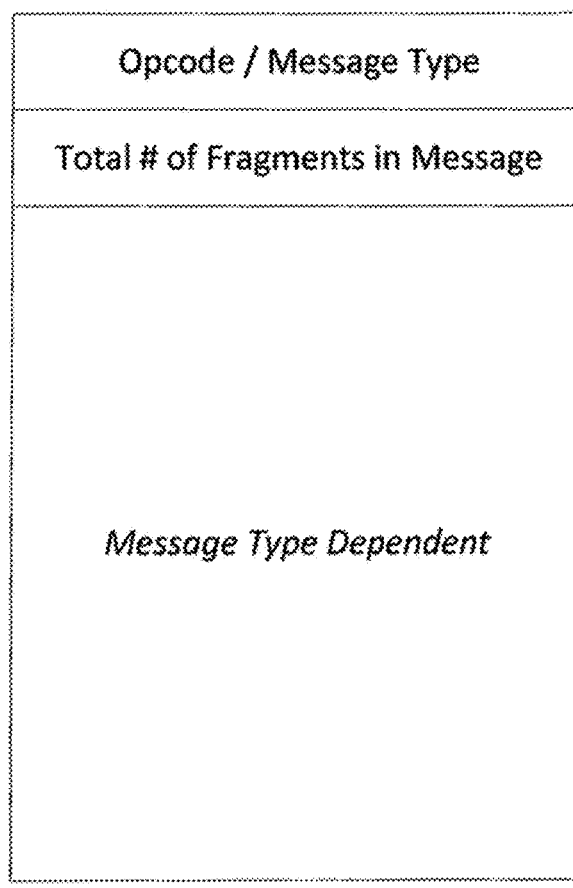

FIGS. 22 and 23 depict a possible encoding of a generic "Replicast" message over L2 frames. As shown, each L2 frame may contain the standard L2 Header, L3 Header and L4 Header. Typically, these may be Ethernet, IP and UDP headers.

The Message (Msg) Sequence number would identify a unique message within the context of a source. The source would be identified by the L3 and L4 source addresses. Multipathing could associate multiple source addresses into a multipath session, but this association would not typically be re-iterated in each L2 frame.

The Fragment # indicates which L2 frame of the total sequence within a message this is. For the first fragment the following attributes would be encoded:

The total number of fragments.
The Message Type.
The Message Length

The Message Payload would then be encoded over multiple L2 frames, each with incrementing Fragment #s. In accordance with an embodiment of the invention, the Message Payload may comprise a fragment of a "Replicast" protocol message as described herein.

Finally, in the last fragment, a validator (Msg Checksum) would be included covering the entire Msg Payload, including portions delivered as Unsolicited payload as part of the setup command. This may be a CRC-32c checksum or better. Including a "Layer 5" checksum is a protection against incorrectly ordered fragments. L2 and L4 already provide protection against corrupt transmissions.

In some embodiments of the present invention, a Msg Checksum may cover only the metadata fields because the Content Hash Identifier already validates the payload.

As shown in FIG. 22, the Payload of the Unreliable Datagram may include a transaction identifier (transaction ID). The transaction ID may include sub-fields that indicate: 1) whether the message is a request, response or notification (Request/Response/Notification); 2) the source of the request or notification (Request/Notification Source); 3) a transaction sequence number (Transaction Sequence #); and 4) a sub-sequence number (Sub-Sequence #). The payload may further include an indication of which fragment of the message payload is being carried (This is Datagram #N). Finally, the payload includes the Nth fragment of the message payload.

As further shown in FIG. 22, the Payload of the Unreliable Datagram also includes the "Nth fragment of Message Payload." In accordance with an embodiment of the invention, the Message Payload may be a Replicast message. An exemplary encoding structure for a generic Replicast message is shown in FIG. 23. Note that the exemplary encoding structure of FIG. 23 may be, in effect, inserted into the Nth Fragment of Message Payload field of FIG. 22.

The structure shown in FIG. 23 includes the following fields: a first field that indicates the opcode or message type; a second field that indicates that total number of fragments in the message; and a third field that is message type dependent. As a couple of examples, the opcode or message type may indicate whether the message is a chunk put proposal, or a chunk put accept. Other message types may be indicated, of course. The Message Type Dependent field (i.e. the third field) includes sub-fields that depend on the message type (i.e. the first field).

Exemplary message types are described below. These message types include: Put Proposals (FIG. 24); Put Accepts (FIG. 25); Rendezvous Transfers (FIG. 26); Payload ACKs and NAKs (FIG. 27); Get Requests (FIG. 28); and Get Responses (FIGS. 29 and 30).

Put Proposals

A Multicast Chunk Put Proposal would have source addresses for L2 through L4 reflecting the network interface being used to send the message. The L3 destination address would be the Multicast Address of the Negotiating Group (typically from the Distributed Hash Allocation Table). The L4 destination port would be a port number assigned for use by this protocol either by a local network administrator or a numbering authority such as IANA (Internet Assigned Numbering Authority).

FIG. 24 depicts exemplary encoding structures for chunk put proposal messages in accordance with an embodiment of the invention. The exemplary encoding structure on the left shows a structure for a named Chunk Put Proposal message, while the exemplary encoding structure on the right shows a structure for an unnamed Chunk Put Proposal message. For example, in Nexenta's Cloud Copy on Write™ object storage system (which will be commercially available from Nexenta Systems of Santa Clara, Calif.), a Named Chunk may correspond to a "version manifest" chunk, and an Unnamed Chunk may correspond to a content chunk. Note that these structures may be, in effect, inserted into the Message Type Dependent field of FIG. 23.

A multicast Chunk Put Proposal may provide at least the following information:
1) The Source of the Chunk Put Proposal. This may be a network address currently assigned to the port or a permanent identifier of the server independent of current network assigned addresses. (See, for example, the source addresses in the L2 through L4 headers of FIG. 22.)
2) A Proposal sequence number that will be incremented for each Chunk Put Proposal sent by a given source. As with all sequence numbers used in networking protocols, it must have sufficient span than the vast majority of sequence numbers are not currently in use. (See, for example, the "Transaction Sequence #" and "Sub-Sequence #" fields of FIG. 22.)
3) An Identifier of the target Negotiating Group. (See, for example, Target Negotiating Group in FIG. 24.)
4) An enumerator specifying the Type of Chunk Put. This enumerator is not intended to be meaningful to the transport layer, only to the storage layer. For example, with Nexenta's Cloud Copy on Write™ object storage system (which is commercially available from Nexenta Systems of Santa Clara, Calif.), the types may be Payload Chunks, Sub-manifests and Version Manifests. (See, for example, Opcode/Message Type in FIG. 23.)
5) The Content Hash ID for the chunk. (See Chunk Hash ID field in FIG. 24.)
6) If this is a Named Chunk, the Name Hash ID. (See, for example, Bucket Hash ID, Name Hash ID, and Unique Version Identifier under the Named Chunk Put Proposal Message in FIG. 24.)
7) The total length of the compressed payload that will be put. (See, for example, "Length of non-volatile content" in FIG. 24.)
8) The total length of the above content that will be put immediately using unsolicited bandwidth, typically in an optional portion in this message. (See, for example, "Length of above included in the Put Proposal message" in FIG. 24.)
9) The multicast address for a Rendezvous Group that will be used to put the payload. The members of the Rendezvous Group are not specified because they have not been selected yet. (See, for example, the "Delivery Group" in FIG. 24.)
10) The maximum desired delivery rate. This would typically be expressed as the total bandwidth required, e.g. bits or bytes per second rather than messages per second. (See, for example, the Maximum Delivery Rate in FIG. 24.)

In the typical case, where a portion of the payload will be delivered using bandwidth from a Reserved traffic class, each recipient of the Chunk Put Proposal will respond with a Chunk Put Accept.

Put Accepts

A Put Accept is preferably addressed to the Multicast Address of the Rendezvous Group. An embodiment of the present invention may allow a Put Accept to be unicast addressed to the request sender.

FIG. 25 depicts exemplary encoding structures for chunk Put Accept messages in accordance with an embodiment of the invention. (Note that a "Put Accept" message may also be referred to herein as a "Chunk Accept" message.) The exemplary encoding structure on the left shows a structure for a Put Accept message that provides a Proposed Rendezvous. The exemplary encoding structure in the middle shows a structure for a Put Accept message that indicates Content Already Stored (for systems with deduplication). The exemplary encoding structure in the middle shows a structure for a Put Accept message that indicates Not Now. Note that these structures may be, in effect, inserted into the Message Type Dependent field of FIG. 23.

A multicast chunk Put Accept message may encode the following information:

1) The identity of the Multicast Chunk Put Proposal it is responding to: the source identifier of the request and the sequence number from that request. (See, for example, the Copy of Put Proposal ID in FIG. 25.)
2) The Target Negotiating Group as specified in the original put proposal. (See, for example, the Target Negotiating Group in FIG. 25.)
3) One of the following three responses:
   a) Chunk already stored. (See, for example, the Chunk Accept Message—Content Already Stored structure in middle of FIG. 25.) In this case, redundant transmission of the chunk payload is not required.
   b) Put Proposal Not Accepted. (See, for example, the Chunk Accept Message—Not Now structure on right of FIG. 25.) In this case, the additional payload may also indicate the earliest time when this Storage Server would want to consider a retry request.
   c) Put Proposal Accepted. (See, for example, the Chunk Accept Message—Proposed Rendezvous structure on left of FIG. 25.) In this case, the additional payload may preferably indicate a time window and data rate reserved for this delivery.

The upper layer will be responsible for processing these responses to determine whether the transfer is required and if so what the membership of the Rendezvous Group should be. For example, the acceptance criteria for an "adequate" number of Accepts (such that a transfer is performed) may be that at least one of the acceptances is from one of the "designated" servers and that a total number of servers in the Rendezvous Group is equal to (or greater than) a desired replication count. The Chunk Source may then initiate a multicast Rendezvous Transfer to the Rendezvous Group at the consensus time.

Rendezvous Transfers

FIG. 26 depicts exemplary encoding structures for rendezvous transfer messages in accordance with an embodiment of the invention. The structures depict a Rendezvous Transfer message without (on the left) and with (on the right) an Arbitrary Chunk ID.

A multicast Rendezvous Transfer message may encode the following information:

1) The Rendezvous Group which may be provided in the "Target Delivery Group" field.
2) The list of Server IDs that should be in the Rendezvous Group. A recipient that is not in this list should leave the Rendezvous Group. This list may be provided in the "List of Delivery Group Members" field.
3) The Content Hash ID of the chunk being put. This may be provided in the "Content Hash ID of Chunk" field. In one implementation, the Content Hash ID may be used to identify the Chunk.
4) The Chunk ID, if different from the Content Hash ID. This may be provided in the "Arbitrary Chunk ID" field.
5) The delivery rate that is planned. A recipient that does not believe it can sustain this rate should leave the Rendezvous Group and explicitly negatively acknowledge the delivery of the chunk (i.e. explicitly indicate that the chunk was not delivered). The delivery rate may be provided in the "Delivery Rate" field.
6) A set of Authentication Tokens for this Chunk. In the context of a new Chunk Put transaction, there will be exactly one Authentication Token. Interpretation and usage of the Authentication Token is not the responsibility of the replicast transport layer. The Authentication Tokens may be provided in the "Remaining Content" field, and the length of these tokens may be provided in the "Length of Tracking Tokens" field.
7) The remaining payload that was not included as unsolicited payload in the original Chunk Put Proposal. This may be provided in the "Remaining Content" field.

Each recipient of the Rendezvous Transfer that is part of a put transaction will either acknowledge successful receipt and processing of the entire chunk with a Payload Acknowledgement (Payload ACK) message, or negatively acknowledge receipt (i.e. indicate failed reception) with a Payload Negative Acknowledgement (Payload NAK). A Payload ACK (or NAK) is also generated in response to a Put Proposal that included an entire chunk payload.

In an exemplary implementation, processing of a received chunk by the upper layer must be complete before the Payload ACK is transmitted. In addition, the received chunk must be persistently stored, or applied and the results persistently stored, before a Payload ACK is sent.

In an exemplary implementation, the Payload ACK may be sent both to the Data Source and to a multicast group of all servers that wish to track the existence of chunks mapped by a row of the Distributed Hash Allocation Table. Such a group may be a specific member of the Multicast Address Set or may be the default multicast address for the Negotiating Group.

An alternative method is to have each recipient of the Chunk Put message send just a unicast Payload ACK to the Chunk Source. The Chunk Source then prepares Relayed ACK messages summarizing one or more received Payload ACKs; these messages are sent to the appropriate multicast group.

The destination group may be the Negotiating Group itself, or it may be a companion multicast address taken from the Multicast Address Set for the Distributed Hash Allocation Table row where that member is designated for Payload ACK messages, either in general or specifically for named chunks.

Payload ACKs and NAKs

FIG. 27 depicts exemplary encoding structures for payload acknowledgement messages in accordance with an embodiment of the invention. Structures for named and unnamed Payload ACK messages are depicted on the left and right, respectively. A structure for a Payload NAK message is depicted in the middle.

The Payload ACK and NAK messages may encode the following information:

The Chunk ID that is being acknowledged. In an exemplary implementation, the Chunk ID may be provided in the "Content Hash ID" field, where the Content Hash ID is generated by applying a hash function to the content of the Chunk.

If these are implemented, the Name Hash identifier and Unique Version ID for this Chunk. The Name Hash identifier may be implemented as shown in a combination of the "Bucket ID" and "Name Hash ID" fields. The Unique Version identifier may be implemented in the "Unique Version Identifier" field.

The status: successful or not. The status may be provided in by the Opcode/Message Type shown of FIG. 23. If the status is unsuccessful, then a specific payload NAK error code may be provided. (See, for example, the Specific Payload NACK Error Code in the Payload NAK Message shown in FIG. 27.) Indicating specific reasons for a negative acknowledgement is useful for diagnostic purposes, but is not necessary for the functionality of the present invention.

When successful, the Server ID that now has this chunk stored. The Server ID may be a network address currently assigned to the port or a permanent identifier of the Server independent of current network assigned addresses. In an exemplary implementation, the source address or identifier may be provided in the Request/Notification Source header field in FIG. 22.

When the Payload ACK was only unicast to the Data Source, the Data Source must multicast a Relayed ACK to the Negotiating Group to inform the members of the group of which servers now have this chunk stored. The Data Source may aggregate multiple Payload ACKs for the same chunk into a single Relayed ACK message.

Get Requests

FIG. 28 depicts exemplary encoding structures for get request messages in accordance with an embodiment of the invention. Structures for named and unnamed Chunk Get messages are depicted on the left and right, respectively.

The multicast Chunk Get messages may encode the following information:
1) Identification of the transaction:
    a) A Source ID of the Client or its agent. This may be a network address currently assigned to the port or a permanent identifier of the Client (or its agent) independent of current network assigned addresses. In an exemplary implementation, the source address or identifier may be provided in the Request/Notification Source header field in FIG. 22.
    b) A transaction sequence number. For example, the transaction sequence number may be provided in the "Transaction Sequence #" and "Sub-Sequence #" fields of FIG. 22.
2) Identification of the chunk desired. Depending on the application layer this may take multiple forms. This could be any of the following:
    a) The exact Chunk ID of any chunk that does not have a Name Hash ID. This Chunk ID will typically have been obtained from a metadata chunk that did have a Name Hash ID. The exemplary Unnamed Chunk Get Message shows this case where the chunk is identified by the "Content Hash ID" field in FIG. 28.
    b) The exact Name Hash ID of an Object combined with an optional specification of a desired version. The exemplary Named Chunk Get Message shows this case where the chunk is identified by a combination of the "Bucket Hash ID", "Name Hash ID" and "Unique Version Identifier Range" fields in FIG. 28.
3) The Rendezvous Group for this Get Request. This corresponds to the "Delivery Group" field in FIG. 28.
4) The maximum amount of unsolicited content that may be delivered in each response. This corresponds to the "Maximum Immediate Content Size per Get" field in FIG. 28.
5) A Reception Window when the client will be ready to receive the response. This may be the same (or very similar) information as provided in the Put Accept message. This corresponds to the "Reception Window" (or "Reception Window(s)") field in FIG. 28.
6) A maximum number of auxiliary responses that may be generated for this request. Once a storage server is acknowledged as the responder for this request, it may issue Get requests for up to this many chunks referenced by the main requested chunk. For each of these allowed auxiliary responses a separate reception window may be specified. If not specified the delegated get requests will perform a put transaction to the Rendezvous Group as though it were a Negotiating Group. This corresponds to the "Maximum # of Delegated Gets" field in FIG. 28.
7) Optional additional reception windows that can be used for auxiliary responses.

In the typical case there will be no Additional Target Requests generated. We will therefore first discuss the multicast Get Request without any having been generated, and leave for later the discussion of the case where additional targets are requested.

For a Get Request which specifies delivery immediately or relatively promptly (as defined by system-wide configuration), each Storage Server in the Negotiating Group possessing the chunk requested will attempt to respond to the Get Request as soon as its internal work queues allows it to. However, in accordance with an embodiment of the invention, only the first responding Storage Server will actually completely respond and deliver the requested chunk. As disclosed herein, the mechanisms to ensure that only one response is generated for each Get Request are dependent on the protocol used to implement this collaboration.

Note that an embodiment of the present invention may also define a Unicast Get Request, in addition to a multicast Get Request. The Unicast Get Request would be a Get Request sent to a specific storage server. It is anticipated that such a capability may be largely used for diagnostic purposes, as that there would be no end-user advantage to requesting a chunk be delivered by a specific storage server.

Each designated storage server will attempt to respond to a multicast Get Request with a Get Response message. The Get Responses will be collected either by the client or by the Negotiating Group, resulting in a single source being selected.

Get Responses

FIG. 29 depicts exemplary encoding structures for get response messages in accordance with an embodiment of the invention. Structures for named and unnamed Get Response messages are depicted on the left and right, respectively.

The Get Response messages may encode the following information:
1) A Timestamp indicative of when the response would occur. See "Timestamp when response would occur" field in FIG. 29.
2) The Source ID and IP address of the responding server. The Source ID may be provided in the "ID of storage server" field in FIG. 29. The IP address of the responding server may be provided in the IP header of the packet.
3) Identification of the Multicast Get Request that is being responded to, and which portion of the response this is: the primary content; or the ordinal offset of which referenced chunk is being transferred. The Get Request may be provided in the "Copy of Get Request ID" field in FIG. 29.
4) The Rendezvous Group ID that will be used (which is repeated from the Get request). This may be provided in the "Delivery Group" field in FIG. 29.
5) The rate at which the chunk will be transmitted. This may be provided in the "Delivery Rate" field in FIG. 29.
6) The Content Hash ID of the chunk it will deliver, and if this is a named Chunk, the Name Hash ID and unique version identifier of the chunk. The Content Hash ID may be provided in the "Content Hash ID" field in FIG. 29. The Name Hash ID and unique version identifier may provided in the "Bucket ID," "Name Hash ID" and "Unique Version ID" fields for the Named Chunk Get Response Message in FIG. 29.

7) If the requested chunk is too large, an error message may indicate this problem and specify the actual metadata and payload lengths (see below description of an error Get Response message). Otherwise, any immediate portion of the requested content and the length of the immediate portion may be provided in the "Immediate Content" and "Immediate Content Length" fields in FIG. 29. Note that the entire content requested may consist of: a) the metadata and integrity checking data; and b) the payload. The "Content Length" field in FIG. 29 may indicate the combined length of the entire content requested.

In some embodiments, a storage server may respond with a Content Not Immediately Available message that indicates that it cannot return the content requested until at least a specified time. This would typically be due to migration of the requested chunk to offline storage. Issuing such a response may indicate that the process of moving the requested chunk back to online status has been initiated. However, the request should be re-issued at some time after the time indicated.

In an exemplary implementation, each respondent only sends the first datagram in the response. This response is sent using unsolicited bandwidth. The balance will only be transferred once the specific server has been selected to perform the rendezvous transfer using reserved bandwidth.

Unless the entire response fits in a single datagram, a single responder must be selected to complete the transfer. This may be the primary member of the Negotiating Group offering to deliver the content. This selection is multicast as a Multicast Get Accept message to the Negotiating Group, and the selected server will then begin the transfer. The selected rendezvous transfer is then initiated using reserved bandwidth by the selected storage server to the Rendezvous Group specified in the original Multicast Get Request.

Error Get Response Message

FIG. 30 depicts exemplary encoding structures for an error Get Response message in accordance with an embodiment of the invention. As shown in FIG. 30, an "Error Code for Chunk Get Response Message" may be provided in this error message.

Volunteer Servers

Volunteer Target Servers may issue Additional Target Requests to the Negotiating Group. These messages request that the Volunteer Target Servers be included in the Rendezvous Group as well. When a multicast protocol is used with IGMP (Internet Group Management Protocol) control, this is actually a notification that the additional target will have already joined the Rendezvous Group by the rendezvous time. The additional target merely has to attempt collection of the rendezvous transfer, and saving the chunk if it is received successfully with the payload matching the signature provided. With a multicast protocol not controlled by IGMP, the server selected to perform the Rendezvous Transfer adds the server to the Rendezvous Group as provided by that alternate protocol. Again, the target merely has to collect the chunk on that multicast group, and save the chunk locally if successful. When a unicast chain simulates multicast, the first responding storage server must add the server to the list. This will result in the same chained delivery as described for the put algorithm, except that no Payload ACK message is required.

Expedited Limited Joins

The present disclosure describes a method where multiple servers join a Rendezvous Group and then depart it for each put transaction. Additional targets also join and then depart a Rendezvous Group for each delivery.

The set of servers that is allowed to join these groups dynamically is preferably restricted to those that already belong to an enabling cluster-wide group. This allows embodiments to bypass potentially excessive overhead associated with normal management plane operations.

When IGMP controls group membership, then during a put transaction an individual storage server will:
7) Join the group after sending a Chunk Put Accept.
8) Depart the group when the first of the following events occur:
  a) It sends a Payload Ack for this transaction. Note that any storage server has the option to conclude that a transfer will not complete successfully and send a Payload NAK without waiting for the transfer to complete. Detection of gaps in the sequence of received datagrams is one reason for reaching this conclusion.
  b) It receives a Rendezvous Transfer which does not list the storage server as a recipient.
  c) It receiving a Rendezvous Transfer which specifies a transfer rate in excess of what the storage server estimates it will be able to sustain.
  d) It receives a message from that sender that explicitly aborts the Rendezvous Transfer.

Mechanisms for Reliable Multicast Payload Delivery

Although a multicast protocol is typically perceived as an unreliable protocol, the number of congestion drops or mis-delivered packets on most wired LANs is extremely small. Since multicasts still have a non-zero probability of not reaching all of the target servers, the Replicast transport protocol provides mechanisms that add reliability to an inherently unreliable protocol, but without the amount of overhead of "reliable" transport mechanisms, such as TCP/IP. These reliability mechanisms are described below under: 1) Chunk Source Responsibilities; 2) Distributed, Reliable Chunk Replication; 3) Requirement for Keep-Alive Service; 4) Lower Layer Transport Protocol; 5) Contention for Unsolicited Bandwidth; 6) Storage Server Queues; and 7) Detection of Non-Compliant Core Network.

1) Chunk Source Responsibilities

One aspect of the "reliability" of the presently-disclosed Replicast transport is that it does not depend on the original chunk source to ensure that all of the copies are made. The chunk source is only responsible for ensuring that the minimum set of replicas are created (with at least one copy on a designated server) before the transaction can be declared complete. Once those copies are guaranteed, then control is returned to the user application that created the object. More replicas will be created, as needed, automatically. Replication of chunks in accordance with the presently-disclosed Replicast transport is an ongoing process that does not necessarily have an end point.

2) Distributed, Reliable Chunk Replication

Now we describe a distributed mechanism for reliability. In an exemplary implementation, each of the Chunk copies keeps a list of the designated destinations for the chunks. (Note that the original source server may be one of these chunk copies that is not a designated copy.) The size of this list is controlled by the replication count for the object, which can also vary by object. If any of the destinations does not yet have a copy of the chunk, then the server holding the chunk wants to replicate the chunk at one or more of the destinations. This distributed replication is an ongoing responsibility of each chunk server. The replication retries are a continuous background task for the storage servers. However, to avoid network congestion, each of the retries may be done on a random interval basis, analogous to the CSMACD collision detection and retry mechanism. In this manner, the replication task may be spread across many different servers and not left to a single source server.

This proclivity to replicate exists for each storage server regardless of its retention of a list of known other replicas. Retaining such data enables optimization of the replication process, but is not necessary for its correctness.

This same mechanism for performing replication is used whenever servers join or leave the ring of servers. Each chunk server is continuously updating the list of servers that have copies of a chunk. If a ring membership change occurs, caused by a failed server or a partitioned network, there will typically be insufficient replicas of chunks previously assigned to the now missing servers. It will then be the responsibility of all chunk owners to attempt to replicate these chunks. It is not necessary for every server to have an accurate count of the number of replicas. If a given server's estimation is low it will attempt to replicate the chunk, and discover that there are sufficient replicas. Some packets are exchanged, but there is no unnecessary rendezvous transfer.

In preferred implementations, the multicast addressing is used for payload delivery as well as for "unsolicited commands" that carry a payload, rather than negotiating for a time to send the payload. Preferred implementations may ensure that the network switch has been provisioned so that the bandwidth allocated for storage and "unsolicited" traffic is non-blocking up to a pre-determined limit and that the network will not experience congestion as long a s the process of reserving payload transmission does not exceed that threshold. This helps to ensure that the "unreliable" multicast is actually quite reliable since it does not run the risk of data loss due to network congestion.

While all commands and payload transfers may be retried, they can avoid the need to retransmit by: protecting the storage traffic from general purpose traffic not complying with these special rules; limiting the bandwidth for unsolicited transmissions to a provisioned rate; limiting the bandwidth for reserved transmissions to a provisioned rate; and only utilizing the reserved bandwidth in accordance with rendezvous agreements negotiated using unsolicited transmissions.

3) Requirement for Keep-Alive Service

The present disclosure generally assumes the deployment of a keep-alive service on the same set of servers. The keep-alive service will promptly detect the departure or loss of contact with any member and have provision for the authenticated joining/re-joining of members. Further, it is assumed that the keep-alive service will determine the round-trip time for each of the storage servers.

4) Lower Layer Transport Protocol

The present disclosure generally assumes a lower layer transport service to provide unreliable datagram service with multicast or unicast addressing. There are also specific congestion control assumptions made about the lower layer protocols. The Replicast transport protocol will function correctly even if these services are not provided, but may exhibit undesirable performance characteristics. For example, the presently-disclosed implementation generally assumes that delivery of unreliable datagrams will be effectively drop free if the nodes comply with the provisioned bandwidth limits. The throughput could fall below what would be achieved with conventional solutions if this is not true, but errors will still be detected and properly dealt with.

Specifically the lower layer transport is expected to:

a) Utilize a protected L2 capacity, such as would be provided by the IEEE 802.1 Enhanced Transmission Service (ETS). Specifically, insertion of L2 frames for this class of service must not be allowed from unauthorized sources. L2 frames that are compliant with the negotiated rate for this traffic class must not be at risk of being dropped for lack of network buffering because of L2 frames submitted for another traffic class.

b) Send messages that are each comprised of multiple unreliable datagrams to a small defined group of target addresses where each frame within the message is labeled as to which message it is part of and which portion of the message the frame encodes. Placement of payload from each unreliable datagram should be possible even when received out of order.

c) Be able to define a multicast Rendezvous Group as a subset of an administratively configured group. Methods for implementing multicast addressing include:

i) Native L2 or L3 multicast addressing capabilities. Both IP and InfiniBand support multicast addressing.

ii) Broadcasting messages on a virtual network (VLAN, VXLAN, etc.) where only the members of the multicast group have access to the virtual network.

iii) Use of a custom L4 protocol.

d) Be able to define a multicast Rendezvous Group as a subset of another group created by this transport service.

e) Additionally, take other actions to prevent drop of L2 frames due to temporary network congestion, such as IEEE 802.1 Priority Flow Control (also known as "Per Priority Pause").

Additionally, the receiving stack should be able to discard packets that are duplicates of content already provided to the storage layer.

On IP networks, both the UDP and SCTP transport layers can be used. UDP is the preferred embodiment because it is simpler. SCTP adds multi-homing and multi-pathing, but does so at the expense of needing to maintain reliable associations between SCTP endpoints. On InfiniBand networks, the Unreliable Datagram (UD) transport would be the preferred implementation.

The transport layer is also traditionally responsible for ensuring error free delivery. The presently-disclosed technique assigns that responsibility to the storage layer, which validates the Content Hash ID on all transfers.

One feature of the disclosed transport layer is to only enable allowed traffic. L2 frames for the storage traffic class may only be accepted from authorized end stations. To preserve network security, data sources may only create multicast groups whose membership is a subset of a pre-existing group. Network administrators frequently must support multiple different groups of users, frequently called tenants, on a single network. The service providers must be able to ensure each tenant that there their traffic will not be delivered to ports controlled by other tenants. Network administrators typically need to configure port groups so that network traffic for different tenants cannot mix without going through a router that enforces filtering rules.

There are three approaches to providing the desired transport services:

a) Use existing multicast protocols such as IP multicasting and the Internet Group Management Protocol (IGMP). This approach has the benefit of being standards based, but may require an implementation to impose a minimum delay before payload transmission to allow for the latency required by the IGMP protocol.

b) Use a custom control plane that is optimized to establish existing data-plane control data to use multicast addressing and/or VLANs to achieve the desired group forwarding.

c) Use a custom L3 routing protocol to establish the desired destinations for each packet. The custom L3 routing would dictate which L3 routers each packet was to be delivered to, and the full set of L2 destinations that each router must deliver the packet to.

With the standard IGMP approach, each host may join or leave any multicast group, identified by a multicast IP address. IP datagrams sent to a multicast IP address will be best effort delivered to all members of the group.

The IGMP method requires each target to control its membership in each group. The other solutions involve customizing other methods already supported by network elements for delivering frames to a controlled set of destination links. For all of these methods, the sender must first invoke a designated module to reconfigure the switch forwarding tables as required. Methods for implementing this include, but are not limited to, OpenFlow modules and vendor-specific Switch control plane plugins.

Alternatively, a custom control plane can directly edit existing data-plane forwarding control data to effectively emulate multicast delivery with sender or push based control. This solution works when the forwarding elements have updatable behavior. This can include a custom control-plane module, such as defined by Arista Networks of Santa Clara, Calif. for their switches, or by the Open source OpenFlow standard.

The first custom control plane method is to define a Port Group on an actual or virtual network switch. Any broadcast message sent on one of those virtual ports will be delivered to all other virtual ports of the group. Port Groups are typically limited to ports on a single switch. When the ports are on multiple switches, some form of packet or frame labeling is typically required.

One method of doing so is the 802.1 Virtual LAN (VLAN). Ethernet frames tagged with a VLAN are only forwarded to ports belonging to that VLAN and to switches as needed to reach those ports. Any broadcast message sent from one of the virtual ports will be delivered to all other virtual ports in the VLAN.

There are other protocols which that provide the same functionality as a VLAN, but without the limitation on the number of VLANs. One example of such as protocol is the VXLAN (Virtual eXtensible Local Area Network) protocol.

The last method is to define a custom L3 header which that establishes both the set of L3 routers that this packet must be delivered to, and then the L2 destinations at each of those destinations.

5) Contention for Unsolicited Bandwidth

The bandwidth reserved for unsolicited transmissions cannot be guaranteed to be adequate for a spike in demand. With the reserved bandwidth there will be at most one participant attempting to transmit to any given target at any given time. However, the capacity reserved for unsolicited transmissions is based on an estimate, not on reservations. Estimates can be low. Therefore, collision drops are possible.

The L2 network may be configured to use technique such as Priority Flow Control (PFC) to minimize drops caused by very short over-demand on the unsolicited capacity. Most L2 networks will allow traffic to exceed the reserved rate for unsolicited traffic provided that it does not require dropping frames from non-storage traffic. These techniques can make rare drops caused by over-subscribing of the unsolicited capacity even more rare, but they cannot totally eliminate the risk.

Therefore, all unsolicited requests are acknowledged. An unanswered request is retransmitted. Because each unsolicited request is uniquely identified by its source and a sequence number from that source, all recipients of a retransmitted request can recognize it as one they have previously processed (which can happen when it was their response that was lost, rather than the original request). Redundant requests can be processed by replaying responses from a response cache.

Even with the potential need to retransmit requests and responses, the presently-disclosed transport protocol can outperform conventional solutions using TCP/IP or other reliable point-to-point transports. A spike in the number of requests would have also produced a spike in the number of connection requests in a TCP/IP solution. The TCP/IP SYN requests (to establish connections) would have failed just as often, and needed to be retried as well. While the retries would have been from the kernel, rather than the application layer, there would still need to be more round-trips with a reliable transport.

With the presently-disclosed transport protocol, exchange of unsolicited messages requires two messages. With reliable point-to-point transports there would need to be three or four packets required to establish the reliable connection, then the exchange of application layer messages, following by an eventual TCP tear-down of the connection.

The network should be configured so that the buffering available for unsolicited requests in both the forwarding elements and the receiving nodes is sufficient for all but the most extreme peaks of traffic. Well-known conventional solutions can make these exchanges just as reliable as reliable transports with less demand on network resources.

The present disclosure also relies upon the Replicast transport layer pacing its upper layer in some manner that limits the aggregate number of unsolicited datagrams to comply with the available buffering. The most minimalistic implementation of this is simply applying an Aloha-style random back-off for retransmission of unacknowledged request datagrams. When network congestion is high more requests will be unacknowledged, which is sufficient information to spread the retransmission over a wider time span. This effectively lowers the aggregate transmission rate.

However, it should be understood that the method used to pace the upper layer is not constrained to a conventional delay on the transmission of an already submitted datagram. Embodiments of the present invention may use a variety of techniques to refine the estimation of contention for the unsolicited bandwidth. Furthermore, this pacing information may be simply shared with the upper layer so that the upper layer may select what datagrams it wants to submit. There is no constraint to merely time the delivery of already submitted datagrams.

6) Storage Server Queues

In an exemplary implementation, the following types of storage traffic may be treated differently:

a) Messages carrying Commands and Responses would use an Unsolicited traffic class and be queued to a short command/response queue on each Storage Server. Obtaining an Ethernet traffic classes for both Unsolicited and Solicited storage traffic will not always be feasible. In many embodiments, a single Ethernet traffic class will be used combined with assigning UDP port numbers to either Unsolicited or Solicited inbound queues.

b) Messages carrying Solicited Payload could use a Solicited traffic class and be steered to a payload queue on each Storage Server, or be differentiated solely by the destination UDP port number.

7) Detection of Non-Compliant Core Network

The presently-disclosed transport protocol relies on the core network to deliver multicast packets only to the edge links identified by the multicast group as currently tailored. An implementation may monitor this compliance, preferably independently but possibly as part of processing incoming Ethernet frames. Excessive delivery, such as would be caused by inadequate forwarding tables resulting in excessive flooding of Ethernet frames out of all non-originating ports, indicates that use of the presently-disclosed protocol should be suspended with conventional TCP-like protocols being used instead.

Alternative Implementations and Special Notes

This section describes alternative implementations and other aspects of the presently-disclosed transport protocol.

1) Variations in Participation by Negotiating Group Members

The Negotiating Group identifies the set of storage servers that should receive get or put requests for those chunks. However, not all members of this group need necessarily be equal.

For example, when IGMP is used to control multicast groups, storage servers that have access to a parent VLAN may be allowed to join the multicast group and thereby become an "associate" member of that group. These "associate" members will receive Put Proposals and Get Requests, but they are not relied upon to provide long-term persistent storage of chunks. They are not on the designated list for the group, and, therefore, will not count towards certain minimal retention requirements.

With sender-controlled memberships, these additional members would be listed as special members of the Negotiating Group. This will require representation in whatever table or datastore used by the upper layers to selected Negotiating Groups.

2) Simulated Multicast Rendezvous

Alternative embodiments may implement a rendezvous transfer using chained point-to-point transfers. These transfers would still be done with a nominally unreliable transport, such as UDP/IP or InfiniBand Unreliable Datagrams (UD). To implement a unicast chain delivery, each storage server will do the following steps:

a) Initiate a unicast point-to-point transfer (typically UDP/IP) to a port or service indicator on the Client/Agent. The client, or agent, will explicitly send a delivery abort response back to the sender for all but one of the transfers. Delivery of the chunk will be discontinued when an abort is received. Implementations may choose to slightly delay the second frame of a response to allow any abort message to be received.

b) Otherwise, deliver the chunk to the Client/Agent over the point-to-point transfer with a Target list consisting solely of the client/agent.

3) Delegated Get Request

In one embodiment of the present invention, the process of getting an object is further optimized for distributed object storage systems which store metadata for a version of an object separately from the payload. The root chunk of an object (also called the "version manifest" or metadata) contains references to the chunks/blocks.

In a default embodiment, the issuer of a Get Request would obtain the version manifest chunk, and then issue Get Requests for the referenced payload chunks. This pattern is used in both pNFS (parallel NFS) and the Hadoop Distributed File System (HDFS).

In an optimized embodiment, the storage server delivering the version manifest chunk may originate Get Requests for a specific number of the initial payload chunks referenced by the version manifest. These requests specify the originator of the Get Request as the target by using the same Rendezvous Group.

Each L5 message for these auxiliary deliveries specifies a sub-sequence number that allows the Chunk Sink(s) to determine which payload chunk is being delivered. The original Get Request specifies the maximum number of auxiliary deliveries it will accept and a delivery window for each.

4) Alternative Delivery Patterns

There are several patterns detailed in this disclosure where the same information is relayed to bother the Rendezvous Group and the Negotiating Group. It should be understood that in all cases any of the following implementations are equally valid:

1) The information is sent to the Rendezvous Group. The transaction originator then relays this information to the Negotiating Group either as an extra message, which may consolidate multiple responses, or by including this information in the next message it would send to the same Negotiating Group.
2) The information is sent to the Negotiating Group, which then determines what the consensus is before sending a single response to the Rendezvous Group.
3) The information is sent to both groups in parallel. This option is particularly attractive with a custom L3 protocol.
4) The information is sent to both groups in parallel under specific scenarios where the implementation has determined that the improved latency offered by dual forwarding this specific information justifies the additional network traffic. Such determinations may be dependent on implementation or even site-specific factors.

5) Alternative Indefinite Reservations

In an alternative embodiment of the present invention, it may be advantageous to recognize when the storage cluster consists of a relatively small number of storage servers and a similarly small number of clients.

When this condition is recognized it may be advantageous for storage servers to grant permanent bandwidth reservations to the clients, and credits for creation of chunks up to a certain aggregate size.

When such a reservation is granted, the clients would be able to dispense with making a Put Proposal, simply assume the Rendezvous Group was identical to the Negotiating Group and immediately put the chunk using the unsolicited protocol.

When the number of storage servers increased the system would shift to normal operations and require the handshake to reserve protocol.

Upper Layer Decision Making

The transport protocol disclosed includes decision making performed by the upper layer. This is the layer above the transport layer. In one embodiment, the upper layer is a storage layer.

For get transactions, the upper layer (of the client in a client consensus embodiment, or of the servers in the negotiating group in a cluster consensus embodiment) is responsible for evaluating all Get Responses to determine which offering server will be the source of the transfer, and the time of the transfer (within the range offered). The source and time of the transfer may then be provided in a Get Accept message. In one simple embodiment, the transfer source may be selected from the offering servers by a randomized selection technique. In another embodiment, the transfer source may be selected from the offering servers by a procedure which takes into account earliest time for transfer indications obtained via the Get Responses and may also take into account the location of the offering servers within the network topology. In one example, offering servers closer to the requesting client in the network topology may be favorably weighted.

For put transactions, the upper layer of the servers in the negotiating group is responsible for evaluating all Put Proposals to determine whether a rendezvous transfer is needed, and if so, at what time and at what rate. The time and rate of the transfer, if needed, may then be provided in a Rendezvous Proposal message to the initiating client (in the client consensus embodiment) or to the other servers in the negotiating group (in the cluster consensus embodiment).

The upper layer is also responsible for determining when each server will offer to do a receive or transmit. This determination may start with the best estimate that the server can make as to the earliest time when the server can be confident that the transfer can occur. Determining the best estimate for the earliest time may involve scheduling of network bandwidth on the local links for the server (to find the earliest time when the link will be free for reception or transmission of the chunk) and of its input/output to persistent storage (since there is little benefit of receiving data that cannot be written to disk until much later because other writes are already committed and/or because of required head movement for traditional hard disk drives).

The algorithm used to make these scheduling estimates may be dependent on the relative speeds of the network and storage devices, and on the resources available to make the estimations. Embodiments of the present invention do not necessarily require any specific algorithm be implemented, although it is preferable that the estimation be as good as possible with the available resources.

A comparison can be made with a free market system. Approaching an optimum balancing of supply versus demand is not dependent on every participant analyzing the market perfectly, just that generally participants are trying to optimize their decisions.

Example Computer Apparatus

Figure 31:
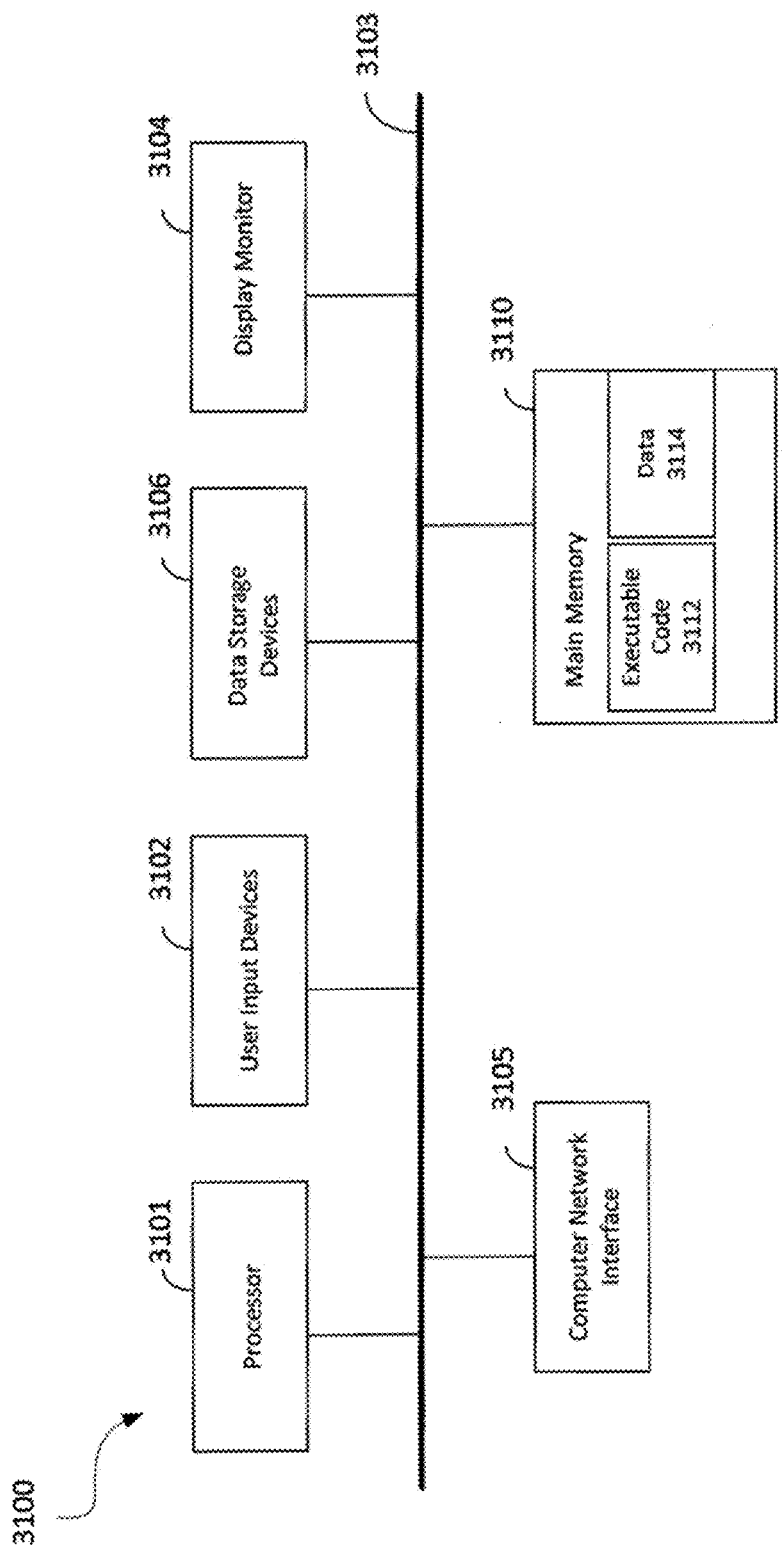
FIG. 31 depicts a simplified example of a computer apparatus which may be configured as a client or a server in the system in accordance with an embodiment of the invention.

FIG. 31 depicts a simplified example of a computer apparatus 3100 which may be configured as a client or a server in the system in accordance with an embodiment of the invention. This figure shows just one simplified example of such a computer. Many other types of computers may also be employed, such as multi-processor computers.

As shown, the computer apparatus 3100 may include a processor 3101, such as those from the Intel Corporation of Santa Clara, Calif., for example. The computer apparatus 3100 may have one or more buses 3103 communicatively interconnecting its various components. The computer apparatus 3100 may include one or more user input devices 3102 (e.g., keyboard, mouse, etc.), a display monitor 3104 (e.g., liquid crystal display, flat panel monitor, etc.), a computer network interface 3105 (e.g., network adapter, modem), and a data storage system that may include one or more data storage devices 3106 which may store data on a hard drive, semiconductor-based memory, optical disk, or other tangible non-transitory computer-readable storage media 3107, and a main memory 3110 which may be implemented using random access memory, for example.

In the example shown in this figure, the main memory 3110 includes instruction code 3112 and data 3114. The instruction code 3112 may comprise computer-readable program code (i.e., software) components which may be loaded from the tangible non-transitory computer-readable medium 3107 of the data storage device 3106 to the main memory 3110 for execution by the processor 3101. In particular, the instruction code 3112 may be programmed to cause the computer apparatus 3100 to perform the methods described herein.

Summary of Features and Advantages of Multicast Transport

The presently-disclosed transport protocol allows the set of storage servers providing persistent storage for a chunk to be selected from those that can store the chunk most promptly, rather than arbitrarily selecting a set of storage servers without regard for network traffic or server workloads.

In conventional solutions, selecting storage servers based upon their current loads was limited to systems with a centralized metadata system, such as HDFS and pNFS. Other previous solutions use consistent hashing algorithms to eliminate the central bottleneck, but are then incapable of considering dynamic factors such as queue depth.

The presently-disclosed transport protocol allows the Chunk Source to select the optimum set of storage servers to take initial delivery of a chunk from amongst the Chunk Put Accept responses collected to a multicast Put Proposal. Centralized metadata solutions can only perform this optimization to the extent that the central metadata server is aware of the resource status of every storage server in the cluster. Existing consistent hash algorithms can only adjust boundaries for longer term changes in the distribution. Any change in the distribution of chunks requires moving previously committed chunks. Only major changes in the distribution can justify the migration costs of adjusting the distribution.

The presently-disclosed transport protocol allows the initial source of a chunk to select the initial Rendezvous Group. In selecting the initial Rendezvous Group, the source server has many options to influence the members of the group. Some of the considerations may include, spreading replicas across failure domains, selecting destinations that have the largest amount of free space, destinations that have a best rating (combination of CPU power and memory space available, e.g. Windows Experience Index) as well as other factors that can vary dynamically, including the speed, number and/or cost of the link(s) between the source and the sink.

The presently-disclosed transport protocol also allows storage servers with excess capacity and currently low work queues to volunteer to provide additional replicas of chunks. In fact, many storage systems have the notion of "hot stand-by" drives that remain powered up, but idle, to step in when an existing drive fails. With an exemplary implementation of the present invention, these hot stand-by drives can be used to perform a performance enhancing "volunteer" duty to hold volatile extra copies of objects. Clients can find these additional replicas using the Negotiating Group. The Negotiating Group also enables collaboration within the group can be found by clients seeking those chunks and/or when replication of those chunks is required due to the loss of an existing storage server (or the additional of a new storage server).

The presently-disclosed transport protocol also allows for dynamic adjustment of a Distributed Hash Allocation Table to dynamically load-balance assignment of responsibilities among the storage servers. The present disclosure also allows for alternate strategies, such as holding new servers in reserve to replace failed or to offload overloaded servers. Prior solutions could only provide this type of flexible resource assignment by centralizing the function of the metadata server.

The presently-disclosed transport protocol also provides for improved utilization of network bandwidth and buffering capacities. Bandwidth capacities may be quoted for network elements as though they were reserved. However, this is not how network elements actually operate. Buffers are not pre-enumerated for different classes of service. They come from a common pool. Stating that the network element has a queue for up to 40 Ethernet frames in Class X does not mean that there are 40 buffers pre-allocated for that purpose. Rather, it means that after 40 frames are queued for Class X, further frames for Class X may or will be dropped, and that no frames for a different Class that is below its quota will be dropped because an excessive number of frames for Class X were queued.

This can be thought of as a reservoir with controlled ingress and egress rates. As an analogy, it may be known that, in aggregate, 30% of the water in the reservoir came from river W, but that does not mean that it is easy to find the specific drops in the reservoir.

With an exemplary implementation of the presently-disclosed transport protocol, the time that copies of a given chunk will be in network element buffers is greatly reduced. With unicast protocols, a buffer will be required for the reception time, queued time and transmit time for each of the three copies. In contrast, with the presently-disclosed protocol, a single buffer will only be held for the reception time, the longest queue time of the three copies, and the transmit time. While this will be more than one-third of the time that buffers will be held for the unicast protocols, it is still a considerable improvement with a replication count of three. Higher replication counts produce even more dramatic improvements.

Even if there are no changes in the class of service traffic shaping for any of the Ethernet priorities, this now unused buffer capacity can enable more Unsolicited and more non-storage packets to be successfully delivered over the same local area network than could have been delivered had a unicast delivery strategy been used. Less buffering also means prompt transmission, which will improve average delivery times.

In summary, the presently-disclosed transport protocol provides for effectively reliable delivery of multicast chunks (and associated tracking data) using unreliable datagrams. It does this by effectively eliminating the risk of congestion-based drops. It extends enhanced L2 techniques, such as IEEE 802.1 DCB (DataCenter Bridging) protocols, by dynamically allocating edge bandwidth between unsolicited and solicited transfers. Each transfer is paced so as to avoid sustained over-subscription of network capacity, which the L2 techniques such as DCB cannot solve.

II. Scalable Object Storage Using Multicast Transport

In accordance with an embodiment of the invention, an object storage system and method uses multicast messaging to perform replication of chunks that encode object metadata and data within distributed object storage systems by using multicast messaging to notify assigned servers and distribute chunk copies for storage and replication. Reliability may be advantageously achieved by collaboration between the presently-disclosed object storage layer and the multicast messaging layer described in detail above.

Metadata and data are frequently handled differently in conventional solutions, but there are still fundamental similarities in the handling of metadata and data. A preferred embodiment of the presently-disclosed object storage layer handles metadata and data in a unified manner. However, uniform handling is not a necessity for the present invention. In this disclosure, the term "chunk" can refer to any subset of the metadata or data for a version of an object, without regard to how uniform or divergent the handling of metadata is from data in a specific storage system.

Multicast transmission, which performs the sending of data once to be received by multiple receivers, is traditionally viewed as being inherently unreliable. The presently-disclosed object storage layer provides effective reliability in collaboration with a transport layer on top of conventional unreliable multicast messaging. This collaboration fulfills the classic role of the transport layer. This collaboration enables avoidance and/or recovery from congestion drops in the network and also provides for recovery from non-congestion drops as well.

Conventional multicast transmission is deployed where there can be a very large number of recipients, making normal flow or congestion control unworkable as a solution. In contrast, an embodiment of the presently-disclosed object storage system anticipates using a small number of recipients (such as, for example, less than one hundred recipients) so that flow control is manageable. An additional aspect of the presently-disclosed object storage system is that due to the redundancy of chunk replicas, the system is safe when a minimum number of copies have been made, and the storage system can be tolerant of jittered delivery.

The presently-disclosed object storage system uses multicast addressing to resolve issues such as assigning which storage servers will hold which chunks, and then performs a negotiation to select a rendezvous time window for a subset of the assigned servers. Multicast messaging is then used to enable efficient, reliable and eventually consistent distribution of chunks.

Layering

The presently-disclosed object storage system is a distributed object storage system that relies on specific multicast messaging capabilities being provided from a transport layer. However, the separation between the transport layer and the storage layer is not conventional.

These two layers occupy a layer above the conventional transport layer ("L4") and below the session layer. Other protocol suites occupying this layer have been referred to as "L5" protocols, even though strictly speaking they are below the Session Layer (which is the correct definition of Layer 5). The primary examples of "L5" protocol suites include iSCSI and RDMA over IP (iWARP).

The presently-disclosed storage layer relies on a transport layer at that same layer. Together, the presently-disclosed storage layer and its supporting transport layer may be referred to as "Replicast". The assignment of responsibilities between the presently-disclosed storage layer and its supporting transport layer is itemized in Table 1 under the description of the scalable transport.

Distributed Object Storage System that Scales Out

The presently-disclosed object storage system provides a method for storing and retrieving chunks encoding object metadata and/or object payload in a distributed object storage system.

Conventional object storage systems rely upon point-to-point connections for all chunk transfers (ingest, replication or retrieval). In contrast, the presently-disclosed object storage system provides effectively reliable access to stored objects built upon unreliable multicast datagrams. By making multicast effectively reliable, it becomes suitable for robust ingest, replication and retrieval of data that is organized into chunks.

Multicast collaboration allows dynamic collaboration in determining which storage servers are storing specific chunks without requiring central or hierarchical control of metadata. Prior object storage systems have chosen between effectively centralized control of location assignment and distributed hash algorithms. However, centralized control of location assignment creates processing bottlenecks that impair scalability of the object storage system, and conventional distributed hash algorithms, while scalable, cannot distribute chunks based on dynamic factors, such as storage server capacity, work queue depths or available network bandwidth.

In contrast, the presently-disclosed object storage system provides distributed control of location selection in a manner that accommodates dynamic loading of servers when making those decisions. This enables the optimization of allocation across storage servers for both storage capacity and dynamic load balancing of the depth of work queues. Hence, the total capacity of the storage cluster, both in terms of TBs (terabytes) of storage and IOPs (input/output operations), can be utilized in an optimized manner even when the cluster has scaled beyond the control of a single metadata server.

Stateless Retrieval

The same Negotiating Group also enables retrieval of chunks without prior knowledge of prior put or replication transactions. Retaining knowledge of prior put or replication transactions in a reliable manner would require centralized metadata. Instead, a get request is multicast to the Negotiating Group specifying a multicast Rendezvous Group that initially only includes the requesting node as the target of the requested chunk (or chunks for certain compound get transactions, to be described). The only server that must track that it has a specific chunk is the server which holds the chunk.

The multicast messages used to respond to a get request may be very similar to those used to put or replicate chunks. They also allow for rapidly pruning the responses from all but the earliest responder to any multicast get request.

The presently-disclosed object storage layer also enables piggy-backing the creation of additional replicas on any get request. Additional targets can be added to the Rendezvous Group and thereby receive the same content that was retrieved for the get requester.

Distributed Editing of the Hash Allocation Table

Multicasting also enables distributed editing of the shared Hash Allocation Table. This enables more flexible tuning of the mapping of Chunk Hash ID to Negotiating Groups than a conventional distributed hashing scheme would allow.

Some of the strategies enabled in preferred embodiments include:

Having new storage servers wait to assign themselves ranges of Chunk Hash IDs based upon failure of other storage servers or detecting an over-loaded storage server.

Failing over shared storage devices from one storage server to another storage server upon failure of the first storage server.

The above techniques enable specific optimization techniques for object-oriented storage systems.

The above techniques may be optimized to provide improved latency when fetching an object stored as a manifest chunk which references multiple payload chunks where the processing of the manifest get issues the first several chunk get requests directly, specifying the Rendezvous Group of the original request. This eliminates the turn-around time required for a client issuing the get for the manifest chunk to issue the get for the referenced payload chunks itself (or from a broker acting on behalf of the client).

Nodes and Network Elements of Object Storage System

The presently-disclosed solution may be implemented using a system comprised of:

1) A plurality of nodes that store and retrieve chunks. Some nodes act strictly as clients, and only accept chunks for the purpose of delivering them to the end client. A subset of the nodes must be willing to act as Storage Servers to provide persistent storage for client nodes.
2) A plurality of network elements connecting the nodes. The presently-disclosed solution may rely on existing standard protocols and use them to provide enhanced reliability without requiring changes to the network stacks of any of the network elements. The round trip times within this network may be relatively short and fairly uniform.

The specific congestion control protocol specified herein requires each node to take responsibility for managing bandwidth reserved for bulk payload delivery to that node.

Methods Provided by the Object Storage System

The presently-disclosed object storage system provides: A) methods for distributing and retrieving chunks using multicast addressing; B) methods for reliable and optimal multicast transmission of chunks by negotiating rendezvous to reserve a Rendezvous Group for a specific transmission during a specific time window; and C) methods for maintaining a shared and distributed Hash Allocation Table without central bottlenecks that could become single points of failure.

A) Methods of Distributing and Retrieving Chunks

The presently-disclosed solution creates a multicast group, named the Negotiating Group, to control both distribution (put) and retrieval (get) of chunks.

Messages may be addressed to either Negotiating Groups and/or to Rendezvous Groups. A Rendezvous Group may be a subset of a Negotiating Group for a put transaction, or a union of the initiating client and a subset of the Negotiating Group for a get transaction. Specifically, the presently-disclosed solution discloses the use of a specialized form of Distributed Hash Table that is a shared and distributed Hash Allocation Table to locate or retrieve the Negotiating Group for a specific chunk in the absence of a central metadata system.

The Hash Allocation Table is used to locate specific chunks in similar fashion to how a Distributed Hash Table would have been used. A Hash ID is used to search for a row in the table, where the Hash ID may have been calculated from the chunk or retrieved from metadata. Where the Hash Allocation Table differs from a Distributed Hash Table is that the method for updating the shared Hash Allocation Table is far more flexible. The method for updating the Hash Allocation Table allows additional servers to be added to the table based on either content already present in the servers or on a volunteer basis. The presently-disclosed solution also allows for servers which are not also clients to hold only the subset of the Hash Allocation Table that is relevant to them.

Each Negotiating Group identifies a subset of the cluster's storage servers that are all of the servers involved in storing or retrieving a specific chunk. Identification of a subset of the storage servers is crucial to allowing unsolicited transmission of buffers without prior bandwidth reservations. If the number of potential unsolicited messages that a given storage server can receive is too large then buffering in the network forwarding elements and the receiving end itself will be insufficient to make delivery of unsolicited messages effectively reliable.

In one embodiment, the Negotiating Group is obtained by a lookup in a shared Hash Allocation Table. This table can be identical in structure to a table that implements a conventional distributed hash table, although the Hash Allocation Table preferably has a variable (rather than fixed) number of members (servers) designated in each row. The Hash Allocation Table differs from a conventional distributed hash table in that there are numerous methods for populating its rows.

As with a Distributed Hash Table, a chunk's Hash Identifier is calculated based upon the chunk's name, or the chunk value (payload). The Hash Identifier is used to look up the row(s) that are used to hold the identities of the servers that are responsible for storing that Hash Identifier. Many methods are well known for performing this type of lookup function.

A negotiation is conducted within the Negotiating Group using unreliable datagrams sent with multicast addressing, as will be specified later, to select a subset of those servers that the chunk must be delivered (or replicated) to.

The presently-disclosed solution requires each chunk to have the following naming attributes:

1) A Chunk ID. The Chunk ID uniquely identifies the chunk and which will never reference a different payload. It must be effectively globally unique for at least twice the lifetime that the chunk will be retained or referenced.

2) A Content Hash ID. Each embodiment of the present invention selects a specific hash algorithm that all servers in the cluster agree upon. If the selected hash algorithm is a cryptographic hash of the content, such as SHA-2 or SHA-3, then the Content Hash ID may also serve as the Chunk ID. When the Content Hash ID also acts as the Chunk ID, the algorithm selected is preferably strongly resistant to pre-image attacks. When only used to validate content, the hash algorithm merely has to be resistant to coincidental collisions. Whether or not it is used to identify the chunk, the Content Hash ID is always used to validate the content of transmitted chunks or chunks retrieved from persistent storage.

The Chunk ID should have a uniform distribution so that it can be used to efficiently index locally retained chunks on storage servers. In a preferred embodiment, the Chunk ID is always the Content Hash ID. Cryptographic hash algorithms generally provide a uniform distribution. In alternate embodiments, the Chunk ID may be supplied as an Arbitrary Chunk ID by a centrally controlled metadata system (such as an HDFS namenode). That metadata system would be responsible for creating Chunk IDs that with a uniform distribution.

A chunk may also have a Name Hash ID. Chunks that are used to store the root of metadata for a version of an object within the storage system also have a name that can be used to retrieve the chunk object. The Name Hash ID is an additional partial identifier for such chunks (the addition of a version identifier is required to form a complete additional identifier). In a preferred implementation where these indexes are implemented is a single flat index, entries found using the Name Hash ID will contain the Chunk ID while those found with Chunk ID will specify the local storage locations where the chunk payload is stored and the chunk back-references are tracked.

When working with chunks that have a Name Hash ID it is used to index the Hash Allocation Table to retrieve the Negotiating Group.

A1) Distributed Put Operation

The above-described FIGS. 6-15 provide illustrative examples of transactions to put a chunk to an object storage system in accordance with the presently-disclosed solution.

The first step in a distributed put operation is for the data source to identify the Negotiating Group comprised of the set of target storage servers that should receive a Chunk Put proposal for the chunk.

A1a) Identification of the Negotiating Group

The Negotiating Group may be identified through several methods, including the following:

1. By looking up the Name Hash ID for the chunk in the shared Hash Allocation Table, or looking up the Content Hash ID in the same table when the chunk does not have a name. An unnamed chunk may be identified directly or indirectly from the contents of a named Chunk. The Negotiating Group row so found would list the target servers for a range of Hash IDs, and a Multicast Group ID already associated with this group.

2. In alternative implementation, the Negotiating Group may be identified by a central metadata system, such as a namenode in the Hadoop Distributed File System (HDFS).

A1b) Chunk Put Proposal

Having selected the set of targets, a Chunk Put Proposal is sent to this Negotiating Group (Designated Super-Group). A Multicast Chunk Put Proposal message may encode at least the following information:

1) An Identifier of the target Negotiating Group.

2) An enumerator specifying the Type of a Chunk Put. These types would include Payload Chunk, Version Manifest and Chunk Manifest.

3) The Content Hash ID for the chunk.

4) If this is a named chunk (which holds the root of the metadata for a version of an object), then the name of the object to be put must be specified. In a preferred embodiment, this includes the Name Hash Id of the enclosing Container (commonly referred to as a "bucket"), the Name Hash ID and the unique version identifier for the version to be created.

5) The total length of the content that will be put.

6) The total length of the above content that will be put immediately using unsolicited bandwidth, typically in an optional portion in this message.

7) The multicast address for a Rendezvous Group that will be used to put the payload. The members of the Rendezvous Group are not specified because they have not been selected yet.

8) Other information as required by the transport layer.

A1c) Chunk Put Accept

A Chunk Put Accept message encodes the following information:

1) The identity of the Put Proposal that this is in response to: Requester, Sequence # and sub-sequence #.

2) One of the following three responses:

a) Chunk already stored. Redundant transmission of the chunk payload is not required.

b) Put Proposal Not Accepted ("Not Now"). The additional payload will indicate the earliest time when this Storage Server would want to consider a retry request.

c) Put Proposal Accepted. The additional payload will indicate the time window and data rate reserved for this delivery.

Dependent on application layer logic, the Data Source will have a policy on the desired number of targets it wants to deliver the chunk to on a first round. In some cases there will already be enough targets holding the chunk that no further deliveries are needed. Otherwise, the Data Source will determine the Rendezvous Group for the payload, which is a subset of the Negotiating Group.

Consider an example with four Data Sinks in a Negotiating Group. In this example, three of the Data Sinks may accept the put proposal, while the fourth may indicate that it cannot accept the chunks being put currently (by sending a "Not Now"). Typically, the acceptance criteria for an "adequate" number of Accepts may be that at least one of the acceptances is from one of the "designated" servers, and there must be a total of "replication count" servers in the rendezvous group.

A1d) Rendezvous Transfer

The Chunk Source will then initiate a Multicast Rendezvous Transfer to the Rendezvous Group at the consensus time. The mechanisms for implementing a multicast rendezvous transfer are dependent on the transport layer.

A1e) Payload ACK

Each recipient of a Rendezvous transfer that is part of a get transaction will either acknowledge successful receipt of the entire chunk (or negatively acknowledge failed reception) with a Payload ACK. A Payload ACK is also generated in response to a Put Proposal that included the entire payload.

Processing of a received chunk by the upper layer must be complete before the Payload Ack is transmitted. The received chunk must be persistently stored, or applied and the results appropriately stored, before a Payload Ack is sent. When a storage server is responsible for providing persistent storage, the results must be persistently stored before a Payload Ack is appropriate.

The Payload ACK must be sent both to the Data Source and to a multicast group of all servers that wish to track the existence of chunks mapped by a row of the Hash Allocation Table. Such a group may be a specific member of the Multicast Address Set or may be the default multicast address for the Negotiating Group.

An alternative method is to have each recipient of the Chunk Put message send just a unicast Payload ACK to the Data Source. The Data Source then prepares Relayed ACK messages summarizing one or more received Payload Acks; these messages are sent to the appropriate multicast group.

The destination group may be the Negotiating Group itself, or may be a companion multicast address taken from the Multicast Address Set for the Hash Allocation Table row where that member is designated for Payload ACK messages either in general or specifically for named chunks.

In a preferred embodiment, the Payload ACK encodes the following information:

1) The identity of the Put Proposal that is being completed.

2) The Chunk ID that is being acknowledged.

3) The status: successful or not. Indicating specific reasons for a negative acknowledgement is useful for diagnostic purposes, but is not necessary for the functionality of the present invention.

4) When successful, the message includes an identifier of the server that now has this chunk stored.

When the Payload ACK was only unicast to the Data Source, the Data Source must multicast a Relayed ACK to the Negotiating Group to inform the members of the group of which servers now have this chunk stored. The Data Source may aggregate multiple Payload ACKs for the same chunk into a single Relayed ACK message.

A1f) Making the Put Transaction Reliable

Finally, the Chunk Source evaluates whether there has been a sufficient set of positively acknowledged deliveries of the chunk. Such a determination may be more complex than merely checking the number of delivered chunk. For example, an embodiment may require that a minimum number of the servers that are permanent members of the Negotiating Group hold the Chunk. A storage server that offered only volatile storage might be acceptable as an additional copy, but not one that can be relied upon. However sufficiency of delivery is evaluated, if insufficient replicas have been created, then the Chunk Source and each successful recipient of the chunk will attempt to put the chunk again after a random back-off delay.

In one embodiment of this collaboration, each interaction described is encoded as a PDU (Protocol Data Unit) which becomes one or more L2 frames. Each PDU is delivered to the set of storage nodes identified by a Multicast Address, whether by a natural Multicast protocol such as multicast UDP over IP or by cut-through replication using unicast connections such as TCP over IP.

The decision to use a native multicast protocol or a unicast simulation thereof can be made independently for the control PDUs (Get Request, Chunk Put Proposal, Chunk Put Accept and Payload ACK) and the payload delivery PDUs.

In one embodiment, multicast is used for payload delivery and IGMP is used to control membership in the multicast group. In these embodiments each Data Sink joins the multicast group before the time window accepted in their Put Accept reply, unless they specifically indicate that they anticipate the offer will be rejected.

A2) Cluster-Wide Timestamp

The presently-disclosed solution assumes a common timestamp maintained by all members of the storage cluster. There are several well-known techniques for maintaining an adequately synchronized clock over a set of distributed servers, and any of which are suitable for an implementation of the present invention (e.g., Network Time Protocol and/or Precision Time Protocol).

A3) Distributed Get Operation

The above-described FIGS. 16-21 provide illustrative examples of transactions to get a stored chunk in accordance with the presently-disclosed solution. In the example shown in FIGS. 20-21, the chunk is also replicated to a volunteer Storage Server to provide additional replicas. The presently-disclosed solution allows for opportunistic replication of the chunks most frequently retrieved, thereby optimizing later retrieval of those same chunks.

The first step of the distributed get operation is for the client, or an agent acting on behalf of the client, to join a Multicast Rendezvous Group previously provisioned for use by this client. Typically, the client will have joined several provisioned Rendezvous Groups for previous transactions and will be selecting one of the groups previously used for a completed transaction.

A3a) Multicast Get Request

The client then issues a Multicast Get Request to Negotiating Group appropriate for the requested chunk. The group is identified just as described for the put procedure.

This Multicast Get Request includes, but is not limited to, the following:

1) Identification of the transaction:
   a) A Source ID of the client or its agent.
   b) A transaction sequence number.
2) Identification of the chunk desired. Depending on the application layer this may take multiple forms. This could be any of the following:

a) The exact Chunk ID of any chunk that does not have a Name Hash ID. This Chunk ID will typically have been obtained from a metadata chunk that did have a Name Hash ID.

b) The exact Name Hash ID of an Object combined with an optional specification of a desired version.

3) The Rendezvous Group for this Get Request.

4) The maximum amount of unsolicited content that may be delivered in each response.

5) A Reception Window when the client will be ready to receive the response. This is the same information as provided in the Put Accept message.

6) A maximum number of auxiliary responses that may be generated for this request. Once a storage server is acknowledged as the responder for this request, it may issue Get requests for up to this many chunks referenced by the main requested chunk. For each of these allowed auxiliary responses a separate reception window must be specified.

7) Optional additional reception windows that can be used for auxiliary responses.

In the typical case, there will be no Additional Target Requests generated. We will therefore complete this description without any having been generated, and discuss additional targets after completing an initial description of the get algorithm.

For a Get Request which specifies delivery immediately or relatively promptly (as defined by system-wide configuration), each Storage Server in the Negotiating Group possessing the chunk requested will attempt to respond to the get request as soon as its internal work queues allows it to. However, only the first responding Storage Server will actually completely respond and deliver the requested chunk. The mechanisms to ensure that only one response is generated for each Get Request are dependent on the protocol used to implement this collaboration.

Note that an embodiment may also define a Unicast Get Request. This would be a Get Request sent to a specific storage server. Such a capability would largely be used for diagnostic purposes, as that there would be no end-user advantage to requesting a chunk be delivered by a specific storage server.

A3b) Multicast Get Response

Each designated storage server will attempt to respond with a Multicast Get Response message. These responses will be collected either by the client or by the Negotiating Group, resulting in a single source being selected. The Multicast Get Response includes, but is not limited to, the following information:

1) The Timestamp of the response.

2) The Source ID and IP address of the responding server.

3) Identification of the Multicast Get Response that is being responded to, and which portion of the response this is: The primary content or the ordinal offset of which referenced chunk is being transferred.

4) The Rendezvous Group ID that will be used (which is repeated from the Get request).

5) The rate at which the chunk will be transmitted.

6) The Content Hash ID of the chunk it will deliver, and if this is a named Chunk the Name Hash ID and unique version identifier of the chunk.

7) If the requested chunk is too large, an error will indicate this problem and specify the actual metadata and payload lengths. Otherwise any immediate portion of the requested content. The entire contents requested consists of:

a) The Metadata Length, and the metadata and integrity checking data b) The Payload length, length and the payload.

In some embodiments, a storage server may respond with a Content Not Immediately Available message that indicates that it cannot return the content requested until at least a specified time. This would typically be due to having previously migrated the requested chunk to offline storage. Issuing such a response indicates that the process of moving the requested chunk back to online status has been initiated. However, the request should be re-issued at some time after the time indicated.

Each respondent only sends the first datagram in the response. This response is sent using unsolicited bandwidth. The balance will only be transferred once this specific server has been selected to perform the rendezvous transfer using reserved bandwidth.

Unless the entire response fits in a single datagram, a single responder must be selected to complete the transfer. This may be the Chunk Sink or the primary member of the Negotiating Group offering to deliver the content. This selection is multicast as a Multicast Get Accept message to the Negotiating Group, and the selected server will then begin the transfer.

The selected rendezvous transfer is then initiated using reserved bandwidth by the selected storage server to the Rendezvous Group specified in the original Multicast Get Request.

A3c) Emergency Get Request

Before failing a request to get a chunk that is believed to exist because there are no responses from the Negotiating Group, a requester will resend the Get Request to all storage nodes rather than just to the Negotiating Group.

A storage node knows that a chunk should exist when it is referenced in another chunk, or when a request is made for an object by a client that does not have a history of requesting non-existent chunks. In order to prevent a denial of service attack, repeated requests from clients for chunks that do not exist should not result in issuance of Emergency Get Requests.

A4) Volunteer Servers

Some embodiments may deploy volunteer servers to enhance the overall responsiveness of the storage cluster. Multicast communications allow them to be effective general purpose caching machines without forcing requests to go through them (at the cost of slowing down all responses where there is no cache hit).

A4a) Accepting Content During an Initial Push

When a Volunteer Server receives a Put Proposal for content it does not have, it may determine that it should volunteer to accept the new content.

The Chunk Source will understand that the response from the volunteer server does not represent a reliably persistent storage server for the content. Any determination that a transaction has been successful will require a minimal number of designated, or permanent, members of the Negotiating Group.

The probability of a volunteer target server issuing a Put Accept for a chunk should be dynamically adjusted as follows:

1) Having larger local storage capacity that is not currently used should increase the probability of issuing an Additional Target Request.

2) Having backlogged queues of already committed work that is not yet completed should radically decrease the probability of issuing a Put Accept.

3) The existence of Put Accepts from other Volunteer Servers for the same chunk should decrease the probability of issuing further Put Accepts.

A4b) Accepting Content Piggy-Backed on Content Delivery

When a Volunteer Server receives a Get Request for content it does not have, it may determine that it should volunteer to hold a replica of this data.

The Volunteer Server issues an Additional Target Request to the same group that the Get Request used. The Additional Target Request requests that the Volunteer Server be included in the delivery as well. When an IGMP controlled multicast protocol is used the volunteer server may simply join the Rendezvous Group specified in the Get Request. The additional target merely has to attempt collection of the chunk on that multicast group, and saving it if it is received successfully. With a non-IGMP controlled multicast protocol, the responding server will have to add the server to the Rendezvous Group. Again, the target merely has to attempt collection of the chunk on that multicast group, and save the chunk locally if successful. With a unicast chain put payload, the first responding storage server must add the server to the list, which will result in the same chained delivery as described for the put algorithm, except that no Payload ACK message is required.

The probability of a volunteer target server issuing an Additional Target Request should be dynamically adjusted as follows:

1) Having larger local storage capacity that is not currently used should increase the probability of issuing an Additional Target Request.

2) Having backlogged queues of already committed work that is not yet completed should radically decrease the probability of issuing an Additional Target Request. The longer the delay before a delivery is initiated (due to source/network congestion, not for delays due to delayed delivery of subsequent chunks for streaming, due to delays should increase the probability of issuing an Additional Target Request. A chunk which cannot be retrieved promptly will more frequently be in need of additional replicas chunks which can be retrieved promptly. A request that a client had to retry is an extreme example of a long delay, which should result in a marked increase in the probability of issuing an Additional Target Request, perhaps even to the extent that two additional targets may be selected.

3) The existence of Additional Target Requests for the same chunk from other servers should decrease the probability of issuing further Additional Target Requests. Adding one extra server per chunk get is often sufficient (this will be the subject of testing and tuning efforts).

In a preferred embodiment, Additional Target Servers should place the additional local copies of chunks on a "short fuse" queue for deletion of these chunks with an adaptable heuristic based on Most Frequently Used and Most Recently Used tagging of chunks. The chunks at the end of this deletion queue should be deleted from the Additional Target Server to make room for Additional Target Requests based on the total number of Additional Target Requests that a Volunteer Server can support.

A4c) Responding to a Get Request for Content Held

Unlike a designated, or primary, member of a Negotiating Group, a Volunteer Server is not obligated to respond to a Get Request even if the Chunk is stored.

Of course, there is little point in volunteering to be an extra replica, unless the server will generally respond to Get Requests, but there are several reasons why it might not be advantageous to respond to a specific request:

1) The work queue might already have several requests.
2) There may be a queue to even validate whether the chunk is locally stored.
3) There are already responses from other storage servers that are sufficiently equivalent (even if technically later than this server could respond) that there is insufficient benefit in responding.

A5) Non-Immediate Requests

In accordance with an embodiment of the invention, a Get Request may specify non-immediate delivery. Here are some examples of when non-immediate requests may be employed:

1) Retrieving archive objects from an archive with slow media (e.g. tape);
2) Copying an object from a server with slow media to a server with fast media in anticipation of forecasted demand for the objects (e.g., email boxes between 5-6 AM before start of business at 8-9 AM);
3) Copying objects to an archive server as a replication for backup; and
4) Replication of chunks can be performed on a "lazy" background basis once the minimum set of copies are guaranteed.

Non-immediate requests may be useful for applications such as retrieving archived objects when no user is waiting for the specific content, or other cases where the consumer wishes to use low priority (and presumably low cost) delivery resources but still eventually receive the requested chunk.

In a preferred implementation for such requests, it is best to pick the member of the Designated Group that effectively has the lowest bid for providing the requested chunk. Rather than selecting the storage server to perform the actual delivery based on the first responder, the members of the Designated Group would multicast a "delivery bid" message to the other members of the group, identifying the Get Request and a nominal price for the delivery. The lowest bidder would submit their "winning" bid to the client, and then deliver the requested chunk at that later time.

Each storage server can apply its own heuristics to determine the nominal price to assign to its response. However, having other deliveries of different chunks at nearly the same time would typically increase the nominal price. Factors that could lead a storage server to offer a lower price include probable caching of the requested cache because of other scheduled deliveries of the same chunk, and whether the drive storing the requested chunk would be already powered up at the requested delivery time.

Similarly, a Chunk Put Proposal can be for a non-immediate push. The recipients of a non-immediate Chunk Put Proposal would respond with either an indication that the chunk was already stored on this storage server or a Put Deferred Accept message that would identify one or more broad time windows when it could accept the chunk, and a nominal price for the delivery. The client would accept a window that had the lowest aggregate cost (based on the nominal prices quoted in each response) and send a Put Deferred Accept message indicating the exact time window when delivery will occur. The selected servers would then make the required bandwidth reservations. With any non-immediate delivery the target may have to cancel the reservation, in which case it should notify the source so that it can seek other targets either at the same time or at a later time.

A6) Target Response

In the Chunk Put Accept response, each target indicates when it expects it will be able to receive the bulk content of the object being put. This must be based upon both the target's internal queues for writes to persistent storage, the amount of room that will be available in ingestion queues and the probable availability of network bandwidth.

Under the presently-disclosed solution, each implementation is responsible for selected a congestion control protocol which will prevent virtually all failed message deliveries due to dropped frames caused by network congestion.

A7) Opportunistic Storage Servers

When joining an existing storage cluster, an implementation may configure new storage servers to refrain from claiming the portions of the Hash ID ranges that a default hash algorithm would have assigned to it.

Instead, the new storage servers will retain its capacity and seek to assign itself ranges of Hash IDs when it detects the following conditions:
1) When a storage server departs the ring, relatively under-assigned storage servers will seek to claim the Hash ID range previously handled by the now departed storage server.
2) When get requests for a given hash id range are taking longer than average a relatively under-assigned storage server will seek to make itself one of the designated servers for a portion of that Chunk Hash ID range.

B) Methods of Reliable Multicast Payload Delivery

Although multicast is typically perceived as an unreliable protocol, on most wired LANs, the number of congestion drops or misdelivered packets is extremely small. Since multicasts still have a non-zero probability of not reaching all of the target servers, Replicast has mechanisms that add reliability to an inherently unreliable protocol, but without the overhead of "reliable" transport mechanisms like TCP/IP.

B1) Source Server Responsibilities

The essence of the "reliability" of the Multicast Payload Delivery is that it does not depend on the original "source server" to insure that all of the copies are made. The "source server" is only responsible for the minimum set of copies. Once those copies are guaranteed, then the application returns control to the user application that created the object. Replication of chunks in the presently-disclosed solution is an ongoing process that does not end.

B2) Distributed, Reliable Chunk Replication

Now a distributed mechanism comes into play. Each of the Chunk copies (note that the original "source server" may be one of these chunk copies that is not a designated copy) keeps a list of the designated destinations for the chunks (the size of this list is controlled by the replication count for the object, which can also vary by object). If any of the destinations does not yet have a copy of the chunk, then the server holding the chunk wants to "mate" with one or more of the destinations so as to reproduce the chunk. The distributed replication is an ongoing responsibility of each chunk server. The replication retries are a continuous background task for the storage servers. However, to avoid network congestion, each of the retries may be done on a random interval basis, analogous to the CSMA/CD collision detection and retry mechanism. In this way, the replication task is spread across many different servers and not left to a single source server.

This task to replicate may exist for each storage server regardless of its retention of a list of known other replicas. Retaining such data enables optimization of the replication process, but is not necessary for its correctness.

This same mechanism for performing replication may be used whenever servers join or leave the ring of servers. Each chunk server is continuously updating the list of servers that have copies of a chunk (including manifests). If due to ring membership, caused by a failed server or a partitioned network, there are insufficient replicas of a chunk on designated servers, then it is the responsibility of all chunk owners to attempt to replicate to the designated servers (as noted in the chunk manifest and hash row). Because this data can be volatile, a "get" type of query may be issued to reconstruct the list of chunk copies.

In preferred implementations, the multicast addressing can be utilized for payload delivery as well as for "unsolicited commands" that carry a payload, rather than negotiating for a time to send the payload. Preferred implementations will insure that the network switch has been provisioned so that the bandwidth allocated for storage and "unsolicited" traffic is non-blocking up to a pre-determined limit and that the network will not experience congestion as long as the process of reserving payload transmission does not exceed that threshold. This helps to ensure that the "unreliable" multicast is actually quite reliable since it does not run the risk of data loss due to network congestion.

While all commands and payload transfers may be retried, they can avoid the need to retransmit by
1. Protecting the storage traffic from general purpose traffic not complying with these special rules;
2. Limiting the bandwidth for unsolicited transmissions to a provisioned rate;
3. Limiting the bandwidth for reserved transmissions to a provisioned rate; and
4. Only utilizing the reserved bandwidth in accordance with rendezvous agreements negotiated using unsolicited transmissions.

C) Methods for Generating and Editing the Hash Allocation Table

The classic methods of generating a hash allocation table will typically result in a fairly uniform distribution of chunks over the servers. However, it is an inflexible distribution. Existing designated hash tables may cause the cluster as a whole to be declared "full" when a single storage server is full. The fact that there is storage available on other servers is irrelevant; there is no space on the storage servers specified by the distributed hash algorithm. If the chunks cannot be stored where readers will look for them, then they cannot be stored.

The improved editing of the Hash Allocation Table replaces a fixed distribution based strictly on a hash algorithm with flexible table driven distribution. The table is no longer maintained by multicast distribution of joins/departures but rather by multicast distribution of edits.

The presently-disclosed solution relies on sharing a mapping of hash IDs to multicast addresses and/or lists of storage servers. This is referred to as a "Hash Allocation Table". In one embodiment, the Hash Allocation Table is implemented as a memory array on each storage server with specific methods used to guarantee that the same table is generated on each storage server. As those skilled in the art will recognize, a "table" may be thought of as a mapping that can be implemented in numerous ways. It is defined by the data which that a key value retrieves, rather than by the specific method used to encode and store the rows of the table.

The presently-disclosed solution requires a Hash Allocation Table that is updated whenever the set of storage servers changes, or when redistribution of the workload is required. There are many methods by which this can be achieved:
1) A designated server could collect changes in the membership of the storage cluster, generate a new hash allocation table, and then distribute it to all servers that needed it. This technique is compatible with the presently-disclosed solution.

2) Having each server generate the table based on the cluster membership reported by a distributed keep-alive ring is also compatible with the present invention.
3) A new method is described herein where the storage servers may multicast edits to the entire storage cluster in a fashion where all edits to the table will be applied, but in a consistent order by all members of the cluster.

In accordance with an embodiment of the present invention, the Hash Allocation Table may be edited on two different planes:

4. One plane deals with the assignment of Multicast Address Sets to specific rows of the Hash Allocation Table. This plane also tracks Multicast Addresses which have been provisioned for the system but which have not been assigned to a Hash Allocation Table row.
5. A second plane deals with the addition and deletion of storage servers to specific rows of the Hash Allocation Table.

A versioned object created within a reserved namespace of the object storage system is used to assign Multicast Address Sets to rows of the Hash Allocation Table and to track spare Multicast Addresses not yet assigned to a row. All servers with access to the Replicast traffic would subscribe to this object so as to always fetch the most recent version of this object (or alternatively to have that version pushed to them).

The edits to the membership of the Hash Allocation Tables edit the membership status of a specific storage server for a specific row. A membership type can be full, limited or non-existent (i.e., delete this entry).

There are at least two valid strategies for reliably editing the memberships in the Hash Allocation Table:

There are well-known prior art techniques for the members of a ring identified by a Keep-alive subsystem to serialize all edits to a common table. After serialization, each member of the ring applies the edits in order, resulting in all servers being in agreement on what the resulting table should contain.

Multicasting the edits may be made reliable by having the multicast edits be acknowledged through the keep-alive functionality itself. After each edit, each storage server computes the signature of the resulting table and the timestamp of the most recent edit applied. This information may be shared through the keep-alive heartbeat messages amongst the members of the cluster.

If there is a later edit that a specific storage server had not been aware of, it can send a multicast request that the specific edit be retransmitted. This should result in that server receiving the edit it had missed, applying it, and then joining the consensus as to what the signature of the Hash Allocation Table should be.

If this fails to result in consensus, ultimately the majority of the ring will declare the minority to be wrong. This will result in those storage servers leaving the ring, and then rejoining it, and then having their Hash Allocation Table be rebuilt based upon the consensus of the majority.

This technique relies upon an implicit acknowledgement of a table edit in the keep-alive synchronization of the Hash Allocation Table signature through the keep-alive subsystem. Inherently, the Hash Allocation Tables cannot be guaranteed to always be identical for all storage servers; the best that can be guaranteed is that the storage servers will converge upon having the same Hash Allocation Tables. However, the presently-disclosed solution relies upon synchronization of the Hash Allocation Table only for efficiency. Even if the complete Hash Allocation Table were lost, all storage servers would seek to repair the table claiming ranges stored locally. Once a new table was agreed upon, all servers would seek to ensure that content stored locally was adequately retained on the designated servers, and multicast put proposals to achieve that goal. Brief discrepancies of isolated rows in the table do not imperil the overall integrity of the distributed storage system.

Server-Specific Heuristic Algorithms

The presently-disclosed solution describes a number of steps that must be implemented by specific storage servers. For example, each storage server estimates when it will be ready to accept a chunk for permanent storage. It is important to understand that the presently-disclosed solution does not restrict the algorithms that any embodiment of any storage server may use to make that estimation.

There are many methods for estimating when the work in a queue will be completed. Many of these methods are well known. Any of these methods are compatible with the presently-disclosed solution. The critical requirement is that each storage server is able to derive its own estimate with the information provided independently without relying on any other storage server.

The presently-disclosed solution may be considered to be an enhanced version of a "share nothing architecture" in that each storage server is independent, and self-sufficient. Further, there are no single points of contention or bottlenecks in the system. However, the presently-disclosed solution widely shares information through multicast within the cluster. For example, all members of the Negotiating Group will typically be notified of each Payload Ack for a chunk in that group. This information can be used by each server's local heuristics to optimize algorithms such as determining when a chunk should be replicated.

The presently-disclosed solution remains a "share nothing architecture" because there is no reliance upon this shared information. It is ephemeral shared status being reported through the cluster. The shared information may be used to enhance behavior, but the loss of this information creates no failures. Some heuristic algorithms may find less optimal solutions, but never an incorrect solution.

Voiding a Designated Chunk Server

A chunk server that has some functional impairment must perform two steps without necessarily shutting down the server. First, it must leave the ring of chunk servers as a designated destination for ingesting new chunks/objects. The byproduct of this step, as with any server that departs the ring of chunk servers, is that all chunks, for which this is the designated server, must void that server as an available designated copy. This in turn will trigger the step to visit each of the (now read-only) chunks that are held on this server and begin the processes.

Variations in Participation by Negotiating Group Members

The Negotiating Group for a specific range of Chunk Hash IDs (i.e., a row of the Hash Allocation Table) identifies the set of storage servers that should receive get or put requests for those chunks. However, not all members of this group are equal. Consider, for example, chunk servers with volatile storage and source-only chunk servers.

1) Chunk Servers with Volatile Storage:

For example, a member may indicate that it should not be counted toward the minimum replication count. Such a server may store chunks in this range, and deliver them when requested. However, it might not guarantee persistent storage. A storage server that uses only very high-speed volatile storage (such as DRAM) is one example.

2) Source Only Chunk Servers

A storage server may also be in an impaired but still functioning state. Such a server no longer has functionality in some of the resources it relies upon to provide persistent storage that is available on demand.

Some examples of impaired servers include:

The server may have lost one (or more) drives of a mirrored set.

The server may have lost one of several network interfaces.

While still functional, the chunks held by this storage server are now a single hardware failure away from being unavailable. This will normally trigger voiding the "designated" status of chunks held on this server. This should trigger process to elect a new designated storage server that is not in a failure state, and replicate the chunks on this server to other servers. Impaired servers should not accept new chunks to be stored, but are still valid sources for triggered replication and for responding to get requests.

Transaction Authentication Token

Some embodiments of the presently-disclosed solution may require the Chunk Source to obtain a Transaction Authentication Token before starting a transaction to put the Chunks for a given object. When required, this token is obtained by supplying user credentials and the identity of the object to be created or edited to the storage servers in the Negotiating Group where the named chunk for the object will be put to complete the transaction.

The token will encode this information and include a signature proving that it was signed by a storage server authorized to validate object access in the object storage system. The signing storage server will have first validated that all required access control rules for the specific object storage system have been met.

When required by the specific implementation, this token must be supplied with each Chunk Put proposal for authentication. It may be stored as metadata to facilitate chunk cross-referencing and to enable auditing of chunk storage.

A specific embodiment may also provide a Transaction Authentication Token with the results for getting a Chunk that is the root of the metadata for an object. This Transaction Authentication Token would then be provided with each Get Request for the other chunks of that object.

Periodic Chunk Replication

Chunks are also periodically replicated to new storage servers. The presently-disclosed solution does not require any prioritization of replication. If all storage servers seek to replicate all chunks they have stored the storage cluster will quickly converge on having enough replicas of all chunks. Implementations may have specific strategies for prioritizing chunk replication so as to attempt replication on those most likely to need additional replicas. Reasons for optimizing specific chunks include changes in the Hash Allocation Table or for changes in implementation specific storage policies.

The procedure to replicate a chunk is basically the same as for putting a chunk. However, rather than supplying a Transaction Authentication Token a full enumeration of existing back-references for the chunk is supplied as metadata in addition to the payload.

When replicating a range of Hash IDs a storage server will replicate named chunks using the Name Hash ID index and use the Chunk ID index to access general chunks, but exclude those chunks that are used solely as Named chunks.

Compound Get Request

In one embodiment of the present invention, the process of getting an object is further optimized for distributed object storage systems which store metadata for a version of an object separately from the payload. The version manifest, or metadata, contains references to the chunks/blocks.

In a default implementation, the issuer of a Get Request may obtain the version manifest chunk, and then issue Get Requests for the referenced payload chunks. This pattern is used in both pNFS (parallel NFS) and the Hadoop Distributed File System (HDFS).

In an optimized implementation, the storage server holding the version manifest chunk may originate Get Requests for a specific number of the initial payload chunks referenced by the version manifest. These requests specify the originator of the Get Request as the target.

When a multicast protocol is used to deliver the payload each Chunk Put PDU specifies which chunk of the overall object it is. This information may be supplied in the Get Request from the storage server holding the version manifest.

When a unicast protocol is used, the Get Request includes a port number to be used for each of n chunks. This port number is provided in the relayed Get Request, which will identify which chunk is being delivered to the end recipient.

Stability Across Power Reset

One desirable characteristic of a chunk distribution algorithm is that the same set of storage servers will reliably recreate the same distribution after a full system wide reset. The presently-disclosed solution retains compatibility with this feature by having each storage server retain in persistent storage those rows in the persistent hash table that reference them, and the total number of storage servers in the keep-alive ring.

The keep-alive system is also required to track how long each server has been a member of the ring. Upon restarting, each storage node will determine whether it should reapply its previous row assignments. It will not do so when heuristic rules suggest that it has rejoined a static ring. Indications of this would include a large portion of the members having been running for a configurable time period, and the population of the ring being on par or greater than the previous population.

Tracking Ongoing Reception

Each node in the system notes all chunk retrieval requests it receives. Even if it does not join the Rendezvous Group, it will still receive either a multicast Payload ACK or a Relayed ACK indicating final delivery status for each chunk to each member of the Rendezvous Group. While a chunk is being delivered, there is no need to start a new delivery for the same chunk.

Extending Existing Central Metadata Systems

In an alternate embodiment, a central metadata system may be extended so that the central metadata server specifies the location(s) of a chunk as the Negotiating Group. The specific set of storage servers is negotiated within the Negotiating Group. Chunks are retrieved by asking the central metadata system where they are located, and then multicasting a request to the Negotiating Group specified for the requested chunk.

These techniques offload the central metadata server from tracking the dynamic state of each chunk/block storage server it controlled. However, these techniques would still rely on a central metadata control system and would therefore still be constrained (throttled) in the same way that any centralized system would be constrained.

Summary of Features and Advantages of Disclosed Object System

The presently-disclosed object system allows the set of storage servers providing persistent storage for a chunk to be selected from those that can store the chunk most promptly, rather than arbitrarily selecting a set of storage servers without regard for network traffic or server workloads.

In prior art, selecting storage servers based upon their current loads was limited to systems with a centralized metadata system, such as HDFS and pNFS.

The presently-disclosed object system allows the Chunk Source to select the optimum set of storage servers to take initial delivery of a chunk from amongst the Chunk Put Accept responses collected to a multicast put proposal. Centralized metadata solutions can only perform this optimization to the extent that the central metadata server is aware of the resource status of every storage server in the cluster. Existing Distributed Hash algorithms can only adjust boundaries for longer term changes in the distribution. Any change in the distribution of chunks requires moving previously committed chunks. Only major changes in the distribution can justify the migration costs of adjusting the distribution.

The presently-disclosed object system allows the initial source of a chunk to select the initial Rendezvous Group. In selecting the initial Rendezvous Group, the source server has many options to influence the members of the group. Some of the considerations include, spreading replicas across failure domains, selecting destinations that have the largest amount of free space, destinations that have a best rating (combination of CPU power and memory space available) as well as other factors that can vary dynamically, including the speed, number and/or cost of the link(s) between the source and the sink.

The presently-disclosed object system allows storage servers with excess capacity and currently low work queues to volunteer to provide additional replicas of chunks. In fact, many storage systems have the notion of "hot stand-by" drives that remain powered up, but idle, to step in when an existing drive fails. With the presently-disclosed object system, these hot stand-by drives can be used to perform a performance enhancing "volunteer" duty to hold volatile extra copies of objects. Clients can find these additional replicas using the Negotiating Group. The Negotiating Group also enables collaboration within the group can be found by clients seeking those chunks and/or when replication of those chunks is required due to the loss of an existing storage server (or the additional of a new storage server).

The presently-disclosed object system also allows for dynamically adjusting the Hash Allocation Table to dynamically load-balance assignment of responsibilities among the storage servers. The presently-disclosed object system enables alternate strategies, such as holding new servers in reserve to replace failed or to offload overloaded servers. Prior art could only provide this type of flexible resource assignment by centralizing the function of the metadata server.

The presently-disclosed object system also improves utilization of network bandwidth and buffering capacities.

Network elements may quote bandwidth capacities as though they were reserved. However, this is not how network elements actually operate. Buffers are not pre-enumerated for different classes of service; they come from a common pool. Stating that the network element has a queue for up to 40 Ethernet frames in Class X does not mean that there are 40 buffers pre-allocated for that purpose. Rather, it means that after 40 frames are queued for Class X, further frames for Class X may or will be dropped, and that no frames for a different Class that is below its quota will be dropped because an excessive number of frames for Class X were queued.

This can be thought of as a reservoir with controlled ingress and egress rates. In aggregate, it is known that 30% of the water in the reservoir came from river W, but that does not mean that it is easy to find the specific drops in the reservoir.

With tailored multicast as disclosed herein, the time that copies of a given chunk will be in network element buffers is greatly reduced. With unicast protocols, a buffer will be required for the reception time, queued time and transmit time for each of the three copies. With the presently-disclosed solution, a single buffer will only be held for the reception time, the longest queue time of the three copies and transmission time. While this will be more than one third of the time buffers will be held for the unicast protocols, it is still a considerable improvement.

Even if there are no changes in the class of service traffic shaping for any of the Ethernet priorities, this now unused buffer capacity can enable more unsolicited messages and more non-storage packets to be successfully delivered over the same local area network than could have been delivered had a unicast delivery strategy been used. Less buffering also means prompt transmission, which will improve average delivery times.

In summary, the presently-disclosed object system provides the following:
  A method for distributing and retrieving chunks using multicast addressing to Negotiating Groups and Rendezvous Groups that are subsets of the Negotiating Groups.
  A method for using a specialized form of Distributed Hash Table that is a shared Hash Allocation Table to find the Negotiating Group for a specific chunk in the absence of a central metadata system. The Hash Allocation Table is used to locate specific chunks the same way a Distributed Hash Table would have been used, but the method for updating the shared Hash Allocation Table is far more flexible.
  A method for reliable multicast transmission of chunks that is enabled as the result of establishing a Rendezvous Group.

Description of Drawings Illustrating Aspects of the Scalable Object System

Figure 32:
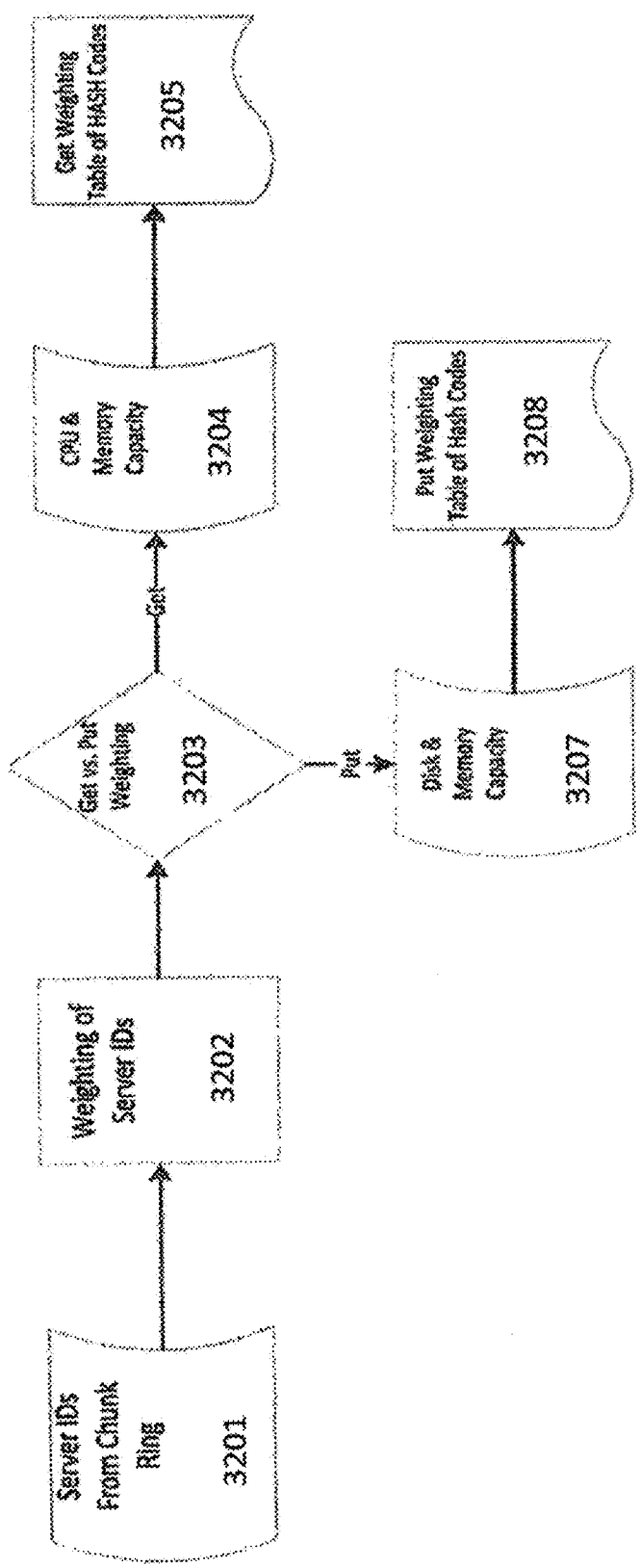
FIG. 32 depicts a process for weighting servers in an object storage system in accordance with an embodiment of the invention.

FIG. 32 depicts a process for weighting servers in an object storage system in accordance with an embodiment of the invention. FIG. 32 shows that the list of server IDs 3201 may be collected from the Ring manager that keeps track of the current set of servers that are active. The servers in the list are put through a process that performs a weighting process 3202 for the servers. In one implementation the weighing process is split into two parts 3203 for servers that handle get chunk operations 3204 and the other for servers that handle put chunk operations 3207. As indicated CPU and memory capacity may determine weightings for the get chunk operations 3204, while disk and memory capacity may determine weightings for the put chunk operations 3207.

Each of these processes yields a table of hash codes (3205, 3208) that are used by the Hash Assignment Table(s). As indicated, the get weightings may be stored in a Get Weighting Table of Hash Codes 3205, and the put weightings may be stored in a Put Weighting Table of Hash Codes 3208.

Figure 33:
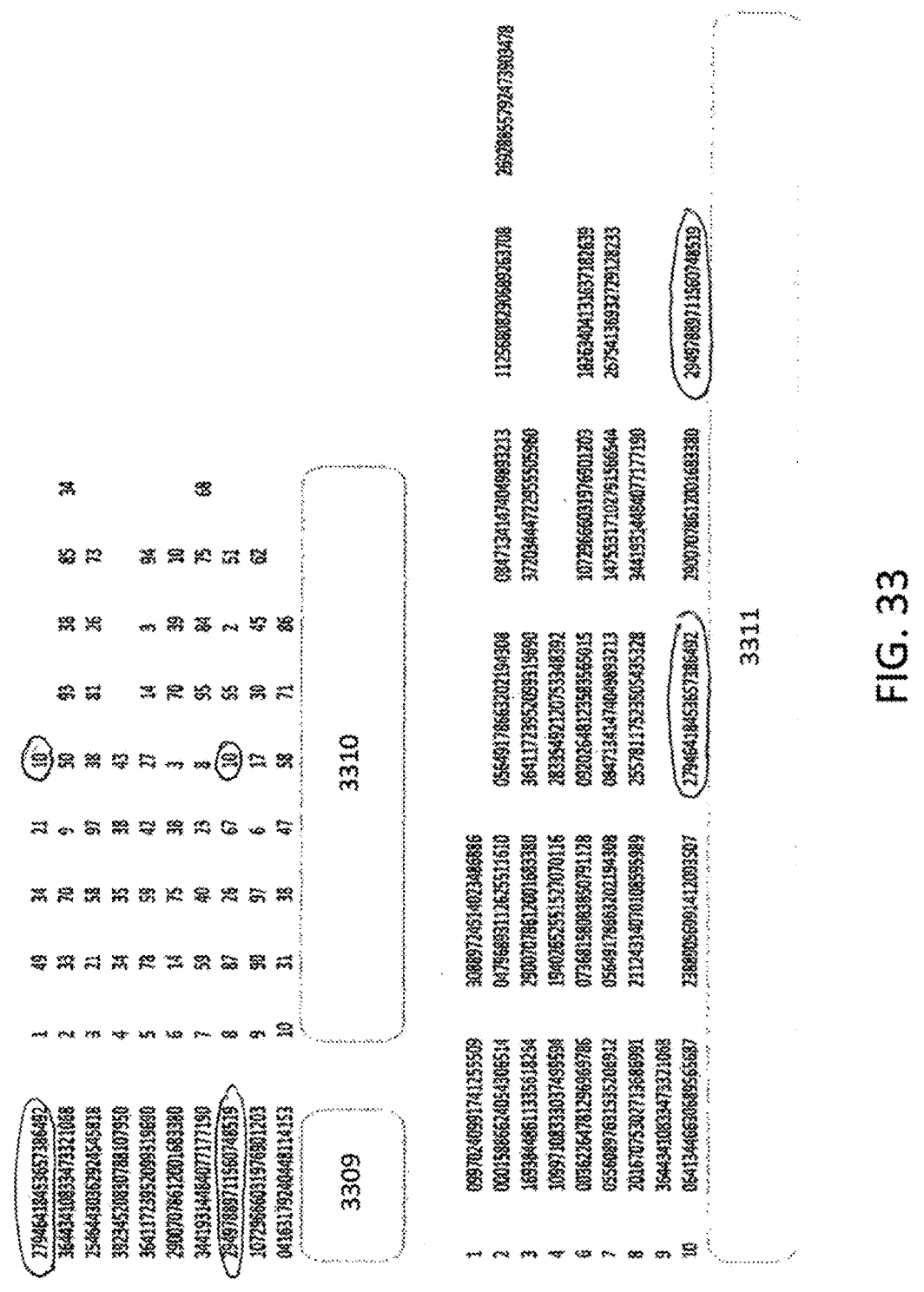

FIG. 33 depicts a sample assignment of server IDs to rows of a hash table for an object storage system in accordance with an embodiment of the invention. Shown in FIG. 33 is a sample (partial) list 3309 of server IDs. While the example storage system has more than ten storage servers, only the first ten server IDs are shown in FIG. 33 for reasons of space.

An intermediate table 3310 with rows indicating negotiating groups to which each server belongs is also shown. The first row ("1") corresponds to the first server (server ID "27946418453657386492") in the sample list 3309 of server IDs. As shown, this first server is a member of negotiating groups numbers 49, 34, 21 and 10. The second row ("2") corresponds to the second server ID (server ID "36944341083347332106_8") in the sample list 3309 of server IDs. As shown, this second server is a member of negotiating groups numbers 33, 70, 9, 50, 93, 38, 85 and 34.

After all of the weighting is assigned, the hash values may be organized into hash rows of a hash allocation table (HAT) 3311. There are numerous algorithms that can perform the hash organization in this fashion. Consider, for example, negotiating group 10 which corresponds to hash row "10" in the HAT 3311. As seen in FIG. 33, hash row "10" includes server ID "27946418453657386492" which is the first server ID in the sample list 3309 and server ID "29497889711560748519" which is the eighth server ID in the sample list 3309. Notice that both the first row and eighth row in the intermediate table 3310 include a "10" which indicates that the first and eighth server IDs are both members of the tenth negotiating group.

Figure 34:
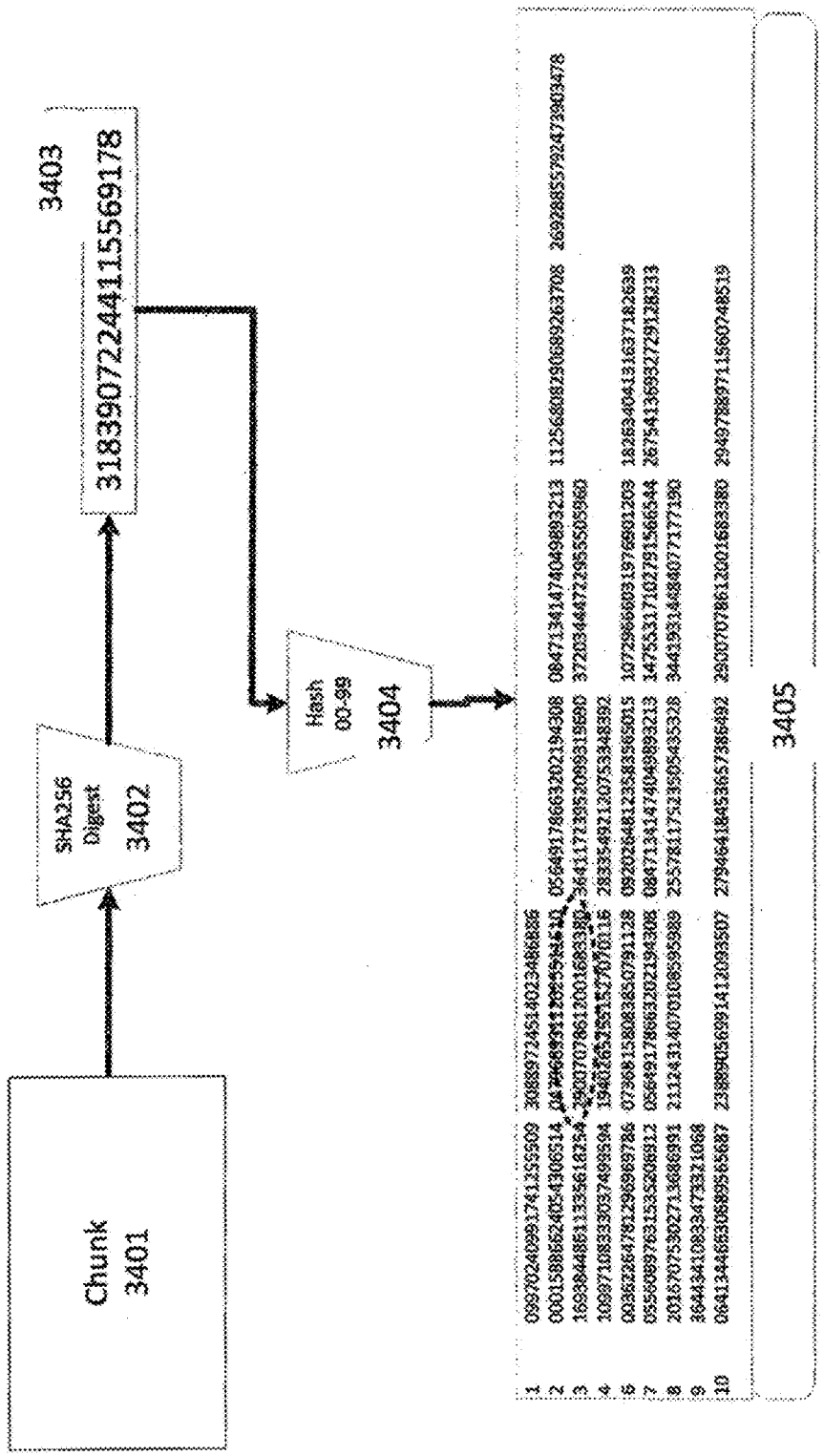
FIG. 34 depicts processing of a chunk hash ID to determine a set of server IDs in an object storage system in accordance with an embodiment of the invention.

FIG. 34 depicts processing of a chunk hash ID to determine a set of server IDs in an object storage system in accordance with an embodiment of the invention. In FIG. 34, a chunk 3401 has its content passed through a cryptographic hash Algorithm 3402 (SHA256, in this example) which generates a cryptographic hash digest 3403 of the content. In the example illustrated, that digest is further processed by a hash algorithm 3404 which reduces the hash to a small number, assuming that the hash algorithm is a cryptographic hash algorithm or of similar high quality to provide for a predicatably uniform distribution of the hash results. In the illustration the small number is represented as 00-99, but is more likely to be a power of 2 that is between $2^5$ and $2^6$. The small-number hash in this example is used to index a table 3405 which contains the lists of servers (server IDs) that are the superset of the servers that are designated to hold the manifest for the object. In this example, the table 3405 would have one hundred rows due to the range of the hash algorithm 3404.

In an alternative implementation, each row of the table could represent a range of the cryptographic hash results. Indexing the table in this fashion would allow more precise balancing of the table at the cost of increasing the cost of searching it. Any implementation may consider those tradeoffs for itself based on current processing and memory capacities. Either method of indexing is compatible with the presently-disclosed solution.

Selected Inventive Aspects Relating to the Object Storage System Using Multicast Transport Inventive Aspect 1: Storage Cluster without Bottlenecks or Single Points of Failure A method for a cluster of storage servers to distribute chunks encoding object metadata and data without central bottlenecks or single points of failure while allowing dynamic factors, such as available storage capacity, work queue depths, available buffer space and overall workload on specific storage servers, to impact the assignment of chunks to specific storage servers and/or the selection of which replica of a chunk will be read on retrieval; the method comprising:

Using a shared and distributed Hash Allocation Table (HAT) to assign responsibility for providing storage services for a chunk to a subset of the storage cluster servers based on a cryptographic hash of either the chunk payload or its object name, wherein a search of the Hash Allocation Table using the cryptographic hash yields a tuple that includes a multicast group address (referred to as the Negotiating Group) for this subset of servers;

Dynamically determining the set of servers to store a chunk by using a multicast transport service.

Inventive Aspect 2: Retrieving Chunks without Server Foreknowledge

The method of retrieving a chunk which was put into persistent storage according to the method of Inventive Aspect 1 without prior knowledge of the specific Rendezvous Group selected for the chunk or its membership by using multicast messaging to the Negotiating Group to obtain response bids from members of the Negotiating Group so that a best response can be selected.

Inventive Aspect 3: Chunk Distribution is a Subset of the Negotiating Group

The method of Inventive Aspect 1, wherein the control over the distribution of a chunk amongst the storage servers is assigned to a subset of the cluster, referred to as the Negotiating Group; wherein the members of this group will collaborate with each other using multicast messaging.

Inventive Aspect 4: Selecting a Negotiating Group

The method of Inventive Aspect 1, wherein the Negotiating Group is selected on any server in the storage cluster by mapping a chunk's Hash ID, which is a cryptographic hash of either the object's name or the chunk's payload, to a tuple specifying a multicast address to reach this set of servers and enumerating the set of servers within the group.

Inventive Aspect 5: Put Procedure with Client Consensus

The method of Inventive Aspect 1, wherein a put of a new chunk is comprised of:

Having the source for the new chunk determine: the Content Hash ID for a chunk by applying a cryptographic hash algorithm to the chunk payload; and for chunks that encode the root of the metadata for an object version the Name Hash ID for the object name by apply a cryptographic hash algorithm on the name of the object; and selecting the Name Hash ID as the Chunk Hash ID if the Name Hash ID exists and the Content Hash ID otherwise. Having the Source look up a tuple using the Chunk Hash ID to obtain a reference to the Negotiating Group responsible for this Chunk Hash ID;

Having the Source multicast a Put Proposal to the Negotiating Group which identifies the chunk to be put including its Content Hash ID and Name Hash ID if it exists, the size that will be transferred and the identity of the Rendezvous Group that will be used for any resulting Rendezvous Transfer.

Having each recipient of the multicast Put Proposal send a Put Accept message which indicates one of the following:

That the responder already has the specified chunk, and does not need it to be transferred again.

That the responder does not have the specified chunk, and indicates when it would be able to receive the chunk via the Rendezvous Group specified in the Push Proposal and the maximum bandwidth that it can commit to accepting. Further, the responder will take appropriate action under the multicast protocol in use as required for a multicast recipient to receive the messages send to this group.

That the responder does not have the specified chunk, but that it will not be able to accept the chunk at this time. This response further indicates that earliest time at which the Source could expect this server to accept a Push Proposal for this chunk.

Having either the Chunk Source or the entire Negotiating Group collect the Push Accept messages and determining based on those replies whether delivery is needed, and if it is needed what the membership of the Rendezvous Group should be;

Communicating that consensus, if determined within the Negotiating Group, with the Chunk Source;

Having the Chunk Source perform a Rendezvous Transfer of the Chunk to the Rendezvous Group.

Having each recipient of the Multicast Chunk Put message send a Payload ACK message either unicast to the Source or multicast to the Negotiating Group;

Relaying the potentially aggregated Payload Acks either to the Chunk Source or to the Negotiating Group as needed.

Having the Chunk Source retry putting the chunk after a random duration back-off if there are not yet sufficient replicas of it stored.

Inventive Aspect 6: Finding a Chunk or Chunk Replica without Foreknowledge of Location The method of Inventive Aspect 1, wherein a chunk may be retrieved without prior knowledge of which specific storage servers have replicas of that chunk; the method comprising:

Determining the Chunk Hash ID of the chunk to be retrieved either by . . .

Having the chunk sink determine the Negotiating Group for this chunk.

Negotiating with the members of the Negotiating Group which replica will be delivered to the chunk sink and when.

Allowing members of the Negotiating Group which do not have the replica, but which desire to have a replica, to join the Rendezvous Group.

Having the selected member of the Negotiating Group deliver the chunk to a Rendezvous Group containing at least the chunk.

Inventive Aspect 7: Retrieval of Objects Referenced within an Object

The method of 0 Aspect 6, wherein retrieval of objects referenced in a first retrieved object may be optimized by the responding storage server; the method comprising:

Multicasting an extended Get Request to the Negotiating Group for the referenced Chunk which specifies the same Rendezvous Group as the triggering Get Request; wherein the Get Request is extended to specify the relative chunk position in the overall delivery.

The initiating client omitting issuing its own Get Requests for chunks referenced in the original requested chunk to the extent that it has enabled automatic retrieval of referenced chunks.

Inventive Aspect 8: Editing Mapping of Hash IDs to a Hash Allocation Table

A method for editing the mapping of Hash IDs to a Hash Allocation Table tuple; the method comprising:

Using versioned updates of a configuration object to assign sets of Multicast Addresses to specific rows of the Hash Allocation Table and to track the pool of unassigned Multicast Addresses.

Changing the membership of storage servers to specific rows of the Hash Allocation Table by multicast edits wherein each has a unique version number comprised of a timestamp and a source identifier of the server submitting the edit; and wherein each storage server will apply the edits in the correct order as received, rolling back to a prior version and reapplying edits that had been received out-of-order; and wherein a hash signature of the resulting table is communicated through the keep-alive system to acknowledge receipt of edits; and where-in a storage server that detects it has not received all edits will first request that those edits be retransmitted and then drop from the ring and rejoin so as to rebuild its local copy of the Hash Allocation Table.

Glossary of Terms for Sections I and II

The following select definitions are presented to illuminate specific embodiments of the presently-disclosed invention, but they are not necessarily meant to limit the scope of the invention.

Arbitrary Chunk ID—A Chunk Identifier supplied by an outside entity, such as an HDFS namenode, to identify a specific Chunk. This identity has no known relationship with the chunk payload, but as with any Chunk ID will not be re-used to reference different chunk payload for at least twice the lifetime of the chunk.

Better Response—A Better Response for the same chunk is "better" if the combined Timestamp and Source fields represent an "earlier" response, or if the version of a chunk is later (more recent).

CCOW™ (Cloud Copy on Write™)—CCOW is an object storage system created by Nexenta Systems that could utilize the present invention. One of the defining characteristics of CCOW is that the chunks are:

Created once.
Accessed and replicated multiple times.
Never updated.
Eventually deleted.

Chunk—A "chunk" is typically a description for a subset of an object. That is, an object is typically split into multiple chunks. In other object storage systems that we have studied, the chunks of an object and the metadata of an object are treated as two separate types of data and are treated differently and stored differently. In accordance with an embodiment of the present invention, the metadata can be accessed as either metadata or as a chunk. Thus, the term chunk can refer to any subset of the metadata or data for a version of an object, without regard to how uniform or divergent the handling of metadata is from data in a specific storage system.

Chunk ID—The identifier of a Chunk which can never refer to different chunk payload for a period that is at least twice as long as the lifespan of a chunk. This is the Content Hash ID in an exemplary embodiment, but it can be an Arbitrary Chunk ID supplied by a centralized metadata system (such as an HDFS namenode) in some embodiments of the present invention.

Chunk Manifest—A Chunk which holds Chunk References but which is not a Version Manifest, but instead represents a nested portion of the full Chunk Reference list for a Version Manifest. It is referenced by its Chunk ID in the parent Version Manifest or Chunk Manifest.

Chunk Put—A Chunk Put is an operation or a PDU which transfers the payload and metadata of a chunk to the Rendezvous Group. See 'Chunk Put Proposal' for an explanation of how these terms may be viewed either as an operation or as a PDU.

Chunk Put Proposal—An operation, or a PDU (depending on which layer the reference is used in) which proposes a Chunk Put using reserved bandwidth. When discussing the algorithm for assigning persistent storage responsibility, this is an abstract operation. When discussing the specific protocol used to implement that collaboration, this is a PDU.

Content Hash ID—The Content Hash ID is a cryptographic hash (typically SHA256 or other suitable hash) that represents a digest of the chunk payload (after optional compression).

Designated Servers—In a preferred embodiment, the set of servers responsible for the long-term storage of a chunk. The designated server list is a subset of the Negotiating Group. A server may be the designated server for a set of chunks.

Distributed Hash Allocation Table—A table used in the preferred embodiment implemented on multiple servers. It maps a range of Hash IDs to a Multicast Address Set and an enumerated list of designated members. When non-IGMP transport protocols are used it would also enumerate other classes of members.

Failure Domain—A domain where storage servers are deployed where there is increased risk of concurrent failure of multiple servers. Therefore, it is undesirable to rely on independent replicas of a given chunk to be stored within the same failure domain. For example, two storage servers that share a single power source would not provide two independent replicas. A single failure could lose access to both replicas.

Gateway Servers—In a preferred embodiment, the set of servers responsible for making special replications of chunks that do not get added to the Chunk's replication count. These servers are used as the front-end or gateway to either archival storage or as gateways to a remote cluster that shares knowledge of assets. The gateway server list is a subset of the Negotiating Group.

Hash Allocation Table—A collection of mappings for ranges of Hash IDs to a Negotiating Group of storage servers and a Multicast Address that can be used to reference them. All servers in the storage cluster have identical Hash Allocation Tables, or at least Hash Allocation Tables that have no conflicting rows. The Hash Allocation Table may be considered to be a specialized form of a Distributed Hash Table. Chunks are found in the Hash Allocation Table in the same manner that they would be found in a Distributed Hash Table. The Hash Allocation Table is specialized in that it is maintained by distributed editing rather than by being generated on each server using the Distributed Hash Table from the same set of inputs.

Hash ID—The Chunk Hash ID is a cryptographic hash (typically SHA256 or other suitable hash, such as SHA-512 or SHA3) that represents a digest of the chunk's data or of the Object Name Identifier (also known as the Name Hash ID—typically a string of encoded text). In the present disclosure, this is used to control the selection of the Negotiating Group for a chunk, either the Name Hash ID or the Content Hash ID.

Jittered Delivery—Jittered delivery is where not all recipients will receive their copies at the same time. Some recipients will receive a chunk when it is first broadcast while other recipients will receive a chunk during a later "retry" to insure that a sufficient number of the targeted recipients have received their copies.

Keep-Alive Ring—A Keep-Alive Ring is a distributed software component which enables a distributed set of servers to determine the set of servers which have joined the ring and which are still capable of communicating with the ring. Typically, when a departure or addition is detected, each member of the ring will notify its local clients of the new or departed servers.

Most Frequently Used (MFU)—A data item is tagged with a frequency counter that marks how frequently it is referenced within a given time window. MFU may be combined with Most Recently Used to determine if a data item should be retained on a queue or deleted from a queue.

Most Recently Used (MRU)—Each time that a data item is referenced, it may be tagged with a timestamp (many implementations are possible). Each time that the queue of data is referenced, the queue may be examined for a combination of MFU and MRU to determine which data items (e.g. chunks) should be removed from a queue.

Multicast Address—A Multicast Address is a network address that enables a message to be sent to a group of destination endpoints. In most embodiments of the present invention, this will be an IP multicast address.

Multicast Address Set—A set of Multicast Addresses that enables a message to be sent to all members of a matching group. The set can be represented as a two-dimensional array. One dimension represents different parallel networks that can reach the same storage servers but over distinct network resources. For each physical network that the storage servers are attached to, one of the multicast addresses in a Multicast Address Set is to be used. The second dimension allows definition of subsets of the Negotiating Group. For example a second multicast address can be created for each Negotiating Group that is subscribed by servers wishing to receive notification of new named chunks. In the preferred embodiment, the Multicast Address Set is assigned to a Distributed Hash Allocation Table using a configuration object.

Multicast Group Address—A Multicast Group Address is a single address which will direct a packet to be delivered to a group of end stations. Multicast addresses are defined for both Layer 2 and Layer 3 protocols. Ethernet is the primary example of a layer 2 protocol, while IP is the primary example of a Layer 3 protocol.

Multicast Rendezvous Group—The Multicast Rendezvous Group is the subset of the Negotiating Group that are selected for either getting copies of an asset (Chunk, Chunk Manifest or Version/Named Manifest) when it is GET or PUT. In a preferred embodiment, the GET membership is the server that has provided delivery of the "Best Response" of the asset. The PUT membership is the set of servers that provided not only optimum storage (e.g., quickest movement to non-volatile storage, but also the best diversity across "Failure Domains").

Name Hash ID—A Name Hash ID is a Hash ID of the name of an object for a chunk holding the base of the metadata for a version of an object. It is derived from the object name, rather than from the chunk content.

Negotiating Group—A Negotiating Group is the group of storage servers that are collectively assigned responsibility to provide access to Chunks for a specific range of Hash IDs. A Negotiating Group may also be referred to as a Designated Super-Group. Typically the Negotiating Group is found by searching the Distributed Hash Allocation Table. Each range of Hash IDs, which corresponds to a row in the Distributed Hash Allocation Table, has a Multicast Address which can be used to address all members of the group. Alternatively, a central metadata system (such as an HDFS namenode) can specify the membership of a Negotiating Group. The presently-disclosed solution allows virtually unlimited scaling of a storage cluster because no matter how large a cluster is, only the members of the Negotiating Group are relevant to the operations on any specific chunk. Doubling the size of the cluster only requires doubling the number of Negotiating Groups.

Notification Servers—In a preferred embodiment, the set of servers that have requested notification when Chunks with a matching Hash (e.g. an Object) have been updated. These servers are most office client servers or proxies that are on a notification queue that will provide information on updates to previously created Chunks. In the preferred embodiment, this is most frequently used for the hash of the name of an object. The notification server list is a subset of the Negotiating Group.

Payload ACK—A Payload ACK is a PDU sent by the recipient of a Chunk Put message to indicate whether the payload was received successfully.

PDU (Protocol Data Unit)—An encoding of a message used to communicate between peers at the same layer, as in an OSI layered model of network communications.

Persistent Storage—Storage for encoded data that is reasonably expected to survive (be available for retrieval) even across a power outage.

Put Accept—A response to a Chunk Put Proposal that specifies whether the storage server already has the identified chunk, or if not when it could receive it, or when it cannot accept the chunk at this time.

Reception Window—The time period (in microseconds) after the time of the Get Request that contains the Reception Window, when the Requestor will desire delivery of the Get Request.

Relayed ACK—A relayed ACK is a PDU sent from the Chunk Source to the Designated Super-Group which relays one more received Payload ACKs so that every member of the Designated Super-Group can be aware of exactly how many replicas of a specific chunk have been successfully created.

Rendezvous Group—The group of storage servers selected to receive a replica of a chunk during a chosen rendezvous of chunk transmission.

Rendezvous Time Window—A Rendezvous Time Window is a proposal for, or consensus upon, a time window for the delivery of a specific chunk to a Rendezvous Group. This includes a start time, duration and a maximum bandwidth.

Rendezvous Transmission—A rendezvous transmission is a transmission of Chunk content that is multicast to a Rendezvous Group. This is a step in either a get or a put of a chunk.

Relayed Unicast Delivery—Relayed Unicast Delivery is the simulation of a multicast delivery in a network environment where multicast is not allowed by network policies. With Relayed Unicast delivery, the packet is delivered once by the originator to the first member of the Rendezvous Group using a Unicast protocol such as TCP/IP (virtual circuits). Each recipient of the chunk with the Rendezvous Group will remove their server id from the list of recipients and then forward the chunk and recipient list to the next reachable Service Level Agreements—Contractual arrangements between hosting or Storage as a Service (SAAS) companies and their customers that guarantee the retention of data and the response time for the availability of data.

Shared and Distributed Hash Allocation Table (HAT)—A Shared and Distributed Hash Allocation Table (HAT) is an object instantiated on each storage server, and potentially on Chunk Sources as well, which encodes the mapping of a range of Hash IDs to Distribution Table tuples. This is most likely to take the form of a sorted array of table entries. The methods for allowing safe access to the table while allowing ongoing updates will be implementation specific, but can include a wide variety of techniques for doing so.

Unsolicited Commands—Commands such as get or put that have an urgent and small request. They will typically include the payload as part of the command rather than proposing that the payload is sent and waiting for round trip times to confirm the delivery request, the payload is included with the command. Unsolicited commands are sent using unsolicited bandwidth. Unsolicited bandwidth is reserved stochastically for an anticipated probable maximum, rather than being reserved for specific transfers.

Version Manifest Chunk—A chunk which holds the root of metadata for an object and which has a Name Hash ID. The term used for such chunks in the Nexenta CCOW storage system is Version Manifest.

Volunteer Servers—In a preferred embodiment, Volunteer Servers are those servers that volunteer to make extra copies of a Chunk, in anticipation that the Chunk will be requested in the near future. Analogous to the Adaptive Replacement Cache which is used in ZFS storage, in one embodiment the Volunteer servers use a combination of Most Recently Used (MRU) and Most Frequently Used (MFU) Chunks to determine which chunks are maintained in their local storage. The copies of Chunks that are placed in these servers are not counted as Designated Copies. The Chunks in these servers are normally held for relatively short periods of time and in preferred embodiments can be deleted almost at will. The only exception to this is, if the Chunk has not yet had a sufficient number of Designated copies committed to long-term storage.

Introduction to Two Distinct Uses of Key-Value Data

The following sections describe two distinct uses of "key-value" data. For purposes on understanding, it is important to keep the difference clear between these two distinct uses.

First, as described below in Section III, "typed key-value tuples" (i.e. key-value pairs of designated types) may be persistently stored locally for each storage device. This may be accomplished using a key-value storage application programming interface (key-value storage API). This API is used even when the ultimate storage is on conventional storage devices with sector-based reads and writes.

Second, as described below in Section IV, the payload for each version of an object may be defined as a collection or set of key-value records. As described below in this section, "sharding" techniques are provided to support the definition of key-value records in objects in a distributed storage layer.

III. Key-Value-Tuple Encoded Storage

The present section describes systems and methods for Key-Value-Tuple-encoded (KVT-encoded) object storage. The KVT encoding taught in this section may be applied for an object storage system, such as the scalable object storage system described above in Section II.

The KVT-encoding structure disclosed herein is preferably used in an object storage system employing distributed copy-on-write. This is because different lifespans for different KVT slices are desirable when used in conjunction with a distributed copy-on-write object storage system.

As taught herein, the KVT encoding may be applied to advantageously restructure content within a distributed object storage cluster, especially for object storage systems that allow payload references to be cached extensively. For such systems, being able to honor (use as valid) existing chunk references even after the underlying content has been restructured is of considerable value. Further, the KVT-encoding taught herein is completely compatible with a fully-distributed object storage cluster. That is, the restructuring may be implemented without requiring any central point of processing.

KVT-Encoding Structure

Figure 35:
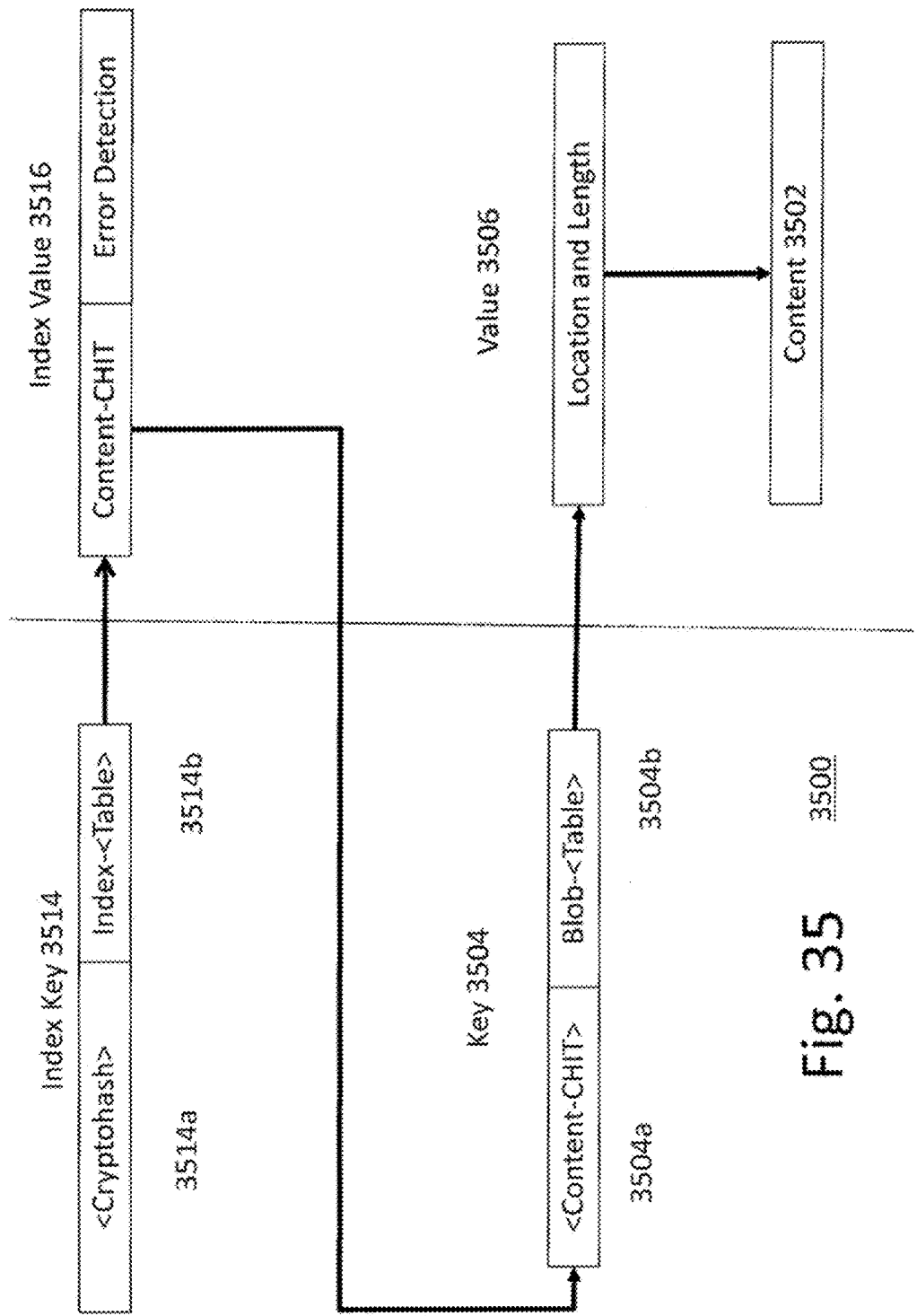
FIG. 35 depicts an exemplary implementation of KVT-encoding structure for content stored in persistent storage supporting a single storage device in accordance with an embodiment of the invention.

FIG. 35 depicts an exemplary implementation of KVT-encoding structure 3500 for content stored in persistent storage supporting a single storage device in accordance with an embodiment of the invention. In particular, the stored content (Content 3502) may be the content (either payload or metadata) of a Chunk.

A first (primary) KVT entry associated with the stored content comprises a Key 3504 and a Value 3506 which may be stored inline with the Key 3504 (i.e. in a known location relative to the Key 3504). The Key 3504 may be a fingerprinted Blob (binary large object), and the Value 3506 may be a Pointer having a location (and length) that points to the Content 3502.

As shown, the Key 3504 comprises a content-derived hash index 3504a and a user-supplied binary large object (Blob) 3504b. As shown, the content-derived hash index 3504a may be a Content Hash Identifying Token (CHIT) based on the Content 3502 (<Content-CHIT>). The Content-CHIT serves as a fingerprint of the Content 3502. As further shown, the user-supplied Blob 3504b may be a Blob form of a Table (Blob-<Table>), where the Table indicates a type of the Content 3502. Note that the Content 3502 and the Content-CHIT 3504a may be used to cross-validate each other.

For many (but not all) chunks, an Index KVT entry may also be created. The Index KVT entry comprises an Index Key 3514 and an Index Value 3516. The Index Value 3516 may be stored inline with the Index Key 3514 (i.e. in a known location relative to the Index Key 3514), and the Index Value 3516 provides an index to the location of the Key 3504 of the first (primary) KVT entry.

As shown, the Index Key 3514 may comprise a Storage Device Key 3514a and a Chunk Slice type 3514b. This Storage Device Key 3514a identifies the chunk being referenced and may be in the form of a cryptographic hash (<Cryptohash>). The Storage Device Key 3514a may be used as a secondary index (for example, a Name index) for the Content 3502. The Chunk Slice Type (Index-<Table>) 3514b identifies the Table (also referred to herein as the Category or Type) of Index KVT entry.

The Index Value 3516 may comprise the Content-CHIT with error detection data for validating the Index KVT entry. The Content-CHIT in the Index Value 3516 provides an index to the Key 3504 of the first (primary) KVT entry associated with the Contents 3502.

Figure 36:
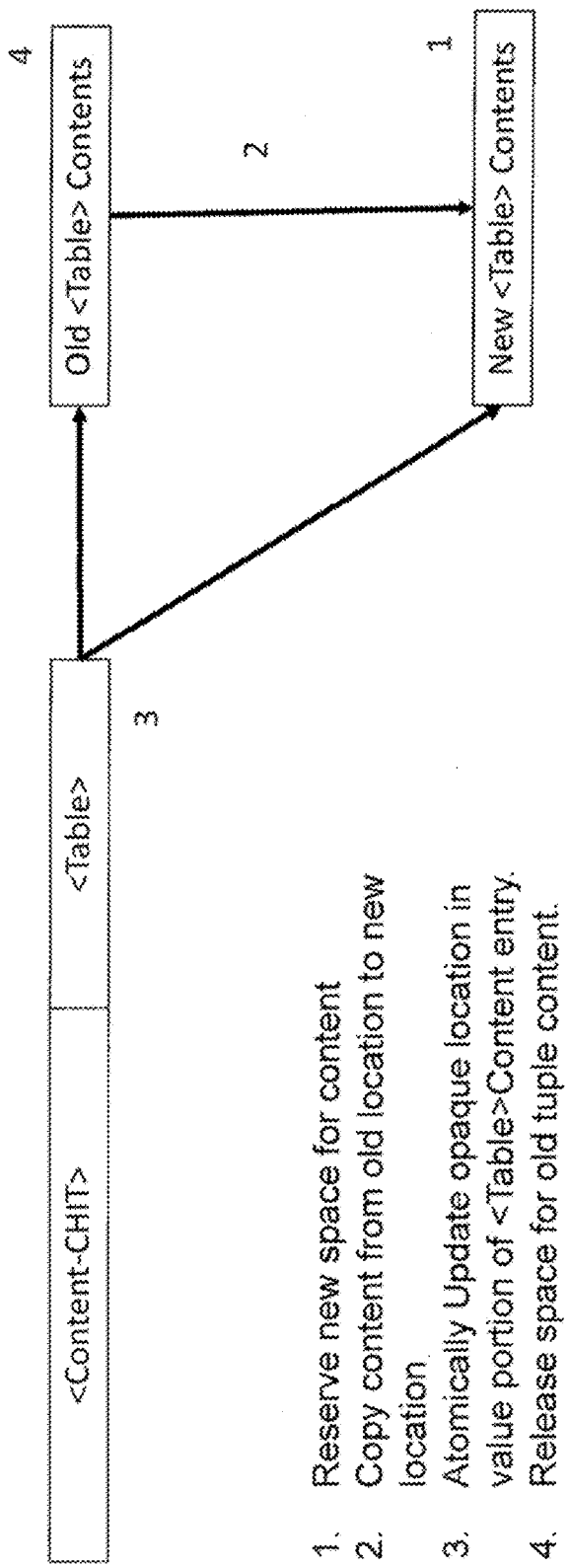
FIG. 36 depicts an exemplary method of relocating content encoded with the KVT-encoding structure in accordance with an embodiment of the invention.

FIG. 36 depicts an exemplary method of relocating content encoded with the KVT-encoding structure in accordance with an embodiment of the invention. This exemplary method shows a substantial advantage of KVT-encoding. With this method, content may be transparently migrated as follows:

In a first step (1), new space for a replica of the content to be moved is reserved. In a second step (2), the content is copied from the old location (Old<Table>Contents) to the new location (New<Table>Contents). In a third step (3), the location and length in the Value portion of the KVT entry (see above discussion of FIG. 35) may be updated atomically. In a fourth step (4), the space for the old location may be released and returned to a free pool.

Figure 37:
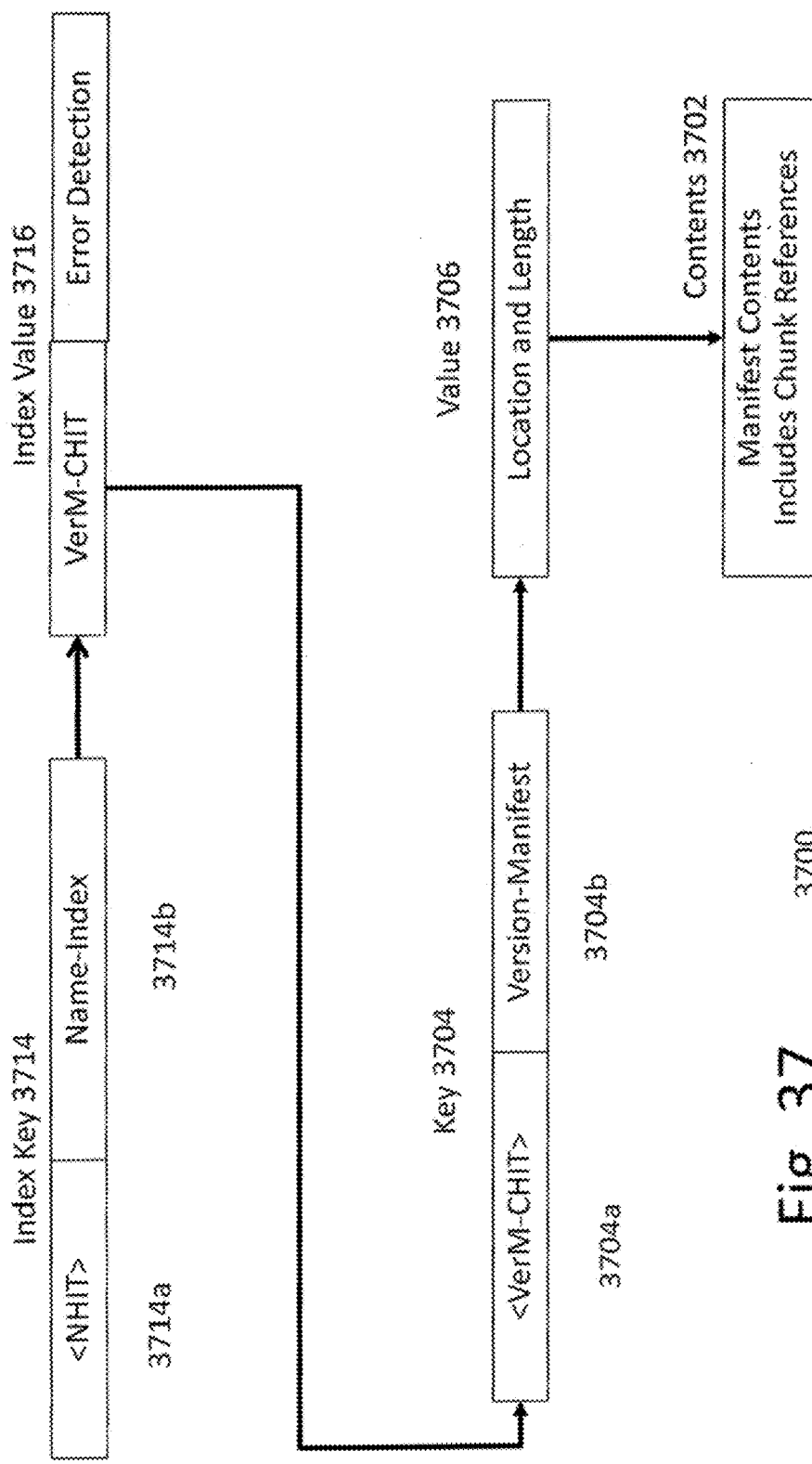
FIG. 37 depicts an exemplary KVT-encoding structure to implement persistent storage of information about chunks in accordance with an embodiment of the invention.

FIG. 37 depicts an exemplary KVT-encoding structure 3700 to implement persistent storage of information about chunks (i.e. chunk metadata) in accordance with an embodiment of the invention. In the illustrated example, the stored information comprises Contents of a Version Manifest (Manifest Contents) 3702 for an Object. The Manifest Contents 3702 may include multiple Chunk References. The Chunk References may reference chunks by a) logical offset and b) logical length plus c) either a VerM-CHIT, or a Payload-CHIT, or an inline designation.

A first (primary) KVT entry associated with the Manifest Contents 3702 comprises a Key 3704 and a Value 3706 which may be stored inline with the Key 3704 (i.e. in a known location relative to the Key 3504). As discussed above in relation to FIG. 35, the Key 3704 may be a fingerprinted Blob, and the Value 3706 may be a Pointer having a location (and length) which points to the location of the Manifest Contents 3702. The Key 3704 and Value 3706 may be stored inline.

In this case, the Key 3704 comprises a CHIT for the Manifest Contents (<VerM-CHIT>) 3704a and a Blob form of the Version Manifest Table (Version-Manifest) 3704b, where the Version Manifest Table corresponds to the Category associated with Version Manifests. The VerM-CHIT serves as a fingerprint of the Manifest Contents 3702. Note that the Manifest Contents 3702 and the VerM-CHIT 3704a may be used to cross-validate each other.

As shown in the figure, a Name Index KVT entry is also present in this KVT-encoding structure 3700. The Name Index KVT entry comprises an Index Key 3714 and an Index Value 3716 (which may be stored inline).

The Index Key 3714 comprises a Name Hash Identifying Token (NHIT) 3714a as the Storage Device Key and a Name Index type 3714b as the Chunk Slice Type. The NHIT is an identifying token of an Object formed by calculating a cryptographic hash of the fully-qualified object name. The NHIT includes an enumerator specifying which cryptographic has algorithm was used as well as the cryptographic hash result itself. The Name Index type corresponds to the Category for a Name of an Object.

The Index Value 3716 may be a CHIT for the Version Manifest (VerM-CHIT) with error detection data for validating the Name Index KVT entry. The VerM-CHIT in the Value 3716 effectively points to the VerM-CHIT in the Key 3704 of the first (primary) KVT entry associated with the Manifest Contents 3702.

Note that, one aspect of an embodiment of the present invention involves supporting layering of any form of data via Manifests (i.e. Universal Manifests). Hence, a Manifest is generalized beyond Version Manifests and Chunk Manifests. This generalized Manifest may encode metadata as well as chunk references to payload. This allows nesting of Manifests to encode key/value metadata.

Figure 38A:
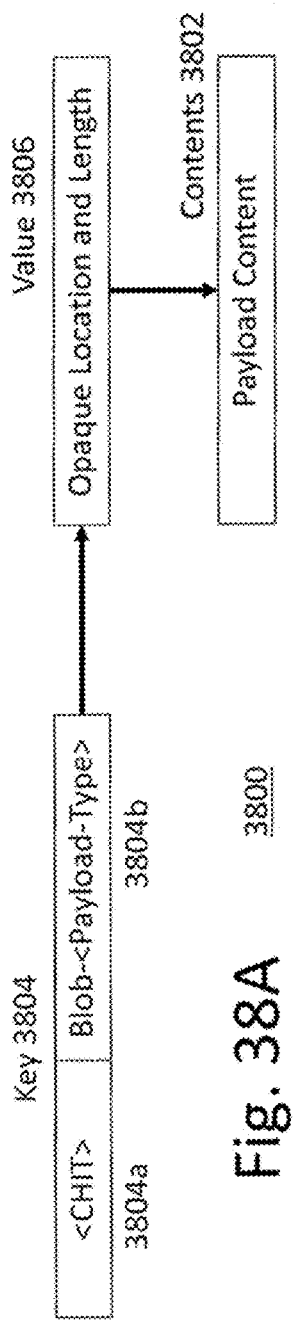
FIG. 38A illustrates an exemplary KVT-encoding structure of a payload in accordance with an embodiment of the invention.

FIG. 38A illustrates an exemplary KVT-encoding structure 3800 for payload content in accordance with an embodiment of the invention. In particular, the Payload Content 3802 may be that of a Payload Chunk which stores the portion of the payload for an Object.

A first (primary) KVT entry associated with the Payload Content 3802 comprises a Key 3804 and a Value 3806 which may be stored inline with the Key 3804 (i.e. in a known location relative to the Key 3804). As discussed above in relation to FIG. 35, the Key 3804 may be a fingerprinted Blob, and the Value 3806 may be a Pointer having a location (and length) which points to the location of the Payload Content 3802.

In this case, the Key 3804 comprises a content-derived hash index in the form of a CHIT for the Payload Content (<CHIT>) 3804a and a Blob form of the Payload Type (Blob-<Payload-Type>) 3804b, where the Payload Type is the Category associated with payloads. The CHIT 3804a serves as a fingerprint of the Payload Content 3802. Note that the Payload Content 3802 and the CHIT 3804a may be used to cross-validate each other.

Figure 38B:
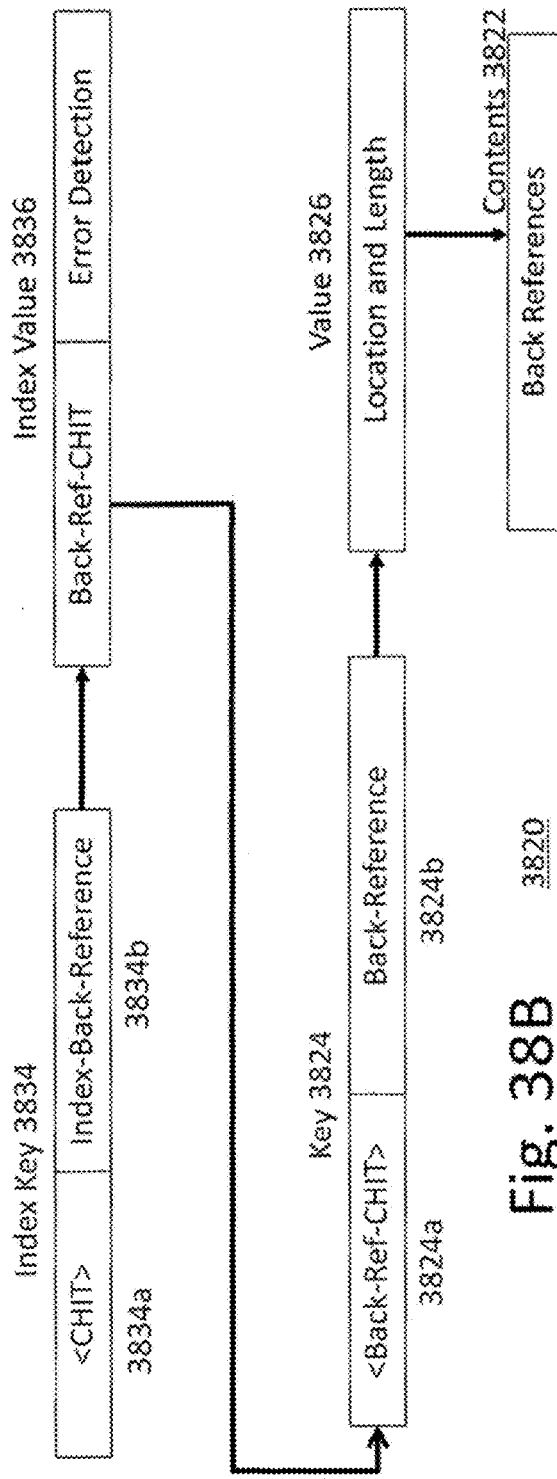
FIG. 38B illustrates an exemplary KVT-encoding structure of a back reference in accordance with an embodiment of the invention.

FIG. 38B illustrates an exemplary KVT-encoding structure 3820 for Back References in accordance with an embodiment of the invention. The Back-References content 3822 provides references back from a Chunk to Objects of which the Chunk is a part.

A KVT entry associated with the Back-References content 3822 comprises a Key 3824 and a Value 3826 (which may be stored inline).

A first (primary) KVT entry associated with the Back-References content 3822 comprises a Key 3824 and a Value 3826 which may be stored inline with the Key 3824 (i.e. in a known location relative to the Key 3824). As discussed above in relation to FIG. 35, the Key 3824 may be a fingerprinted Blob, and the Value 3826 may be a Pointer having a location (and length) which points to the location of the Back-References content 3822.

In this case, the Key 3824 comprises a content-derived hash index in the form of a CHIT for the Back-References content (<Back-Ref-CHIT>) 3824a and a Blob form of the Back-Reference Type (Back-References) 3824b, where the Back-Reference Type is the Category associated with back-references content. The Back-Ref-CHIT 3824a serves as a fingerprint of the Back-References content 3822. Note that the Back-References content 3822 and the Back-Ref-CHIT 3824a may be used to cross-validate each other.

As shown in the figure, a Back-Reference Index KVT entry is also present in this KVT-encoding structure 3820. The Back-Reference Index KVT entry comprises an Index Key 3834 and an Index Value 3836 (which may be stored inline).

The Index Key 3834 comprises a content hash identifying token (<CHIT>) 3834a as the Storage Device Key and a Back-Reference Index type (Index-Back-References) 3834b as the Chunk Slice Type. The CHIT 3834a is based on, and serves to identify, the Payload Content of the Chunk which is associated with the Back-References content. The Back-Reference Index type 3834b corresponds to the Category for Back References (from a Chunk to Objects).

While examples of KVT-encoding of payload data and meta-data (including Version Manifests, Object Names, and Back References) are described above, an embodiment of the invention includes KVT-encoding for the chunk slice types listed below in Table 3.

TABLE 3

| Chunk Slice Type | Storage Device Key | Inline Storage | Referenced Storage |
|---|---|---|---|
| Name Index | NHIT (Name Hash) | Manifest-CHIT Error Detection | |
| Version Manifest | Manifest-CHIT | Location and Length of Manifest Contents | Manifest |
| Content Manifest | Manifest-CHIT | Location and Length of Manifest Contents | Manifest |
| Back-Reference Index | Content-CHIT | Back-Reference-CHIT Error Detection | |
| Back-Reference Payload | Back-Reference-CHIT | Location and Length of Back-Reference Content | Back-References |
| Offset Payload | Content-CHIT | Location and Length of Payload. | Byte array |
| Line Payload | Content-CHIT | Location and Length of Payload | Line array |
| Key/Value Payload | Content-CHIT | Location and Length of Key/Value Payload. | Key/Value Records |

TABLE 3-continued

| Chunk Slice Type | Storage Device Key | Inline Storage | Referenced Storage |
|---|---|---|---|
| Transaction-Log | CHIT of Transaction Log content. | Location and Length of Transaction Log content. | |
| Delta-Key/Value-X-Index | CHIT of current Payload Chunk that this is a modification for. | CHIT of delta content | Delta Key/Value Payload |
| Delta-Key/Value-X-Payload | CHIT of content | Location and length of Key/Value Payload | |

Figure 39:
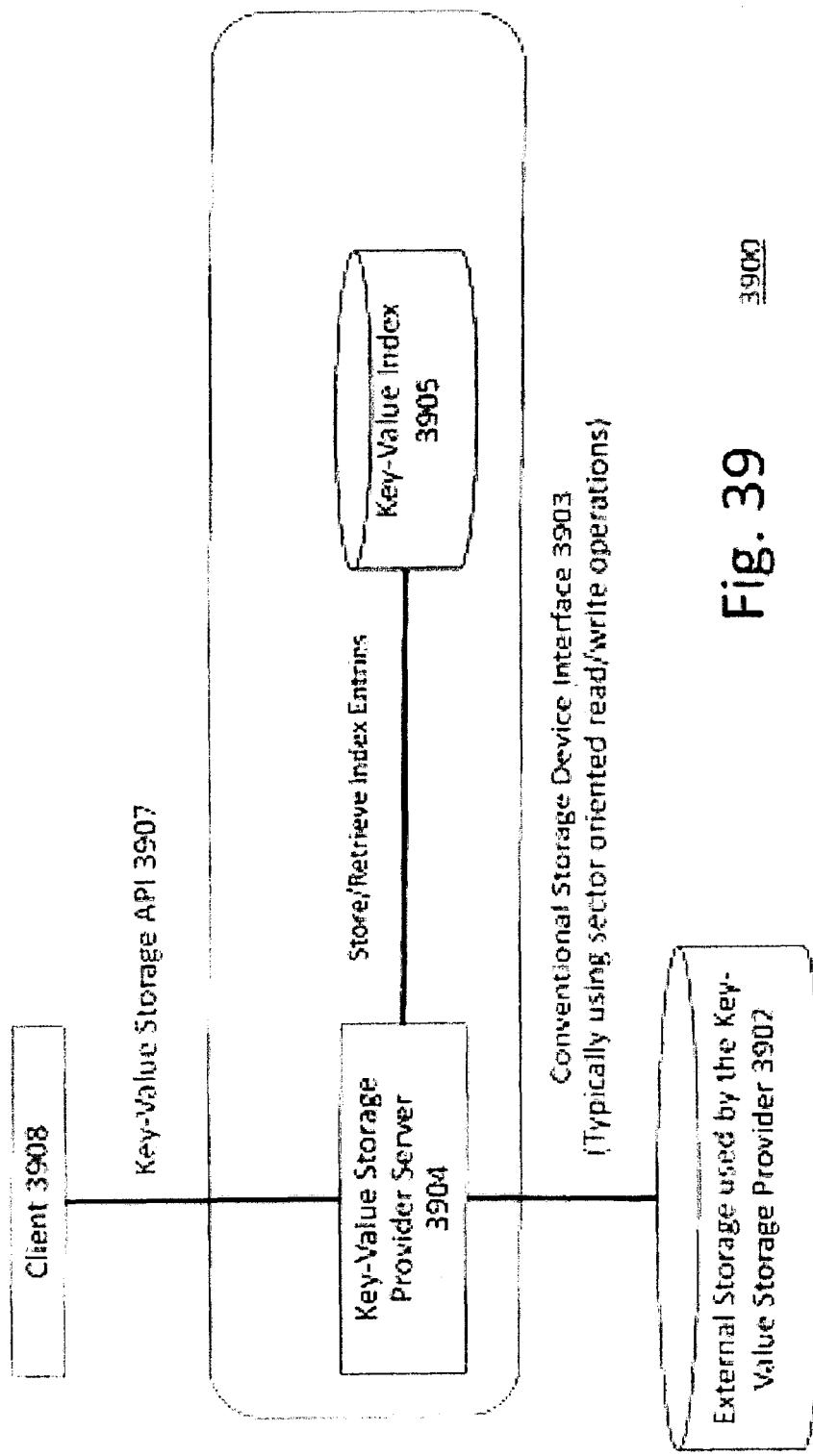
FIG. 39 depicts a system that layers a persistent key-value storage provider server above a conventional persistent storage device in accordance with an embodiment of the invention.

FIG. 39 depicts a system 3900 that layers a persistent key-value storage provider server 3904 above a conventional persistent storage device 3902 in accordance with an embodiment of the invention. As shown, a client computer system 3908 may access the storage service provided by the key-value storage provider server 3904 by way of a key-value storage application programming interface (API) 3907.

The key-value storage provider server 3904 may store content to, and retrieve content (in chunk payloads) from, one or more external storage devices 3902 via a convention storage device interface 3903. Typically, the external storage devices use sector-oriented read and write operations. For example, the external storage devices may be hard disk drives.

The content stored at the one or more external storage devices 3902 may comprise the Content 3502 in persistent storage discussed above in relation to FIG. 35. In relation to FIG. 37, the content stored at the one or more external storage devices 3902 may comprise the Manifest Contents 3702. In relation to FIG. 38A, the content stored at the one or more external storage devices 3902 may comprise the Payload Content 3802. In relation to FIG. 38B, the content stored at the one or more external storage devices 3902 may comprise the Back-References content 3822.

The key-value storage provider server 3904 may store and retrieve the KVT index entries to one or more key-value index storage devices 3905. In FIG. 35, the KVT index entries include Key 3504, Value 3506, Index Key 3514, and Index Value 3516. In FIG. 37, the KVT index entries include Key 3704, Value 3706, Index Key 3714, and Index Value 3716. In FIG. 38A, the KVT index entries includes Key 3804 and Value 3806. In FIG. 38B, the KVT entries include Key 3824, Value 3826, Index Key 3834, and Index Value 3836.

Preferably, the key-value index storage devices 3905 be on fast media (i.e. have fast access times). For example, the key-value index storage devices 3905 may be a random-access memory (RAM) disk or a solid-state drive (SSD).

Figure 39B:
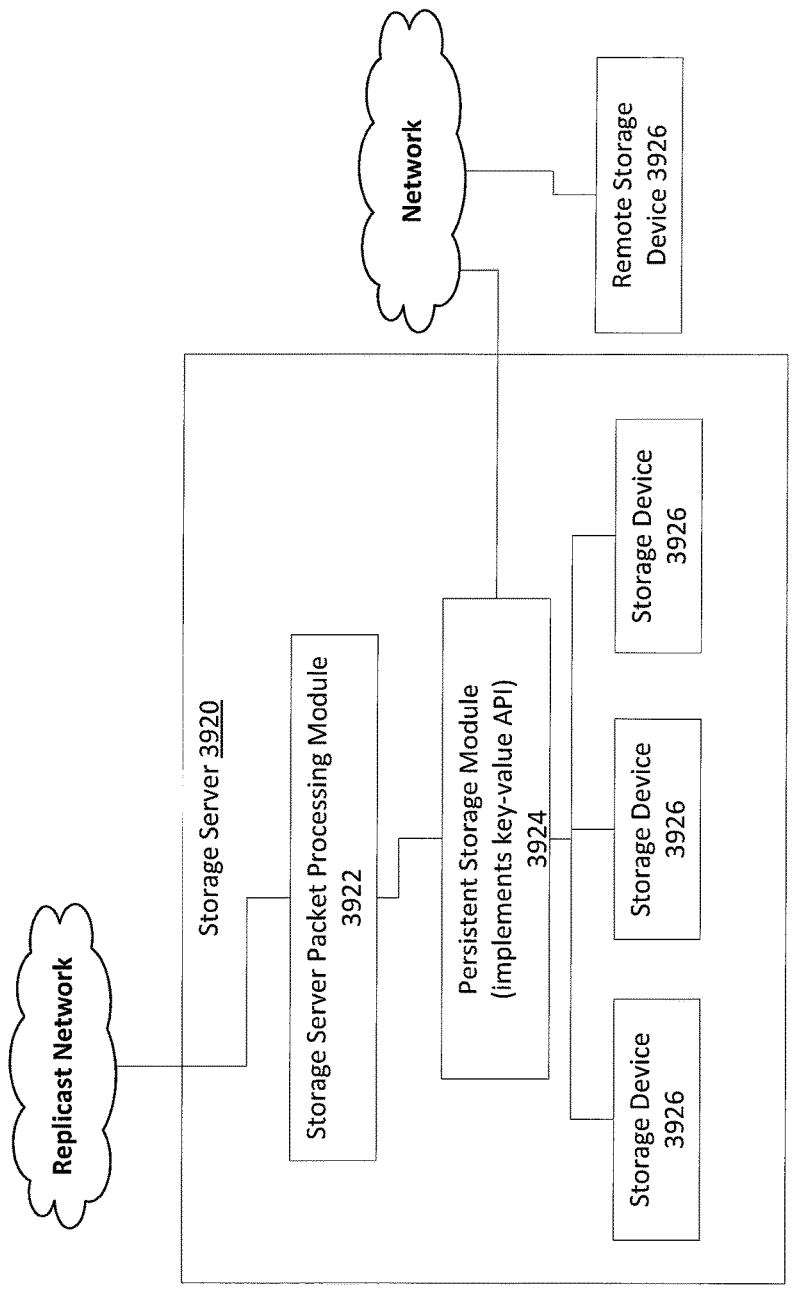
FIG. 39B illustrates an exemplary architecture for a storage server 3920 which implements persistent storage of key-value tuples in accordance with an embodiment of the invention.

FIG. 39B illustrates an exemplary architecture for a storage server 3920 that implements persistent storage of key-value tuples in accordance with an embodiment of the invention. The storage server 3920 includes:

A Storage Server Packet Processing Module 3922: the primary module that process and transmits Replicast packets to the other members of the Replicast network, which uses the locally provided persistent storage services.

A Persistent Storage Module 3924: a polymorphic module that implements a key/value API to the local (or remote) persistent storage resources.

Actual Storage Devices 3926: the actual persistent storage devices, local (or remote), used by the Persistent Storage Module to implement the key/value API.

The use of non-default Key-Value Tuples is typically a by-product of Replicast packet processing. In a typical transaction, only the payload data is transmitted over the network.

An example of a non-payload Key-Value Tuple data is the back-reference tracking data for a chunk. This data is updated when each object version referencing the chunk is put (or expunged), although the payload data itself is unaltered.

Another example of a non-payload Key-Value Tuple data is the access history data of a chunk. This usage tracking data may be updated when the chunk is accessed. Again, the chunk itself is unaltered by this usage tracking data. This usage tracking data also has the characteristic that a Storage Server could choose to erase it during a severe shortage of available storage capacity.

Figure 40:
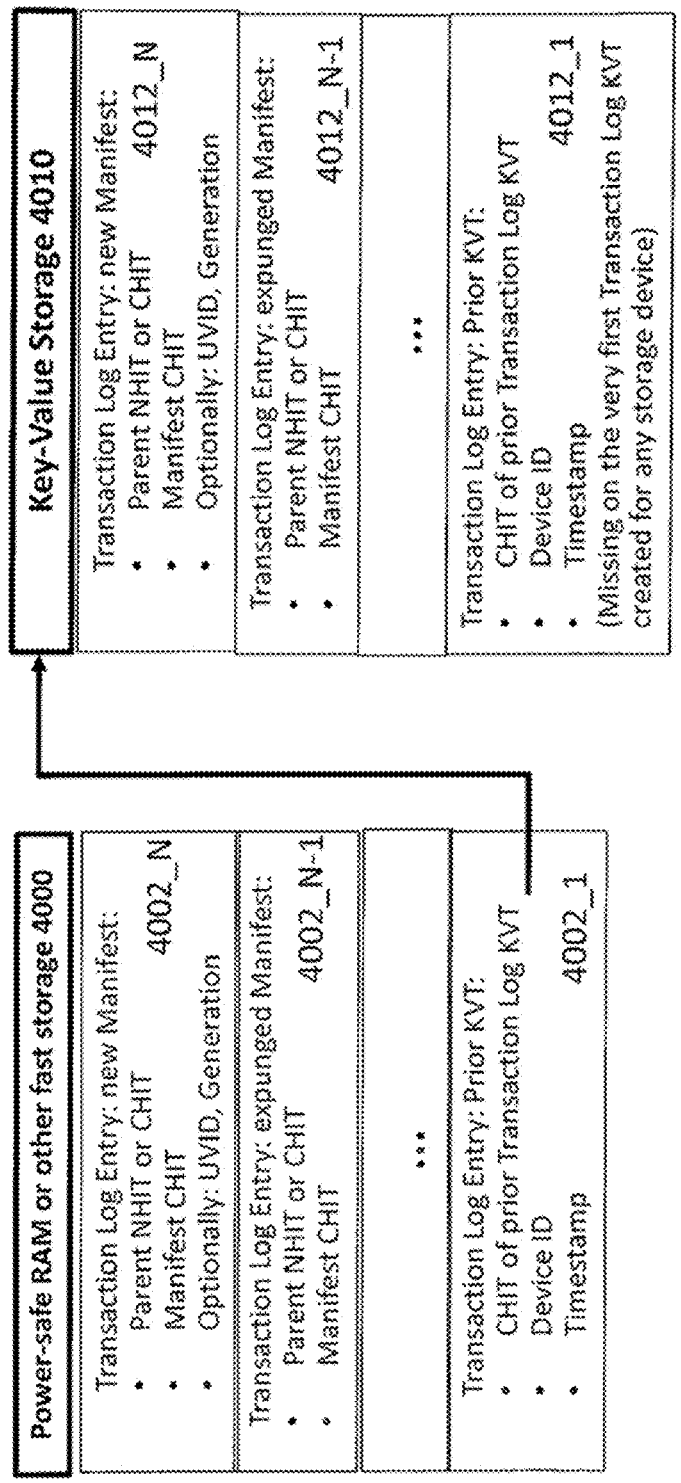
FIG. 40 illustrates an implementation of a storage device transaction log as a memory buffer for a sequence of transaction-log entries in accordance with an embodiment of the invention.

FIG. 40 illustrates an implementation of a storage device transaction log as a memory buffer for a sequence of transaction-log entries in accordance with an embodiment of the invention. A sequence of transaction log entries 4002_1, ..., 4002_N–1, 4002_N are shown being buffered in Power-safe RAM (or other fast storage, such as solid-state drives) 4000. As further shown, a sequence of replica transaction log entries 4012_1, ..., 4012_N–1, 4012_N are shown as stored in Key-Value Storage 4010.

The Power-safe RAM (or other fast storage, such as solid-state drives) 4000 may be, for example, memory of the Key-Value Storage Provider Server 3904 of FIG. 39. The Key-Value Storage 4010 may be, for example, at one or more key-value index storage devices 3905 of FIG. 39.

IV. Generating and Using Shards of Objects Storing Key-Value Records

Background

Conventionally, object storage clusters support get and put operations on a whole object, where each version of an object is defined as an array of bytes. Some conventional object clusters support appending bytes at the end of the current object, whatever that size is, but that is the only form of inheriting content from prior versions found.

On the other hand, it is common for the application layers to define data as records. One particular common format is the key-value (key/value) record where the record consists of a variable length "key" and an optional variable length "value". Within a collection or set of key-value records, the keys generally must be unique; there can be at most one record for any "key", while there may be multiple records with the same "value". A new record put with a key that already exists generally supersedes the previous record. For example, MapReduce applications use key-value records. It is also common for application configuration data to be encoded as key-value records.

Introduction to Object "Shards"

While conventional distributed storage technology defines key-value records at the application layer, the technology described in this section supports the definition of key-value records in objects in a distributed storage layer. In other words, while conventional distributed storage technology merely supports byte-array objects, the "sharding" techniques described herein efficiently extends support to objects containing collections of key-value records.

In accordance with an embodiment of the invention, the payload of each version of an object may be a collection of key-value records. All records within such a collection may be defined to have a variable-length full key and an optional variable-length value. There are no duplicate keys; any update to a given key replaces the prior value for that key.

Of particular interest, given that key-value record collection in the payload of an object is to be supported at the distributed storage layer, the issue arises as to how the object payload is to be split or partitioned so that the record collection may be stored in chunks. The sharding techniques described herein provide ways to partition such an object payload into "shards" that are advantageously efficient and useful.

Note that a primary difference between object shards and object chunks is that shards survive across versions of the object while chunks do not. In other words, a shard is persistent in the context of the object in that the same shards will generally exist in the next version of the object, while a chunk is not persistent in that chunks survive to the next version only when content is unchanged. By default, a shard will exist in the next object version. If the content for the shard has changed then there will be a new chunk specified in the shard.

In an exemplary use case, a collection of key-value records may be used advantageously to create an object that functionally resembles an archive file, such as a .TAR or .TGZ file, where a single object encodes multiple files. For this use case, the "key" is the name of the file while the "value" is the binary content of the file.

Such an archive-like object may be fetched or transferred as a whole. In addition, the "sharding" techniques described herein efficiently supports the retrieval of specific "files" (i.e. specific key-value records) from within the archive-like object. Furthermore, the "sharding" techniques described herein efficiently supports edits that change specific key-value records without the server needing to retrieve all the chunks referenced by a most recent version of the object. Moreover, because shards are persistent, the edit may be applied to an object without specifying a particular version of the object. For example, a transaction to add a "dog" record may be specified in a same way whether the transaction is being applied to the version created at 11:10 AM on Thursday or to the version created at 11:20 AM on Thursday.

A. Sorted Shards

Figure 41:
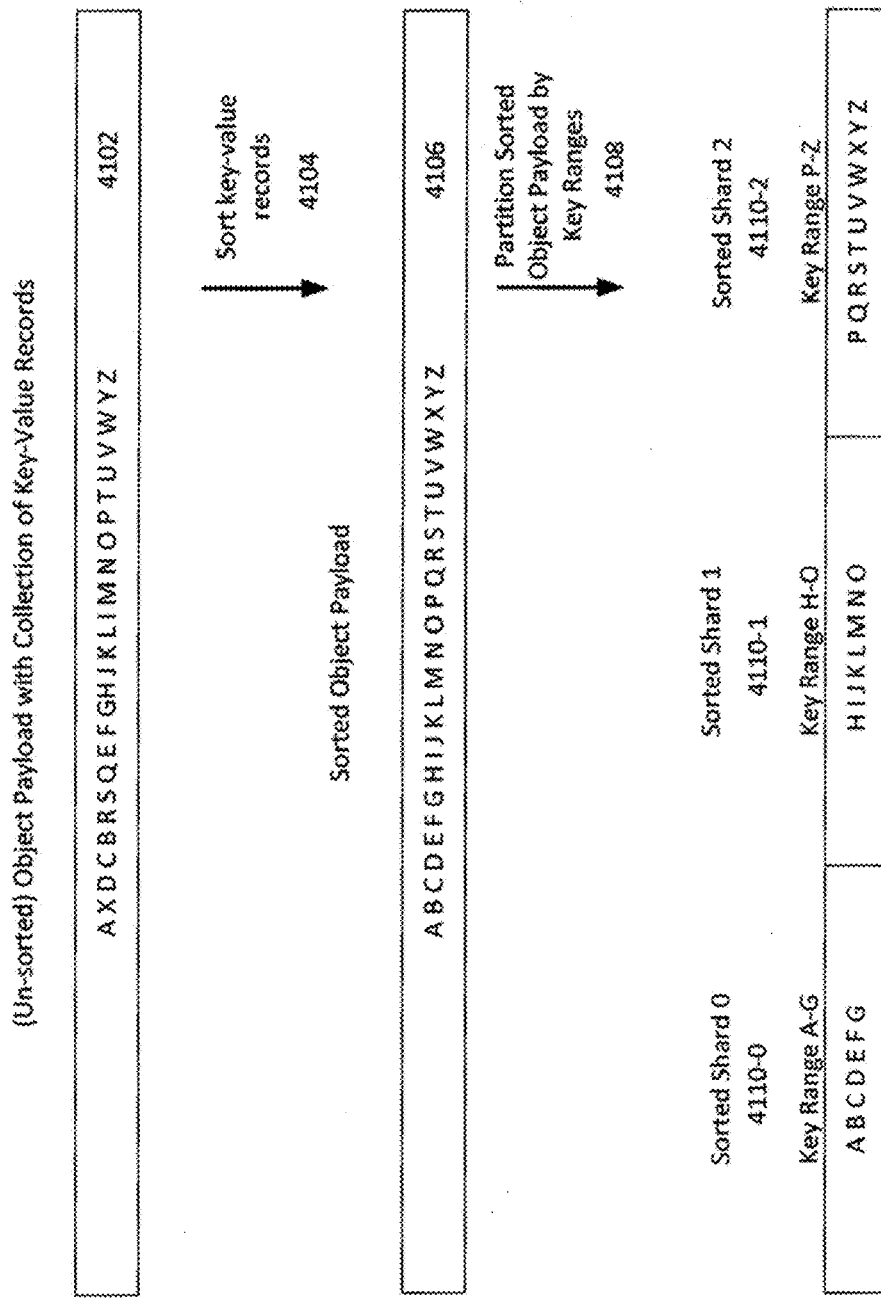
FIG. 41 illustrates a method of partitioning an object payload having key-value records using sorting to generate "sorted shard" payloads in accordance with an embodiment of the invention.

As depicted in the simplified diagram of FIG. 41, one technique for determining how to partition an object payload into chunks may involve receiving an un-sorted object payload with a collection of key value records 4102. The key-value records in the object payload are then sorted 4104 to obtain a sorted object payload 4106. The sorting may be performed, for example, by ordering the key-value records in "alphabetical" (or other sorting) order based on the keys. The sorted object payload may then be partitioned 4108 into "sorted shards" 0, 1 and 2 (4110-0, 4110-1, and 4110-2) based on ranges of the sorted records so as to divide the sorted object payload into chunk payloads. While our example shows partitioning into three shards, the partitioning may create any number (two or more) of shards. In the simplified example shown in FIG. 41, the sorted shard 0 includes keys beginning with A-G, the sorted shard 1 includes keys beginning with H-O, and the sorted shard 2 includes keys beginning with P-Z.

This technique may be referred to as "sorted sharding" (or "alphabetical sharding"). Advantageously, when a record is to be updated, only one of the shards needs to be retrieved and updated. For example, in our simple example in FIG. 41, if the record to update has a key that begins with a "K", then only sorted shard 2 (4110-2) needs to be retrieved and updated. However, while such a sorting-based partitioning technique is feasible, common use cases exist which would result in disadvantages, such as an unbalanced distribution of records in the sorted shards. Because of these disadvantages, this sorting-based solution is not described in further detail.

B. Block Shards

Another technique for determining how to partition an object payload into shards is a "block sharding" technique which is described in relation to FIG. 42 as follows. "Block sharding" is a better balanced and generally more efficient technique than "sorted sharding" when dealing with random access objects, such as virtual disk drives or "volumes".

An object payload with a collection of key value records 4202 is received. The object payload may then be partitioned 4204 into "block shards" 0, 1 and 2 (4210-0, 4210-1, and 4210-2) based on offset byte ranges in the object payload so as to divide it into multiple payloads.

Figure 42:
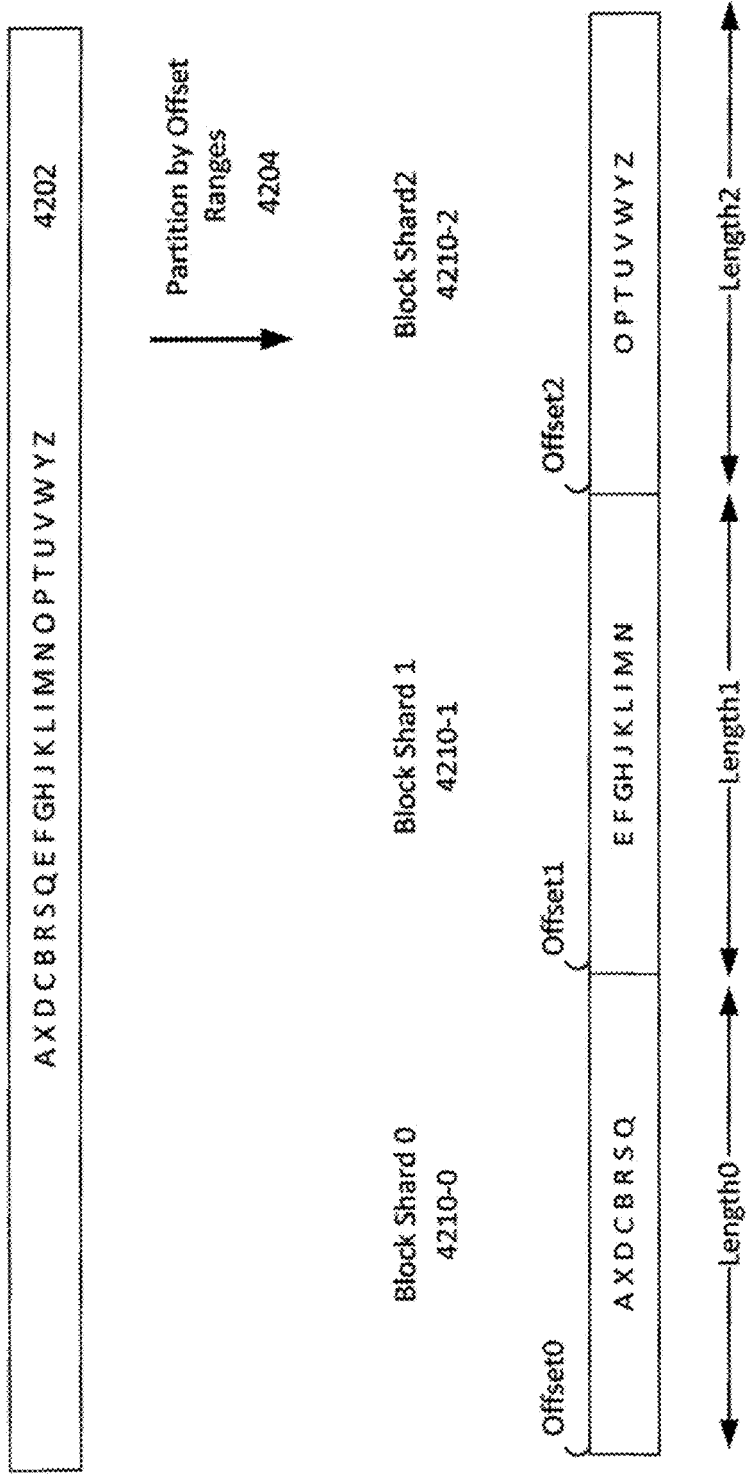
FIG. 42 illustrates a method of partitioning an object payload having key-value records based on offsets to generate "block-shard" payloads in accordance with an embodiment of the invention.

Note that, while the illustrative example of FIG. 42 shows partitioning into three shards, the partitioning may create any number (two or more) of shards. In the simplified example of FIG. 42, the byte offsets for the starts of block shards 0, 1 and 2 are denoted by Offset0, Offset1, and Offset2, respectively. The lengths of the blocks for the block shards 0, 1 and 2 are denoted by Length0, Length1, and Length2, respectively.

In accordance with an embodiment of the invention, a version manifest for a stored object may include "block-shard" chunk references for that version of the object. A block-shard chunk reference references a chunk holding the payload assigned to a block shard. This chunk may be referred to as "the referenced chunk." As depicted in FIG. 43, each block-shard chunk reference (i.e. the reference to the chunk holding the payload assigned to a block shard) may have the following data fields:

i) a specific offset range 4302, where all bytes in this specified offset range (i.e. within this block of offset values) within the object payload are assigned to this shard;

ii) a shard number 4304 for this shard;

iii) a total number of shards 4306 for the object; and iv) a content hash identifying token (CHIT) 4308 for this object version's payload chunk (or manifest chunk) for this shard.

The specific offset range 4302 may be specified, for example, by a logical offset and a logical length to identify the range within the bytes of the object payload. The shard number 4304 may indicate the position of a particular shard within a series of shards whose contents together form the object payload. For example, the shard number may range from zero to the total number of shards 4306 minus one (i.e. from 0 to S−1, where S is the total number of shards for the object). Note that, in contrast to a block-shard chunk reference, an "ordinary" (non-shard) chunk reference does not have the shard number and total number of shards for the object.

In the context of copy-on-write data storage an "update" does not modify the current storage, but provides new copies of the data with the "unmodified" portions being copied either actually or by value. When the storage system divides the object payload into chunks then it is highly unlikely that the existing chunk boundaries will match the boundaries of the content to be modified by a later transaction. Existing chunks will be "updated" even when only a small portion of that content has been changed. With many APIs, particularly for block IO, the user update may not supply the entire content of the chunk that is being updated. This requires a read, modify, write cycle. The block-shard feature allows this read-modify-write update to be confined to target storage servers.

In another example that illustrates this, the original user action may be to update a portion of an the current version of an object which represents a portion of an existing chunk. This would occur when the object represented a virtual disk with large chunks and the application had written a single sector. The gateway server can determine the shard to be updated (being the shard that includes the offset that is being updated), generate a multicast delta put request, collect the responses, select the targets to be updated and multicast the changed sector to those targets. Each would then "update" that specific range by creating a new chunk with the prior content excluding the supplied update. The new CHITs would then be reported to the gateway, validated and saved in a new version manifest. The ability to support partial chunk updates with the impacts of the "read, modify, write" operation being confined to the target servers (with no old content being sent over the network) is one of the primary motivating benefits of block sharding.

In an exemplary implementation, the total number of shards may include "unallocated" shards in a numbering scheme designed to support currently non-existing byte ranges. For example, shard numbers may be reserved for chunks that do not yet exist but are expected to exist in the future. For example, there may be sparse portions of volumes that are expected to be filled in. In that case, shard numbers may be reserved for those portions. Such "over-reserving" for non-existent shards may advantageously avoid the need to change the HDIT of an unmodified shard during the creation of a future version manifest that includes content in a currently non-existent byte range, although such over-reserving may also result in unbalanced key distribution.

Determining the Negotiating Group for a Block Shard

While a payload chunk referenced by an ordinary (non-shard) chunk reference may be found based on the CHIT itself, the chunk referenced by a block-shard chunk reference may be found utilizing the NHIT (name hash identifying token) plus a HDIT (hash differential identifying token). An exemplary technique for locating a payload chunk referenced by a block-shard chunk reference (using the NHIT and HDIT) is described as follows.

The NHIT is associated with the object. The NHIT may be calculated from the object name using the appropriate pre-determined hashing algorithm. In an exemplary implementation, the NHIT for the object may be pre-calculated and stored using key-value-tuple encoding as described above in relation to FIG. 37.

The HDIT is associated with the shard. In an exemplary implementation, the HDIT may be generated using the shard number and the total number of shards so as to distribute the HDITs evenly over a hash circle. For example, if the hash circle spans a 16-bit HDIT space, and the total number of shards of an object is eight, then the HDIT for the shards may be as follows: the HDIT for shard number 0 may be 0x0000; the HDIT for shard number 1 may be 0x2000; the HDIT for shard number 2 may be 0x4000; the HDIT for shard number 3 may be 0x6000; the HDIT for shard number 4 may be 0x8000; the HDIT for shard number 5 may be 0xA000; the HDIT for shard number 6 may be 0xC000; and the HDIT for shard number 7 may be 0xE000.

The negotiating group of a block shard is the group of storage servers that are collectively assigned responsibility to provide access to the block-shard payload chunk (the chunk holding the content for the block shard). Exemplary methods of determining the negotiating group for a block-shard chunk may utilize either a "consistent" hashing or a "flexible" hashing procedure. Consistent hashing and flexible hashing are discussed as follows in relation to FIGS. 44-47.

Figure 44:
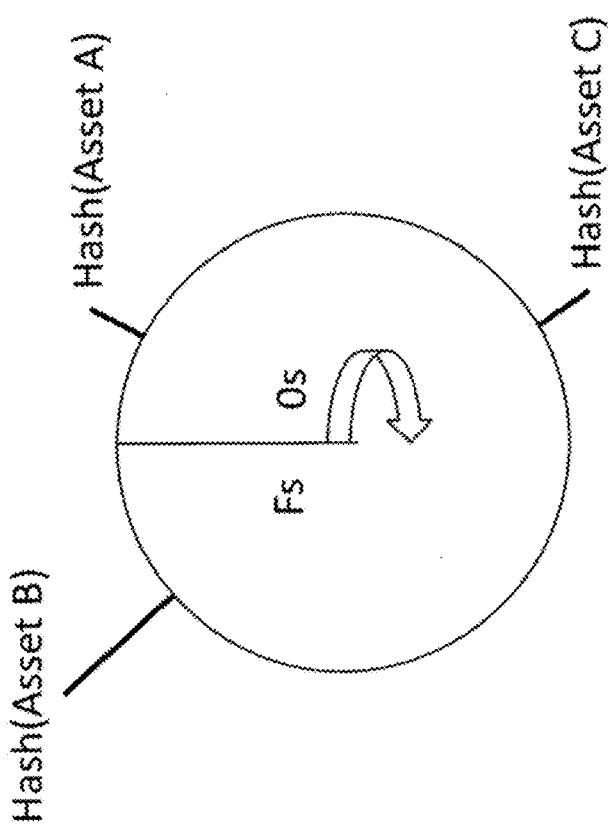
FIG. 44 illustrates the mapping of assets to a circle of hash values in accordance with an embodiment of the invention.

First, consider the mapping of assets to a hash circle as depicted in FIG. 44. As shown, the hash circle is defined, in hexadecimal, as going from all 0 s (for example, 0000) to all Fs (for example, FFFF) as the angle goes from 0 degrees to 360 degrees. For example, a hash circle that is $2^{16}$ values in size (i.e. a 16-bit hash circle) may be defined as going from 0000 to FFFF (in hexadecimal). In between, the hash value increments going clockwise on the hash circle such that the sequence of hash values going clockwise is 0000, 0001, 0002, 0003, 0004, . . . , FFFD, FFFE, and FFFF.

In an exemplary implementation, the hash circle includes wraparound such that only the last 16 bits of the hash value are used to map onto the hash circle. For example, for a hash circle with $2^{16}$ values and wraparound, the 32-bit hash values XXXX 0032 and YYYY 0032 (where XXXX and YYYY are different most-significant 16 bits of the 32-bit numbers) would map onto the same position on the hash circle since they have the same least-significant 16 bits.

A specific position on the hash circle (for example, as identified by the least-significant 16 bits of the pertinent hash value) may be associated with an indivisible negotiating group (ING), which is a smallest negotiating group of the system (and cannot be divided into an even smaller negotiating group). For example, for a 16-bit hash circle, there are $2^{16}$ INGs. Each ING may be mapped to an actual negotiating group. An actual negotiating group may include more than one ING and may be mapped to a range of INGs along the hash circle. The number of actual negotiating groups may depend, for example, on the size of the storage cluster.

In the example illustrated in FIG. 44, the ING number for Asset A is "less than" the ING number for Asset C, and the ING number for Asset C is "less than" the ING number for Asset B. In other words, least-significant 16 bits of Hash(Asset A)<least-significant 16 bits of Hash(Asset C)<least-significant 16 bits of Hash(Asset B).

Each asset may be, for example, a chunk (i.e. content) or an object's name (i.e. a name index). In the case of a chunk, the hash value may be a content hash identifying token (CHIT). In the case of an object's name, the hash value may be a name hash identifying token (NHIT).

Figure 45:
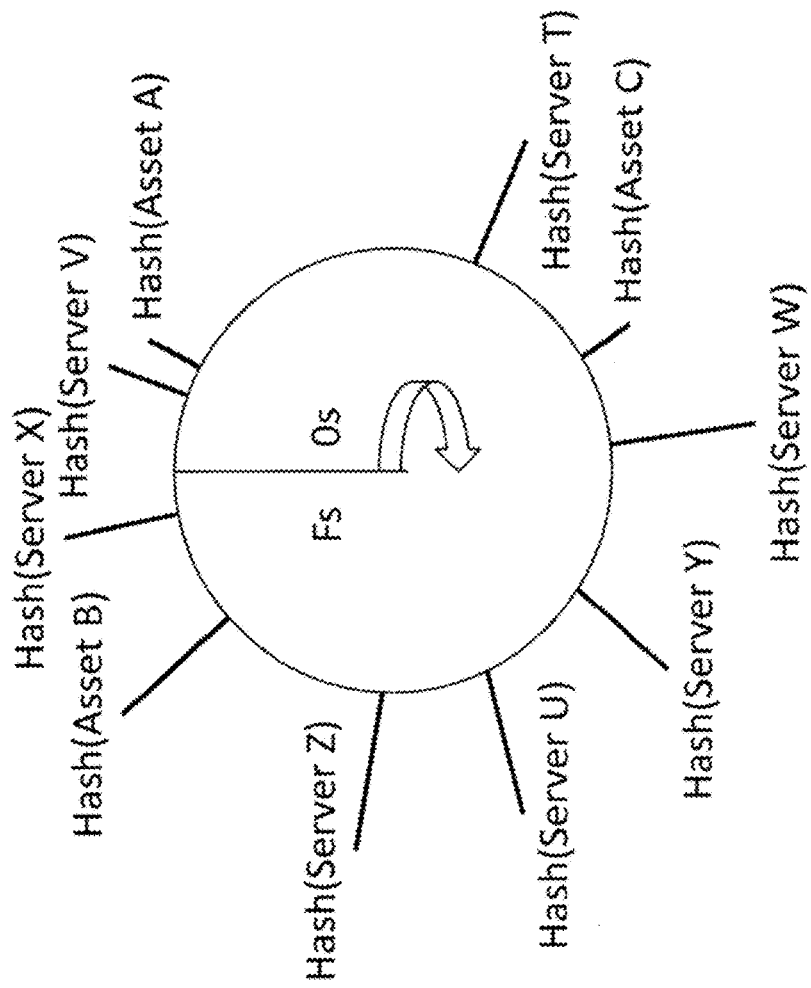
FIG. 45 illustrates the mapping of servers to the same hash circle as FIG. 44 for use in consistent hashing in accordance with an alternate embodiment of the invention.

FIG. 45 illustrates the mapping of servers to the same hash circle as FIG. 44 and determining servers for storing an asset using a "consistent hashing" procedure in accordance with an alternate embodiment of the invention. As disclosed herein, consistent hashing involves hashing the asset to a point (i.e. an ING number) on the hash circle and selecting a number of different servers for storing (or accessing) the asset by clockwise rotation in the hash circle from that point.

In the illustrated example: the ING number for Server V is "less than" the ING number for Asset A; the ING number for Server T is between the ING numbers of Assets A and C; the ING numbers of Servers W, Y U and Z are between the ING numbers of Assets C and B; and the ING number of Server X is greater than the ING number of Asset B. In particular, least-significant 16 bits of Hash(Server V)<least-significant 16 bits of Hash(Asset A)<least-significant 16 bits of Hash(Server T)<least-significant 16 bits of Hash(Asset C)<least-significant 16 bits of Hash(Server W)<least-significant 16 bits of Hash(Server Y)<least-significant 16 bits of Hash(Server U)<least-significant 16 bits of Hash(Server Z)<least-significant 16 bits of Hash(Asset B)<least-significant 16 bits of Hash(Server X). Note that, while the least-significant 16 bits are used in the above-described example, alternate implementations may extract a different set of bits, such as the 16 most-significant bits, for example.

In consistent hashing, each asset may be assigned to the next N servers (at greater ING numbers) in different failure domains. Consider N=3, for example. In the case shown in FIG. 45, assuming each server is in a different failure domain: Asset A may be assigned to Servers T, W and Y; Asset C may be assigned to Servers W, Y and U; and Asset B may be assigned to Servers X, V and T. If V and T were in the same failure domain (while all other servers were in different failure domains), then Asset B may be assigned to Servers X, V and W (skipping T). Of course, N may be set to different numbers to increase or decrease the number of servers at which an asset is stored.

Figure 46:
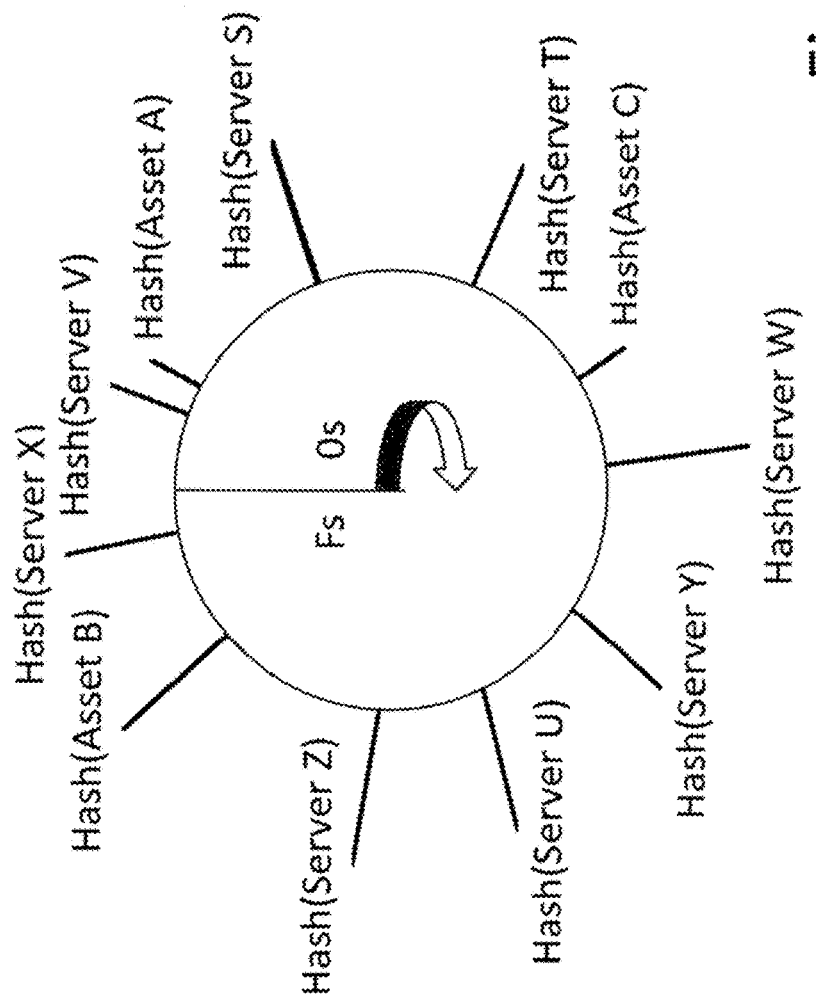
FIG. 46 illustrates the migration of assets to different servers due to the addition of a new server under consistent hashing in accordance with an alternate embodiment of the invention.

FIG. 46 illustrates the migration of assets to different servers due to the addition of a new server under consistent hashing in accordance with an alternate embodiment of the invention. In this case, consider the example discussed above in relation to FIG. 45, and add Server S as a new server.

As depicted, the ING number of Server S is between the ING numbers of Asset A and Server T. In this case, the addition of the new Server S may force migration of the asset locations to be as follows: Asset A becomes assigned to Servers S, T, and W (migrates from Y to S); Asset C remains assigned to Servers W, Y and U; and Asset B becomes assigned to Servers X, V and S (migrates from Server T to Server S).

Figure 47:
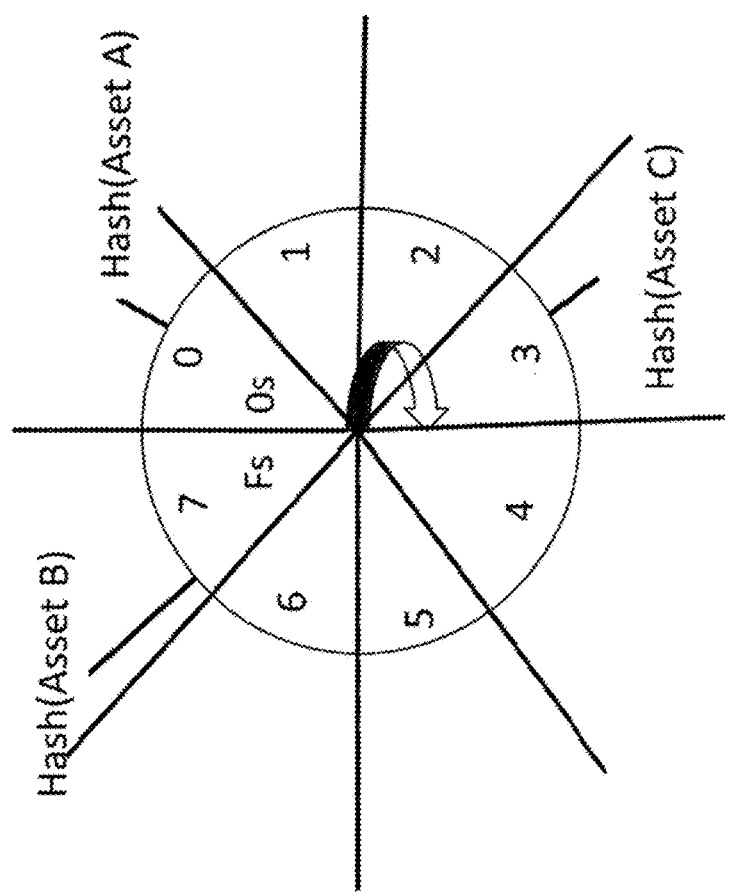
FIG. 47 illustrates assigning assets to negotiating groups using a "flexible" hashing procedure in accordance with an embodiment of the invention.

FIG. 47 illustrates assigning assets to negotiating groups using a "flexible" hashing procedure in accordance with an embodiment of the invention. As disclosed herein, flexible hashing involves assigning assets to indivisible negotiating groups (INGs), and the INGs are then mapped to the actual negotiating groups. In other words, flexible hashing involves assigning assets to negotiating groups based on their positions on the hash circle relative to the ranges assigned to the negotiating groups.

As depicted, the hash circle may be divided into evenly-sized ranges, where each range may correspond to a negotiating group. In the depicted example, 16-bit hash circle (with ING numbers ranging from 0000 to FFFF) is divided into negotiating groups as follows: Negotiating Group 0 has a range of ING numbers of 0000-0FFF; Negotiating Group 1 has a range of ING numbers of 1000-1FFF; Negotiating Group 2 has a range of ING numbers of 2000-2FFF; Negotiating Group 3 has a range of ING numbers of 3000-3FFF; Negotiating Group 4 has a range of ING numbers of 4000-4FFF; Negotiating Group 5 has a range of ING numbers of 5000-5FFF; Negotiating Group 6 has a range of ING numbers of 6000-6FFF; and Negotiating Group 7 has a range of ING numbers of 7000-7FFF.

Further in the depicted example, the assets may be assigned to negotiating groups as follows: the ING number generated by hashing Asset A falls within the range for Negotiating Group 0, so Negotiating Group 0 may be selected for Asset A; the ING number generated by hashing Asset C falls within the range for Negotiating Group 3, so Negotiating Group 3 may be selected for Asset C; and the ING number generated by hashing Asset B falls within the range for Negotiating Group 7, so Negotiating Group 7 may be selected for Asset B.

Similar to assets being assigned to a negotiating group, servers may join negotiating groups using a flexible hashing. Note that, under the flexible hashing procedure, a new server does not force immediate data migration in relation to the negotiating groups.

While the above describes consistent and flexible hashing as applied to "ordinary" (i.e. non-shard) assets and servers, the following describes consistent and flexible hashing as applied to shards in accordance with embodiments of the invention.

Figure 48:
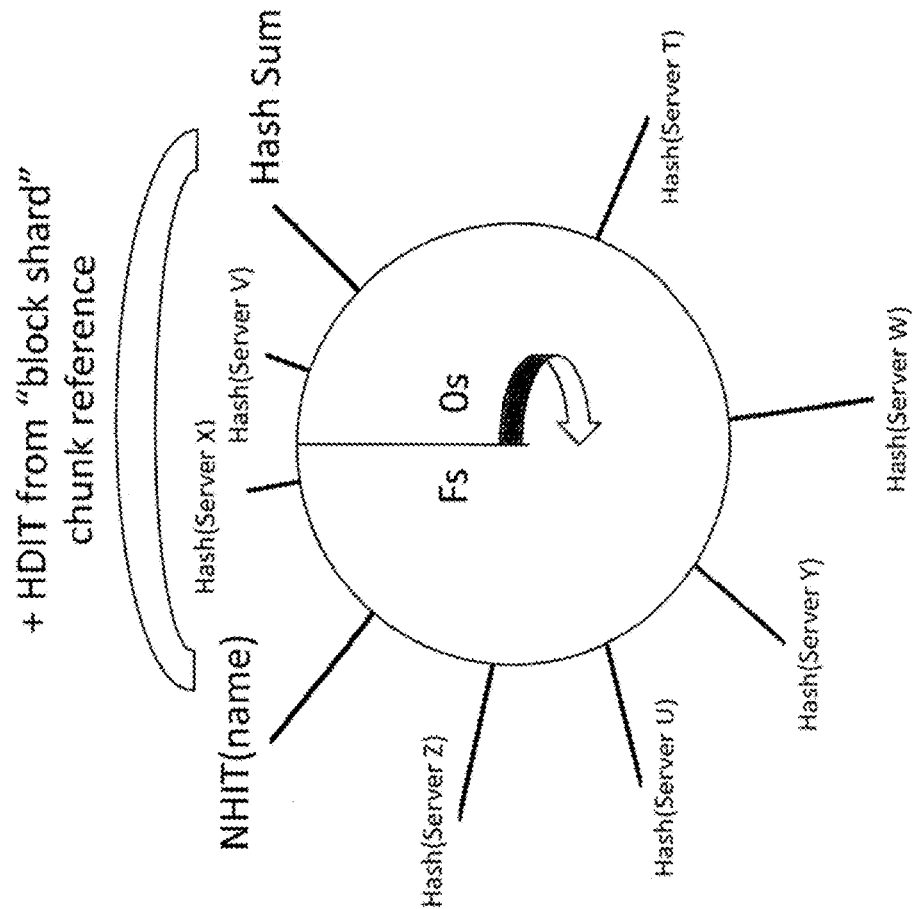
FIG. 48 illustrates a consistent hashing procedure to determine servers for storing and accessing a payload chunk of a "block shard" in accordance with an alternate embodiment of the invention.

FIG. 48 illustrates a consistent hashing procedure to determine a set of servers for storing and accessing a payload chunk of a "block shard" in accordance with an alternate embodiment of the invention. As described below, this procedure may utilize the object's name hash identifying token (NHIT) and hash differential identifying tokens (HDITs) associated with the block shards to distribute the block shards amongst the storage servers of a distributed storage system.

As depicted, starting with the NHIT based on the object's name, the HDIT for a particular block shard of the object is added so as to generate a hash sum. The ING based on the hash sum (for example, the least-significant 16 bits of the hash sum in our example hash circle) determines which servers are used to store (and provide access to) the payload chunk for the particular block shard. For example, the next three servers counterclockwise from the hash sum may be used to store a block shard. In that case, Servers T, W and Y would store the chunk payload for the block shard depicted.

Note that different block shards of the object generally have different HDITs, so the shards are stored in a distributed manner amongst the servers of the distributed storage system. In one implementation, the HDIT for a block shard may depend on its shard number and the total number of shards for the object. For example, if the hash circle spans a 16-bit HDIT space, and the total number of shards of an object is four, then the HDIT for the shards may be as follows: the HDIT for shard number 0 may be 0x0000; the HDIT for shard number 1 may be 0x4000; the HDIT for shard number 2 may be 0x8000; and the HDIT for shard number 3 may be 0xC000.

Figure 49:
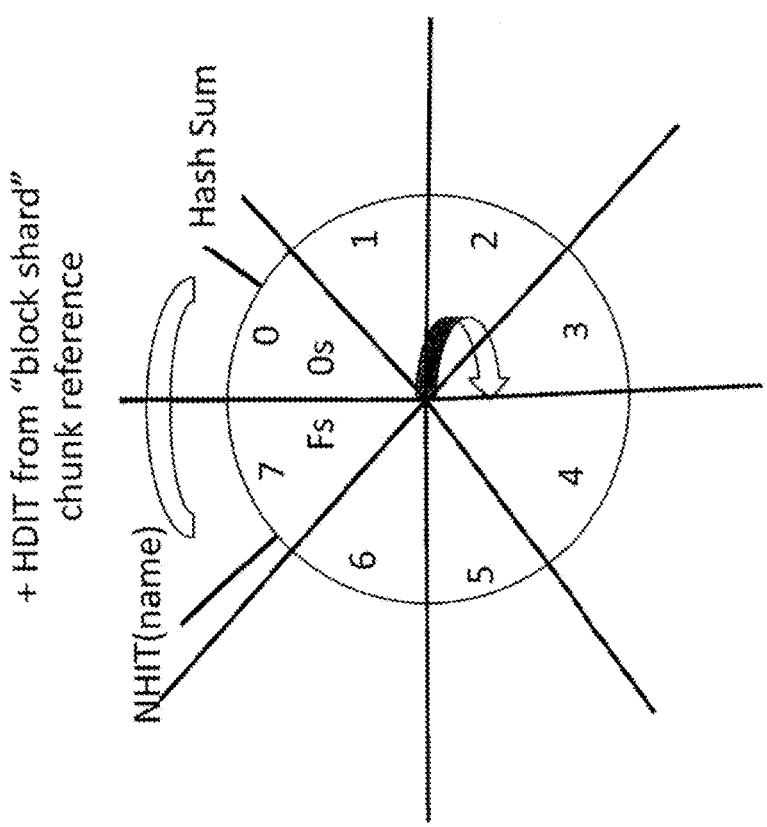
FIG. 49 illustrates a flexible hashing procedure to determine a negotiating group for storing and accessing a payload chunk of a "block shard" in accordance with an embodiment of the invention.

FIG. 49 illustrates a flexible hashing procedure to determine a negotiating group for storing and accessing a payload chunk of a "block shard" in accordance with an embodiment of the invention. As described below, this procedure may utilize the object's NHIT and HDITs associated with the block shards to distribute the block shards amongst the negotiating groups of the distributed storage system.

As depicted, starting with the NHIT based on the object's name, the HDIT for a particular block shard of the object is added so as to generate a hash sum. The ING based on the hash sum (for example, the least-significant 16 bits of the hash sum in our example hash circle) determines which negotiating group is used to store (and provide access to) the payload chunk for the particular shard. For example, as depicted, the hash sum for a block shard may fall within the range of Negotiating Group 0, so Negotiating Group 0 is used to store and access that block shard.

As described above, the flexible hashing procedure may be used to effectively "pre-assign" payload chunks for a block-sharded object to specific negotiating groups before the content of each payload chunk is known. In other words, the negotiating groups of the block shards are pre-assigned before knowing their content. This provides the following beneficial impacts which allow "delta" edits of a block shard to be performed efficiently.

First, a gateway to the distributed storage system does not have to retrieve or store the existing payload chunks of a block-sharded object to enable efficient editing of portions of it. This is because the payload chunk associated with a block shard may be accessed without knowing its content. This is particularly beneficial when caching resources in the gateway server are limited.

Second, only altered portions of a payload chunk for a block shard, rather than the entire chunk, needs to be transferred over the network. This is because the hash sum that is used to access the payload chunk of a block shard does not depend on its content. For example, if a key-value record in the payload of a block shard needs updating, only the data for that record needs to be transferred. Advantageously, this greatly reduces the required bandwidth to do such a delta edit or partial update.

Third, because delta edits may be efficiently performed, larger chunks can be used to encode large objects, such as virtual disks, reducing the depth of the metadata required to support large objects.

Block-Shard Update Process

Figure 50:
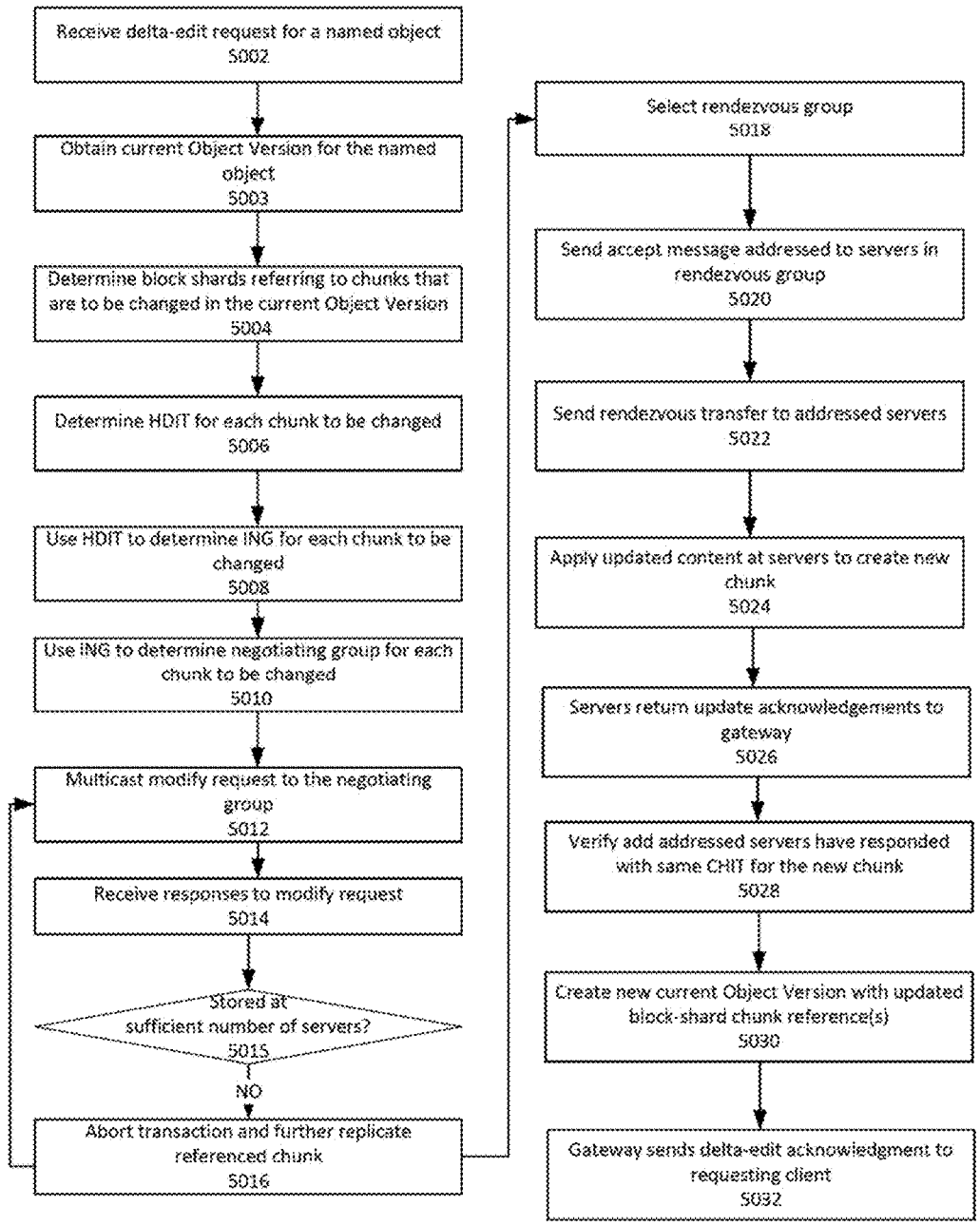
FIG. 50 is a flow chart of a method (process) of performing a delta edit of a block-sharded object stored in a distributed storage system in accordance with an embodiment of the invention.

FIG. 50 is a flow chart of a method (process) 5000 of performing a delta edit of a block-sharded object stored in a distributed storage system in accordance with an embodiment of the invention. Advantageously, the method 5000 allows portions of a sharded object (i.e. payload chunks referenced by shards) to be updated in a highly efficient manner.

Per step 5002, a gateway server for the distributed storage system may receive, from a client, a delta-edit request for a named object. In this case, the object is stored in "block shards the payload chunk of each block shard including a range of offsets in the payload. An example of such a block-sharded object is described above in relation to FIG. 42.

The delta-edit request may be an extended put request that is extended to indicate only select portions of the named object that are being put. The delta-edit request (i.e. the extended put request) may specify, for example, specified changes or updates (delta edits) to data stored at specified offsets in the object.

Per step 5003, the gateway server may obtain the current Object Version from the Version Manifest for the named object. In an exemplary implementation, the current Object Version may be found by sending a request including the object's name to the negotiating group for Version Manifests.

For a block-sharded object, the current Object Version includes "block-shard chunk references," one block-shard chunk reference for each block shard of the object. Each block-shard chunk reference contains information needed to access the payload chunk that stores the content for the corresponding block shard. The payload chunk storing the content for a block shard may be referred to herein simply as the "block shard" or the "referenced shard". An example of a block-shard chunk reference is described above in relation to FIG. 43.

Per step 5004, the gateway server may determine, from the delta edits that are requested, the block shards to be updated in the current Object Version, and find the block-shard chunk references for those block shards in the current Object Version. The block shards to be updated are those which contain key-value records to be changed per the delta-edit request.

Per step 5006, the gateway server may determine a Hash Differential Identifying Token (HDIT) for each shard to be updated. For example, using a predetermined algorithm, the HDIT may be determined from the shard number and the total number of shards. An example of such an algorithm is described above.

Per step 5008, the gateway server may add the HDIT to the object's name hash (NHIT) to determine the Indivisible Negotiating Group (ING) for each shard to be updated. As discussed above, the ING may be represented by a position on a hash circle.

Per step 5010, using a flexible hashing procedure, the ING may be used by the gateway server to determine the negotiating group for each shard to be updated. The negotiating group of a block shard is the group of servers that are designated to supply the shard. An example of flexible hashing is described above in relation to FIG. 49.

Per step 5012, a modify request for each shard to be updated may be multicast from the gateway server to the negotiating group for the shard to be updated. The modify request may specify the CHIT of the chunk to be modified and may be addressed to all the storage servers in the negotiating group. As such, any storage server in the negotiating group may respond to the modify request with a bid, even if the storage server does not already store the chunk referenced in the modify request (i.e. "the referenced chunk"). However, those storage servers that do not have already have the referenced chunk would have to obtain it, so those storage servers would submit bids at a time disadvantage compared to those servers that already have the referenced chunk.

In one implementation, the modify request, in addition to specifying the CHIT of the referenced chunk, may specify the length in bytes of the payload update (i.e. the modified portion of the shard payload) that will be provided. Providing the length of the payload update allows the storage servers to adjust the length of the inbound reservation to accommodate only the data that will actually be transferred.

Per step 5014, responses to each modify request may be received by the gateway server from the storage servers in the negotiating group. The responses may provide a bid indicative of when each server could perform the update of the shard by creating a new payload chunk containing the updated records. The storage servers that do not currently have the referenced chunk may indicate so in their response and should adjust their bids to reflect the time to fetch the referenced chunk.

Per step 5015, for each modify request, a determination may be made if the responses received indicate that there is a sufficient number of storage servers in the negotiating group that already have the referenced chunk. This determination may be performed, for example, by counting the number of responses that indicate the referenced chunk is currently stored at the server and comparing the number of responses against a threshold number.

Per step 5016, for each modify request, if the responses indicate that there is a shortage of storage servers in the negotiating group, then the gateway server may abort that modify transaction and have the referenced chunk further replicated in the distributed storage system. Thereafter, the gateway server may restart the aborted modify transaction by sending out another modify request per step 5012.

Per step 5018, for each modify request, if the responses indicate that there is a sufficient number (i.e. at or above a threshold number) of storage servers in the negotiating group that have the referenced chunk, then the gateway server may select a rendezvous group from amongst the responding storage servers. Per step 5020, the gateway server may identify the storage servers of the rendezvous group by address in an accept message.

Per step 5022, for each shard being modified, a rendezvous transfer message may then be sent from the gateway server to the addressed servers (i.e. to the storage servers of the rendezvous group). The rendezvous transfer message may specify the referenced chunk (for example, by CHIT) and the updated content (for example, specified changes to key-value records) to be applied.

Per step 5024, for each shard being modified, the addressed servers may then each apply the updated content to the payload of the referenced chunk so as to create a new chunk. Each new chunk may be co-located with (i.e. stored at the same storage server as) the previous chunk that it is, in effect, replacing.

The process for applying an update to a shard may include: obtaining the referenced chunk if it is not already stored on the server; applying the changes (delta edits) to the payload of the referenced chunk to create a revised payload; generating the cryptographic hash for the revised payload (using the same hash algorithm as used to generate the cryptographic hash of the previous version of the referenced shard); and saving the new chunk in persistent storage, wherein the new chunk includes the revised payload and its cryptographic hash.

Per step 5026, for each new chunk, the addressed servers will return a modification acknowledgement message to the gateway server. The modification acknowledgement message may include the CHIT of the revised payload.

Per step 5028, for each new chunk, the gateway server may verify that all the addressed servers have responded with the same CHIT for the revised payload.

Per step 5030, the current Object Version may be updated by replacing it with a new current Object Version that includes the updated block-shard chunk references that have the CHITs of the new chunks. Also, the logical offsets and the logical lengths of the block-shard chunk references are updated to account for the changes made. This step may be performed by communication between the gateway server and the negotiating group for the Version Manifests.

Finally, per step 5032, the gateway server may send a delta-edit acknowledgement message to the requesting client. The delta-edit acknowledgement message may indicate to the client the successful fulfillment of the delta-edit request.

Process for Retrieving Block-Sharded Content

Figure 51:
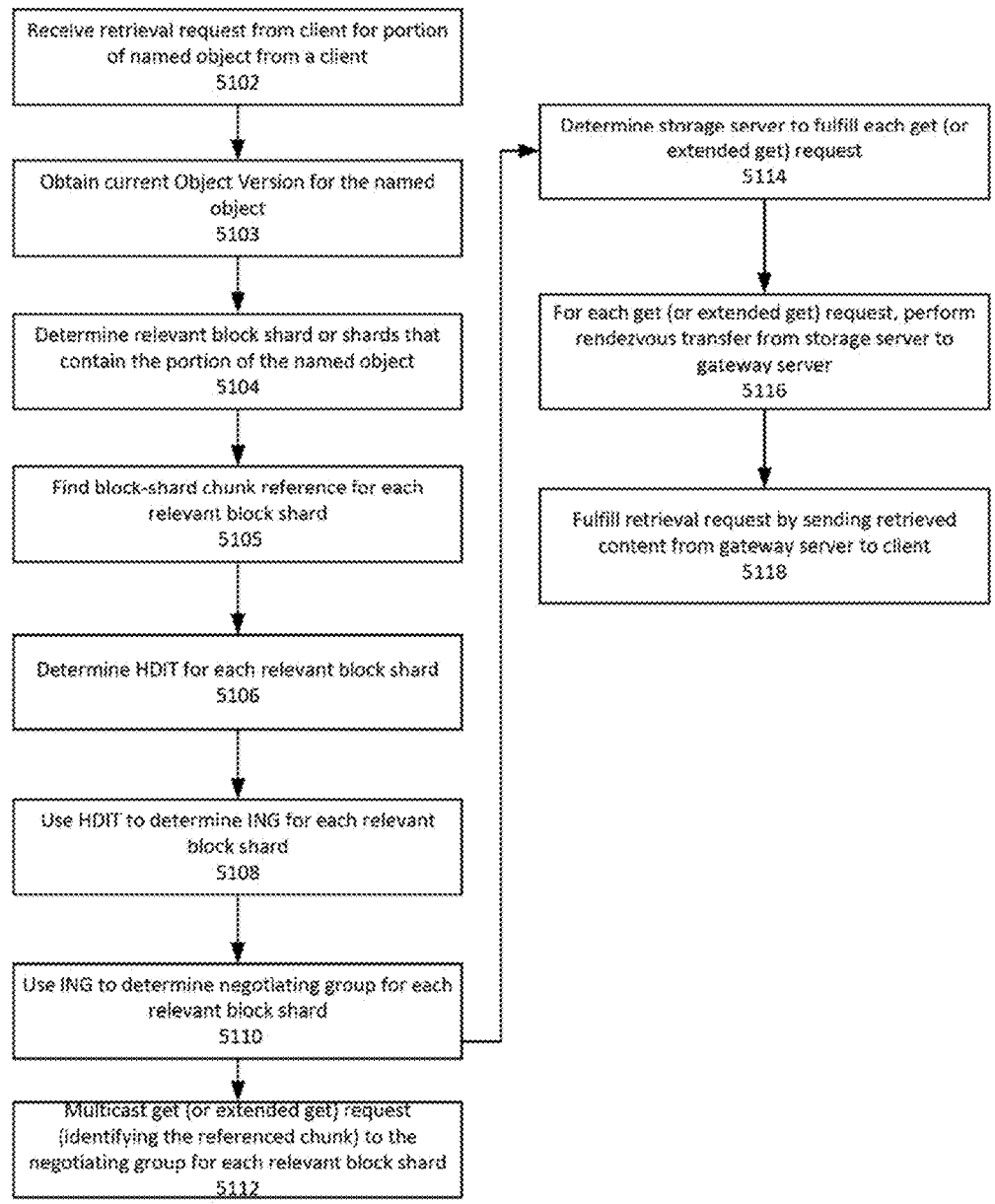
FIG. 51 is a flow chart of a method (process) of retrieving block-sharded content in accordance with an embodiment of the invention.

FIG. 51 is a flow chart of a method (process) 5100 of retrieving block-sharded content in accordance with an embodiment of the invention. In this case, the object is stored in "block shards" with the payload chunk of each block shard including a specified block (i.e. a specified offset range) of the object payload. An example of such a block-sharded object is described above in relation to FIG. 42. Advantageously, this method 5100 allows key-value records in a block-sharded object to be retrieved in a relatively efficient manner.

Per step 5102, a gateway server for the distributed storage system may receive, from a client, a retrieval request for a portion of a named object. The retrieval request may be in the form of an extended get request for the object, where the extension indicates the portion of the object that is being requested. The retrieval request may specify, for example, a specific offset (or offsets) in the payload for named object.

Per step 5103, the gateway server may obtain the current Object Version from the Version Manifest for the named object. In an exemplary implementation, the current Object Version may be found by sending a request including the object's name to the negotiating group for Version Manifests.

Per step 5104, the gateway server may determine, from the current Object Version, the block shard (or shards) that contain the portion of the named object that is requested.

Such block shards may be referred to as the "relevant block shards". The referenced chunks for the relevant block shards are to be retrieved to fulfill the retrieval request.

Per step 5105, the gateway server may find the block-shard chunk reference(s) for the relevant block shard(s) in the current Object Version. An example of such a block-shard chunk reference is described above in relation to FIG. 43.

Per step 5106, the gateway server may determine a Hash Differential Identifying Token (HDIT) for each relevant block shard. For example, using a predetermined algorithm, the HDIT may be determined from the shard number and the total number of shards. An example of such an algorithm is described above.

Per step 5108, the gateway server may add the HDIT to the object's name hash (NHIT) to determine the Indivisible Negotiating Group (ING) for the each relevant block shard. As discussed above, the ING may be represented by a position on a hash circle.

Per step 5110, using a flexible hashing procedure, the ING may be used by the gateway server to determine the negotiating group for each relevant block shard. An example of flexible hashing is described above in relation to FIG. 49.

Per step 5112, a get request (or an extended get request) may be multicast from the gateway server to the storage servers in the negotiating group for each relevant block shard. In this case, the negotiating group is that determined by the flexible hashing procedure. Each get request may specify identify the referenced chunk for the relevant block shard by its CHIT.

Furthermore, in an exemplary implementation, the get request may have an optional field. The get request may become an extended get request by using the optional field. The optional field may specify a particular part of the referenced chunk to be retrieved. The particular part may be specified, for example, by an offset range.

Per step 5114, for each get (or extended get) request, a determination may be made as to which individual storage server in the negotiating group is to provide the referenced chunk (or part thereof) to fulfill the get (or extended get) request. The determination of the individual storage server that provides the referenced chunk, or part thereof, may be made using a client-consensus process (described above in relation to FIGS. 16 and 17, for example) or a cluster-consensus process (described above in relation to FIGS. 18 and 19, for example).

Per step 5116, for each referenced chunk, a rendezvous transfer may be performed from the individual storage server to the gateway server. The rendezvous transfer provides the referenced chunk, or part thereof, to the gateway server.

Finally, per step 5118, after all the referenced chunks, or parts thereof have been received by the gateway server, the gateway server may send the retrieved content to the client so as to fulfill the retrieval request.

Using Both Chunk References and Block-Shard Chunk References

In accordance with an embodiment of the invention, a distributed storage system may utilize both chunk references (referred to as "ordinary" or "non-shard" chunk references) and block-shard chunk references.

The negotiating groups for ordinary (non-shard) chunk references may be determined by the CHITs (i.e. the Chunk Hash IDs) of the chunks. Hence, the negotiating groups for accessing the (ordinary) chunks of an object vary substantially depending on the exact content of the object. As a result, the negotiating groups for accessing the (ordinary) chunks of an object are unstable and change substantially depending on the exact content of the object.

On the other hand, as described above, the negotiating groups for block-shard chunk references are determined by the NHIT of the object and the shard information (for example, by the shard numbers and the total number of shards). This results in stable negotiating groups for accessing the shards of an object.

Note that, in one implementation, the Manifests for an Object Version may utilize both ordinary chunk references and block-shard chunk references. A block-shard chunk reference may specify a sub-Manifest. That sub-Manifest may have either ordinary or block-shard chunk references, but it is constrained to only have offset references that are within the range of the reference that selected it.

In one exemplary implementation, the block-shard chunk references may be used only to refer to payload chunks, while ordinary chunk references may be used to refer to content manifests containing block-shard chunk references. This scheme may result is optimized read/modify/write traffic.

Note that there are a couple of differences between block-shard chunk references and non-sharded (i.e. ordinary) chunk references. First, there is less potential for deduplication with block-shard chunk references than with non-shard chunk references. This is because new payload chunks need not be created for payload chunks that are unchanged in a new version of an object. Second, a Content Manifest for a block-sharded object includes meta data identifying the object (e.g., by the NHIT) and identifying the shards (e.g. by the HDITs of the shards).

Advantageous Aspects of Block Sharding

The above-discussed block-sharding technique has several advantageous aspects. Of particular significance, less network traffic is required to accomplish an update to the content of a block shard. For example, in the block-shard update process, neither the client nor the gateway is required to retrieve the unmodified portion of the current object in order to create a new chunk replacing a current chunk. In other words, the "read/modify/write" penalty for network traffic is avoided. This is extremely valuable when emulating a storage archive or a file interface.

In addition, under flexible hashing, the block-sharding technique may typically assign the first chunk (the chunk which is associated to the zeroth shard) of an object to the same negotiating group as the negotiating group for the Version Manifests. Hence, the content of the first chunk of an object may be retrieved from a single storage server, while the remaining chunks of the object may still be distributed over a number of servers in different negotiating groups.

C. Key Shards

Another technique for determining how to partition an object payload into shards is a "key sharding" technique which is described as follows. Key sharding has advantages over both sorted sharding and block sharding.

Sharding based on an alphabetic ordering of the key (i.e. sorted sharding) may often result in a highly undesirable distribution of records. Furthermore, when dividing a sorted shard, there is no guarantee that future records will be randomly distributed throughout the keyspace. Indeed, there are many real-world use cases where new records are received in a decidingly non-random order, such as, for example, when importing a set of records exported from another system. In such a use case, it would be common for the new records to arrive pre-sorted.

Sharding based on dividing an object payload by byte offsets (i.e. block sharding) is inefficient when later searching for a specific key record. This is because the later search has no information (without obtaining and examining the payload chunks of the block shards) as to the byte offset location where a desired key is to be found.

In contrast, sharding based a partial or full hash of the key of a key-value record (i.e. key sharding) makes the probable distribution of future records very even. The even distribution of records allows for an optimum division of the object into shards.

All key-value records within a key-value set have a variable-length full key and an optional variable-length value. There are no duplicate keys; any update to a given key replaces the prior value for that key.

In one embodiment of key sharding, a partition key is used, where the partition key is a subset of a full key. In other words, if the full key is N bits in length, the partition key may be a predetermined n-bit subset of the N bits, where n<N. For example, if the full key is 256 bits in length, the partition key may be, for instance, the most-significant 16 bits of the 256 bits. In accordance with an embodiment of the invention, all key-value records having the same partition key are assigned to the same key shard.

Advantageously, by having all records with a same partition key assigned to a same shard, searches using the partition key are efficient. For example, a directory object may have key-value records that are directory entries. For such a directory object, the fully qualified name of an enclosing directly (for example, directory "/tenant/a/foo/") may be the partition key. In that case, retrieval of entries in that enclosing directory may only require responses from the storage devices handling the key shard to which the specific partition key is assigned.

The partition key is not directly used to partition the records into shards. Rather, a cryptographic hash is applied to the partition key to generate a key hash identifying token (KHIT), and the KHIT is used to partition the records into shards. In this embodiment, the KHIT is a partial-key hash because the partition key is a subset of the full key.

Key-value records with KHITs having a specified subset of bits in common are assigned to a same key shard, and the subset of bits is specified in the key-shard chunk reference for that key shard. In one implementation, the key-shard chunk reference specifies a Base KHIT and a match length L, and all key-value records with KHITs that match a the most-significant L bits of the Base KHIT are stored in the referenced key shard. In this case, since the KHIT is a partial-key hash, the key-shard chunk reference may be referred to as a partial-key-shard chunk reference.

Figure 52:
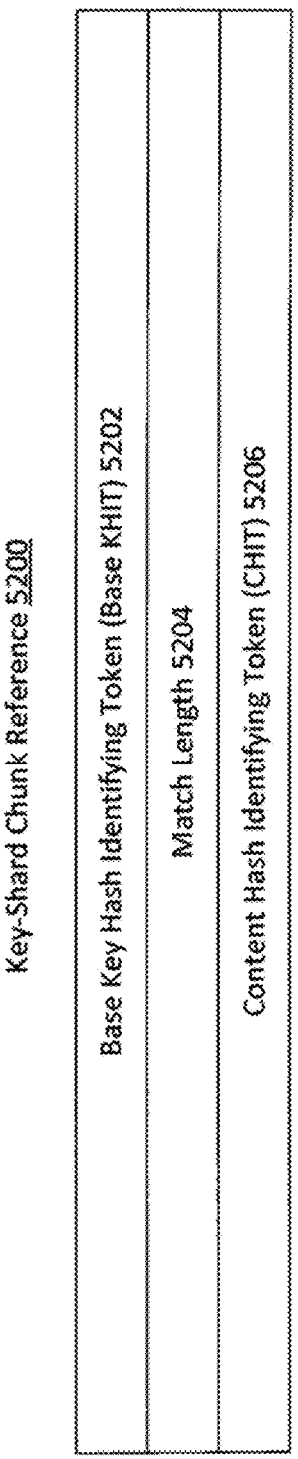
FIG. 52 depicts a key-value reference chunk in accordance with an embodiment of the invention.

In accordance with an embodiment of the invention, a version manifest for a stored object may include the key-shard chunk references for that version of the object. A key-shard chunk reference is a reference to a chunk holding the payload assigned to the referenced shard. As depicted in FIG. 52, each key-shard chunk reference may have the following data fields:

i) a Base Key Hash Identifying Token (Base KHIT) 5202;

ii) a match length 5204, where the KHITs for key-value records belonging to the referenced shard must match the Base KHIT for the number of bits (for example, the most-significant bits) specified by the match length; and iii) a Content Hash Identifying Token (CHIT) 5206 for this object version's payload chunk (or manifest chunk) for the referenced shard.

Figure 53:
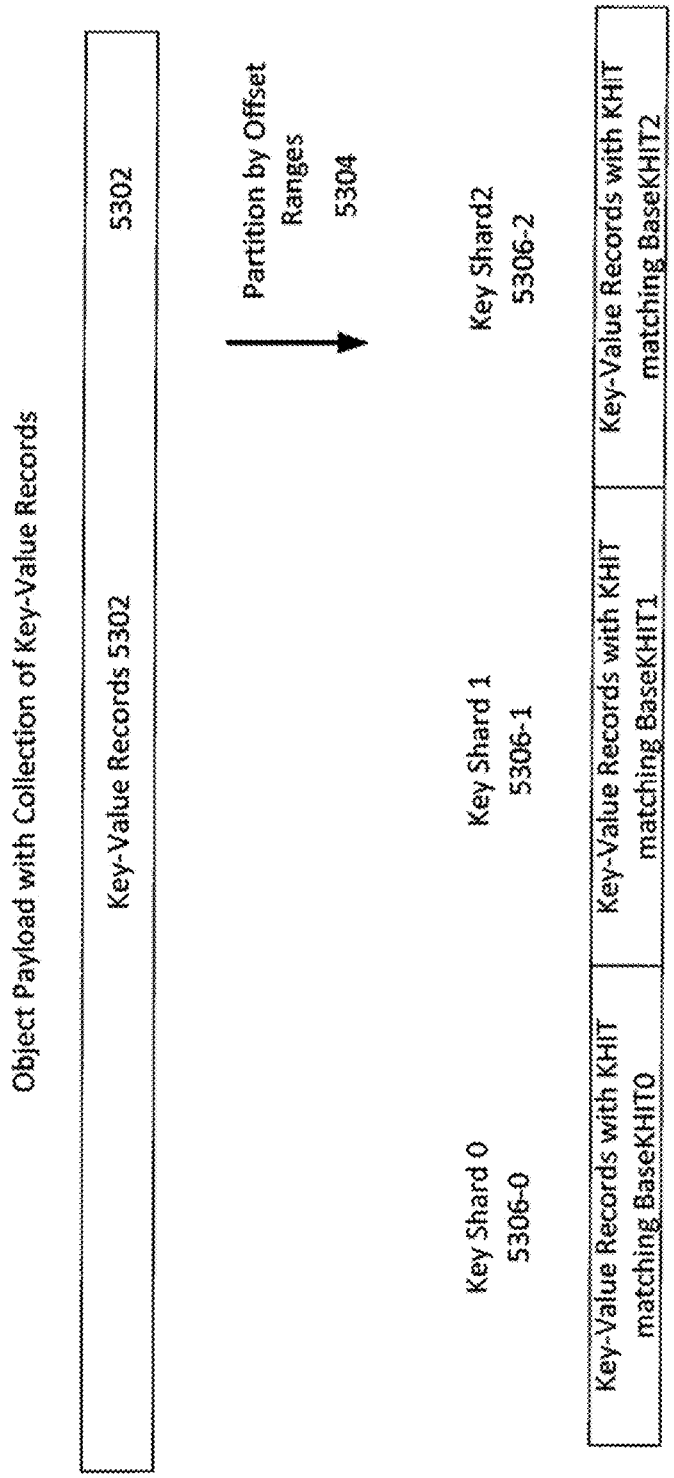
FIG. 53 depicts the partitioning of an object payload into key shards in accordance with an embodiment of the invention.

FIG. 53 depicts the partitioning of an object payload into key shards in accordance with an embodiment of the invention. As illustrated, an object payload with a collection of key-value records 5302 is received. The object payload may then be partitioned (divided) 5304 into key shards 0, 1 and 2 (5306-0, 5306-1, and 5306-2). Each key shard has associated with it a Base KHIT, as indicated by BaseKHIT0, BaseKHIT1, and BaseKHIT2. Key shard 0 contains key-value records that have KHITs which match BaseKHIT0 (over the specified match length); Key shard 1 contains key-value records that have KHITs which match BaseKHIT1 (over the specified match length); and Key shard 2 contains key-value records that have KHITs which match BaseKHIT2. The matching is done only for the number of bits specified by the match length in the key-shard chunk reference. Note that, while the illustrative example of FIG. 53 shows partitioning into three key shards, the partitioning may create any number of key shards (two or more, to be useful).

Determining the Negotiating Group for a Key Shard

Figure 54:
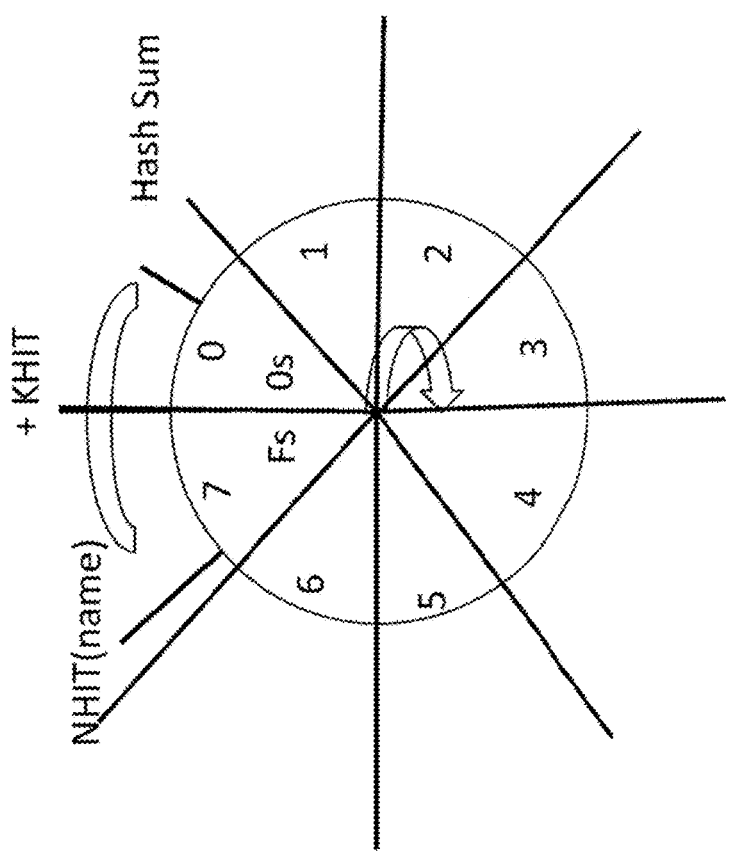
FIG. 54 illustrates a flexible hashing procedure to determine a negotiating group for storing and accessing a payload chunk of a "key shard" in accordance with an embodiment of the invention.

FIG. 54 illustrates a flexible hashing procedure to determine a negotiating group for storing and accessing a payload chunk of a "key shard" in accordance with an embodiment of the invention. As described below, this procedure may utilize the object's NHIT and KHITs associated with the key shards to distribute the key shards amongst the negotiating groups of the distributed storage system.

As depicted, starting with the NHIT based on the object's name, the KHIT for a particular key shard of the object is added so as to generate a hash sum. The ING based on the hash sum (for example, the least-significant 16 bits of the hash sum in our example hash circle) determines which negotiating group is used to store (and provide access to) the payload chunk for the particular shard. For example, as depicted, the hash sum for a key shard may fall within the range of Negotiating Group 0, so Negotiating Group 0 is used to store and access that block shard.

As described above, the flexible hashing procedure may be used to effectively "pre-assign" payload chunks for a key-sharded object to specific negotiating groups before the content of each payload chunk is known. In other words, the negotiating groups of the key shards are pre-assigned before knowing their content. This provides the following beneficial impacts which allow "delta" edits of a key shard to be performed efficiently.

First, a gateway to the distributed storage system does not have to retrieve or store the existing payload chunks of a key-sharded object to enable efficient editing of portions of it. This is because the payload chunk associated with a key shard may be accessed without knowing its content. This is particularly beneficial when caching resources in the gateway server are limited.

Second, only altered portions of a payload chunk for a key shard, rather than the entire chunk, needs to be transferred over the network. This is because the hash sum that is used to access the payload chunk of a key shard does not depend on its content. For example, if a key-value record in the payload of a key shard needs updating, only the data for that record needs to be transferred. Advantageously, this greatly reduces the required bandwidth to do such a delta edit or partial update.

Third, because delta edits may be efficiently performed, larger chunks can be used to encode large objects, such as virtual disks, reducing the depth of the metadata required to support large objects.

Gateway Servers and Putget Brokers and Agents

In one embodiment of the invention, the put and get transactions described below may be performed by a gateway server (i.e. a gateway to the distributed storage system). As described above, a subset of the storage servers may be gateway servers.

Figure 55:
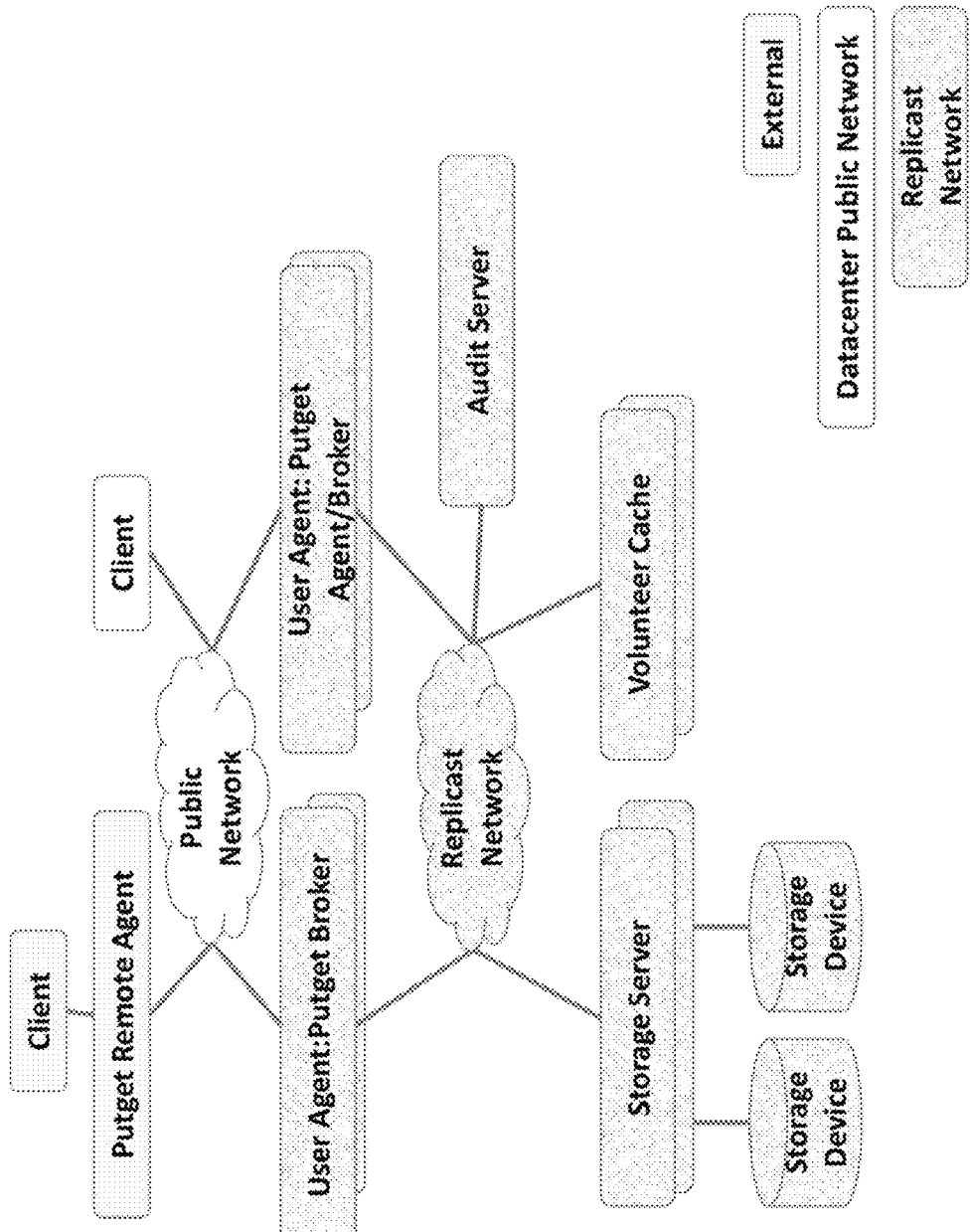
FIG. 55 depicts a system with putget brokers and agents in accordance with an embodiment of the invention.

In an alternate embodiment, the put and get transactions described below may be performed using a putget broker and a putget agent, as depicted in FIG. 55. As depicted in FIG. 55, the putget agent receives/sends messages from/to the client, and the putget broker receives/sends messages from/to the object storage system (the "replicast" network in FIG. 55). The putget broker may be implemented in a user agent in the object storage system. The putget agent may be combined with the putget broker in a user agent, or the putget agent may be remote at the client. The client and the object storage system may communicate through a public network (or, alternatively, a private network). The object storage system may include multiple storage servers, each of which may utilize multiple storage devices. Other components of the object storage system may include multiple volunteer caches and an audit server.

Put Transaction to Create New Object Version

Figure 56:
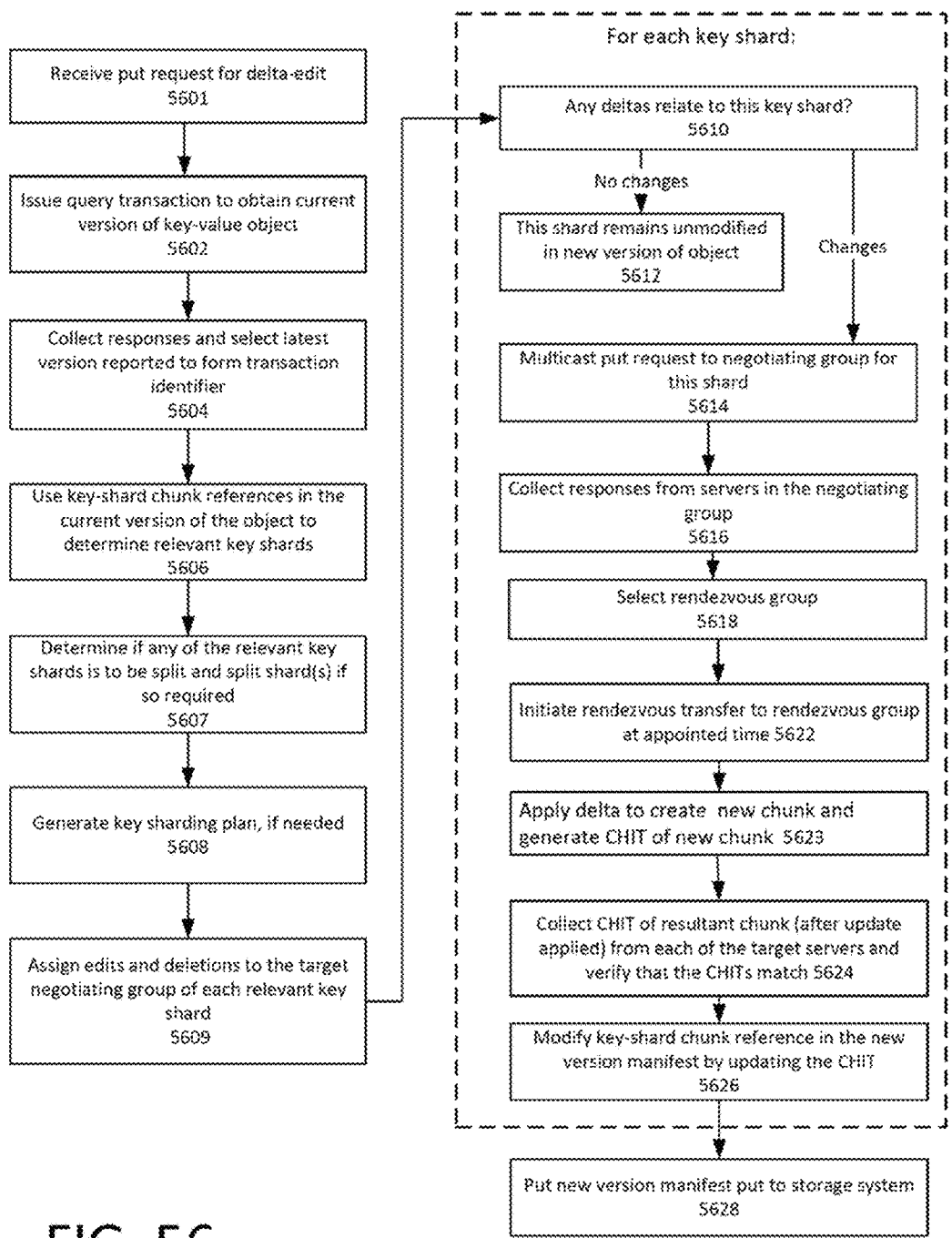
FIG. 56 is a flow chart of a put transaction to create a new object version based upon a prior version with enumerated edits in accordance with an embodiment of the invention.

FIG. 56 is a flow chart of a put transaction 5600 to create a new object version based upon a prior version with enumerated edits in accordance with an embodiment of the invention. In other words, the put transaction 5600 performs a delta edit of a named object stored in a distributed storage system.

In step 5601, the put request for the delta edit may be received by a gateway server (or putget broker). The delta edit may specify changes to key-value records in the payload of the named object. The changes may include insertions of key-value records and/or deletion of key-value records.

In step 5602, the gateway server (or putget broker) issues a query transaction to obtain the current version of the key-value object to be modified.

In step 5604, the gateway server (or putget broker) collects the responses and selects the latest version reported as the current version to form its Transaction Identifier (Transaction ID). The current version of the object includes the current key-shard chunk references for the key-sharded object. An example of such a key-shard chunk reference is described above in relation to FIG. 52.

In step 5606, the gateway server (or putget broker) may determine, from Base KHITs in the key-shard chunk references, the key shard (or shards) that contain (or are assigned to contain) key-value records to be changed by the enumerated edits. Such key shards may be referred to as the "relevant key shards".

In step 5607, the gateway server (or putget broker) then determines if splitting of any of the relevant key shards is required, and the relevant key shards are split if so required. Splitting of a key shard is described further below.

In step 5608, a key sharding plan may be generated by the gateway server (or putget broker) for the new version of the object to be created, if needed. The key sharding plan indicates the partitioning of the key-value records of the object into key shards. In this case, the key sharding plan for the new version depends on the key sharding plan for the current version and on the above-mentioned shard splitting.

In step 5609, the gateway server (or putget broker) may assign edits (insertions and/or deletions of key-value records) to the target negotiating group for each relevant key shard. The negotiating group for each relevant key shard may be determined as described above in relation to FIG. 54.

For each key shard, the following steps 5610 through 5626 may be performed.

In step 5610, a determination may be made by the gateway server (or putget broker) as to whether there are any deltas (changes) that relate to this key shard. If there are no changes to this key shard, then this key shard will be unmodified in the new version, per step 5612. Otherwise, if there are changes to this key shard, then this key shard is a "relevant key shard. For each relevant key shard, the following steps may be performed:

In step 5614, a put request (put proposal) may be multicast by the gateway server (or putget broker) to the selected negotiating group. The put request may specify, for example: the referenced chunk to be used as the base chunk for the merge operation; and the size of the delta payload to be merged.

In step 5616, responses (put accepts: either "not now", or a rendezvous proposal) from storage servers in the negotiating group are collected. Note that responses from storage servers that do not currently have the reference chunk stored locally will be at a distinct disadvantage to those from servers that do have the chunk available locally.

In step 5618, the rendezvous group may selected based on the put accepts. The selection of the rendezvous group may be performed by a client-consensus-based procedure described above in Sections I (Scalable Transport for Multicast Replication) and II (Scalable Object Storage Using Multicast Transport).

In step 5622, the initiation of the rendezvous transfer to the target servers in the rendezvous group may be performed at the appointed time.

In step 5623, each target server in the rendezvous group applies the supplied delta to the existing reference Chunk. This results in a new chunk, which is stored locally. In addition, the CHIT of the new chunk may be computed, and the CHIT may be sent to the gateway server (or putget broker).

In step 5624, a CHIT of the resulting chunk (after application of the update or changes) is collected by the gateway server (or putget broker) from each of the target servers, and verification is performed that these CHITs all match.

In step 5626, the key-shard chunk reference in the new Version Manifest (and/or referenced co-located Chunk Manifests) may be modified by updating the CHIT to the received CHIT.

Finally, in step 5628, the new Version Manifest (and/or co-located Content Manifests) may be put to the storage system by the gateway server (or putget broker) using a single transaction. This manifest put may complete a compound rendezvous transfer (if both the update to the shard and the new version manifest are put using rendezvous transfers).

Splitting a Key Shard

When the number of records already stored in a single key shard is the maximum desired, the user agent will split the "original" (pre-split) key shard into two "resultant" (post-split) key shards. Each of the two resultant key shards may contain a fraction (preferably half) of the content of the original shard, and two key-shard chunk references may be created for the two resultant key shards.

The splitting may be accomplished using two merge transaction, each merge transaction creating a payload chunk for one resultant key shard. Each merge transaction may reference the payload chunk of the original key shard, but specify which half of the records within that chunk are to be referenced as the base content for the new payload chunk being created.

Sub-Partitioning a Key Shard

A partition key and partial-key-shard chunk references may be utilized as described above to divide an object into key shards. However, there are use cases where it is desirable to sub-partition a key shard into multiple chunks. For example, a word count object may have a key shard that grows to have so many references for certain popular words that the key shard should be sub-partitioned.

In accordance with an embodiment of the invention, such sub-partitioning may be performed using the full key and full-key-shard chunk references. In particular, a partial-key-shard chunk reference with the single Base KHIT of the key shard to be sub-partitioned is created, where the CHIT in the partial-key-shard chunk reference is the CHIT of a content manifest. The content manifest is filled with multiple full-key-shard chunk references, each full-key-shard chunk reference corresponding to a sub-partition of the key shard. Each sub-partition may be used to further refine the assignment of key-value records to chunk payloads.

Although unlikely to be needed, these references may themselves refer to content manifests. However, in a preferred implementation, a maximum-sized content manifest may reference hundreds of thousands of payload chunks, so such an additional layer of indirection will be rarely needed.

Get Transaction

Figure 57:
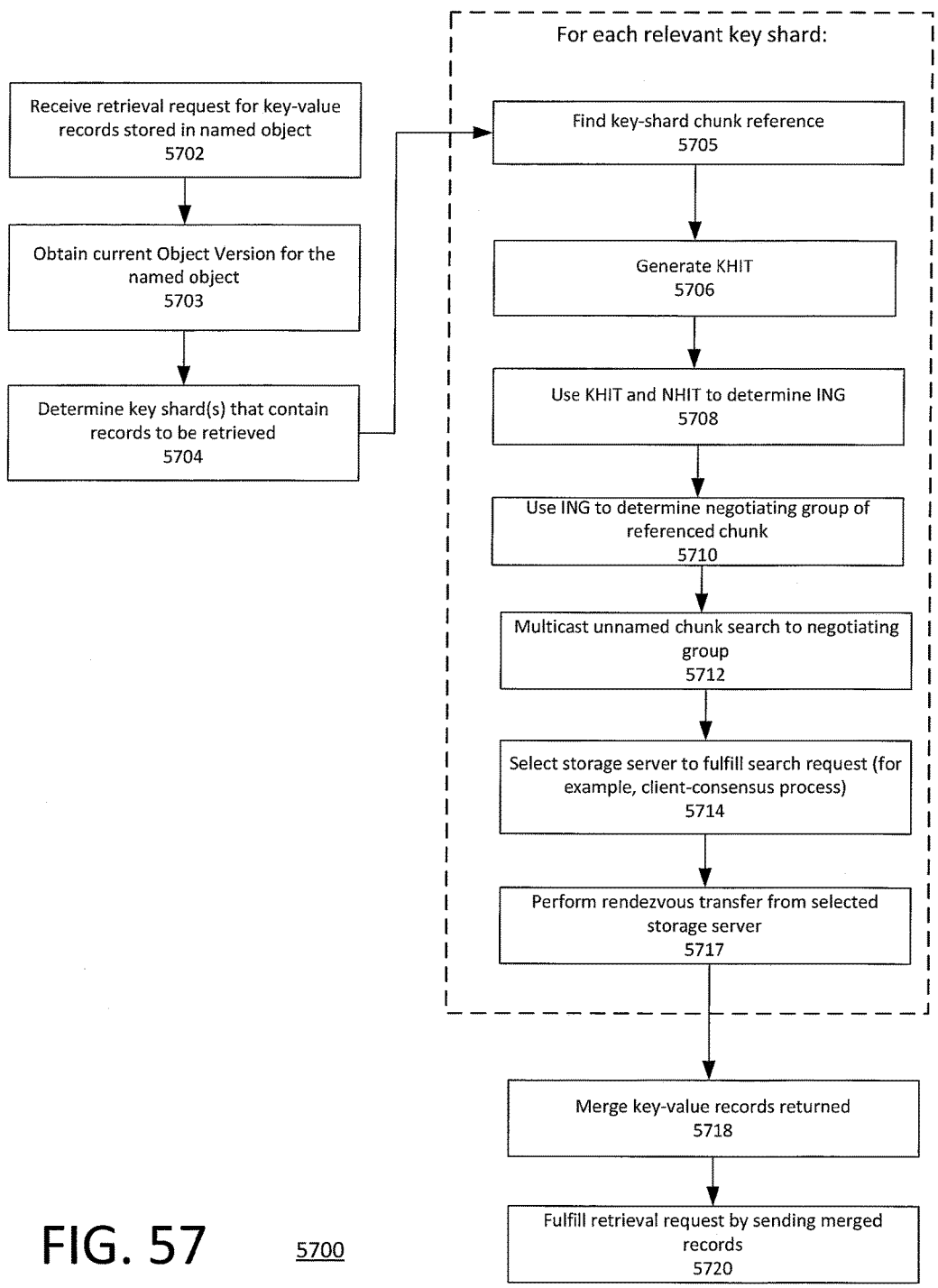
FIG. 57 is a flow chart of a method to perform a get transaction to collect and obtain key-value records from selected replicas of relevant key shards in accordance with an embodiment of the invention.

FIG. 57 is a flow chart of a method to perform a get transaction 5700 to collect and obtain key-value records from selected replicas of relevant key shards in accordance with an embodiment of the invention. Advantageously, this method 5700 allows key-value records in a key-sharded object to be retrieved in a highly efficient manner. This method 5700 may extend the client-consensus-based procedure for obtaining a chunk as follows.

Per step 5702, a gateway server (or putget broker) for the distributed storage system may receive a retrieval request for specific key-value records stored in a named object. The retrieval request may originate from a client computer and may be in the form of an extended get request for the object, where the extension enumerates the key-value records of the object that is being requested. The retrieval request may specify, for example, specific key-value records or a specific range of key-value records in the payload for named object.

Per step 5703, the gateway server (or putget broker) may obtain the current Object Version from the Version Manifest for the named object. In an exemplary implementation, the current Object Version may be found by sending a request including the object's name to the negotiating group for Version Manifests.

Per step 5704, the gateway server (or putget broker) may determine, from the current Object Version, the key shard(s) that contain the requested key-value records. Such key shards may be referred to as "relevant key shards".

For each relevant key shard (i.e. for each key shard that contains a requested record or records), the following steps 5705 through 5716 may be performed.

Per step 5705, the gateway server (or putget broker) may find the key-shard chunk reference for the relevant key shard. An example of such a key-shard chunk reference is described above in relation to FIG. 52. As shown in FIG. 52, the key-shard chunk reference provides a CHIT to identify a "referenced chunk" that holds its payload of key-value records.

Per step 5706, the gateway server (or putget broker) may generate the Key Hash Identifying Token (KHIT) for the key shard to be retrieved. This step may be performed using a predetermined hash algorithm.

Per step 5708, the gateway server (or putget broker) may add the KHIT to the object's name hash (NHIT) to determine an Indivisible Negotiating Group (ING). As discussed above, the ING may be represented by a position on a hash circle.

Per step 5710, using a flexible hashing procedure, the ING may be used by the gateway server (or putget broker) to determine the negotiating group for the referenced chunk. An example of flexible hashing is described above in relation to FIG. 54.

Per step 5712, an unnamed chunk search request may be multicast from the gateway server (or putget broker) to the storage servers in the negotiating group. In this case, the negotiating group is that determined by the flexible hashing procedure. In one implementation, the unnamed chunk search request may specify the range of full key values that are being sought, as well as a maximum number of bytes to be returned.

Per step 5714, selection may be made as to which individual storage server in the negotiating group is to provide the requested key-value records to fulfill the unnamed chunk search request. The selection of the individual storage server that provides the referenced chunk, or part thereof, may be made using a client-consensus process (described above in relation to FIGS. 16 and 17, for example), where the putget broker in this case is the "client" in that it determines the storage server to fulfill the request.

The selection of the storage server may be based on the responses to the search request from the storage servers in the negotiating group. The responses may provide a reservation that indicates an appointed time at which the storage server would be able to send the requested content (the referenced chunk or, preferably, the key-value records therefrom).

Per step 5716, a rendezvous transfer may be performed at the appointed time from the selected storage server to the gateway server (or putget broker). The rendezvous transfer may provide the requested content.

Per step 5718, after all of the requested content has been received by the gateway server (or putget broker), the gateway server (or putget broker) may generate a set of merged records that groups together the requested key-value records that were returned by the various rendezvous transfers.

Finally, per step 5720, the set of merged records may be sent to the requesting client (or putget agent) to fulfill the retrieval request. If a putget agent receives the set of merged records, the putget agent may then send it along to the requesting client.

D. Read-Modify-Write Process at Storage Level—Efficient Creation of New Chunks Using Sharding As described above, using sharding (whether block sharding, key sharding, or other similar forms of sharding), an optimal transaction for specifying a new chunk (i.e. an updated shard) for a new version of an object may specify only the delta for that chunk (i.e. only changes made to the shard compared to the current version). This allows retained (unchanged) portions of the shard to be referenced without having to copy its entire contents over the network. Such efficiency is possible because a shard contains a pre-assigned portion of the payload space for an object.

Successive versions of the object may change the payload or manifest chunk assigned for the shard, but the identity of the shard remains intact. (Note that the payload of a shard is contained in a payload chunk for that shard, and the metadata of a shard is a part of the metadata for the object version.) Specifically, the assignment of a persistent negotiating group to each shard allows for highly efficient editing of content, particularly when major portions of the new payload chunk are specified by reference to a prior payload chunk for the shard.

In other words, as taught by the present disclosure, sharding (whether block sharding, key sharding, or other similar forms of sharding) provides substantial efficiency in the creation of a new chunk that is an edited version of an existing chunk. In particular, when major portions of a new chunk are specified by reference to an existing chunk, then sharding allows for the new chunk to be created efficiently at the storage servers, rather than at the gateway.

Figure 58:
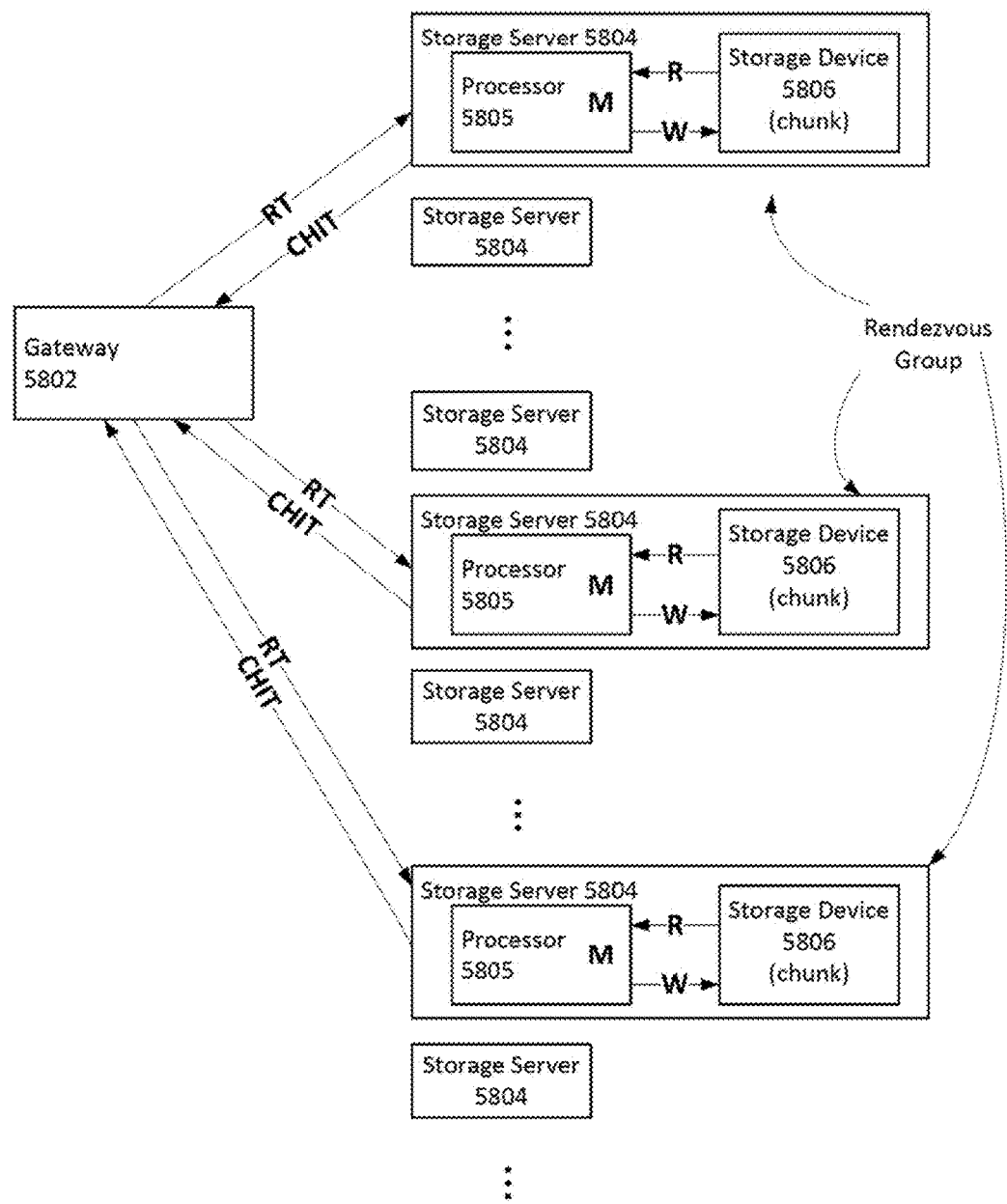
FIG. 58 is a diagram depicting a technique that allows for the creation of the new chunk at the storage servers in a way that conserves storage network bandwidth in accordance with an embodiment of the invention.

The process 5800 that allows for the creation of the new chunk at the storage servers in a way that conserves storage network bandwidth is described below in relation to FIG. 58. Depicted in FIG. 58 is a gateway server 5802 in the distributed object storage system, and a plurality of storage servers 5804.

In this illustrative example, consider that a new chunk is to be created that an edited version of an existing chunk, where the existing chunk is the referenced chunk for a shard of a sharded object. The existing chunk (indicated by "(chunk)" in the figure) is stored in the local storage device 5806 of several of the storage servers 5804 in the negotiating group of the shard.

These storage servers 5804, since they already have the existing chunk stored locally, may be selected to be part of the rendezvous group to store the new chunk, while the other servers which need to obtain the existing chunk, are likely not selected. In this example, the storage servers 5804 with the existing chunk stored locally are selected to be members of the rendezvous group.

As further depicted, a rendezvous transfer (indicated by "RT") may be performed from the gateway server to these storage servers 5804 in the rendezvous group. A storage processor 5805 in each of these storage servers 5804 in the rendezvous group may perform a read-modify-write process that includes the steps of: reading (indicated by "R") the existing chunk from its local storage device; modifying (indicated by "M") the existing chunk as specified by the rendezvous transfer so as create the new chunk; and writing (indicated by "W") the new chunk to its local storage device.

Each storage server 5804 storing the new chunk may apply a cryptographic hash to the payload of the new chunk so as to generate a content hash identifying token (CHIT). The CHITs may be sent to the gateway server 5802, and the gateway server 5802 may collect and compare them. If the CHITs match each other, then the new chunk has been properly created by the storage servers 5804. If they are not the same, then an error is indicated. If an error is indicated, then the gateway server may take corrective action. For example, the rendezvous transfer may be re-sent by the gateway server. In this fashion, the gateway server can cryptographically validate the new chunk without needing to create a memory image of the new chunk itself.

Hence, using the object sharding taught in the present disclosure, the read-modify-write process for a chunk may be performed at the storage servers 5804, without need for the existing chunk to be retrieved by the gateway server 5802 or for the new chunk to be sent to the storage servers 5804. In contrast, in a conventional process, the modification of the chunk is performed at the gateway server 5802, so the gateway server 5802 is required to retrieve the existing chunk from one of the storage servers 5804 and send the new chunk to the storage servers 5804 in the rendezvous group.

Summary of Disclosure for Sections III and IV

The present disclosure provides systems and methods for Key-Value-Tuple-encoded (KVT-encoded) object storage. In accordance with an embodiment disclosed herein, chunks of objects, storing payload data or metadata, are persistently stored by servers using KVT-encoded storage.

Furthermore, the KVT encoding may be applied to advantageously restructure content within a distributed object storage cluster, especially for object storage systems that allow payload references to be cached extensively. For such systems, it is of considerable value to honor (use as valid) existing chunk references after the underlying content has been re-structured. Further, the KVT encoding taught herein is completely compatible with a fully-distributed object storage cluster.

One embodiment disclosed herein relates to a storage server for a distributed object storage system that stores an object in chunks. The storage server includes: a storage server packet processing module that processes requests to put the chunks to, and get the chunks from, the storage server; a persistent storage module that provides a key-value application programming interface that encodes multiple key-value-tuple (KVT) entries for one chunk; and a plurality of persistent storage devices for storing the chunks and the multiple KVT entries.

Another embodiment disclosed herein relates to a method of storing chunks of objects by a storage server in a distributed object storage system. A storage server packet processing module processes requests to put the chunks to, and get the chunks from, the storage server. A persistent storage module provides a key-value application programming interface that encodes multiple key-value-tuple (KVT) entries for one chunk. The chunks and the multiple KVT entries are stored in a plurality of persistent storage devices.

The present disclosure also provides systems and methods for sharding objects stored in a distributed storage system. Such sharding may be advantageously utilized for an object that stores a collection of key-value records and for otherwise encoded objects. In accordance with one embodiment disclosed herein, a block sharding technique is used. In accordance with another embodiment disclosed herein, a key sharding technique is used.

Block sharding is an advantageously efficient technique when dealing with random access objects, such as virtual disk drives or "volumes". One embodiment disclosed herein provides a method of performing a delta edit of a named object stored in a distributed storage system in which a payload of the named object is stored in block shards defined by block-shard chunk references, wherein the block shards store non-overlapping byte ranges of the payload of the named object. A gateway server receives, from a client, a request for a set of delta edits to be applied to the named object. Each delta edit specifies a change to the payload for the named object. The gateway server determines the relevant block shards to which the delta edits apply. Advantageously, the relevant block shards are updated, while other block shards for the named object are not updated.

Another embodiment disclosed herein relates to a method of retrieving a portion of a named object stored in a distributed object storage system. A payload of the named object is stored in block shards defined by block-shard chunk references, wherein the block shards store non-overlapping byte ranges of the payload of the named object. A gateway server receives, from a client, a retrieval request that specifies the portion of the payload for the named object that is to be retrieved. The gateway server determines one or more relevant block shards that need to be obtained in order to fulfill the retrieval request. Content is obtained from the relevant block shards, while content is not obtained from other block shards for the named object.

Another embodiment disclosed herein relates to a distributed storage system that includes a network a plurality of storage servers interconnected by the network. The plurality of storage servers include a plurality of gateway servers, and the plurality of storage servers store a payload of a named object in block shards defined by block-shard chunk references, wherein the block shards store non-overlapping blocks of bytes in referenced chunks.

Key sharding is an advantageously efficient technique when dealing with an object containing a collection of key-value records. One embodiment disclosed herein provides a method of performing a delta edit of a named object stored in a distributed storage system in which a payload of the named object is stored in key shards that are defined by key-shard chunk references, and the payload for the named object comprises a collection of key-value records. Referenced chunks identified by the key shards each stores a subset of the collection of the key-value records, and the key-value records in the subset have key hashes that have a range of matching bits in common. A gateway server receives a request for a set of delta edits to be applied to the named object. Each delta edit specifies an addition or a deletion of a key-value record. The gateway server determines relevant key shards to which the delta edits apply. The relevant key shards are updated while other key shards for the named object are not updated.

Another embodiment disclosed herein relates to a method of retrieving a portion of a named object stored in a distributed object storage system in which a payload of the named object is stored in key shards defined by key-shard chunk references, and the payload for the named object comprises a collection of key-value records. Referenced chunks identified by the key shards each stores a subset of the collection of the key-value records, and the key-value records in the subset have key hashes that have a range of matching bits in common. The gateway server receives a retrieval request that specifies a plurality of key-value records of the payload of the named object. The gateway server determines relevant key shards that need to be obtained in order to fulfill the retrieval request. Content is obtained from the relevant key shards, while content is not obtained from other key shards of the named object.

The object sharding techniques advantageously enable a read-modify-write process at the storage server level. One embodiment disclosed herein provides a method of creating a new chunk by modifying a payload of an existing chunk at the storage server level in a distributed object storage system. A rendezvous transfer is sent from a gateway server to storage servers in a rendezvous group, wherein the rendezvous transfer specifies a change to the payload of the existing chunk. The payload of the existing chunk is read from a storage device by each of the storage servers in the rendezvous group. The payload of the existing chunks modified by applying the specified change to create a new payload by each of the storage servers in the rendezvous group. A cryptographic hash is applied to the new payload to generate a new content hash identifying token by each of the storage servers in the rendezvous group. The new chunk is written to the storage device by each of the storage servers in the rendezvous group, wherein the new chunk includes the new payload and the new content hash identifying token. Finally, the new chunk is validated at the gateway server.

Other embodiments, aspects, and features are also disclosed.

Glossary of Terms for Sections III and IV

The following select definitions are presented to illuminate specific embodiments of the presently-disclosed invention, but they are not necessarily meant to limit the scope of the invention.

Back-Reference KVT—A KVT that encodes the Back-References for a Chunk.

Back-Reference CHIT—Content Hash Identifying Token of a KVT containing Back References.

CHIT—See Content Hash Identifying Token.

Chunk—In relation to the KVT encoding described herein, a chunk is a portion of the representation of an Object and may be either a Payload Chunk or a Manifest Chunk.

Chunk Back Reference—A single record recording one back-reference from a Chunk to other chunks that reference it. A Payload Chunk has either speculative back-references (the Transaction ID of the Transaction that will create the Version Manifest which ultimately references this Payload Chunk) or a verified back-reference (which specifies the CHIT of the referencing Manifest). A non-root Content Manifest has the same Back References. While a Chunk has more than one Back Reference, it cannot be deleted from a designated storage device.

Chunk Reference—A record with a Manifest that references Payload or Metadata stored in other chunks, or which includes that data inline. The Chunk Reference may identify the chunk by a CHIT.

Chunk Slice—A Chunk Slice is one aspect of a Chunk. A typical implementation of a Storage Server will write the slices of a chunk at different times. For example, the Chunk Slice holding the payload of a chunk is written once (and then fetched and replicated), but the Back References for a Chunk will be modified many times.

CM-CHIT—Content Manifest CHIT.

Content Hash Identifying Token (CHIT)—An identifying token for a chunk formed by applying a cryptographic hash on the content. The full token includes both the cryptographic hash value and an enumerator identifying the cryptographic hash algorithm used. When used to identify a chunk, a CHIT may be referred to as a Chunk Hash ID. Note that named chunks (Version Manifests) are also identified by their Name Hash Identifying Token (NHIT).

Content Manifest—Manifest that is not the root manifest (or Version Manifest) for a specific Object Version. It is referenced either by another Content Manifest or the Version Manifest.

Cryptographic Hash—The result of applying a hash algorithm to a name or payload. The algorithm is variable, and indicated with an enumerator. By default a cryptographic hash algorithm is used which protects against a pre-image attack. However, other hash algorithms that make accidental collisions effectively impossible may be used.

Derivative Data—Data that is functionally derived from the main payload of a Chunk.

Designated Storage Device—A storage device responsible for retaining persistent replica of a particular chunk. A device is the designated storage device for a set of chunks.

Device Transaction Log—A per storage device log of transactions that is used as a history of transactions and to enable recovery after a sudden power failure. Without a transaction log all transactions would require more writes to achieve a single write that created the new state with no risk of loss of data.

Fully Qualified Object Name—A globally unique name of an object that begins with a unique identifier of the tenant.

Gateway Server—A storage server that may be used as a gateway to access a distributed storage system.

Key-Value Record—A unique record within a key-value collection where each record has a unique variable length key value and an optional variable length value.

Key-Value Tuple—An encoding of a named subset of the information concerning a Chunk on local key-value storage by a storage server. The term "Key Value Tuple" is used when referring to indexed access to the data, while "Chunk Slice" is used when describing the data without reference to how it is stored locally.

KVT—See Key-Value Tuple.

Manifest—A Chunk that encodes a Manifest, which can be either a Version Manifest or a Content Manifest. Manifests are encoded as special KVT types to enable finding all manifests when recovering from a system failure.

Name Hash Identifying Token—An identifying token of an Object formed by calculating a cryptographic hash of the fully qualified object name. The token includes an enumerator specifying which cryptographic hash algorithm was used as well as the cryptographic hash result itself.

NHIT—See Name Hash Identifying Token.

Object—A named collection of one or more versions only one of which is current.

Payload Chunk—A Chunk storing a portion of the payload for an object. Payload chunks may be simple byte arrays, lines of text or an array of key-value records sorted by the key. Note that, in a preferred embodiment, key-value records within a Payload Chunk are sorted within that chunk by their full key.

Storage Device—A logical device that stores chunks persistently. A storage server manages each storage device. In a preferred embodiment, a storage device can only be in three states—working, unusable, cold/unpowered and read-only. Each Storage Device may be identified by a unique L3 address. In the preferred implementation, the L3 address is an IPV6 address.

Storage Server—A network entity that manages one or more storage devices.

Transaction Log CHIT—Transaction Log for a given Storage Device. When the in-memory Transaction Log is full, the accumulated entries are written to disk and the resulting CHIT is recorded in a Prior-Translation-Log-Chit entry as the record to replace all of those just written.

Transaction Log KVT—A KVT that encodes a set of transaction log entries committed to persistent storage in one write transaction.

User Object—An object created by a user action.

Version Manifest—A Manifest that is the root of the metadata for a Version Manifest.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of creating a new chunk by modifying a payload of an existing chunk of a named object in a distributed object storage system, the method comprising:

sending a rendezvous transfer from a gateway server to storage servers in a rendezvous group, wherein the rendezvous transfer specifies a change to the payload of the existing chunk, wherein the rendezvous group is a subset of the storage servers in a negotiating group for the existing chunk, and wherein the storage servers in the negotiating group are selected using a name hash identifying token that is generated by applying a predetermined hashing algorithm to the named object;

reading the payload of the existing chunk from a storage device by each of the storage servers in the rendezvous group;

modifying the payload of the existing chunk by applying the specified change to create a new payload by each of the storage servers in the rendezvous group;

applying a cryptographic hash to the new payload to generate a new content hash identifying token by each of the storage servers in the rendezvous group;

writing the new chunk to the storage device by each of the storage servers in the rendezvous group, wherein the new chunk includes the new payload and the new content hash identifying token; and validating the new chunk by the gateway server, wherein a payload of the named object is stored in existing chunks which are key shards that are defined by key-shard chunk references, wherein the payload for the named object comprises a collection of key-value records, and wherein referenced chunks identified by the key shards each stores a subset of the collection of the key-value records, where the key-value records in the subset have key hashes that have a range of matching bits in common.

2. The method of claim 1, wherein the gateway server cryptographically validates the new chunk without needing to create a memory image of the new chunk.

3. The method of claim 1, further comprising:

sending new content hash identifying tokens from the storage servers in the rendezvous group to the gateway server; and determining, by the gateway server, whether the new content hash identifying tokens match with each other.

4. The method of claim 3, further comprising:

determining that the new chunk was successfully stored if the new content hash identifying tokens match with each other; and determining that an error occurred in storing the new chunk if at least one of the new content hash identifying tokens does not match with the others.

5. The method of claim 1, wherein a payload of a version of the named object is stored in block shards defined by block-shard chunk references, wherein chunks referenced by the block-shard chunk references store non-overlapping byte ranges of the payload of the named object.

6. The method of claim 5, further comprising:

receiving, by the gateway server from a client, a request for a set of delta edits to be applied to the named object, wherein each delta edit specifies a change to the payload for the named object.

7. The method of claim 6, further comprising:
determining, by the gateway server, the relevant block shards to which the delta edits apply; and
updating, by the storage servers, the relevant block shards, while not updating other block shards for the named object.

8. The method of claim 1, further comprising:
receiving, by a gateway server, a request for a set of delta edits to be applied to the named object, wherein each delta edit specifies an addition or a deletion of a key-value record.

9. The method of claim 8, further comprising:
determining, by the gateway server, the relevant key shards to which the delta edits apply; and
updating, by the storage servers, the relevant key shards, while not updating other key shards for the named object.

10. A distributed storage system that stores a payload of a named object in chunks, the system comprising:
a plurality of storage servers; and
a plurality of gateway servers communicatively interconnected with, and providing access to, the plurality of storage servers,
wherein a procedure for creating a new chunk by modifying a payload of an existing chunk comprises:
sending a rendezvous transfer from a gateway server to the storage servers in a rendezvous group, wherein the rendezvous transfer specifies a change to the payload of the existing chunk, wherein the rendezvous group is a subset of the storage servers in a negotiating group for the existing chunk, and wherein the storage servers in the negotiating group are selected using a name hash identifying that is generated by applying a predetermined hashing algorithm to the named object;
reading the payload of the existing chunk from a storage device by each of the storage servers in the rendezvous group;
modifying the payload of the existing chunk by applying the specified change to create a new payload by each of the storage servers in the rendezvous group;
applying a cryptographic hash to the new payload to generate a new content hash identifying token by each of the storage servers in the rendezvous group;
writing the new chunk to the storage device by each of the storage servers in the rendezvous group, wherein the new chunk includes the new payload and the new content hash identifying token; and
validating the new chunk by the gateway server, and
wherein a payload of the named object is stored in existing chunks which are key shards that are defined by key-shard chunk references, wherein the payload for the named object comprises a collection of key-value records, wherein referenced chunks identified by the key shards each stores a subset of the collection of the key-value records, and wherein the key-value records in the subset have key hashes that have a range of matching bits in common.

11. The system of claim 10, wherein the gateway server cryptographically validates the new chunk without needing to create a memory image of the new chunk.

12. The system of claim 10, wherein the procedure for creating the new chunk by modifying the payload of the existing chunk comprises further comprises:

sending new content hash identifying tokens from the storage servers in the rendezvous group to the gateway server; and
determining, by the gateway server, whether the new content hash identifying tokens match with each other.

13. The system of claim 12, wherein the procedure for creating the new chunk by modifying the payload of the existing chunk comprises further comprises:
determining that the new chunk was successfully stored if the new content hash identifying tokens match with each other; and
determining that an error occurred in storing the new chunk if at least one of the new content hash identifying tokens does not match with the others.

14. The system of claim 10, wherein a payload of the named object is stored in existing chunks which are block shards defined by block-shard chunk references, and wherein the block shards store non-overlapping byte ranges of the payload of the named object.

15. The system of claim 14, wherein the procedure for creating the new chunk by modifying the payload of the existing chunk comprises further comprises:
receiving, by the gateway server from a client, a request for a set of delta edits to be applied to the named object, wherein each delta edit specifies a change to the payload for the named object.

16. The system of claim 15, wherein the procedure for creating the new chunk by modifying the payload of the existing chunk comprises further comprises:
determining, by the gateway server, the relevant block shards to which the delta edits apply; and
updating, by the storage servers, the relevant block shards, while not updating other block shards for the named object.

17. The system of claim 10, wherein the procedure for creating the new chunk by modifying the payload of the existing chunk comprises further comprises:
receiving, by a gateway server, a request for a set of delta edits to be applied to the named object, wherein each delta edit specifies an addition or a deletion of a key-value record.

18. The system of claim 17, wherein the procedure for creating the new chunk by modifying the payload of the existing chunk comprises further comprises:
determining, by the gateway server, the relevant key shards to which the delta edits apply; and
updating, by the storage servers, the relevant key shards, while not updating other key shards for the named object.

19. A non-transitory computer-readable medium comprising instructions stored thereon, that when executed by one or more processors at a plurality of servers within a distributed storage system, perform the steps of:
sending a rendezvous transfer from a gateway server to storage servers in a rendezvous group, wherein the rendezvous transfer specifies a change to the payload of the existing chunk, wherein the rendezvous group is a subset of the storage servers in a negotiating group for the existing chunk, and wherein the storage servers in the negotiating group are selected using a name hash identifying token that is generated by applying a predetermined hashing algorithm to the named object;
reading the payload of the existing chunk from a storage device by each of the storage servers in the rendezvous group;

modifying the payload of the existing chunk by applying the specified change to create a new payload by each of the storage servers in the rendezvous group;

applying a cryptographic hash to the new payload to generate a new content hash identifying token by each of the storage servers in the rendezvous group;

writing the new chunk to the storage device by each of the storage servers in the rendezvous group, wherein the new chunk includes the new payload and the new content hash identifying token; and validating the new chunk by the gateway server, wherein a payload of the named object is stored in existing chunks which are key shards that are defined by key-shard chunk references, wherein the payload for the named object comprises a collection of key-value records, and wherein referenced chunks identified by the key shards each stores a subset of the collection of the key-value records, where the key-value records in the subset have key hashes that have a range of matching bits in common.

20. The non-transitory computer readable medium of claim 19, wherein the gateway server cryptographically validates the new chunk without needing to create a memory image of the new chunk.

* * * * *